US012227688B2

(12) United States Patent
Bae et al.

(10) Patent No.: US 12,227,688 B2
(45) Date of Patent: Feb. 18, 2025

(54) DYE-DOPED LIQUID-CRYSTAL MEDIUM COMPRISING POLYMERIZABLE COMPOUNDS

(71) Applicant: Merck Patent GmbH, Darmstadt (DE)

(72) Inventors: Hyun-Woo Bae, Pyeongtaek (KR); Jung-Min Lee, Pyeongtaek (KR); Hyun-Jin Yoon, Pyeongtaek (KR); Yong-Kuk Yun, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 156 days.

(21) Appl. No.: 17/735,165

(22) Filed: May 3, 2022

(65) Prior Publication Data

US 2022/0389321 A1 Dec. 8, 2022

(30) Foreign Application Priority Data

May 4, 2021 (EP) .................................... 21171926

(51) Int. Cl.

| | |
|---|---|
| ***C09K 19/46*** | (2006.01) |
| ***C09K 19/04*** | (2006.01) |
| ***C09K 19/60*** | (2006.01) |
| ***G02F 1/1333*** | (2006.01) |
| ***G02F 1/13357*** | (2006.01) |
| ***G02F 1/1341*** | (2006.01) |

(52) U.S. Cl.

CPC ............ *C09K 19/46* (2013.01); *C09K 19/601* (2013.01); *G02F 1/133365* (2013.01); *G02F 1/133617* (2013.01); *G02F 1/1341* (2013.01); *C09K 2019/0448* (2013.01); *G02F 2202/36* (2013.01)

(58) Field of Classification Search

CPC ..................................................... C09K 19/42

See application file for complete search history.

(56) References Cited

U.S. PATENT DOCUMENTS 11,236,271 B2 2/2022 Song et al.

FOREIGN PATENT DOCUMENTS

| | | | | | |
|---|---|---|---|---|---|
| CN | 107922844 A | * | 4/2018 | ............. | C09K 19/12 |
| CN | 109669290 A | * | 4/2019 | ............. | C09K 19/12 |
| GB | 2539908 A | * | 1/2017 | ............. | C09K 19/04 |
| WO | WO-2018046421 A1 | * | 3/2018 | ............. | C09K 19/04 |
| WO | WO-2020115089 A1 | * | 6/2020 | ......... | C09K 19/0403 |

OTHER PUBLICATIONS

Machine Translation of CN 109669290 (Year: 2024).*
Machine Translation of CN 107922844 A1 (Year: 2024).*
European Search Report in corresponding EP22171066 dated Sep. 2, 2022 (pp. 1-6).

* cited by examiner

*Primary Examiner* — Chanceity N Robinson
(74) *Attorney, Agent, or Firm* — Millen White Zelano & Branigan; Csaba Henter

(57) ABSTRACT

A liquid-crystal (LC) medium containing one or more dyes and one or more polymerizable compounds, its use for optical, electro-optical and electronic purposes, in particular in LC displays, especially in colour LC displays of the PSA (polymer sustained alignment) or SA (self-aligning) mode containing a quantum dot colour filter (QDCF), an LC display of the PSA or SA mode containing the LC medium and containing a QDCF, and to a process of manufacturing the LC display.

21 Claims, No Drawings

DYE-DOPED LIQUID-CRYSTAL MEDIUM COMPRISING POLYMERIZABLE COMPOUNDS

The present invention relates to a liquid-crystal (LC) medium comprising one or more dyes and one or more polymerizable compounds, to its use for optical, electro-optical and electronic purposes, in particular in LC displays, especially in colour LC displays of the PSA (polymer sustained alignment) or SA (self-aligning) mode comprising a quantum dot colour filter (QDCF), to an LC display of the PSA or SA mode comprising the LC medium and comprising a QDCF, and to a process of manufacturing the LC display.

The popularity of 8K and gaming monitors leads to an increased need for LC display (LCD) panels having higher refresh rates and thus for LC media having faster response times. Many of these LCD panels are using polymer stabilized (PS) or polymer sustained alignment modes (PSA) modes, like the PS-VA (vertically aligned), PS-IPS (in-plane switching) or PS-FFS (fringe-field switching) mode or modes derived therefrom, or self-aligned (SA) modes like SA-VA which are polymer stabilized.

In the PS or PSA mode a small amount, typically from 0.1 to 1% of one or more polymerizable mesogenic compounds, also known as RMs (reactive mesogens), is added to the LC medium. After filling the LC medium into the display the RMs are then polymerized in situ by UV photopolymerization, while a voltage is applied to the electrodes of the display. Thereby a small tilt angle is generated in the LC molecules of the LC medium, which is stabilized by the polymerized RMs. The UV polymerization process, also referred to as "PSA process", is usually carried out in two steps, a first UV exposure step ("UV1 step"), with application of a voltage, to generate the tilt angle, and a second UV exposure step ("UV2 step"), without application of a voltage, to complete polymerization of the RMs.

In the SA-VA mode the alignment layers are omitted in the display. Instead, a small amount, typically 0.1 to 2.5%, of a self alignment (SA) additive is added to the LC medium, which induces the desired alignment, for example homeotropic or planar alignment, in situ by a self assembling mechanism. The SA additive usually contains an organic, mesogenic core group and attached thereto one or more polar anchor groups, for example hydroxy, carboxy, amino or thiol groups, which are capable of interacting with the substrate surface, causing the additives on the substrate surface to align and induce the desired alignment also in the LC molecules. The SA additive may also contain one or more polymerizable groups that can be polymerized under similar conditions as the RMs used in the PSA process. The LC medium may in addition to the SA additive also contain one or more RMs.

The PSA and SA-VA mode is also used in coloured LCDs. These coloured LCDs do usually contain an RGB colour filter (CF) which is typically comprising a pattern of photoresist materials. The photoresist materials absorb a specific waveband of the incoming light emitted by the backlight and transmit light of a colour complementary to the absorbed waveband. However, the manufacture of such CFs is usually complicated as each colour needs to be deposited and patterned separately followed by hardening the photoresist.

Recently it has been proposed to use CFs for LCDs based on quantum dots (QDs). These quantum dot colour filters (QDCFs) contain red, green and blue QDs and provide several benefits such as an easier manufacturing process, reduced layer thickness, wider viewing angle, and improved colour gamut leading to higher brightness and efficiency. Moreover, QDCFs do not operate by blocking specific wavelengths of light like the conventional CFs. Instead the QDs contain a semiconducting material which is excited by blue light emitted from the backlight and converts this to light of the desired colour. QDCFs can thus be used as an active component rather than a passive one.

However, QDCFs have the drawback that they emit light in all directions, i.e. also into the LC layer. This can lead to a decrease of the colour purity due to undesired reflection of the light by the QDs at the interface between the LC layer and the backlight.

It was therefore an object of the present invention to provide methods and materials which allow to overcome the drawbacks of QDCFs used in LC displays, especially those of the PSA or SA-VA mode.

It was found that this object could be achieved by providing LC media as disclosed and claimed hereinafter. These are characterized in that they additionally contain a blue dye and/or a red dye. The blue dye is chosen such that it absorbs red light emitted by the QDCF into the LC layer, while the red dye is chosen such that it absorbs green light emitted by the QDCF into the LC layer. This will reduce undesired reflection at the interface between the LC layer and the backlight and thereby enable higher colour purity. Moreover, the blue and red dye are chosen such that they do not absorb light reflected by the blue backlight of the display, and thus do not affect excitation of the QDs, thereby avoiding an undesired loss of brightness.

The invention relates to an LC medium having negative dielectric anisotropy, characterized in that it comprises one or more polymerizable compounds of formula I $$\text{P-Sp-A}^a\text{-(Z}^a\text{-A}^b)_z\text{-R}^b \qquad \text{I}$$

wherein the individual radicals, independently of each other and on each occurrence identically or differently, have the following meanings $R^b$ P-Sp- or R, R F, Cl, —CN or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O—, $CR^0$═$CR^{00}$—, —C≡C—

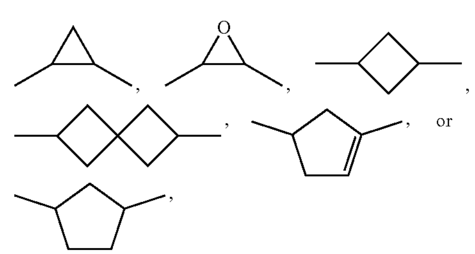

in such a manner that O- and/or S-atoms are not directly connected with each other, and wherein one or more H atoms are each optionally replaced by F or Cl or P-Sp-, P a polymerizable group, Sp a spacer group which is optionally substituted by P, or a single bond, $A^a$, $A^b$ an alicyclic, heterocyclic, aromatic or heteroaromatic group with 4 to 20 ring atoms, which is mono-cyclic or polycyclic and which is optionally substituted by one or more groups L or P-Sp-, $Z^a$ —O—, —S—, —CO—, —CO—O—, —O—CO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH═CH—, —CF═CF—, —CH═CF—, —CF═CH—, —C≡C—, —CH═CH—CO—O—, —O—CO—CH═CH—, —$CH_2$—$CH_2$—CO—O—, —O—CO—$CH_2$—$CH_2$—, —$CR^0R^{00}$—, or a single bond, $R^0$, $R^{00}$ H or alkyl having 1 to 12 C atoms, L F, Cl, —CN, P-Sp- or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O—, $CR^0$═$CR^{00}$—, —C≡C—,

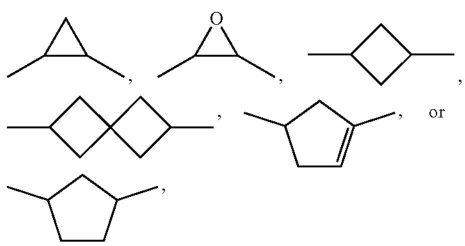

in such a manner that O- and/or S-atoms are not directly connected with each other, and wherein one or more H atoms are each optionally replaced by P-Sp-, F or Cl, z 0, 1, 2, 3 or 4, n1 1, 2, 3 or 4, and that the LC medium further comprises one or more compounds of formula II

II

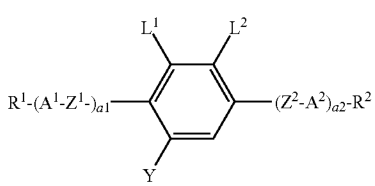

wherein the individual radicals, independently of each other and on each occurrence identically or differently, have the following meanings $R^1$, $R^2$ H or a straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O—, $CR^0$═$CR^{00}$—, —C≡C—,

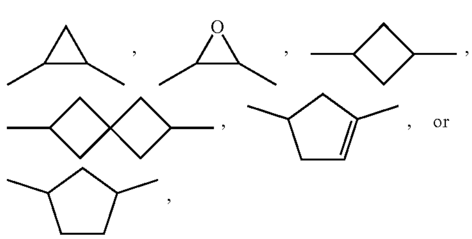

in such a manner that O- and/or S-atoms are not directly connected with each other, and wherein one or more H atoms are each optionally replaced by CN, $CF_3$, F or Cl, preferably alkyl or alkoxy having 1 to 6 C atoms, $A^1$, $A^2$ a group selected from the following formulae

A1

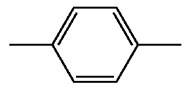

A2

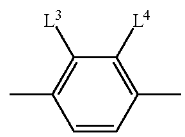

A3

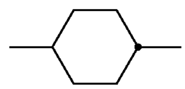

A4

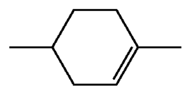

A5

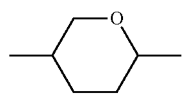

A6

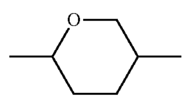

A7

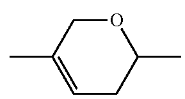

A8

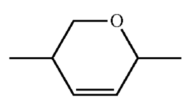

A9

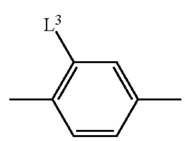

A10

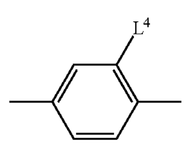

A11

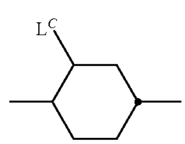

A12

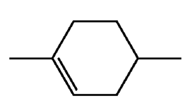

-continued

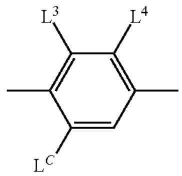
A13

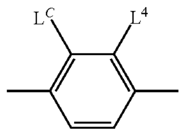
A14

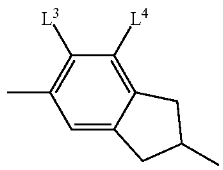
A15

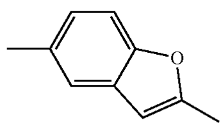
A16 preferably from formulae A1, A2, A3, A4, A5, A6, A9 and A10, very preferably from formulae A1, A2, A3, A4, A5, A9 and A10, $Z^1$, $Z^2$ —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, preferably a single bond, $L^1$, $L^2$, $L^3$, $L^4$ F, Cl, $OCF_3$, $CF_3$, $CH_3$, $CH_2F$ or $CHF_2$, preferably F or Cl, very preferably F, Y H, F, Cl, $CF_3$, $CHF_2$ or $CH_3$, preferably H or $CH_3$, very preferably H, $L^C$ $CH_3$ or $OCH_3$, preferably $CH_3$, a1 0, 1 or 2, a2 0 or 1, and that the LC medium further comprises at least one dye absorbing green light and/or at least one dye absorbing red light.

The invention further relates to the use of the LC medium as described above and below in LC displays of the PSA or SA mode, especially in displays comprising a comprising a quantum dot colour filter (QDCF).

In a preferred embodiment the LC medium further comprises one or more additives selected from the group consisting of self-alignment additives and stabilizers, The invention furthermore relates to a process for preparing an LC medium as described above and below, comprising the steps of mixing one or more polymerizable compounds of formula I with one or more compounds of formula II and one or more dyes absorbing green light and/or one or more dyes absorbing red light and optionally with further LC compounds and/or additives.

The invention furthermore relates to an LC display comprising an LC medium according to the invention as described above and below and a quantum dot colour filter (QDCF), wherein said display is preferably a PSA or SA display, very preferably a PS-VA, PS-IPS, PS-FFS, PS-UB-FFS or SA-VA display.

The invention furthermore relates to an LC display comprising an LC medium and a QDCF as described above and below wherein the polymerizable compounds are present in polymerized form, which is preferably a PSA or SA display, very preferably a PS-VA, PS-IPS, PS-FFS, PS-UB-FFS or SA-VA display.

The invention furthermore relates to an LC display of the PSA type comprising two substrates, at least one which is transparent to light, an electrode provided on each substrate or two electrodes provided on only one of the substrates, a QDCF, and located between the substrates a layer of an LC medium as described above and below, wherein the polymerizable compounds are polymerized between the substrates of the display by UV photopolymerization.

The invention furthermore relates to a process for manufacturing an LC display as described above and below, comprising the steps of filling or otherwise providing an LC medium as described above and below between the substrates of the display, and polymerizing the polymerizable compounds, preferably by irradiation with UV light, preferably while a voltage is applied to the electrodes of the display.

The invention furthermore relates to a process for manufacturing an LC display as described above and below, wherein irradiation of the polymerizable compounds is carried out using a UV-LED lamp.

The LC medium according to the present invention when used in a colour LC display comprising a QDCF, provides several advantages. The LC medium contains a blue dye which selectively absorbs red light and a red dye which selectively absorbs green light. The selective reflection of parts of visible light emitted by the QDCF into the LC layer reduces reflection at the interface between the LC layer and the backlight and thereby enables higher colour purity. The blue and red dyes are preferably selected such that they do not absorb light reflected by the blue backlight of the display, so as not to affect excitation of the QDs and avoid a loss in brightness.

In addition, the LC media according to the present invention show the one or more of the following advantageous properties when used in PSA displays:

- a suitable tilt generation which is inside a certain process window,
- fast polymerization leading to minimal residues of RM after the UV-process,
- a high voltage-holding-ratio after the UV-process,
- good tilt stability,
- sufficient stability against heat,
- sufficient solubility in organic solvents typically used in display manufacture.

In addition the LC media according to the present invention help to solve one or more of the following problems:

- to generate a tilt angle to a desired degree after exposure to UV-light,
- to provide a high tilt stability,
- to show good UV absorption especially at longer UV wavelengths, preferably in the range from 340 to 400 nm, more preferably in the range from 340 to 380 nm, very preferably in the range from 350 to <370 nm, most preferably in the range from 355 to 368 nm, and enable quick and complete polymerization of the RMs at these wavelengths,
- to be suitable for use in PSA displays prepared by a polymerization process using UV-LED lamps,
- to control enable of the time range of the first UV-step in which the tilt angle is generated during UV-processing,
- to keep the time range of the second UV-step as short as possible to minimize production cost, after the first and second UV-exposure step, to reduce or avoid any negative effects of the residual RM on the LC mixture performance parameters, such as VHR, tilt stability, etc.

to provide good solubility and stability in the LC host mixture in a broad temperature range, preferably from −40° C. to ca. 140° C.

An alkenyl group in the compounds of formula II or other components of the LC medium as disclosed below is not considered to be within the meaning of the term "polymerizable group" as used herein. The conditions for the polymerization of the polymerizable compounds of the LC medium are preferably selected such that alkenyl substituents do not participate in the polymerization reaction. Preferably the LC media disclosed and claimed in the present application do not contain an additive that initiates or enhances the participation of the alkenyl group in a polymerization reaction.

Unless stated otherwise, the polymerizable compounds and the compounds of formula II are preferably selected from achiral compounds.

As used herein, the expression "UV light having a wavelength of" followed by a given range of wavelengths (in nm), or by a given lower or upper wavelength limit (in nm), means that the UV emission spectrum of the respective radiation source has an emission peak, which is preferably the highest peak in the respective spectrum, in the given wavelength range or above the given lower wavelength limit or below the given upper wavelength limit and/or that the UV absorption spectrum of the respective chemical compound has a long or short wavelength tail that extends into the given wavelength range or above the given lower wavelength limit or below the given upper wavelength limit.

As used herein, the term "full width half maximum" or "FWHM" means the width of a spectrum curve measured between those points on the y-axis which are half the maximum amplitude.

As used herein, the term "substantially transmissive" means that the filter transmits a substantial part, preferably at least 50% of the intensity, of incident light of the desired wavelength(s). As used herein, the term "substantially blocking" means that the filter does not transmit a substantial part, preferably at least 50% of the intensity, of incident light of the undesired wavelengths. As used herein, the term "desired (undesired) wavelength" e.g. in case of a band pass filter means the wavelengths inside (outside) the given range of □, and in case of a cut-off filter means the wavelengths above (below) the given value of □.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "tilt" and "tilt angle" will be understood to mean a tilted alignment of the LC molecules of an LC medium relative to the surfaces of the cell in an LC display (here preferably a PSA display), and will be understood to be inclusive of "pretilt" and "pretilt angle". The tilt angle here denotes the average angle (<90°) between the longitudinal molecular axes of the LC molecules (LC director) and the surface of the plane-parallel outer plates which form the LC cell. A low absolute value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

As used herein, the terms "reactive mesogen" and "RM" will be understood to mean a compound containing a mesogenic or liquid crystalline skeleton, and one or more functional groups attached thereto which are suitable for polymerization and are also referred to as "polymerizable group" or "P".

Unless stated otherwise, the term "polymerizable compound" as used herein will be understood to mean a polymerizable monomeric compound.

An SA-VA display according to the present invention will be of the polymer stabilised mode as it contains, or is manufactured by use of, an LC medium containing RMs of formula I and II. Consequently as used herein, the term "SA-VA display" when referring to a display according to the present invention will be understood to refer to a polymer stabilised SA-VA display even if not explicitly mentioned.

As used herein, the term "low-molecular-weight compound" will be understood to mean to a compound that is monomeric and/or is not prepared by a polymerization reaction, as opposed to a "polymeric compound" or a "polymer".

As used herein, the term "unpolymerizable compound" will be understood to mean a compound that does not contain a functional group that is suitable for polymerization under the conditions usually applied for the polymerization of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerization. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerizable group(s) in a polymerizable mesogenic compound.

Above and below,

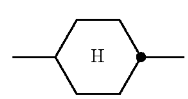

denotes a trans-1,4-cyclohexylene ring, and

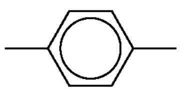

denotes a 1,4-phenylene ring.

In a group

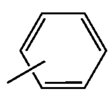

the single bond shown between the two ring atoms can be attached to any free position of the benzene ring.

If in the formulae shown above and below a group $R^{1-12}$, $R^{Q}$, R or L denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

If in the formulae shown above and below a group $R^{1-13}$, $R^{51}$, $R^{52}$, $R^{Q}$, R, $R^{2A}$, $R^{2B}$, $R^{IIIA}$, $R^{1N}$, $R^{2N}$, $R^{B1}$, $R^{B2}$, $R^{CR1}$, $R^{CR2}$, R or L denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

If in the formulae shown above and below a group $R^{1-13}$, $R^{51}$, $R^{52}$, $R^{Q}$, R, $R^{2A}$, $R^{2B}$, $R^{IIIA}$, $R^{1N}$, $R^{2N}$, $R^{B1}$, $R^{B2}$, $R^{CR1}$, $R^{CR2}$, R or L denotes an alkyl radical wherein one or more $CH_2$ groups are replaced by S, this may be straight-chain or branched. It is preferably straight-chain, has 1, 2, 3, 4, 5, 6 or 7 C atoms and accordingly preferably denotes thiomethyl, thioethyl, thiopropyl, thiobutyl, thiopentyl, thiohexyl or thioheptyl.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If in the formulae shown above and below a group $R^{1-13}$, $R^{51}$, $R^{52}$, $R^{Q}$, R, $R^{2A}$, $R^{2B}$, $R^{IIIA}$, $R^{1N}$, $R^{2N}$, $R^{B1}$, $R^{B2}$, $R^{CR1}$ $R^{CR2}$, R or L denotes an alkoxy or oxaalkyl group it may also contain one or more additional oxygen atoms, provided that oxygen atoms are not linked directly to one another.

In another preferred embodiment, one or more of $R^{1-13}$, $R^{51}$, $R^{52}$, $R^{Q}$, R, $R^{2A}$, $R^{2B}$, $R^{IIIA}$, $R^{1N}$, $R^{2N}$, $R^{B1}$, $R^{B2}$, $R^{CR1}$, $R^{CR2}$, R or L are selected from the group consisting of

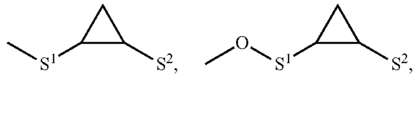

-continued

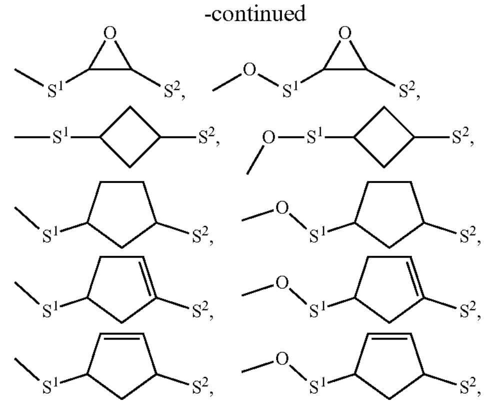

—$S^1$—F, —O—$S^1$—F, —O—$S_1$—O—$S_2$, wherein $S^1$ is $C_{1-12}$-alkylene or $C_{2-12}$-alkenylene and $S^2$ is H, $C_{1-12}$-alkyl or $C_{2-12}$-alkenyl, and very preferably are selected from the group consisting of

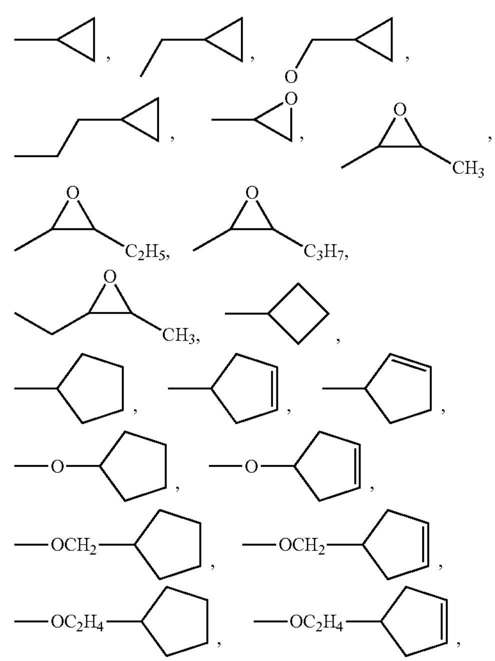

—$OCH_2OCH_3$, —$O(CH_2)_2OCH_3$, —$O(CH_2)_3OCH_3$, —$O(CH_2)_4OCH_3$, —$O(CH_2)_2F$, —$O(CH_2)_3F$ and —$O(CH_2)_4F$.

If in the formulae shown above and below a group $R^{1-13}$, $R^{51}$, $R^{52}$, $R^{Q}$, R, $R^{2A}$, $R^{2B}$, $R^{IIIA}$, $R^{1N}$, $R^{2N}$, $R^{B1}$, $R^{B2}$, $R^{CR1}$, $R^{CR2}$, R or L denotes an alkyl radical in which one $CH_2$ group has been replaced by —CH═CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If in the formulae shown above and below a group $R^{1-13}$, $R^{51}$, $R^{52}$, $R^{Q}$, R, $R^{2A}$, $R^{2B}$, $R^{IIIA}$, $R^{1N}$, $R^{2N}$, $R^{B1}$, $R^{B2}$, $R^{CR1}$, $R^{CR2}$, R or L denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Halogen is preferably F or Cl, very preferably F.

The group —$CR^0$═$CR^{00}$— is preferably —CH═CH—.

—OC—, —CO—, —C(═O)— and —C(O)— denote a carbonyl group, i.e.

Preferred substituents L, are, for example, F, Cl, Br, I, —CN, —$NO_2$, —NCO, —NCS, —OCN, —SCN, —C(═O)N(Rx)$_2$, —C(═O)$Y^1$, —C(═O)$R^x$, —N($R^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl, optionally substituted silyl having 1 to 20 Si atoms, or optionally substituted aryl having 6 to 25, preferably 6 to 15, C atoms, wherein $R^x$ denotes H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P— or P-Sp-, and $Y^1$ denotes halogen.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

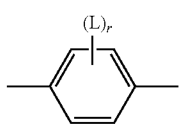

is preferably

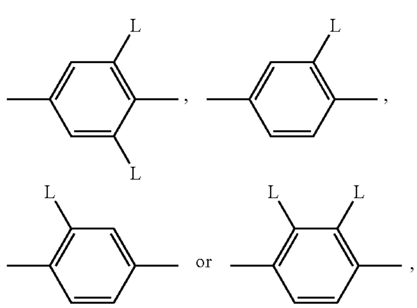

in which L has one of the meanings indicated above.

The polymerizable group P is a group which is suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C═C double bond or —C≡C— triple bond, and groups which are suitable for polymerization with ring opening, such as, for example, oxetane or epoxide groups.

Preferred groups P are selected from the group consisting of $CH_2$═$CW^1$—CO—O—, $CH_2$═$CW^1$—CO—,

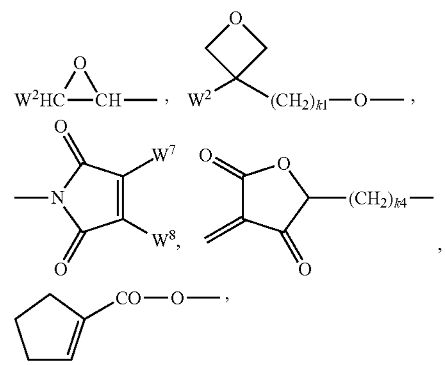

$CH_2$═$CW^2$—(O)$_{k3}$—, $CW^1$═CH—CO—(O)$_{k3}$—, $CW^1$═CH—CO—NH—, $CH_2$═$CW^1$—CO—NH—, $CH_3$—CH═CH—O—, ($CH_2$═CH)$_2$CH—OCO—, ($CH_2$═CH—$CH_2$)$_2$CH—OCO—, ($CH_2$═CH)$_2$CH—O—, ($CH_2$═CH—$CH_2$)$_2$N—, ($CH_2$═CH—$CH_2$)$_2$N—CO—, HO—$CW^2W^3$—, HS—$CW^2W^3$—, $HW^2N$—, HO—$CW^2W^3$—NH—, $CH_2$═$CW^1$—CO—NH—, $CH_2$═CH—(COO)$_{k1}$-Phe-(O)$_{k2}$—, $CH_2$═CH—(CO)$_{k1}$-Phe-(O)$_{k2}$—, Phe-CH═CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2$═$CW^1$—CO—O—, $CH_2$═$CW^1$—CO—,

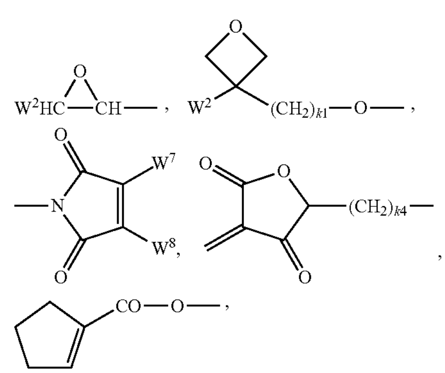

$CH_2{=}CW^2$—O—, $CH_2{=}CW^2$—, $CW^1{=}CH$—CO—$(O)_{k3}$—, $CW^1{=}CH$—CO—NH—, $CH_2{=}CW^1$—CO—NH—, $(CH_2{=}CH)_2CH$—OCO—, $(CH_2{=}CH{-}CH_2)_2CH$—OCO—, $(CH_2{=}CH)_2CH$—O—, $(CH_2{=}CH{-}CH_2)_2N$—, $(CH_2{=}CH{-}CH_2)_2N$—CO—, $CH_2{=}CW^1$—CO—NH—, $CH_2{=}CH$—$(COO)_{k1}$-Phe-$(O)_{k2}$—, $CH_2{=}CH$—$(CO)_{k1}$-Phe-$(O)_{k2}$—, Phe-CH=CH— and $W^4W^5W^6Si$—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2{=}CW^1$—CO—O—, in particular $CH_2{=}CH$—CO—O—, $CH_2{=}C(CH_3)$—CO—O— and $CH_2{=}CF$—CO—O—, furthermore $CH_2{=}CH$—O—, $(CH_2{=}CH)_2CH$—O—CO—,

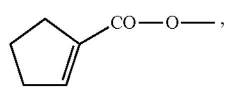

$(CH_2{=}CH)_2CH$—O—,

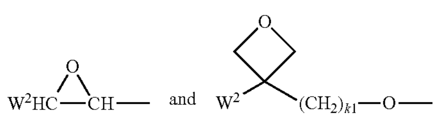

Further preferred polymerizable groups P are selected from the group consisting of vinyloxy, acrylate, methacrylate, fluoroacrylate, chloroacrylate, oxetane and epoxide, most preferably from acrylate and methacrylate.

Very preferably all polymerizable groups in the polymerizable compound have the same meaning.

If the spacer group Sp is different from a single bond, it is preferably of the formula Sp"-X", so that the respective radical P-Sp- conforms to the formula P-Sp"-X"—, wherein Sp" denotes linear or branched alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N($R^0$)—, —Si($R^0R^{00}$)—, —CO—, —CO—O—, —O—CO—, —O—CO—O—, —S—CO—, —CO—S—, —N($R^{00}$)—CO—O—, —O—CO—N($R^0$)—, —N($R^0$)—CO—N($R^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N($R^0$)—, —N($R^0$)—CO—, —N($R^0$)—CO—N($R^{00}$)—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^0$—, —$CY^2{=}CY^3$—, —C≡C—, —CH=CH—CO—O—, —O—CO—CH=CH— or a single bond, $R^0$ and $R^{00}$ each, independently of one another, denote H or alkyl having 1 to 20 C atoms, and $Y^2$ and $Y^3$ each, independently of one another, denote H, F, Cl or CN.

X" is preferably —O—, —S—, —CO—, —COO—, —OCO—, —O—OCO—, —CO—$NR^0$—, —$NR^0$—CO—, —$NR^0$—CO—$NR^{00}$— or a single bond.

Typical spacer groups Sp and -Sp"-X"— are, for example, —$(CH_2)_{p1}$—, —$(CH_2)_{p1}$—O—, —$(CH_2)_{p1}$—O—CO—, —$(CH_2)_{p1}$—CO—O—, —$(CH_2)_{p1}$—O—CO—O—, —$(CH_2CH_2O)_{p1}$—$CH_2CH_2$—, —$CH_2CH_2$—S—$CH_2CH_2$—, —$CH_2CH_2$—NH—$CH_2CH_2$— or —$(SiR^0R^{00})_{p1}$—, in which p1 is an integer from 1 to 12, q1 is an integer from 1 to 3, and $R^0$ and $R^{00}$ have the meanings indicated above.

Particularly preferred groups Sp and -Sp"—X"— are —$(CH_2)_{p1}$—, —$(CH_2)_{p1}$—O—, —$(CH_2)_{p1}$—O—CO—, —$(CH_2)_{p1}$—CO—O—, —$(CH_2)_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

In a preferred embodiment of the invention the compounds of formula I and its subformulae contain a spacer group Sp that is substituted by one or more polymerizable groups P, so that the group Sp-P corresponds to $Sp(P)_s$, with s being ≥2 (branched polymerizable groups).

Preferred compounds of formula I according to this preferred embodiment are those wherein s is 2, i.e. compounds which contain a group $Sp(P)_2$. Very preferred compounds of formula I according to this preferred embodiment contain a group selected from the following formulae:

| | |
|---|---|
| —X-alkyl-CHPP | S1 |
| —X-alkyl-CH($(CH_2)_{aa}$P)($(CH_2)_{bb}$P) | S2 |
| —X—N($(CH_2)_{aa}$P)($(CH_2)_{bb}$P) | S3 |
| —X-alkyl-CHP—$CH_2$—$CH_2$P | S4 |
| —X-alkyl-C($CH_2$P)($CH_2$P)—$C_{aa}H_{2aa+1}$ | S5 |
| —X-alkyl-CHP—$CH_2$P | S6 |
| —X-alkyl-CPP—$C_{aa}H_{2aa+1}$ | S7 |
| —X-alkyl-CHPCHP—$C_{aa}H_{2aa+1}$ | S8 |

in which P is as defined in formula I, alkyl denotes a single bond or straight-chain or branched alkylene having 1 to 12 C atoms which is unsubstituted or mono- or polysubstituted by F, Cl or CN and in which one or more non-adjacent $CH_2$ groups may each, independently of one another, be replaced by —C($R^0$)=C($R^0$)—, —C≡C—, —N($R^0$)—, —O—, —S—, —CO—, —CO—O—, —O—CO—, —O—CO—O— in such a way that O and/or S atoms are not linked directly to one another, where $R^0$ has the meaning indicated above, aa and bb each, independently of one another, denote 0, 1, 2, 3, 4, 5 or 6, X has one of the meanings indicated for X", and is preferably O, CO, $SO_2$, O—CO—, CO—O or a single bond.

Preferred spacer groups $Sp(P)_2$ are selected from formulae S1, S2 and S3.

Very preferred spacer groups $Sp(P)_2$ are selected from the following subformulae:

—CHPP S1a

—O—CHPP S1b

—$CH_2$—CHPP S1c

—$OCH_2$—CHPP S1d

—CH($CH_2$—P)($CH_2$—P) S2a

—OCH($CH_2$—P)($CH_2$—P) S2b

—$CH_2$—CH($CH_2$—P)($CH_2$—P) S2c

—$OCH_2$—CH($CH_2$—P)($CH_2$—P) S2d

—CO—NH($(CH_2)_2$P)($(CH_2)_2$P) S3a

P is preferably selected from the group consisting of vinyloxy, acrylate, methacrylate, fluoroacrylate, chloroacrylate, oxetane and epoxide, very preferably from acrylate and methacrylate, most preferably from methacrylate.

Further preferably all polymerizable groups P that are present in the same compound have the same meaning, and very preferably denote acrylate or methacrylate, most preferably methacrylate.

Sp preferably denotes a single bond or —$(CH_2)_{p1}$—, —$(CH_2)_{p2}$—CH═CH—$(CH_2)_{p3}$—, —O—$(CH_2)_{p1}$—, —O—CO—$(CH_2)_{p1}$, or —CO—O—$(CH_2)_{p1}$, wherein p1 is 2, 3, 4, 5 or 6, preferably 2 or 3, p2 and p3 are independently of each other 0, 1, 2 or 3 and, if Sp is —O—$(CH_2)_{p1}$—, —O—CO—$(CH_2)_{p1}$ or —CO—O—$(CH_2)_{p1}$ the O-atom or CO-group, respectively, is linked to the benzene ring.

Further preferably at least one group Sp is a single bond.

Further preferably at least one group Sp is different from a single bond, and is preferably selected from —$(CH_2)_{p1}$—, —$(CH_2)_{p2}$—CH═CH—$(CH_2)_{p3}$—, —O—$(CH_2)_{p1}$—, —O—CO—$(CH_2)_{p1}$, or —CO—O—$(CH_2)_{p1}$, wherein p1 is 2, 3, 4, 5 or 6, preferably 2 or 3, p2 and p3 are independently of each other 0, 1, 2 or 3 and, if Sp is —O—$(CH_2)_{p1}$—, —O—CO—$(CH_2)_{p1}$ or —CO—O—$(CH_2)_{p1}$ the O-atom or CO-group, respectively, is linked to the benzene ring.

Very preferably Sp is different from a single bond, and is selected from —$(CH_2)_2$—, —$(CH_2)_3$—, —$(CH_2)_4$—, —O—$(CH_2)_2$—, —O—$(CH_2)_3$—, —O—CO—$(CH_2)_2$ and —CO—O—$(CH)_2$—, wherein the O atom or the CO group is attached to the benzene ring.

In the compounds of formula I and its subformulae as described above and below, P is preferably selected from the group consisting of vinyloxy, acrylate, methacrylate, fluoroacrylate, chloroacrylate, oxetane and epoxide, very preferably from acrylate and methacrylate, most preferably methacrylate.

Further preferred are compounds of formula I and its subformulae as described above and below, wherein all polymerizable groups P that are present in the compound have the same meaning, and very preferably denote acrylate or methacrylate, most preferably methacrylate.

Further preferred are compounds of formula I and its subformulae as described above and below, which contain one, two, three or four groups P-Sp, very preferably two or three groups P-Sp.

Further preferred are compounds of formula I and its subformulae as described above and below, wherein $R^b$ is P-Sp-.

Further preferred are compounds of formula I and its subformulae as described above and below, wherein Sp denotes a single bond or —$(CH_2)_{p1}$—, —O—$(CH_2)_{p1}$—, —O—CO—$(CH_2)_{p1}$, or —CO—O—$(CH_2)_{p1}$, wherein p1 is 2, 3, 4, 5 or 6, and, if Sp is —O—$(CH_2)_{p1}$—, —O—CO—$(CH_2)_{p1}$ or —CO—O—$(CH_2)_{p1}$ the O-atom or CO-group, respectively, is linked to the benzene ring.

Further preferred are compounds of formula I and its subformulae as described above and below, wherein at least one group Sp is a single bond.

Further preferred are compounds of formula I and its subformulae as described above and below, wherein at least one group Sp is different from a single bond, and is selected from —$(CH_2)_{p1}$—, —O—$(CH_2)_{p1}$—, —O—CO—$(CH_2)_{p1}$, or —CO—O—$(CH_2)_{p1}$, wherein p1 is 2, 3, 4, 5 or 6, and, if Sp is —O—$(CH_2)_{p1}$—, —O—CO—$(CH_2)_{p1}$ or —CO—O—$(CH_2)_{p1}$ the O-atom or CO-group, respectively, is linked to the benzene ring.

Very preferred are compounds of formula I and its subformulae as described above and below, wherein at least one group Sp is different from a single bond, and is selected from —$(CH_2)_2$—, —$(CH_2)_3$—, —$(CH_2)_4$—, —O—$(CH_2)_2$—, —O—$(CH_2)_3$—, —O—CO—$(CH_2)_2$ and —CO—O—$(CH)_2$—, wherein the O atom or the CO group is attached to the benzene ring.

Preferably $A^a$ and $A^b$ in formula I are selected from the group consisting of 1,4-phenylene, 1,3-phenylene, naphthalene-1,4-diyl, naphthalene-2,6-diyl, phenanthrene-2,7-diyl, 9,10-dihydro-phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent $CH_2$ groups may be replaced by 0 and/or S, 1,4-cyclohexenylene, bicycle[1.1.1]-pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, all of which are optionally substituted by one or more groups L or P-Sp-.

Very preferably $A^a$ and $A^b$ in formula I are selected from the group consisting of benzene, naphthalene, phenanthrene, anthracene, dibenzofuran or dibenzothiophene, all of which are optionally substituted by one or more groups L or P-Sp-.

Preferably z in formula I is 0, 1 or 2, very preferably 1 or 2.

Preferably $-A^a-(Z^a-A^b)_z-$ in formula I denotes benzene, biphenylene, p-terphenylene (1,4-diphenylbenzene), m-terphenylene (1,3-diphenylbenzene), naphthylene, 2-phenyl-naphthylene, phenanthrene or anthracene, dibenzofuran or dibenzothiophene, all of which are optionally substituted by one or more groups L or P-Sp-.

Further preferred are compounds of formula I and its subformulae that contain at least one group $A^a$ or $A^b$ that is not substituted by L.

Preferred compounds of formula I and their subformulae are selected from the following preferred embodiments, including any combination thereof:

- the compounds contain at least one group $A^a$ or $A^b$ that is substituted by one or more groups L,
- the compounds contain two unfused or fused, preferably unfused, benzene rings,
- the compounds contain three or more, preferably three or four unfused or fused benzene rings, the compounds contain at least one benzene ring that is not substituted by L, the compounds contain exactly one polymerizable group (represented by the group P), the compounds contain exactly two polymerizable groups (represented by the groups P), the compounds contain exactly three polymerizable groups (represented by the groups P), the compounds contain exactly four polymerizable groups (represented by the groups P), P is selected from the group consisting of acrylate, methacrylate and oxetane, very preferably acrylate or methacrylate, P is methacrylate, Pg is a hydroxyl group, each of the groups Sp denotes a single bond, at least one of the groups Sp is different from a single bond, at least one of the groups Sp is a single bond and at least one of the groups Sp is different from a single bond, Sp, when being different from a single bond, is selected from —$(CH_2)_{p2}$—, —$(CH_2)_{p2}$—O—, —$(CH_2)_{p2}$—CO—O—, —$(CH_2)_{p2}$—O—CO—, wherein p2 is 2, 3, 4, 5 or 6, and the O-atom or the CO-group, respectively, is connected to the benzene ring, Sp, when being different from a single bond, is selected from —$(CH_2)_2$—, —$(CH_2)_3$—, —$(CH_2)_4$—, —O—$(CH_2)_2$—, —O—$(CH_2)_3$—, —O—CO—$(CH_2)_2$ and —CO—O—$(CH)_2$—, wherein the O atom or the CO group is attached to the benzene ring Sp is a single bond or denotes —$(CH_2)_{p2}$—, —$(CH_2)_{p2}$—O—, —$(CH_2)_{p2}$—CO—O—, —$(CH_2)_{p2}$—O—CO—, wherein p2 is 2, 3, 4, 5 or 6, and the O-atom or the CO-group, respectively, is connected to the benzene ring, $Sp(P)_2$ is selected from subformulae Sp1a-Sp3a, $R^b$ denotes P-Sp-, $R^b$ does not denote or contain a polymerizable group, $R^b$ denotes denotes F, Cl, CN or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F or Cl, R denotes F, Cl, CN or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F or Cl, $Z^1$ is a single bond, z is 0, 1, 2 or 3, very preferably 0 or 1, L is selected from the group consisting of F, Cl, CN, alkyl, alkenyl, alkynyl, alkoxy, alkylcarbonyl, alkoxycarbonyl, alkylcarbonyloxy or alkoxycarbonyl-oxy each having 1 to 6 C atoms, in which one or more H atoms are optionally replaced by F or Cl, preferably F, Cl, CN or $OCH_3$, very preferably F.

Very preferred compounds of formula I and its subformulae are selected from the following subformulae:

M1

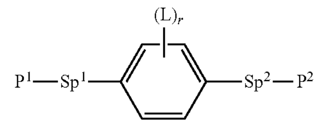

M2

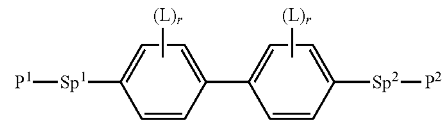

M3

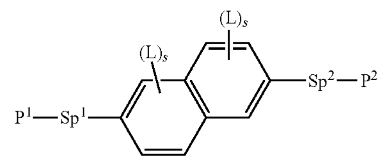

M4

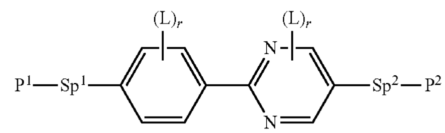

M5

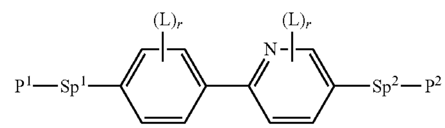

M6

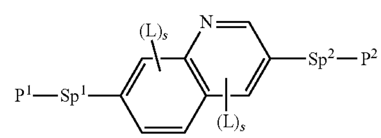

M7

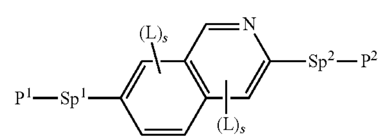

M8

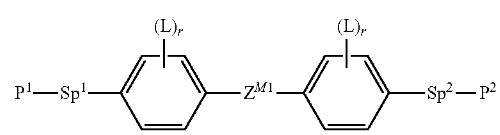

M9

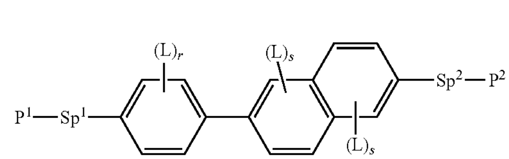

M10

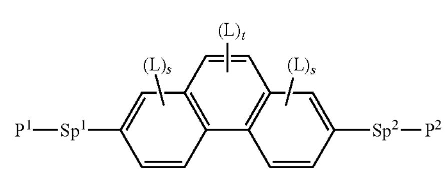

M11

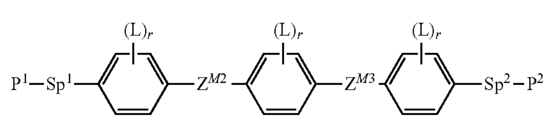

-continued
M12
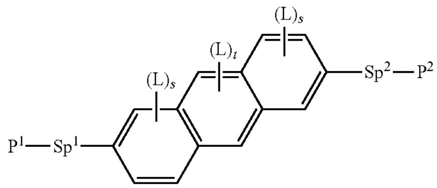
M13
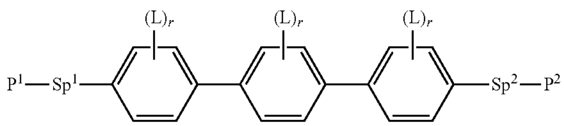
M14
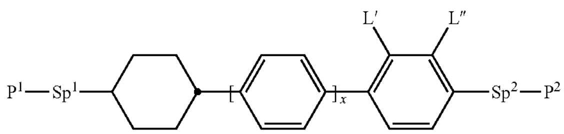
M15
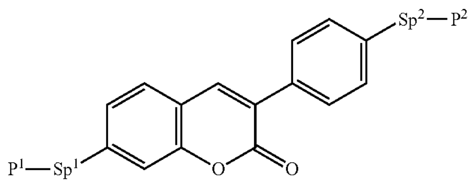
M16
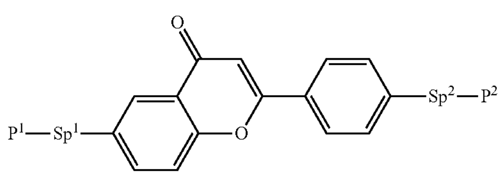
M17
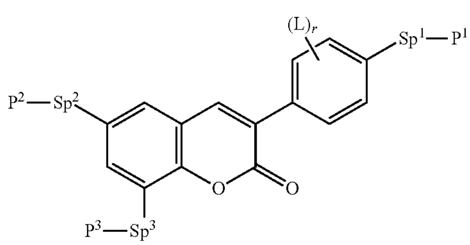
M18
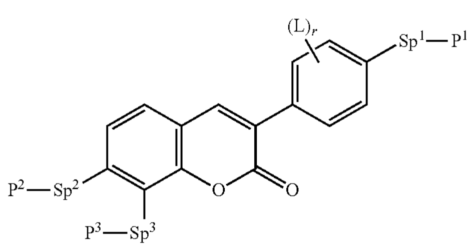
M19
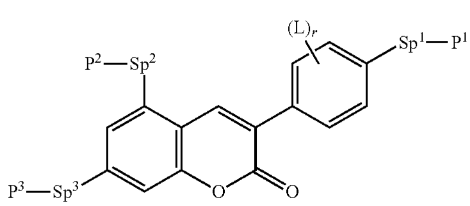
-continued
M20
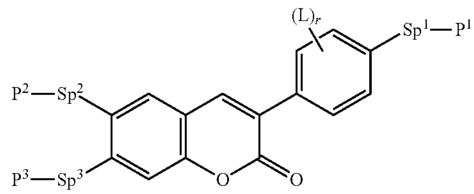
M21
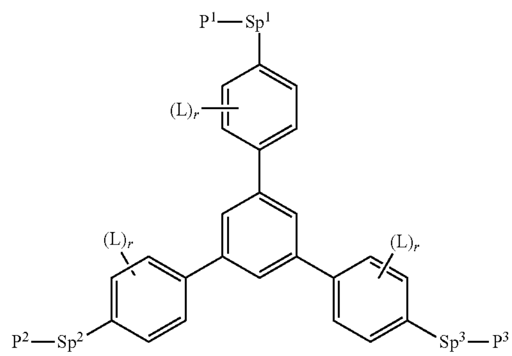
M22
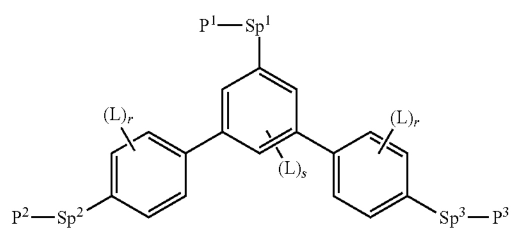
M23
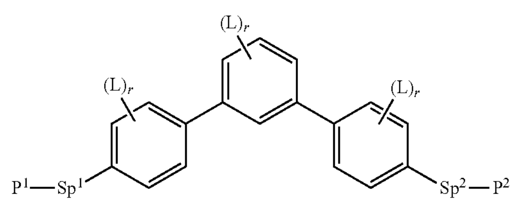
M24
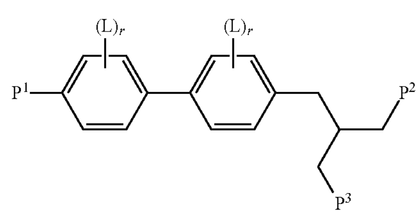
M25
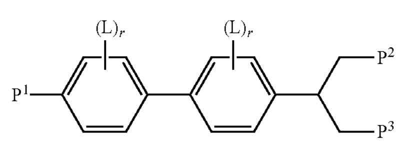
M26
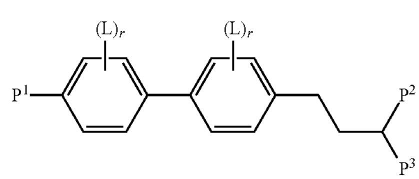

-continued

M27

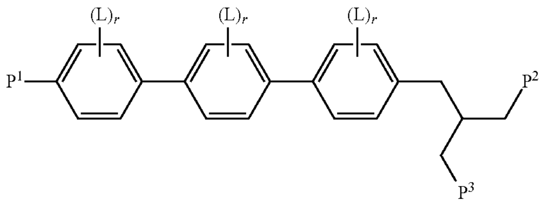

M28

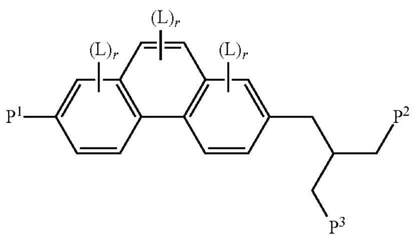

M29

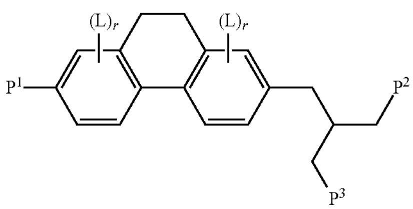

M30

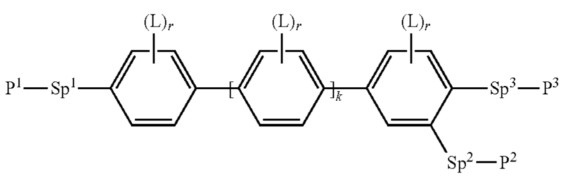

M31

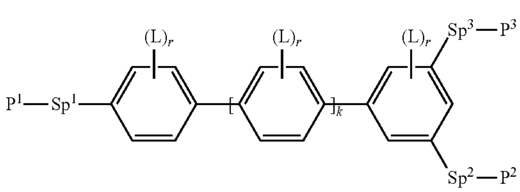

M32

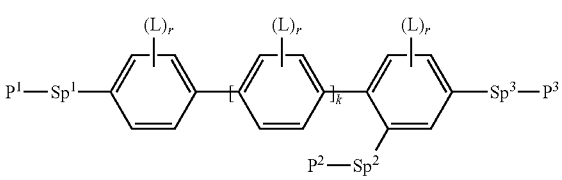

in which the individual radicals, on each occurrence identically or differently, and each, independently of one another, have the following meaning:

$P^1$, $P^2$, $P^3$ a polymerizable group, preferably selected from vinyloxy, acrylate, methacrylate, fluoroacrylate, chloroacrylate, oxetane and epoxy, $Sp^1$, $Sp^2$, $Sp^3$ a single bond or a spacer group where, in addition, one or more of the radicals $P^1$-$Sp^1$-, $P^2$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$- present is different from $R^{aa}$, preferably —$(CH_2)_{p1}$—, —$(CH_2)_{p1}$—O—, —$(CH_2)_{p1}$—CO—O— or —$(CH_2)_{p1}$—O—CO—O—, wherein p1 is an integer from 1 to 12, $R^{aa}$ H, F, Cl, CN or straight-chain or branched alkyl having 1 to 25 C atoms, in which, in addition, one or more non-adjacent $CH_2$ groups may each be replaced, independently of one another, by —C($R^0$)=C($R^{00}$)—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), and wherein $R^{aa}$ does not denote or contain a group $P^1$, $P^2$ or $P^3$, $R^0$, $R^{00}$ H or alkyl having 1 to 12 C atoms, $R^y$ and $R^z$ H, F, $CH_3$ or $CF_3$, $X^1$, $X^2$, $X^3$ —CO—O—, —O—CO— or a single bond, $Z^{M1}$ —O—, —CO—, —C($R^yR^z$)— or —$CF_2CF_2$—, $Z^{M2}$, $Z^{M3}$ —CO—O—, —O—CO—, —$CH_2O$—, —$OCH_2$—, —$CF_2O$—, —$OCF_2$— or —$(CH_2)_n$—, where n is 2, 3 or 4, L F, Cl, CN or straight-chain or branched, optionally mono- or poly-fluorinated alkyl, alkoxy, alkenyl, alkynyl, alkylcarbonyl, alkoxycarbonyl, alkylcarbonyloxy or alkoxycarbonyloxy having 1 to 12 C atoms, L', L" H, F or Cl, k 0 or 1, r 0, 1, 2, 3 or 4, s 0, 1, 2 or 3, t 0, 1 or 2, x 0 or 1.

Very preferred are compounds of formulae M2 and M13, especially directive compounds containing exactly two polymerizable groups $P^1$ and $P^2$.

Further preferred are compounds selected from formulae M17 to M32, in particular from formulae M20, M22, M24, M27, M30 and M32, especially trireactive compounds containing exactly three polymerizable groups $P^1$, $P^2$ and $P^3$.

In the compounds of formulae M1 to M32 the group

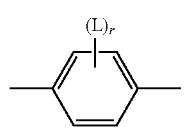

is preferably

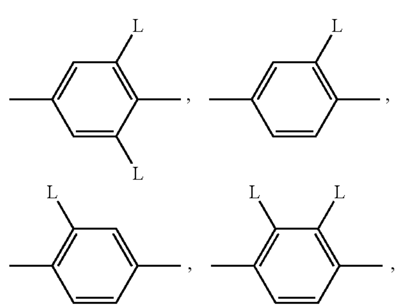

-continued

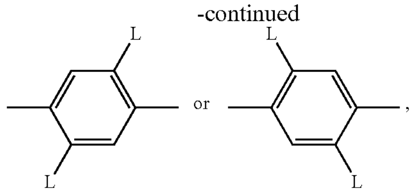

wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, more preferably F, Cl, $CH_3$, $OCH_3$, $COCH_3$ or $OCF_3$, most preferably F or $OCH_3$.

Preferred compounds of formulae M1 to M32 are those wherein $P^1$, $P^2$ and $P^3$ denote an acrylate, methacrylate, oxetane or epoxy group, very preferably an acrylate or methacrylate group, most preferably a methacrylate group.

Further preferred compounds of formulae M1 to M32 are those wherein $Sp^1$, $Sp^2$ and $Sp^a$ are a single bond.

Further preferred compounds of formulae M1 to M32 are those wherein one of $Sp^1$, $Sp^2$ and $Sp^3$ is a single bond and another one of $Sp^1$, $Sp^2$ and $Sp^3$ is different from a single bond.

Further preferred compounds of formulae M1 to M32 are those wherein those groups $Sp^1$, $Sp^2$ and $Sp^3$ that are different from a single bond denote —$(CH_2)_{s1}$—X"—, wherein s1 is an integer from 1 to 6, preferably 2, 3, 4 or 5, and X" is X" is the linkage to the benzene ring and is —O—, —O—CO—, —CO—O—, —O—CO—O— or a single bond.

Further preferred compounds of formula M are those selected from Table D below, especially those selected from the group consisting of formulae RM-1, RM-4, RM-8, RM-17, RM-19, RM-35, RM-37, RM-39, RM-40, RM-41, RM-48, RM-52, RM-54, RM-57, RM-58, RM-64, RM-74, RM-76, RM-88, RM-91, RM-102, RM-103, RM-109, RM-116, RM-117, RM-120, RM-121, RM-122, RM-139, RM-140, RM-142, RM-143, RM-145, RM-146, RM-147, RM-149, RM-156 to RM-162, RM-168, RM-169 and RM-170 to RM-182.

Particularly preferred are LC media comprising one, two or three polymerizable compounds of formula M.

Further preferred are LC media comprising two or more direactive polymerizable compounds of formula M, preferably selected from formulae M1 to M16, very preferably selected from formulae M2 and M13.

Further preferred are LC media comprising one or more direactive polymerizable compounds of formula M, preferably selected from formulae M1 to M16, very preferably from formulae M2 and M13, and one or more trireactive polymerizable compounds of formula M, preferably selected from formulae M17 to M32, very preferably from formulae M20, M22, M24, M27, M30 and M32.

Further preferred are LC media comprising one or more polymerizable compounds of formula M wherein at least one r is not 0, or at least one of s and t is not 0, very preferably selected from formulae M2, M13, M22, M24, M27, M30 and M32, and wherein L is selected from the preferred groups shown above, most preferably from F and $OCH_3$.

Further preferred are LC media comprising one or more polymerizable compounds which show absorption in the wavelength range from 320 to 380 nm, preferably selected from formula M, very preferably from formulae M1 to M32.

Further preferred are LC media comprising one or more polymerizable compounds selected from Table D. Of these, compounds RM-1, RM-4, RM-8, RM-17, RM-19, RM-35, RM-37, RM-39, RM-40, RM-41, RM-48, RM-52, RM-54, RM-57, RM-58, RM-64, RM-74, RM-76, RM-88, RM-91, RM-102, RM-103, RM-109, RM-116, RM-117, RM-120, RM-121, RM-122, RM-139, RM-140, RM-142, RM-143, RM-145, RM-146, RM-147, RM-150 to RM-156, RM-162, RM-163 and RM-164 to RM-176 are particularly preferred.

Further preferred compounds of formula MT are selected from Table D below.

The concentration of the polymerizable compounds of formula I and its subformulae in the LC medium is preferably from 0.01 to 3.0%, very preferably from 0.05 to 1%, most preferably from 0.1 to 0.5% by weight.

For use in PSA displays the total concentration of the polymerizable compounds of formula I and its subformulae in the LC medium is preferably from 0.01 to 2.0%, very preferably from 0.1 to 1.0%, most preferably from 0.2 to 0.5% by weight.

For use in SA-VA displays the total concentration of the polymerizable compounds of formula I and its subformulae in the LC medium is preferably from 0.01 to 3%, very preferably from 0.01 to 2%, more preferably from 0.05 to 2.0, most preferably from 0.05 to 1.0% by weight.

The LC medium according to the present invention further comprises at least one dye absorbing green light and/or at least one dye absorbing red light. Preferably the dye absorbing green light is a red dye, and the dye absorbing red light is a blue dye.

The dyes are preferably selected from dichroic dyes. Very preferably the dichroic dyes contained in the LC medium are selected from blue dyes which have an absorption maximum in the red part of the visible spectrum, and red dyes which have an absorption maximum in the green part of the visible spectrum.

Further preferably, the blue and red dyes contained in the LC medium are selected such that they do not substantially absorb light reflected by the blue backlight of the display.

Preferably the blue dye, or dye absorbing red light, has an absorption maximum in the range from 580 to 680 nm, more preferably in the range from 590 to 650 nm, most preferably in the range from 600 to 630 nm.

Preferably the red dye, or dye absorbing green light, has an absorption maximum in the range from 480 to 580 nm, more preferably in the range from 500 to 570 nm, most preferably in the range from 520 to 560 nm.

Very preferably the LC medium according to the present invention comprises one or more dyes selected from formula I*

I*

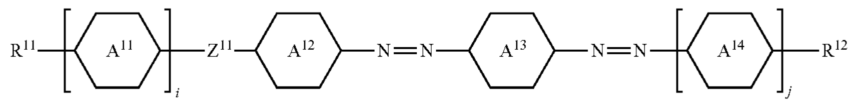

wherein the individual radicals, independently of each other and on each occurrence identically or differently, have the following meanings

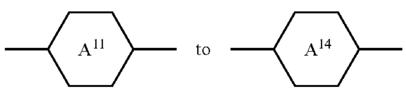

are independently of each other

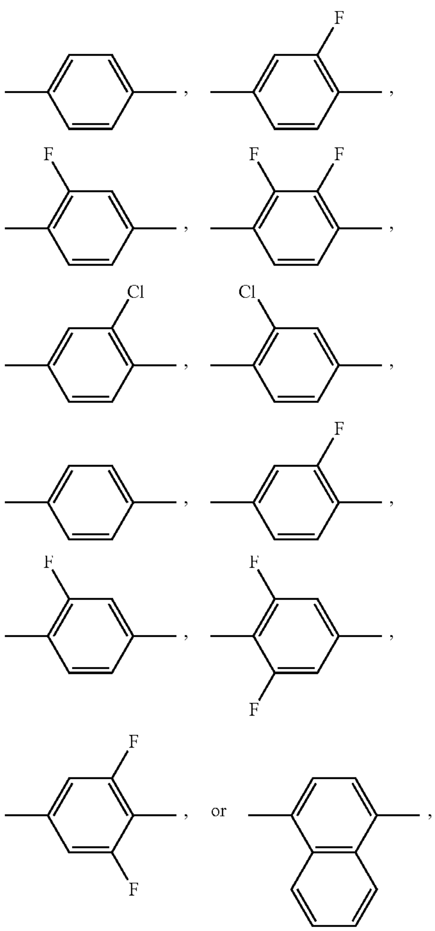

and, in case i is 2 or more, the terminal

may also be

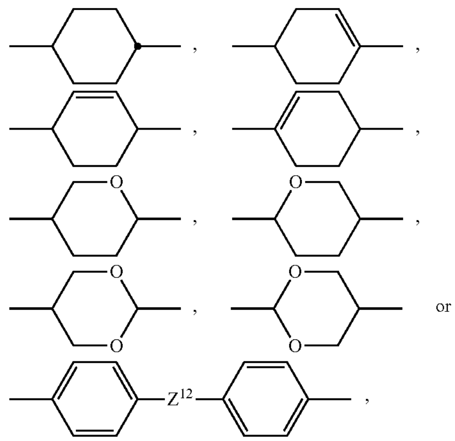

and, in case j is 2 or more, the terminal

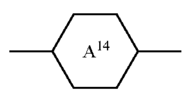

may also be

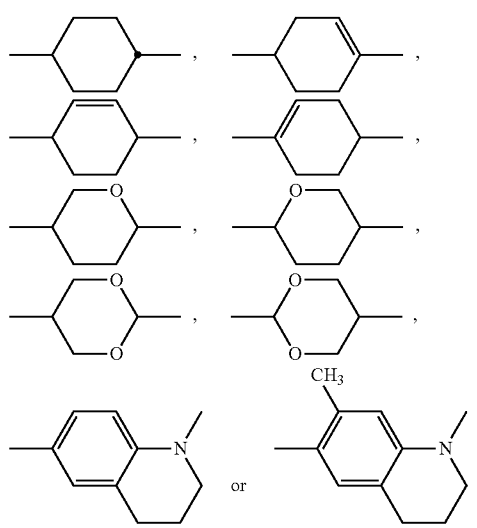

$Z^{11}$ and $Z^{12}$ denote a single bond, —N═N—, —OCO— or —COO—, preferably $Z^{11}$ is —N═N— or —COO— and $Z^{12}$ is —OCO— or a single bond, $R^{11}$ and $R^{12}$ denote alkyl, alkoxy, fluorinated alkyl or fluorinated alkoxy with 1 to 20, preferably with 1 to 7, C-atoms, alkenyl, alkenyloxy, alkoxyalkyl or fluorinated alkenyl with 2 to 20, preferably with 2 to 7, C-atoms, or alkylaminyl, dialkylaminyl, alkylcarbonyl, alkyloxycarbonyl, alkylcarbonyloxy or alkyloxycarbonyloxy with 3 to 20, preferably 3 to 10, C-atoms, or alkylcyclohexylalkyl with 8 to 25, preferably 8 to 15, C-atoms, and preferably are $R^{01}$, $R^{01}NH$, $R^{01}(R^{02})N$, $R^{01}CO$, $R^{01}OCO$, $R^{01}COO$ or $R^{01}OCOO$, alkyl, alkenyl or alkylcyclohexylalkyl, wherein $R^{01}$ and $R^{02}$ are independently of each other alkyl, oxaalkyl, fluorinated alkyl or fluorinated oxaalkyl with 1 to 7 C-atoms, alkenyl, alkoxyalkyl, fluorinated alkenyl or fluorinated alkoxyalkyl with 2 to 7 C-atoms, preferably alkyl, more preferably n-alkyl or iso-alkyl, i and j are independently of each other 1, 2, 3 or 4, preferably 1, 2 or 3 and (i+j) preferably is 2, 3, 4 or 5, more preferably 2, 3 or 4, and In formula I*, the rings

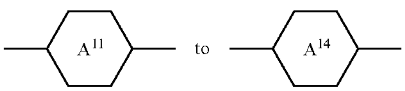

are preferably selected from

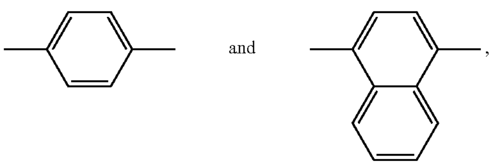

and, in case m is 2 or more, the terminal ring

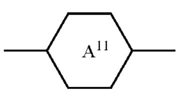

may also be

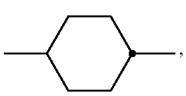

and, in case n is 2 or more, the terminal

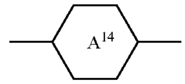

may also be

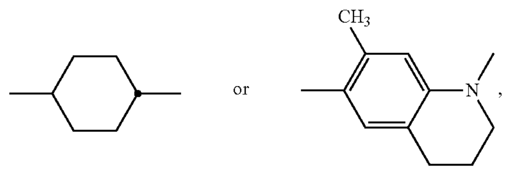

In formula I*, more preferably at least one of

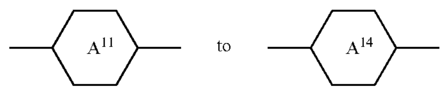

most preferably at least one of

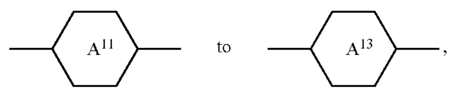

most preferably

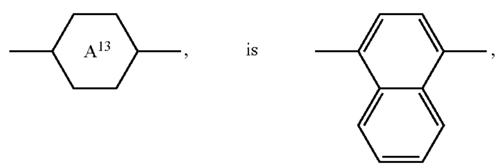

In a preferred embodiment of the present invention the LC medium comprises one or more dichroic dyes selected from the group of compounds of formulae I*1 to I*7

I*1

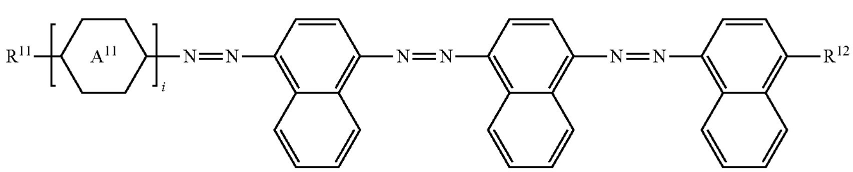

I*2

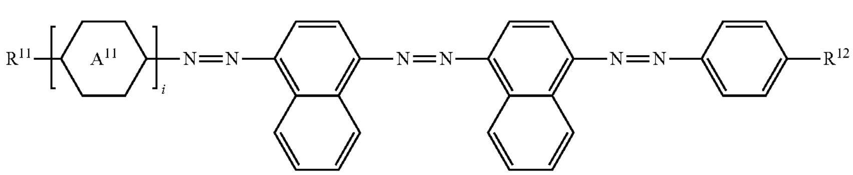

-continued
I*3
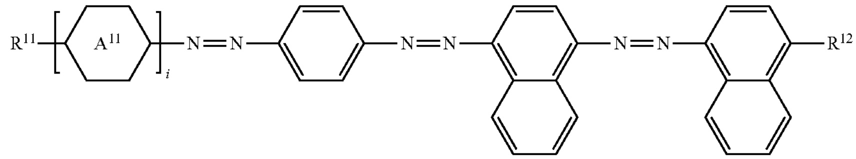
I*4
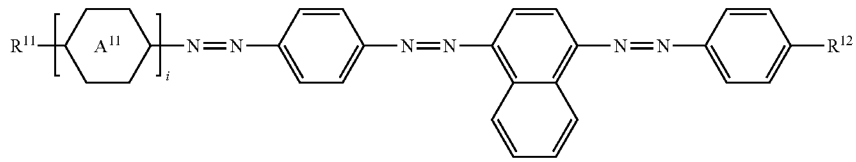
I*5
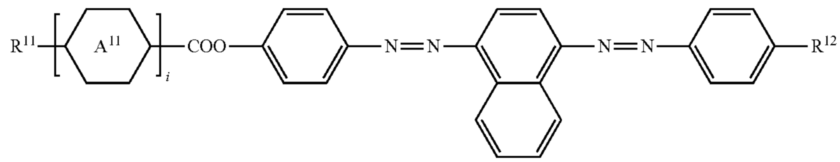
I*6
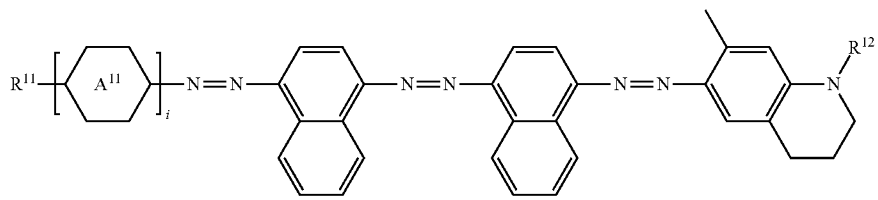
I*7
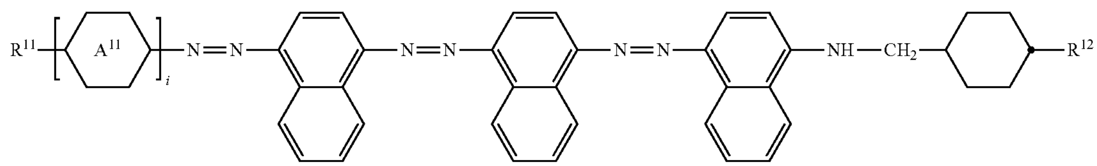
wherein the parameters have the respective meanings given under formula I* above.
In a very preferred embodiment of the present invention the LC medium comprises one or more dichroic dyes selected from the group of compounds of formulae I*1a to I*7a
I*1a
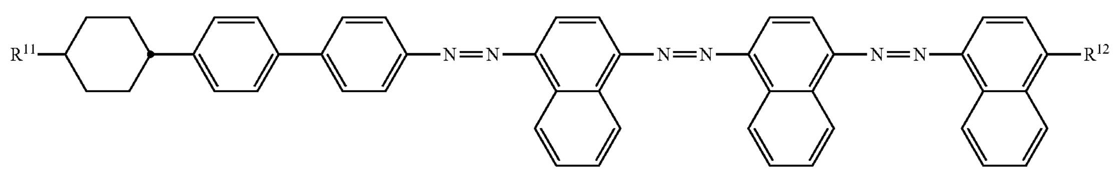
I*2a
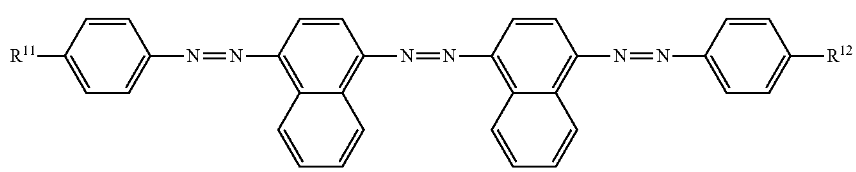

-continued
I*3a
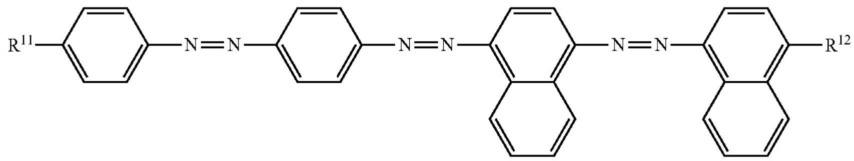
I*4a
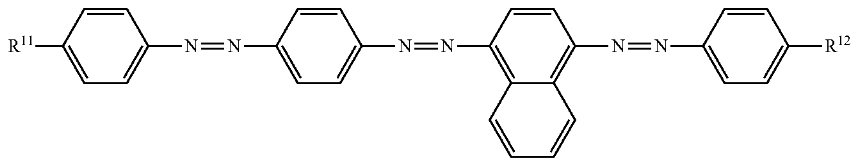
I*5a
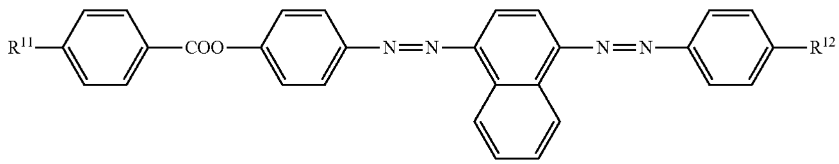
I*6a
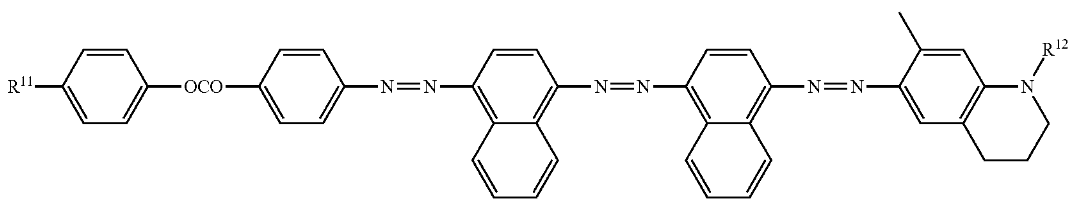
I*7a
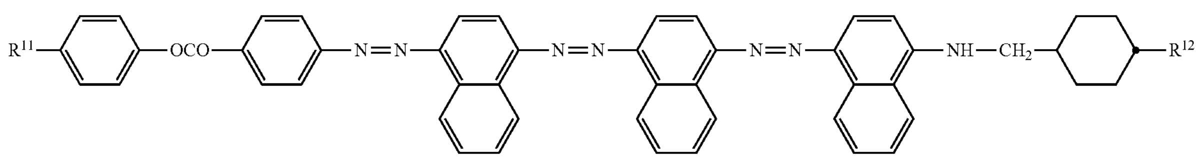
wherein the parameters have the respective meanings given under formula I* above.
Exemplary compounds of formula I*, which are particularly well suited for use as dyes, are represented by the following formulae
I*1a1
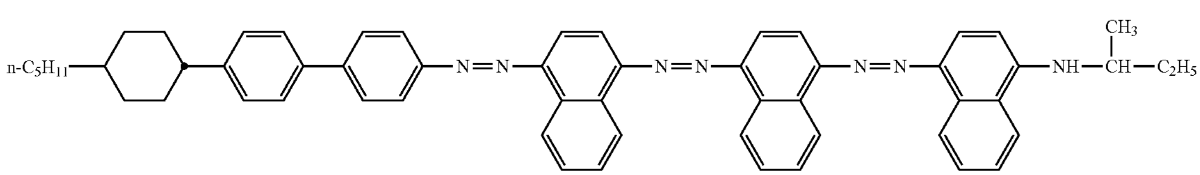
I*4a1
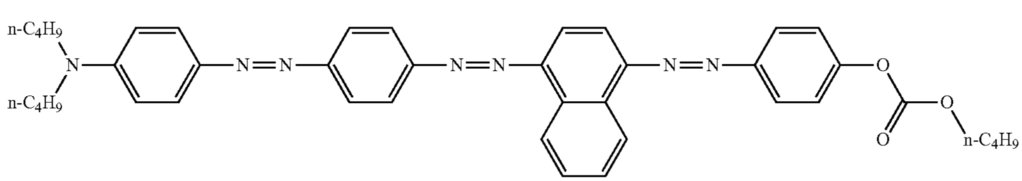

-continued

I*5a1

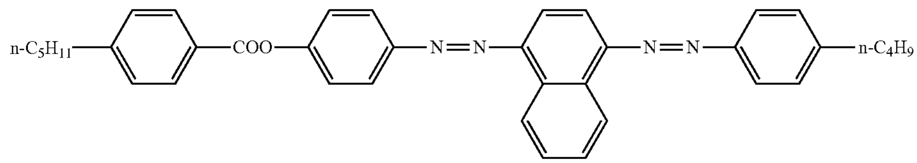

I*6a1

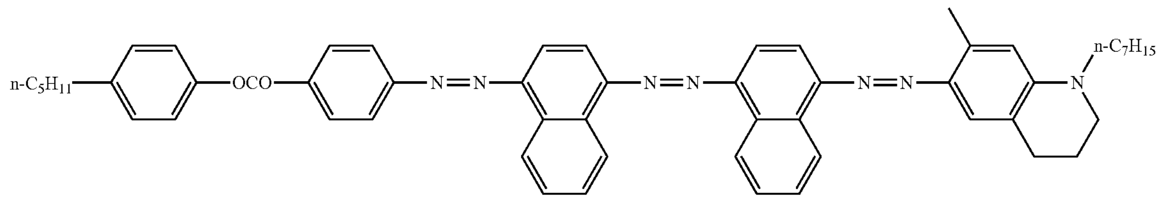

I*7a1

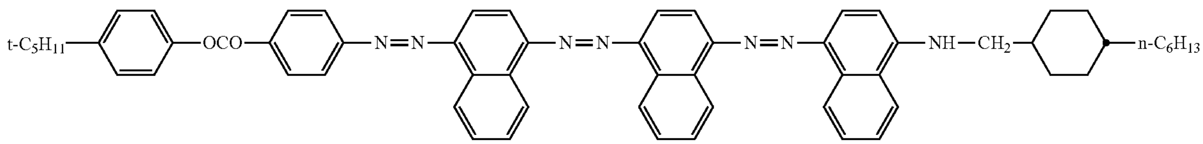

Preferably the concentration of the dyes in the LC medium is in the range from 0.01% to 5%, more preferably from 0.02% to 3%, even more preferably from 0.05% to 1%, most preferably from 0.1% to 0.8% by weight.

The Table below shows particularly preferred dyes of the formulae I*1a1, I*6a1, and I*4a1 and their spectral characteristics.

| Dye | I*1a1<br>F593<br>blue dye | I*6a1<br>F503<br>blue dye | I*4a1<br>F355<br>red dye |
|---|---|---|---|
| $\lambda_{max}$/nm | 621 | 601 | 536 |
| $\Delta\lambda_{max}$/nm | ±2 | ±2 | ±2 |
| OD* | 0.620 | 0.645 | 0.785 |
| ΔOD* | ±0.020 | ±0.020 | ±0.020 |
| Colour | Blue | Blue | Red |
| Host LC* | 2903 | 3021-000 | 2452 |
| DR*** | 16.2 | 10.9 | 13.7 |
| S**** | 0.83 | 0.77 | 0.81 |

*OD = Optical Density = $\log_{10}(I_i/I_t)$, wherein
Ii = Intensity of incident light,
It = Intensity of transmitted light,
**ZLI-mixtures available from Merck KGaA, Germany,
***DR = Dichroic Ratio of Dye in Host LC
****S = Order Parameter of Dye in Host LC.

Especially preferred is an LC medium according to the present invention comprising a dichroic dye selected from $F_{593}$ and $F_{503}$ and/or a dichroic dye selected from $F_{355}$.

Besides the polymerizable compounds and dichroic dyes described above, the LC media for use in the LC displays according to the invention comprise an LC mixture ("host mixture") comprising one or more, preferably two or more LC compounds which are selected from low-molecular-weight compounds that are unpolymerizable, and at least one of which is a compound of formula II. These LC compounds are selected such that they stable and/or unreactive to a polymerization reaction under the conditions applied to the polymerization of the polymerizable compounds.

Particularly preferred embodiments of such an LC medium are shown below.

Preferably the LC medium comprises one or more compounds of formula II selected from the group consisting of compounds of the formulae IIA, IIB, IIC and IID IIa

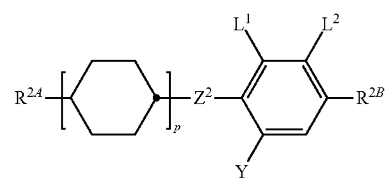

IIB

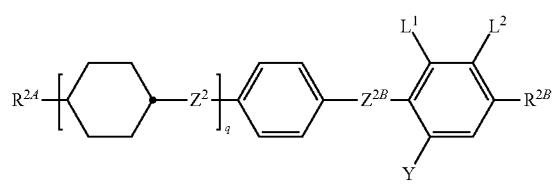

IIC

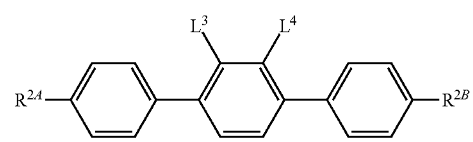

IID

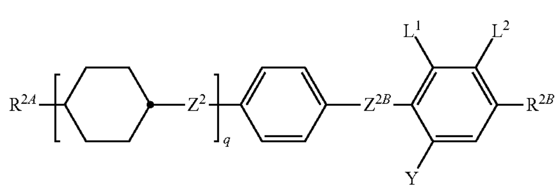

in which $R^{2A}$ and $R^{2B}$ each, independently of one another, denote H, an alkyl or alkenyl radical having up to 15 C atoms which is unsubstituted, monosubstituted by CN, $CF_3$, F or Cl, or at least monosubstituted by halogen, where, in addition, one or more $CH_2$ groups in these radicals may be replaced by —O—, —S—,

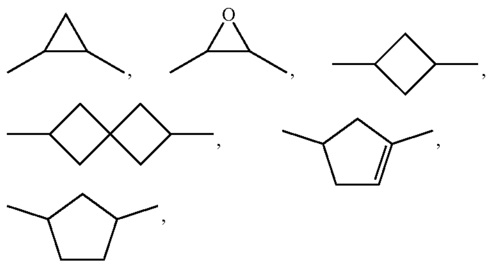

—C≡C—, —$CF_2O$—, —$OCF_2$—, —OC—O— or —O—CO— in such a way that O atoms are not linked directly to one another, $L^1$ to $L^4$ each, independently of one another, denote F, Cl, $CF_3$ or $CHF_2$, Y denotes H, F, Cl, $CF_3$, $CHF_2$ or $CH_3$, preferably H or $CH_3$, particularly preferably H, $Z^2$, $Z^{2B}$ and $Z^{2D}$ each, independently of one another, denote a single bond, —$CH_2CH_2$—, —CH═CH—, —$CF_2O$—, —$OCF_2$—, —$CH_2O$—, —$OCH_2$—, —COO—, —O CO—, —$C_2F_4$—, —CF═CF—, —CH═$CHCH_2O$—, p denotes 0, 1 or 2, and q on each occurrence, identically or differently, denotes 0 or 1.

Preferred compounds of the formulae IIA, IIB, IIC and IID are those wherein $R^{2B}$ denotes an alkyl or alkoxy radical having up to 15 C atoms, and very preferably denotes $(O)C_vH_{2v+1}$ wherein (O) is an oxygen atom or a single bond and v is 1, 2, 3, 4, 5 or 6.

Further preferred compounds of the formulae IIA, IIB, IIC and IID are those wherein $R^{2A}$ or $R^{2B}$ denotes or contains cycloalkyl or cycloalkoxy radical, preferably selected from the group consisting of

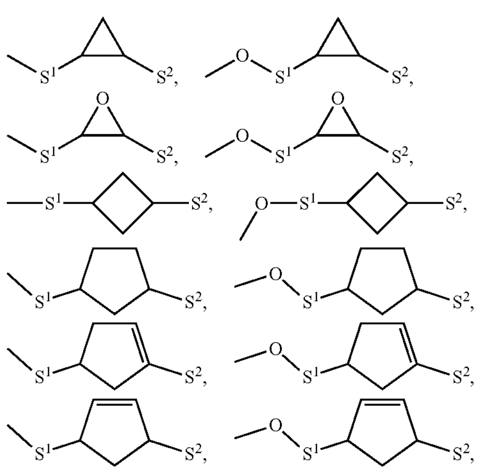

wherein $S^1$ is $C_{1-5}$-alkylene or $C_{2-5}$-alkenylene and $S^2$ is H, $C_{1-7}$-alkyl or $C_{2-7}$-alkenyl, and very preferably are selected from the group consisting of

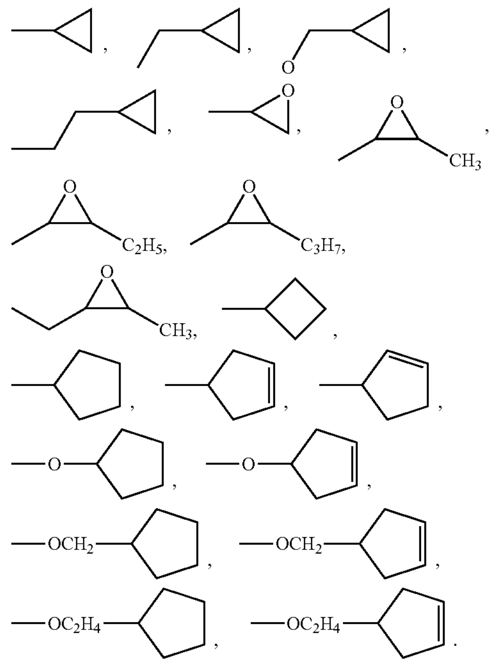

In a preferred embodiment the LC medium comprises one or more compounds of the formula IIA selected from the group consisting of formulae IIA-1 to IIA-76,

IIA-1

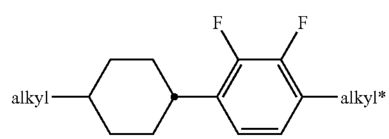

IIA-2

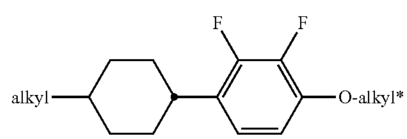

IIA-3

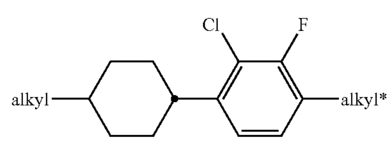

IIA-4

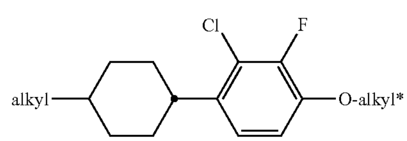

IIA-5

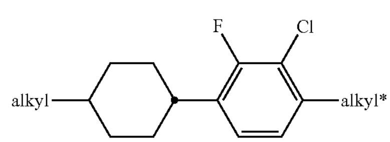

IIA-6

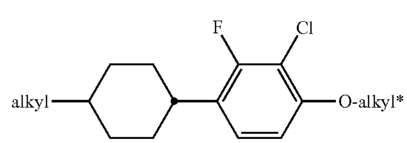

-continued
IIA-7
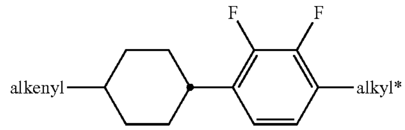
IIA-8
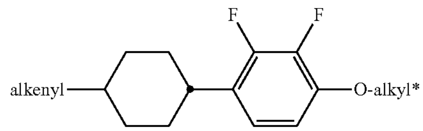
IIA-9
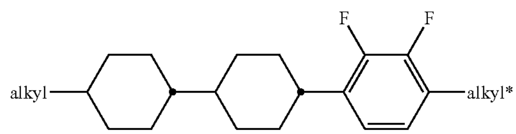
IIA-10
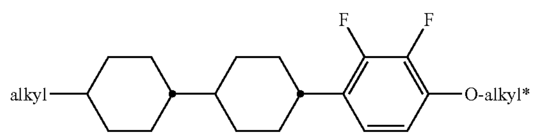
IIA-11
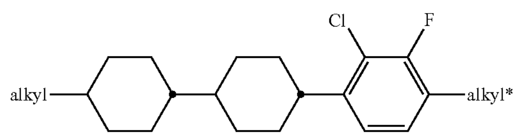
IIA-12
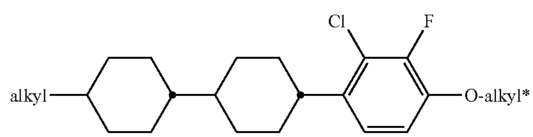
IIA-13
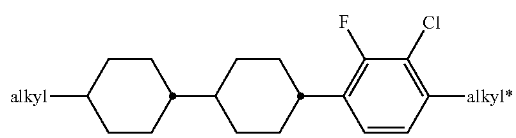
IIA-14
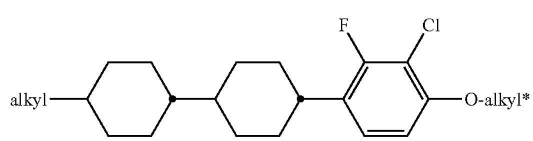
IIA-15
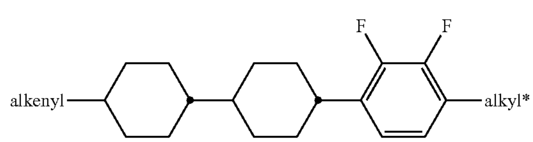
IIA-16
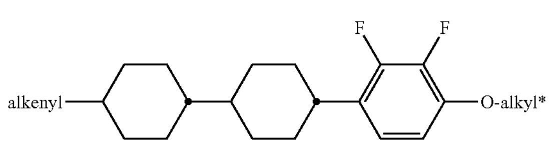
-continued
IIA-17
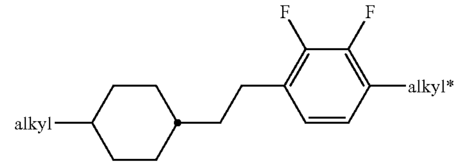
IIA-18
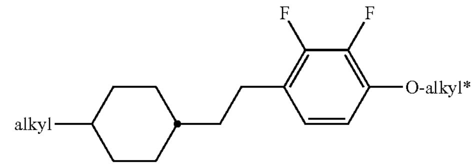
IIA-19
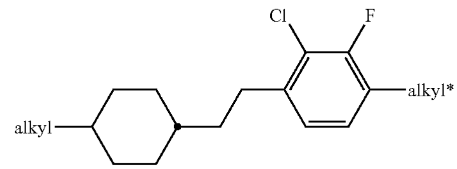
IIA-20
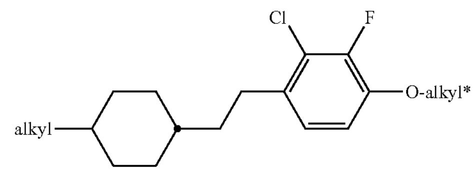
IIA-21
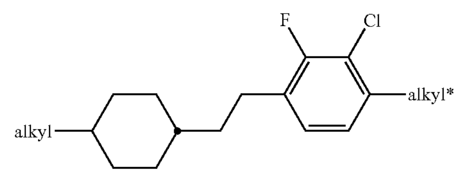
IIA-22
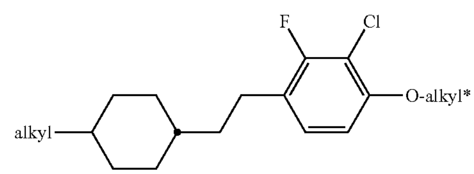
IIA-23
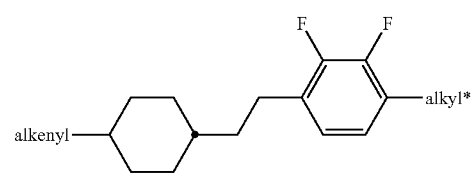
IIA-24
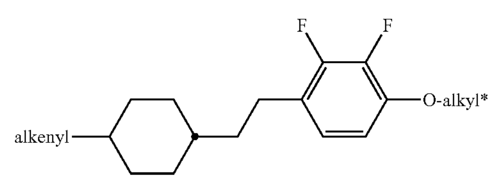
IIA-25
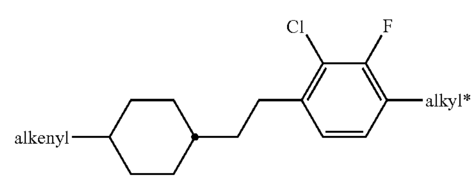

-continued
IIA-26
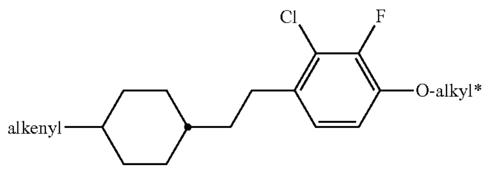
IIA-27
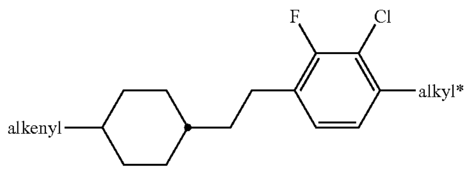
IIA-28
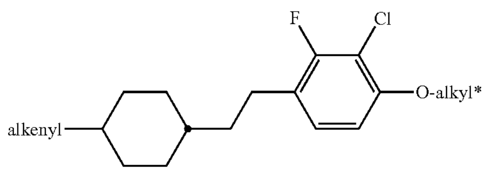
IIA-29
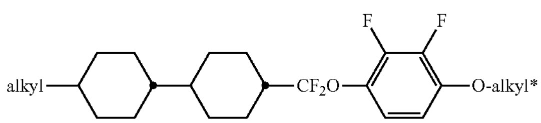
IIA-30
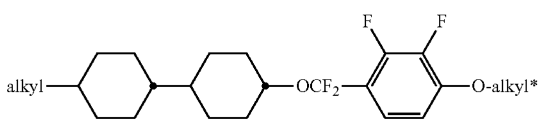
IIA-31
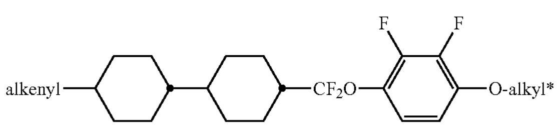
IIA-32
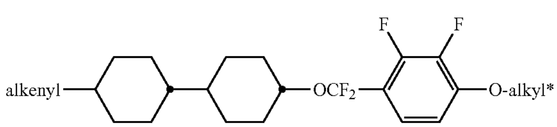
IIA-33
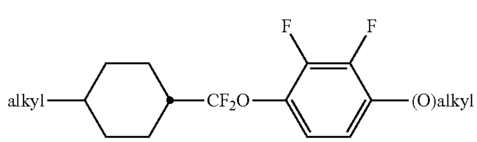
IIA-34
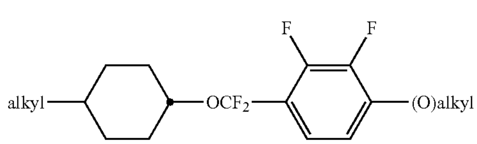
IIA-35
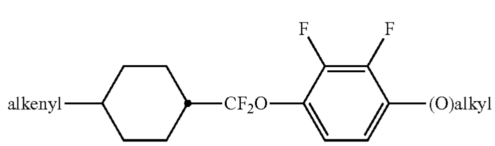
-continued
IIA-36
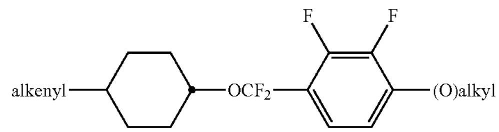
IIA-37
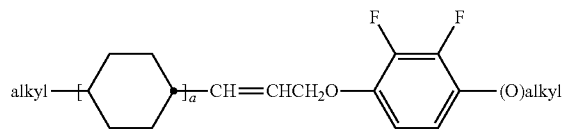
IIA-38
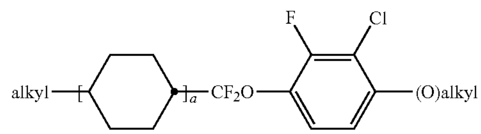
IIA-39
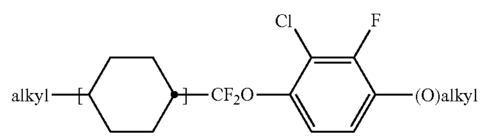
IIA-40
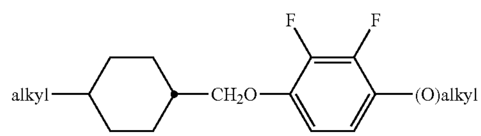
IIA-41
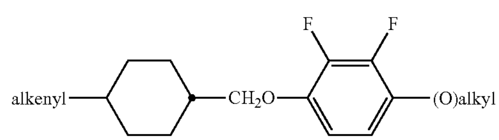
IIA-42
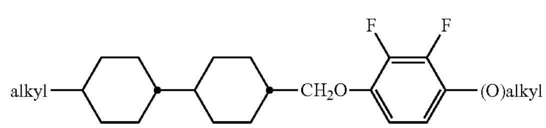
IIA-43
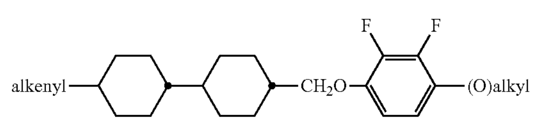
IIA-44
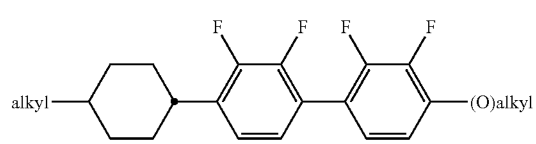
IIA-45
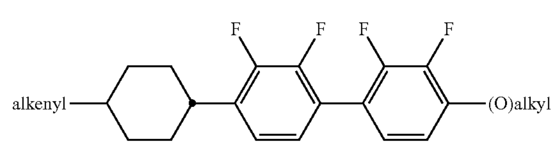

-continued
IIA-46
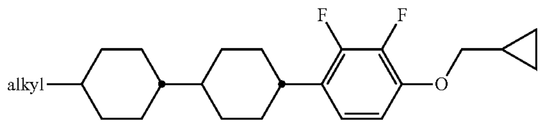
IIA-47
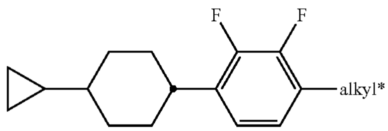
IIA-48
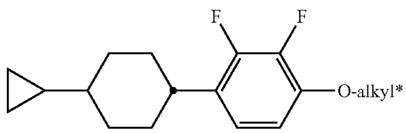
IIA-49
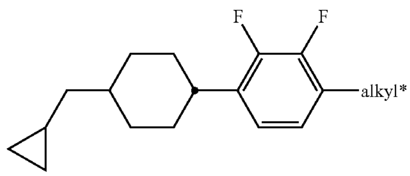
IIA-50
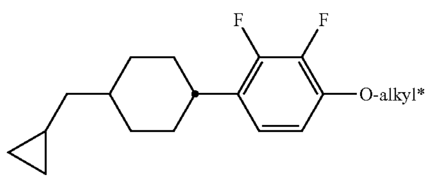
IIA-51
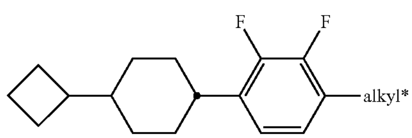
IIA-52
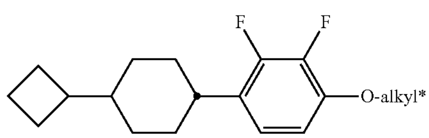
IIA-53
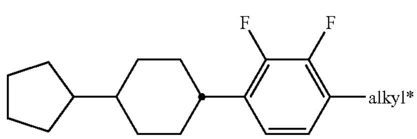
IIA-54
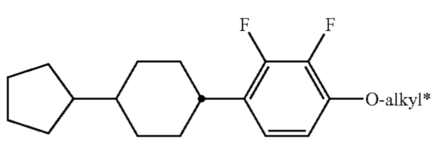
IIA-55
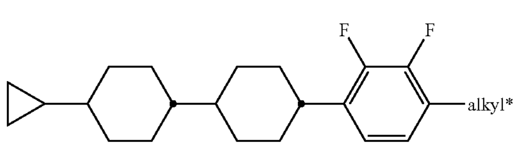
-continued
IIA-56
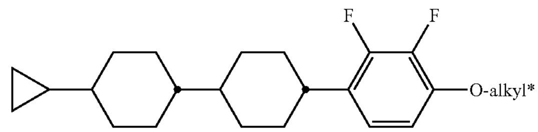
IIA-57
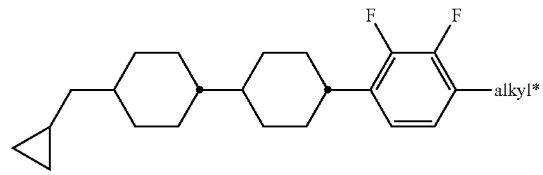
IIA-58
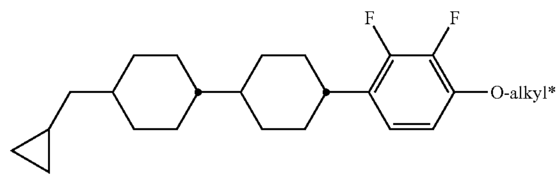
IIA-59
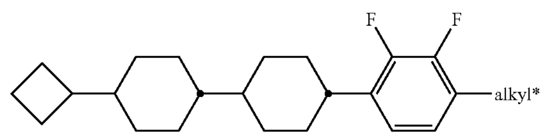
IIA-60
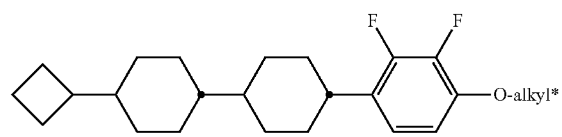
IIA-61
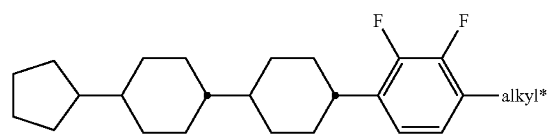
IIA-62
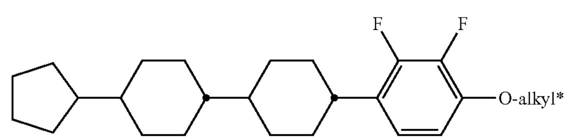
IIA-63
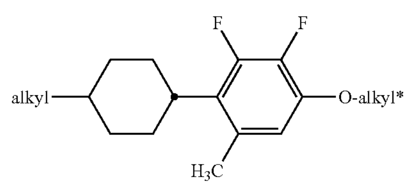
IIA-64
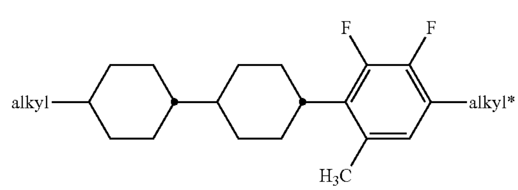

-continued

IIA-65

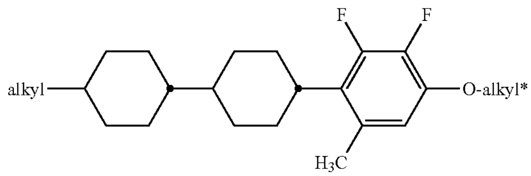

IIA-66

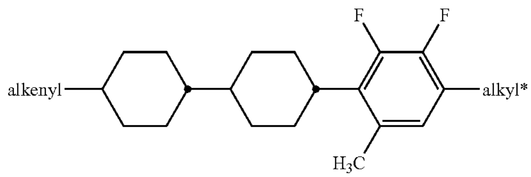

IIA-67

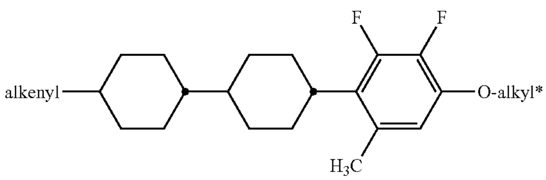

IIA-68

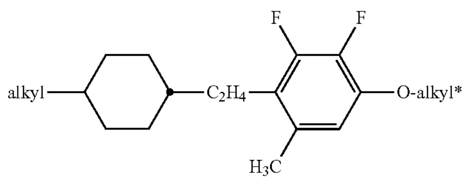

IIA-69

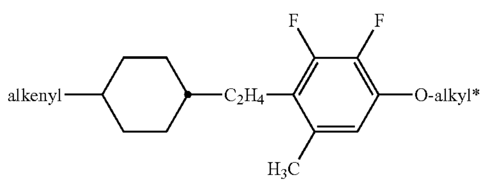

IIA-70

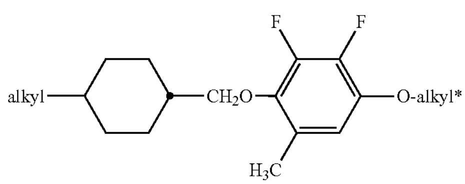

IIA-71

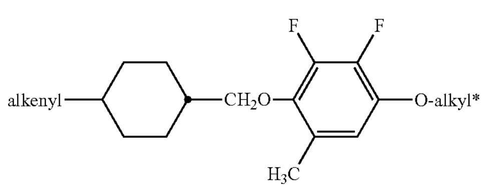

IIA-72

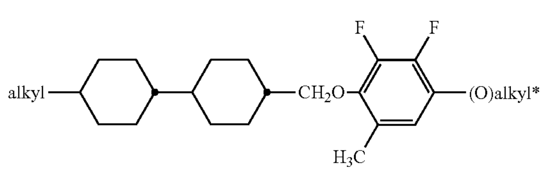

-continued

IIA-73

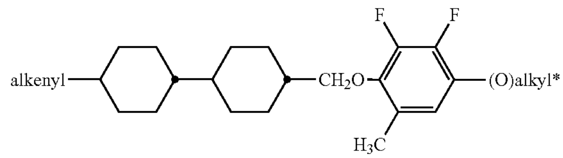

IIA-74

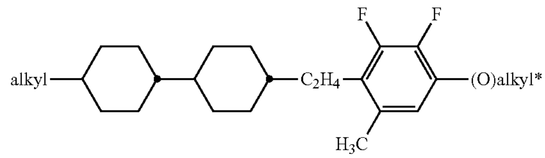

IIA-75

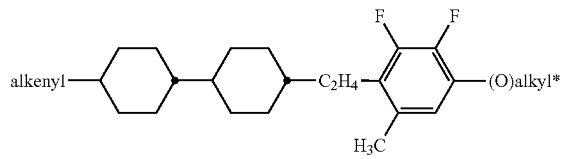

in which the index a denotes 1 or 2, "alkyl" and "alkyl*" each, independently of one another, denote a straight-chain alkyl radical having 1-6 C atoms, "alkenyl" denotes a straight-chain alkenyl radical having 2-6 C atoms, and (O) denotes an oxygen atom or a single bond. "alkenyl" preferably denotes $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Particularly preferred LC media according to the invention comprise one or more compounds selected from the group consisting of formulae IIA-2, IIA-8, IIA-10, IIA-16, II-18, IIA-40, IIA-41, IIA-42 and IIA-43.

In another preferred embodiment the LC medium comprises one or more compounds of the formula IIB selected from the group consisting of formulae IIB-1 to IIB-26,

IIB-1

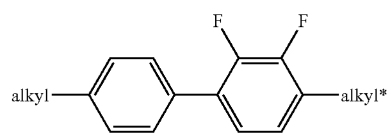

IIB-2

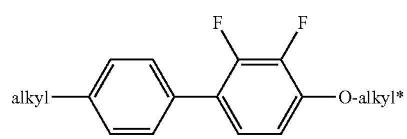

IIB-3

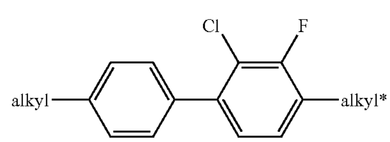

IIB-4

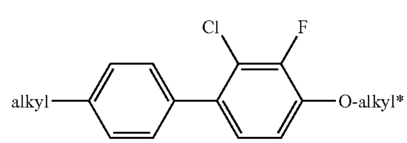

-continued
IIB-5
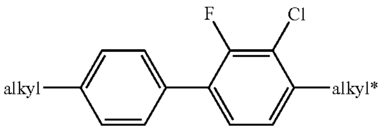
IIB-6
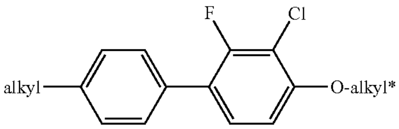
IIB-7
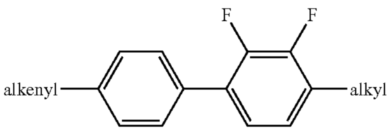
IIB-8
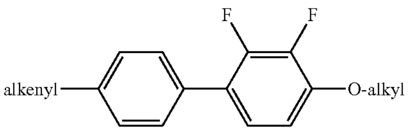
IIB-9
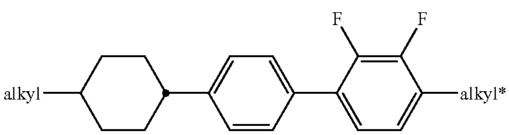
IIB-10
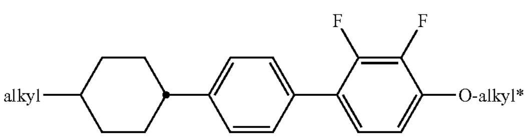
IIB-11
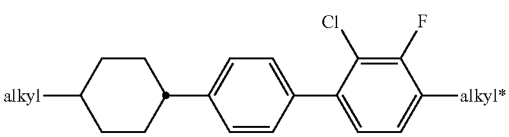
IIB-12
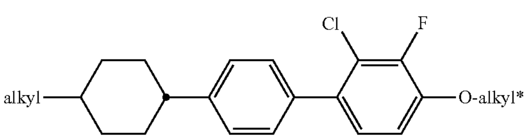
IIB-13
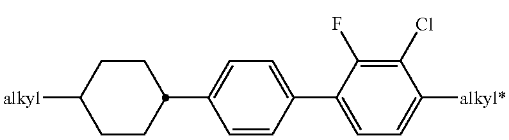
IIB-14
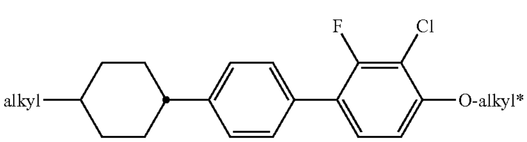
-continued
IIB-15
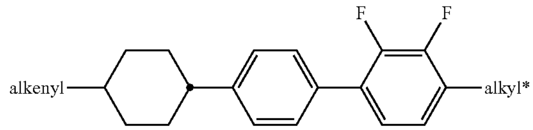
IIB-16
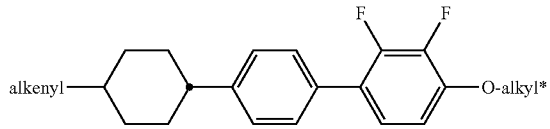
IIB-17
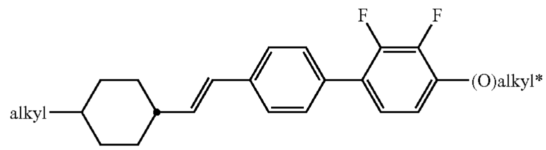
IIB-18
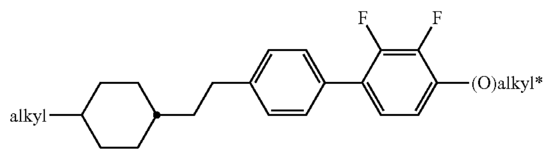
IIB-19
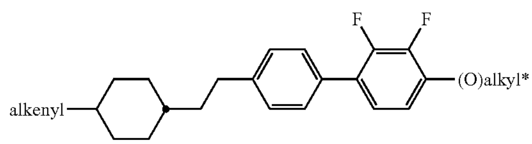
IIB-20
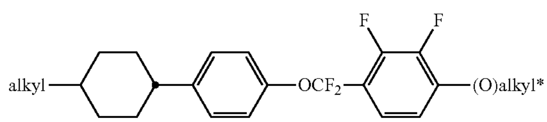
IIB-21
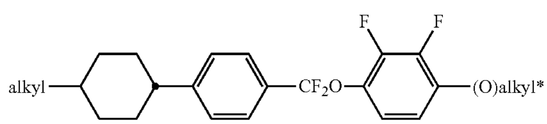
IIB-22
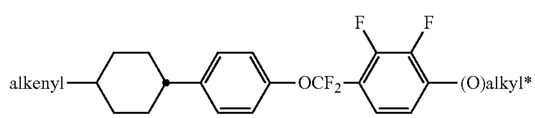
IIB-23
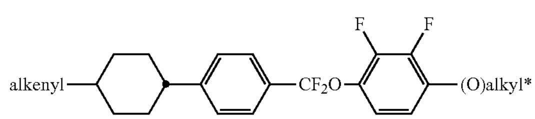
IIB-24
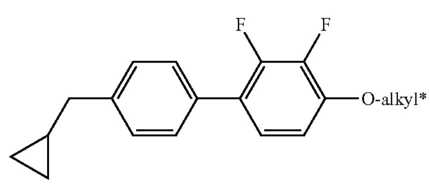

-continued

IIB-25

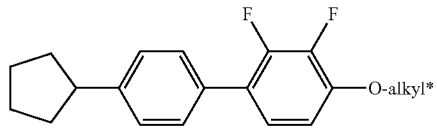

IIB-26

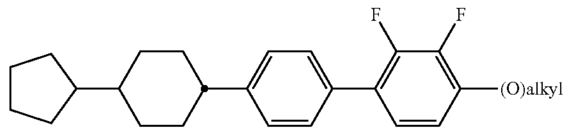

in which "alkyl", "alkyl*", "alkenyl" and (O) have the meanings given above.

Particularly preferred LC media according to the invention comprise one or more compounds selected from the group consisting of formulae IIB-2, IIB-10 and IIB-16.

In another preferred embodiment the LC medium comprises one or more compounds of the formula IIC selected from the formula IIC-1,

IIC-1

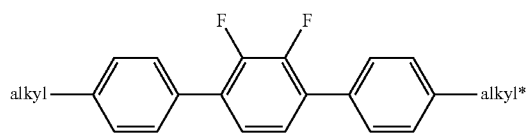

in which "alkyl" and "alkyl*" and (O) have the meanings given above.

In another preferred embodiment the LC medium comprises one or more compounds of the formula IID selected from the group consisting of formulae IID-1 to IID-10,

IID-1

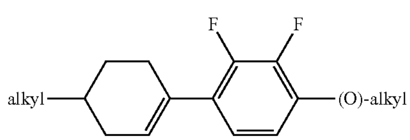

IID-2

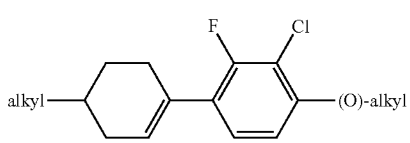

IID-3

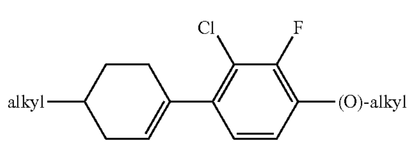

IID-4

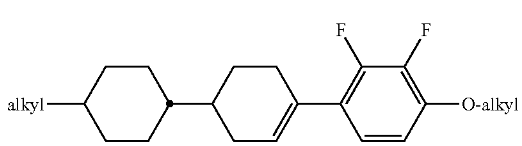

-continued

IID-5

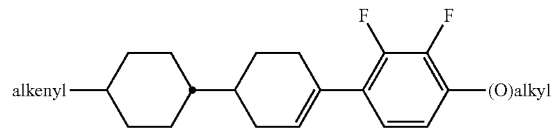

IID-6

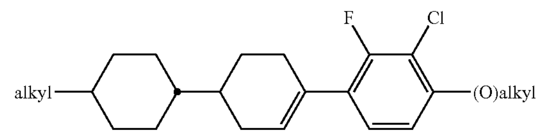

IID-7

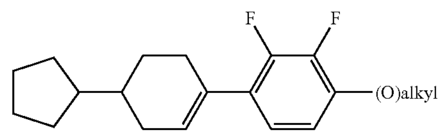

IID-7

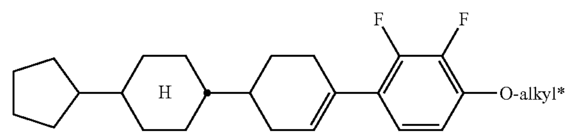

IID-9

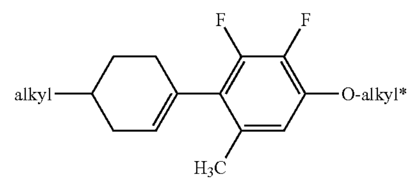

IID-10

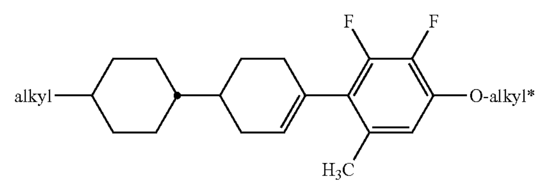

in which "alkyl", "alkyl*", "alkenyl" and (O) have the meanings given above.

Particularly preferred LC media according to the invention comprise one or more compounds of the formula IID-4.

The proportion of compounds of the formulae IIA and/or IIB in the mixture as a whole is preferably at least 20% by weight.

In another preferred embodiment the LC medium comprises one or more compounds of formula III

III

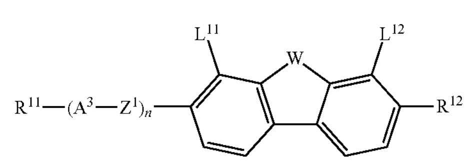

in which $R^{11}$ and $R^{12}$ each, independently of one another, denote H, an alkyl or alkoxy radical having 1 to 15 C atoms, where one or more $CH_2$ groups in these radicals may each be replaced, independently of one another, by

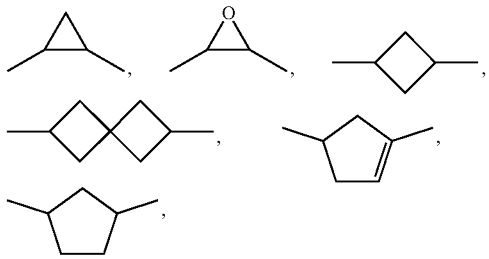

O—, —S—, —C≡C—, —$CF_2O$—, —$OCF_2$—, —CH═CH—, —OC—O— or —O—CO— in such a way that O atoms are not linked directly to one another, and in which, in addition, one or more H atoms may be replaced by halogen, $A^3$ on each occurrence, independently of one another, denotes a) 1,4-cyclohexenylene or 1,4-cyclohexylene radical, in which one or two non-adjacent $CH_2$ groups may be replaced by —O— or —S—, b) a 1,4-phenylene radical, in which one or two CH groups may be replaced by N, or c) a radical selected from the group consisting of spiro[3.3]heptane-2,6-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, wherein the radicals a), b) and c) may be mono- or polysubstituted by halogen atoms, n denotes 0, 1 or 2, preferably 0 or 1, $Z^1$ on each occurrence independently of one another denotes —CO—O—, —O—CO—, —$CF_2O$—, —$OCF_2$—, —$CH_2O$—, —$OCH_2$—, —$CH_2$—, —$CH_2CH_2$—, —$(CH_2)_4$—, —CH═CH—$CH_2O$—, —$C_2F_4$—, —$CH_2CF_2$—, —$CF_2CH_2$—, —CF═CF—, —CH═CF—, —CF═CH—, —CH═CH—, —C≡C— or a single bond, and $L^{11}$ and $L^{12}$ each, independently of one another, denote F, Cl, $CF_3$ or $CHF_2$, preferably H or F, most preferably F, and W denotes O or S.

In a preferred embodiment of the present invention the LC medium comprises one or more compounds of the formula III-1 and/or III-2

III-1

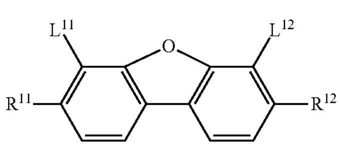

III-2

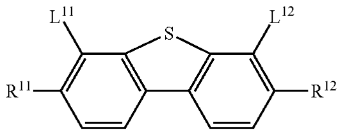

in which the occurring groups have the same meanings as given under formula III above and preferably $R^{11}$ and $R^{12}$ each, independently of one another, an alkyl, alkenyl or alkoxy radical having up to 15 C atoms, more preferably one or both of them denote an alkoxy radical and $L^{11}$ and $L^{12}$ each preferably denote F.

In another preferred embodiment the LC medium comprises one or more compounds of the formula III-1 selected from the group consisting of formulae III-1-1 to III-1-10, preferably of formula III-1-6,

III-1-1

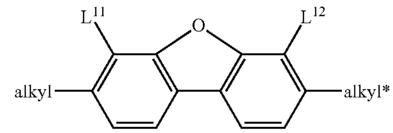

III-1-2

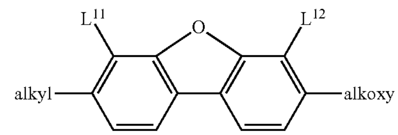

III-1-3

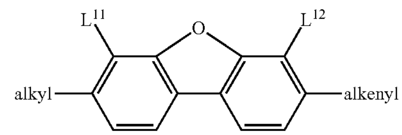

III-1-4

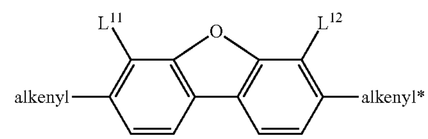

III-1-5

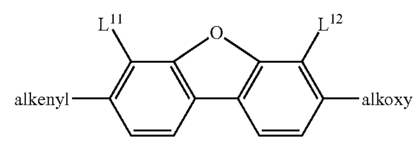

III-1-6

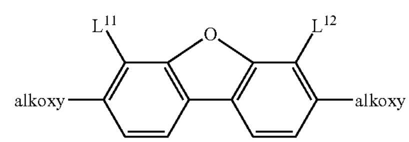

III-1-7

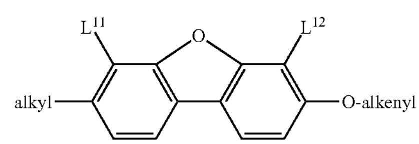

III-1-8

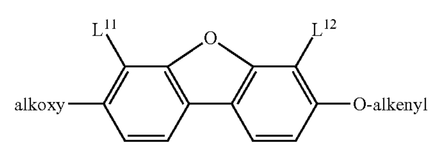

III-1-9

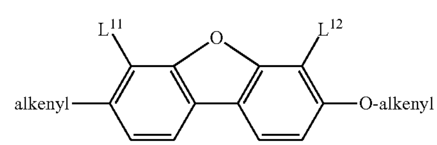

III-1-10

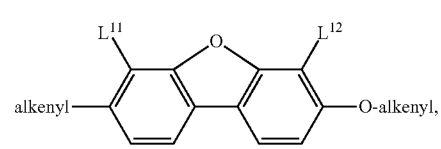

in which "alkyl" and "alkyl*" each, independently of one another, denote a straight-chain alkyl radical having 1-6 C atoms, "alkenyl" and "alkenyl*" each, independently of one another, denote a straight-chain alkenyl radical having 2-6 C atoms, "alkoxy" and "alkoxy*" each, independently of one another, denote a straight-chain alkoxy radical having 1-6 C atoms, and $L^{11}$ and $L^{12}$ each, independently of one another, denote F or Cl, preferably both F.

In another preferred embodiment the LC medium comprises one or more compounds of the formula III-2 selected from the group consisting of formulae III-2-1 to III-2-10, preferably of formula III-2-6,

III-2-1

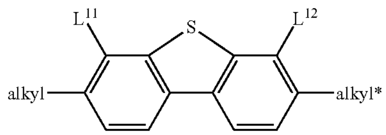

III-2-2

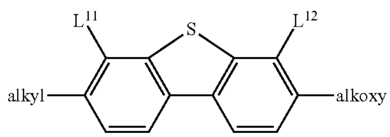

III-2-3

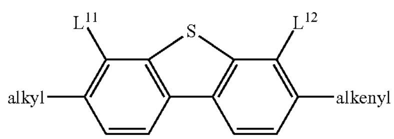

III-2-4

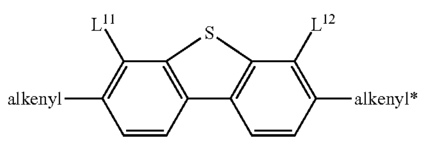

III-2-5

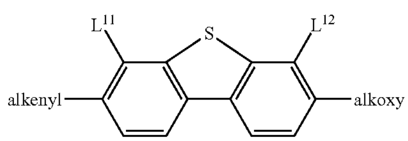

III-2-6

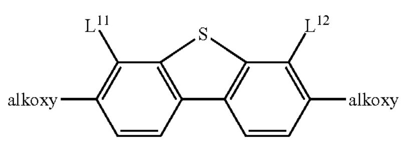

III-2-7

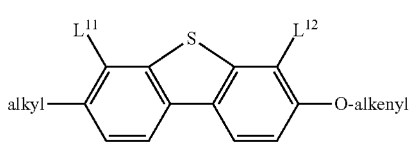

III-2-8

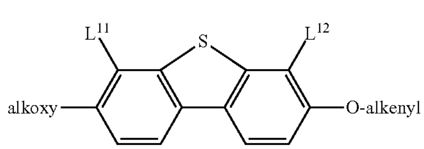

III-2-9

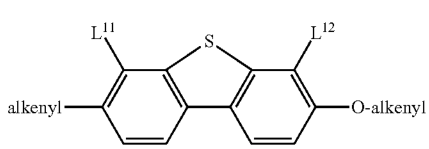

-continued

III-2-10

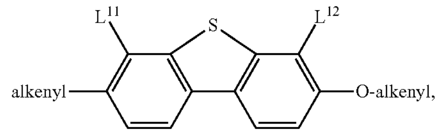

in which "alkyl" and "alkyl*" each, independently of one another, denote a straight-chain alkyl radical having 1-6 C atoms, "alkenyl" and "alkenyl*" each, independently of one another, denote a straight-chain alkenyl radical having 2-6 C atoms, "alkoxy" and "alkoxy*" each, independently of one another, denote a straight-chain alkoxy radical having 1-6 C atoms, and $L^{11}$ and $L^{12}$ each, independently of one another, denote F or Cl, preferably both F.

In a very preferred embodiment the LC medium comprises one or more compounds selected from the group consisting of the following formulae

III-2-2-1

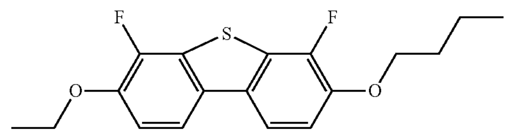

III-2-2-2

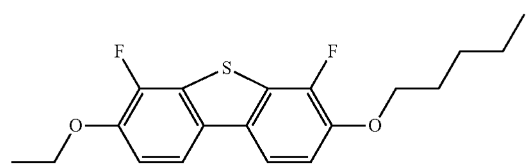

III-2-2-3

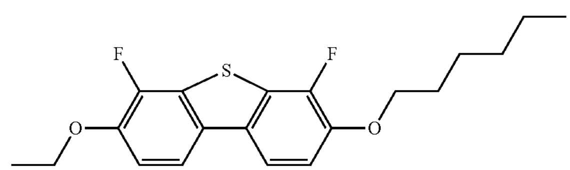

In another preferred embodiment of the present invention the LC medium comprises one or more compounds of the formula IIIA-1 and/or IIIA-2

IIIA-1

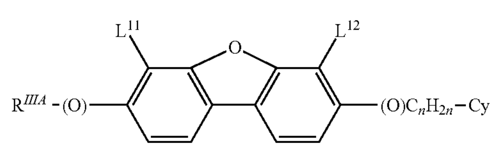

IIIA-2

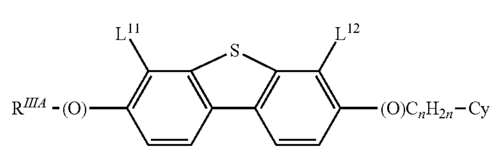

in which $L^{11}$ and $L^{12}$ have the same meanings as given under formula III, (O) denotes O or a single bond, $R^{IIIA}$ denotes alkyl or alkenyl having up to 7 C atoms or a group Cy-$C_mH_{2m+1}$—, m and n are, identically or differently, 0, 1, 2, 3, 4, 5 or 6, preferably 1, 2 or 3, very preferably 1, and Cy denotes a cycloaliphatic group having 3, 4 or 5 ring atoms, which is optionally substituted with alkyl or alkenyl each having up to 3 C atoms, or with halogen or CN, and preferably denotes cyclopropyl, cyclobutyl or cyclopentyl.

The compounds of formula IIIA-1 and/or IIIA-2 are contained in the LC medium either alternatively or additionally to the compounds of formula III, preferably additionally.

Very preferred compounds of the formulae IIIA-1 and IIIA-2 are the following:

IIIA-1-1

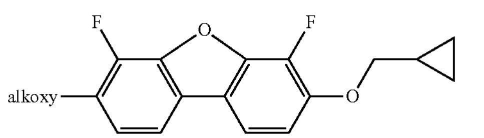

IIIA-1-2

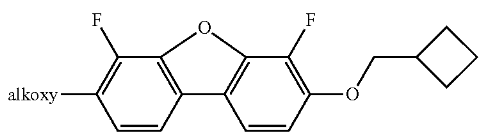

IIIA-1-3

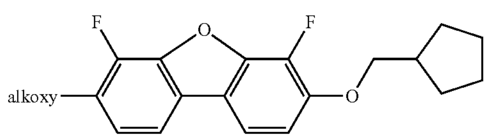

IIIA-2-1

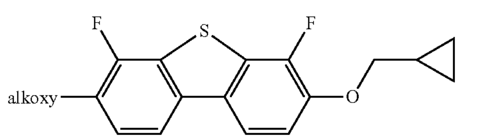

IIIA-2-2

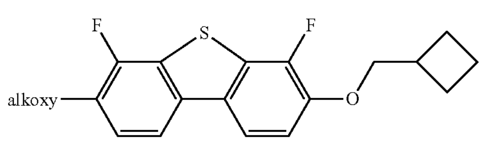

IIIA-2-3

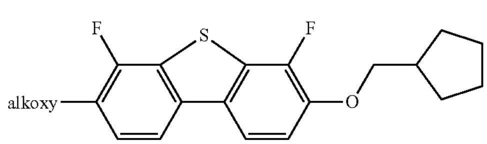

in which "alkoxy" denotes a straight-chain alkoxy radical having 1-6 C atoms, and preferably denotes n-propoxy, n-butyloxy, n-pentyloxy or n-hexyloxy.

In a preferred embodiment of the present invention, the LC medium comprises one or more compounds of formula III-3

III-3

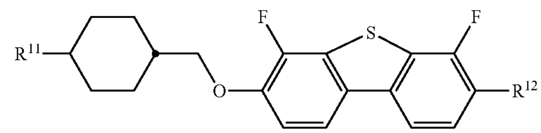

in which $R^{11}$, $R^{12}$ identically or differently, denote H, an alkyl or alkoxy radical having 1 to 15 C atoms, in which one or more $CH_2$ groups in these radicals are optionally replaced, independently of one another, by —C≡C—, —$CF_2$O—, —O$CF_2$—, —CH═CH—,

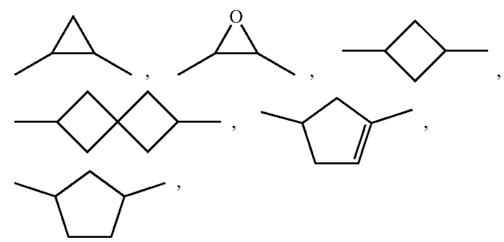

O—, —S—, —CO—O— or —O—CO— in such a way that O atoms are not linked directly to one another, and in which, in addition, one or more H atoms may be replaced by halogen.

The compounds of formula III-3 are preferably selected from the group consisting of formulae III-3-1 to III-3-11:

III-3-1

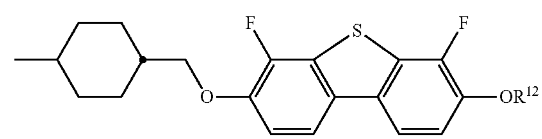

III-3-2

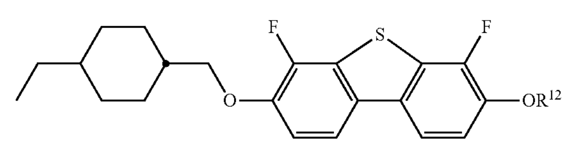

III-3-3

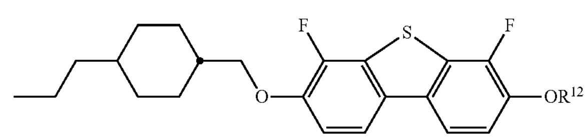

III-3-4

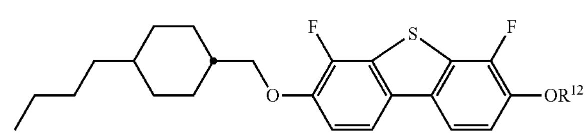

III-3-5

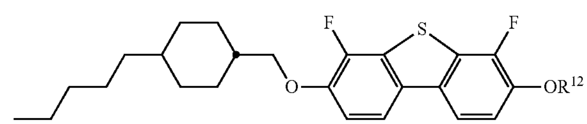

-continued

III-3-6

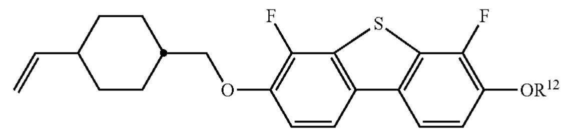

III-3-7

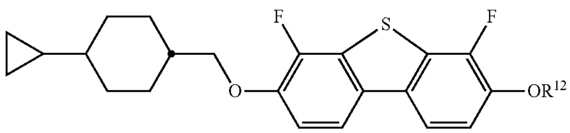

III-3-8

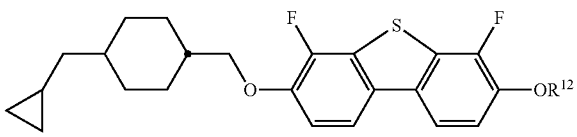

III-3-9

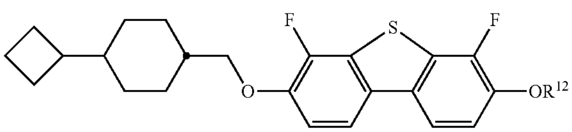

III-3-10

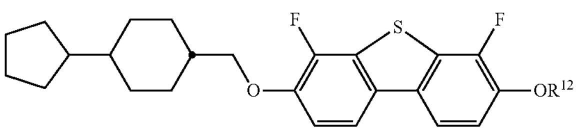

III-3-11

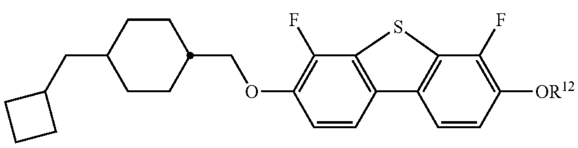

in which $R^{12}$ denotes alkyl having 1 to 7 C-atoms, preferably ethyl, n-propyl, n-butyl, n-pentyl or n-hexyl, or alternatively cyclopropylmethyl, cyclobutylmethyl or cyclopentylmethyl.

In another preferred embodiment of the present invention, the LC medium comprises one or more compounds of the formulae III-4 to III-6, preferably of formula III-5,

III-4

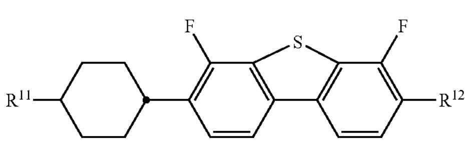

III-5

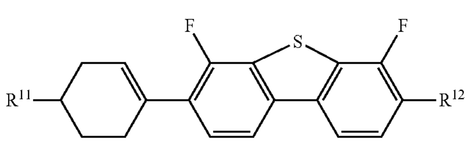

III-6

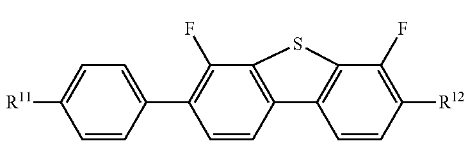

in which the parameters have the meanings given above, $R^{11}$ preferably denotes straight-chain alkyl and $R^{12}$ preferably denotes alkoxy, each having 1 to 7 C atoms.

In another preferred embodiment the LC medium comprises one or more compounds of the formula I selected from the group consisting of formulae III-7 to III-9, preferably of formula III-8,

III-7

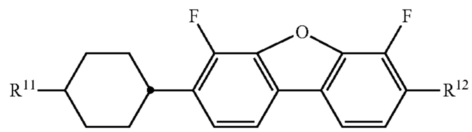

III-8

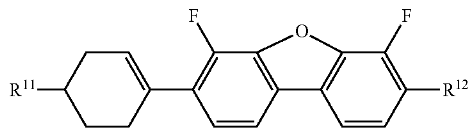

III-9

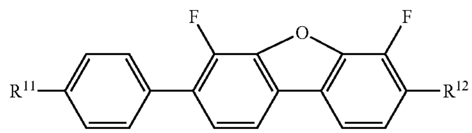

in which the parameters have the meanings given above, $R^{11}$ preferably denotes straight-chain alkyl and $R^{12}$ preferably denotes alkoxy each having 1 to 7 C atoms.

In a preferred embodiment, the medium comprises one or more compounds of the formula IV,

IV

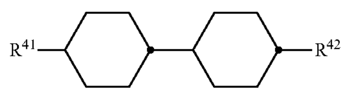

in which $R^{41}$ denotes an unsubstituted straight-chain, branched or cyclic alkyl radical having 1 to 7 C atoms or an unsubstituted alkenyl radical having 2 to 7 C atoms, preferably an n-alkyl radical, particularly preferably having 2, 3, 4 or 5 C atoms, and $R^{42}$ denotes an unsubstituted straight-chain, branched or cyclic alkyl radical having 1 to 7 C atoms or an unsubstituted alkoxy radical having 1 to 6 C atoms, both preferably having 2 to 5 C atoms, an unsubstituted alkenyl radical having 2 to 7 C atoms, preferably having 2, 3 or 4 C atoms, more preferably a vinyl radical or a 1-propenyl radical and in particular a vinyl radical.

The compounds of the formula IV are preferably selected from the group consisting of formulae IV-1 to IV-6,

IV-1

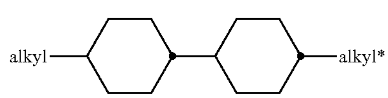

IV-2

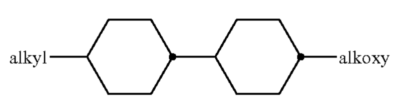

-continued

IV-3

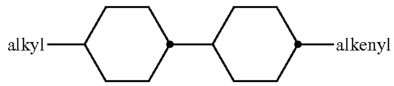

IV-4

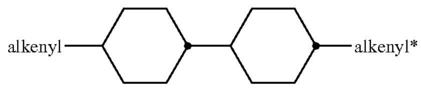

IV-5

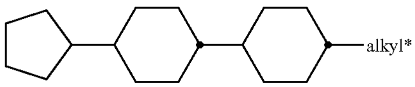

IV-6

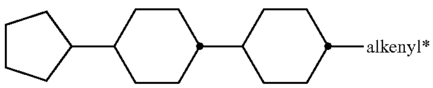

in which

"alkyl" and "alkyl*" independently of one another, denote alkyl having 1 to 7 C atoms, preferably having 2 to 5 C atoms, "alkenyl" denotes an alkenyl radical having 2 to 5 C atoms, preferably having 2 to 4 C atoms, particularly preferably 2 C atoms, "alkenyl*" denotes an alkenyl radical having 2 to 5 C atoms, preferably having 2 to 4 C atoms, particularly preferably having 2 to 3 C atoms, and "alkoxy" denotes alkoxy having 1 to 5 C atoms, preferably having 2 to 4 C atoms.

Preferably, the LC medium comprises one or more compounds selected from the group consisting of formulae IV-1-1 to IV-1-9

IV-1-1

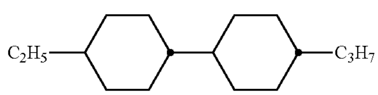

IV-1-2

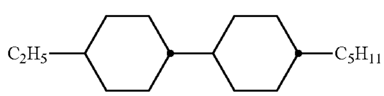

IV-1-3

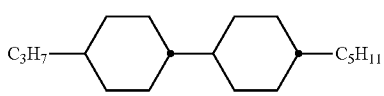

IV-1-4

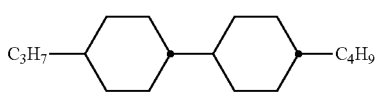

IV-1-5

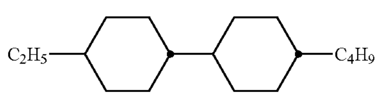

IV-1-6

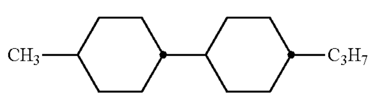

IV-1-7

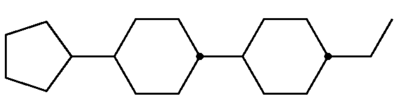

-continued

IV-1-8

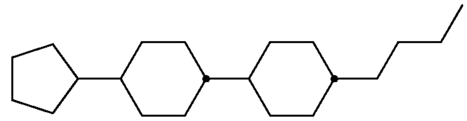

IV-1-9

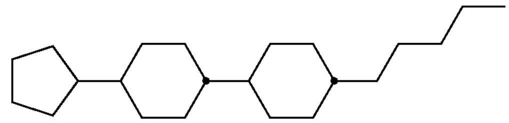

wherein the propyl, butyl and pentyl groups are straight-chain groups.

Very preferably, the LC medium according to the invention comprises one or more compounds of the formulae IV-2-1 and/or IV-2-2

IV-2-1

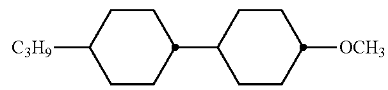

IV-2-2

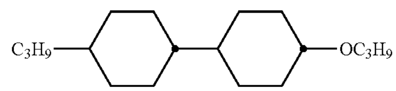

Very preferably, the LC medium according to the invention comprises a compound of formula IV-3, in particular selected from the group consisting of formulae IV-3-1 to IV-3-6

IV-3-1

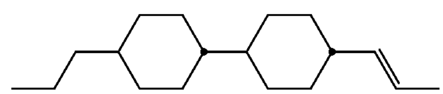

IV-3-2

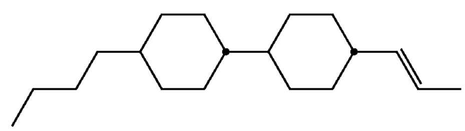

IV-3-3

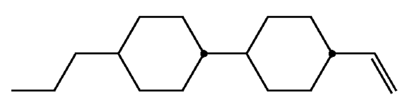

IV-3-4

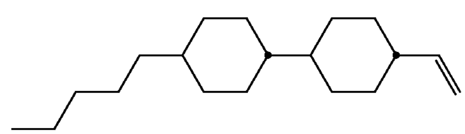

IV-3-5

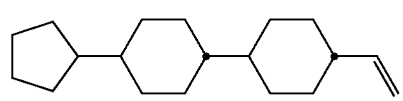

IV-3-6

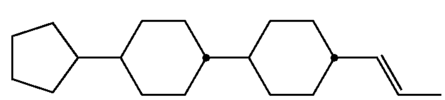

Very preferably, the LC medium according to the invention comprises a compound of formula IV-4, in particular selected from the formulae IV-4-1 and IV-4-2

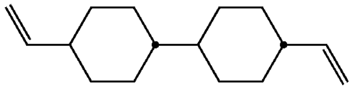

IV-4-1

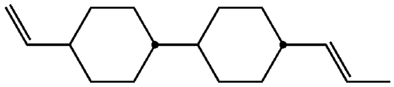

IV-4-2

The LC medium preferably additionally comprises one or more compounds of the formula IVa,

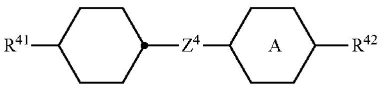

IVa in which $R^{41}$ and $R^{42}$ each, independently of one another, denote a straight-chain alkyl, alkoxy, alkenyl, alkoxyalkyl or alkoxy radical having up to 12 C atoms, and

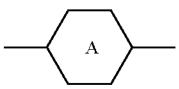

denotes

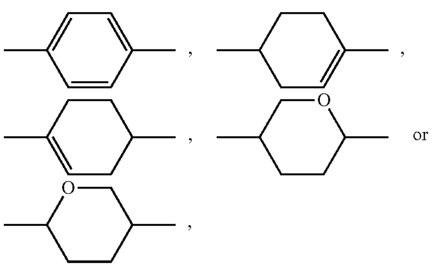

$Z^4$ denotes a single bond, —$CH_2CH_2$—, —CH═CH—, —$CF_2O$—, —$OCF_2$—, —$CH_2O$—, —$OCH_2$—, —COO—, —OCO—, —$C_2F_4$—, —$C_4H_8$— or —CF═CF—.

Preferred compounds of the formula IVa are indicated below:

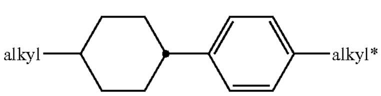

IVa-1

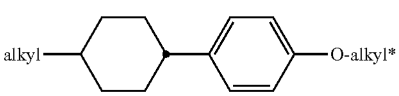

IVa-2

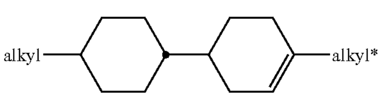

IVa-3

-continued

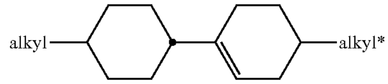

IVa-4 in which alkyl and alkyl* each, independently of one another, denote a straight-chain alkyl radical having 1 to 6 C atoms.

The LC medium according to the invention preferably comprises at least one compound of the formula IVa-1 and/or formula IVa-2.

The proportion of compounds of the formula IVa in the mixture as a whole is preferably at least 5% by weight Preferably, the LC medium comprises one or more compounds of formula IVb-1 to IVb-3

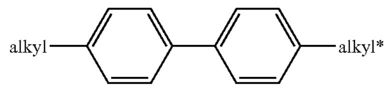

IVb-1

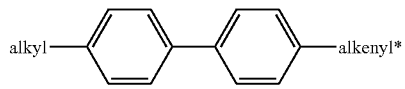

IVb-2

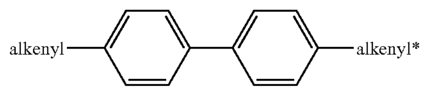

IVb-3 in which

"alkyl" and "alkyl*" each, independently of one another, denote a straight-chain alkyl radical having 1 to 6 C atoms, and "alkenyl" and "alkenyl*" each, independently of one another, denote a straight-chain alkenyl radical having 2 to 6 C atoms.

The proportion of the biphenyls of the formulae IV-1 to IV-3 in the mixture as a whole is preferably at least 3% by weight, in particular 5% by weight.

Of the compounds of the formulae IVb-1 to IVb-3, the compounds of the formula IVb-2 are particularly preferred.

Particularly preferred biphenyls are

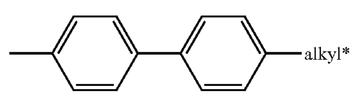

IVb-1-1

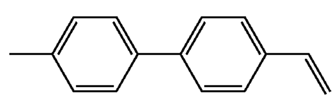

IVb-2-1

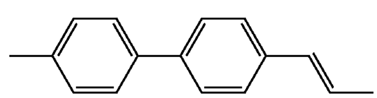

IVb-2-2

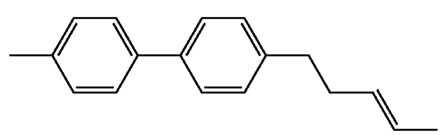

IVb-2-3 in which "alkyl*" denotes an alkyl radical having 1 to 6 C atoms and preferably denotes n-propyl.

The LC medium according to the invention particularly preferably comprises one or more compounds of the formulae IVb-1-1 and/or IVb-2-3.

In a preferred embodiment, the LC medium comprises one or more compounds of formula V

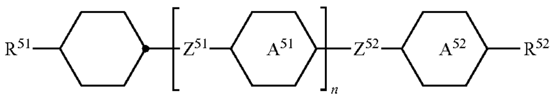

V in which $R^{51}$ and $R^{52}$ independently of one another, have one of the meanings given for $R^{41}$ and $R^{42}$ and preferably denote alkyl having 1 to 7 C atoms, preferably n-alkyl, particularly preferably n-alkyl having 1 to 5 C atoms, alkoxy having 1 to 6 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

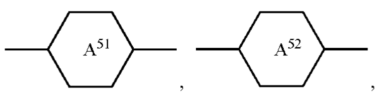

identically or differently, denote

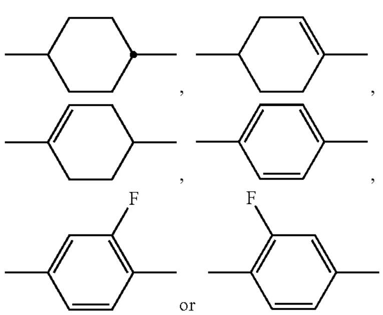

in which

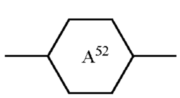

preferably denotes

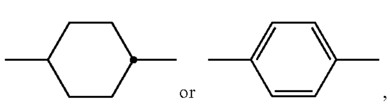

$Z^{51}$, $Z^{52}$ each, independently of one another, denote —$CH_2$—$CH_2$—, —$CH_2$—O—, —CH═CH—, —C≡C—, —COO— or a single bond, preferably —$CH_2$—$CH_2$—, —$CH_2$—O— or a single bond and particularly preferably a single bond, and n is 1 or 2.

The compounds of formula V are preferably selected from the group consisting of formulae V-1 to V-16:

V-1

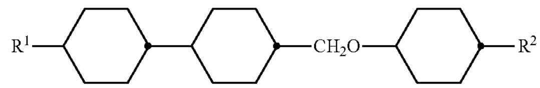

V-2

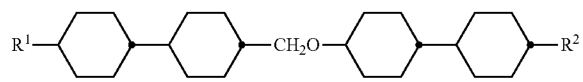

V-3

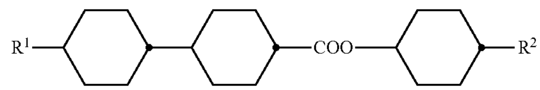

V-4

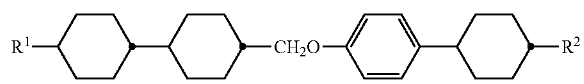

V-5

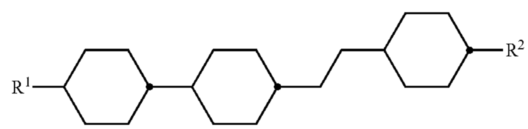

V-6

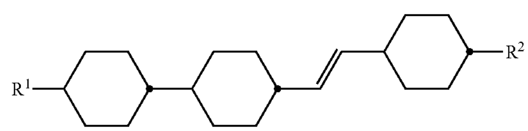

V-7

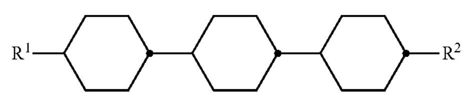

V-8

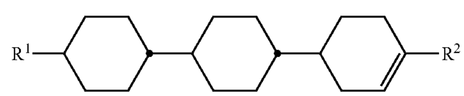

V-9

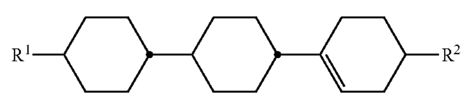

V-10

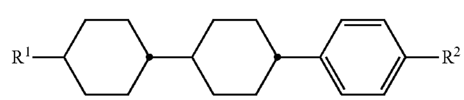

V-11

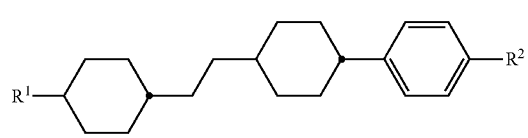

V-12

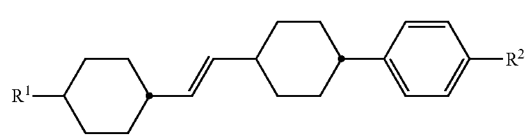

-continued

V-13

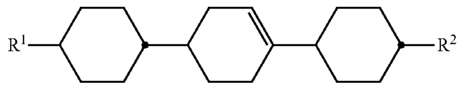

V-14

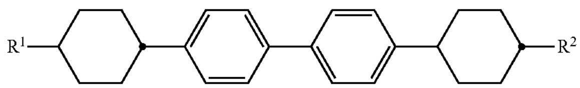

V-15

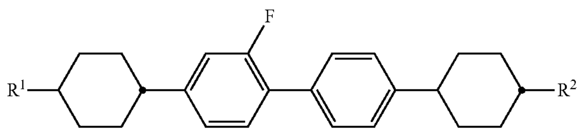

V-16

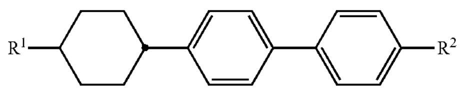

in which $R^1$ and $R^2$ have the meanings indicated for $R^{2A}$ above.

$R^1$ and $R^2$ preferably each, independently of one another, denote straight-chain alkyl or alkenyl.

Preferred LC media comprise one or more compounds of the formulae V-1, V-3, V-4, V-6, V-7, V-10, V-11, V-12, V-14, V-15, and/or V-16

LC media according to the invention very particularly preferably comprise the compounds of the formula V-10, V-12, V-16 and/or IV-1, in particular in amounts of 5 to 30%.

Preferred compounds of the formulae V-10 are indicated below:

V-10a

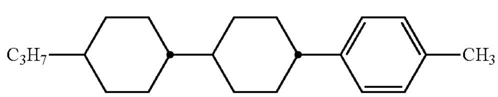

V-10b

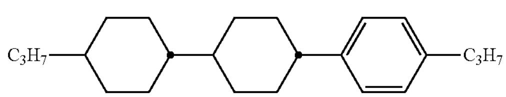

V-10c

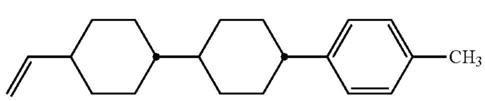

The LC medium according to the invention particularly preferably comprises the tricyclic compounds of the formula V-10a and/or of the formula V-10b in combination with one or more bicyclic compounds of the formulae IV-1 The total proportion of the compounds of the formulae V-10a and/or V-10b in combination with one or more compounds selected from the bicyclohexyl compounds of the formula IV-1 is 5 to 40%, very particularly preferably 15 to 35%.

Very particularly preferred LC media comprise compounds V-10a and IV-1-1

V-10a

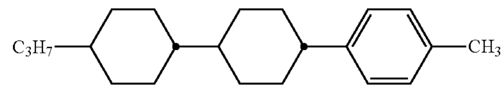

IV-1-1

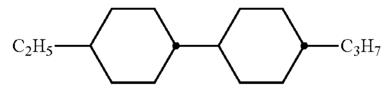

The compounds V-10a and IV-1-1 are preferably present in the mixture in a concentration of 15 to 35%, particularly preferably 15 to 25% and especially preferably 18 to 22%, based on the mixture as a whole.

Very particularly preferred LC media comprise the compounds V-10b and IV-1-1:

V-10b

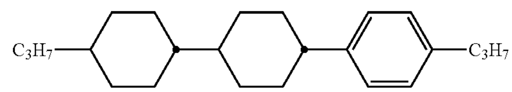

IV-1-1

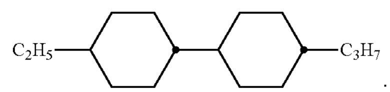

The compounds V-10b and IV-1-1 are preferably present in the mixture in a concentration of 15 to 35%, particularly preferably 15 to 25% and especially preferably 18 to 22%, based on the mixture as a whole.

Very particularly preferred LC media comprise one, two or three of the following three compounds:

V-10a

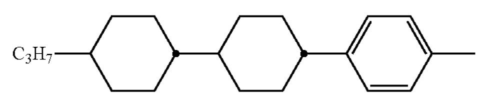

V-10b

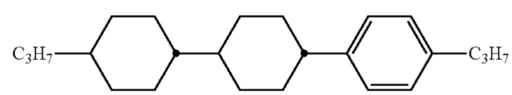

IV-1-1

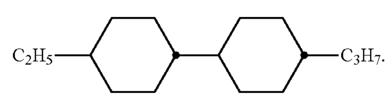

The compounds V-10a, V-10b and IV-1-1 are preferably present in the mixture in a concentration of 15 to 35%, particularly preferably 15 to 25% and especially preferably 18 to 22%, based on the mixture as a whole.

Preferred LC media comprise at least one compound selected from the group consisting of the following formulae

V-6

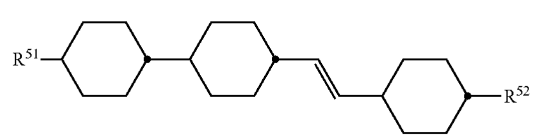

-continued

V - 7

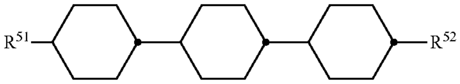

IV - 1

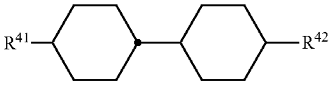

in which $R^{41}$ and $R^{42}$, and $R^{51}$ and $R^{52}$ have the meanings indicated above. Preferably in the compounds V-6, V-7 and IV-1, $R^{41}$ and $R^{51}$ denotes alkyl or alkenyl having 1 to 6 or 2 to 6 C atoms, respectively, and $R^{42}$ and $R^{52}$ denotes alkenyl having 2 to 6 C atoms.

Preferred LC media comprise at least one compound of the formulae V-6a, V-6b, V-7a, V-7b, IV-4-1, IV-4-2, IV-3a and IV-3b:

V-6a

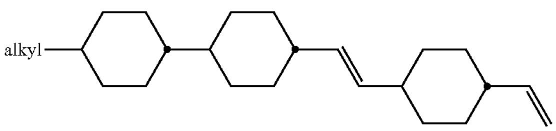

V-6b

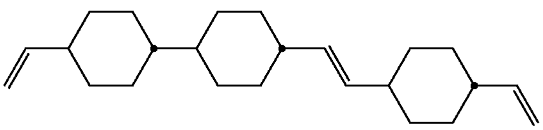

V-7a

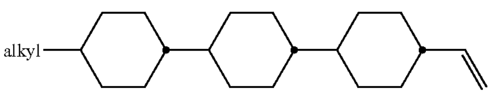

V-7b

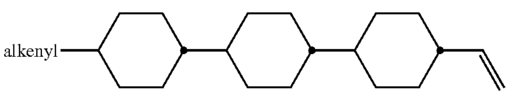

IV-4-1

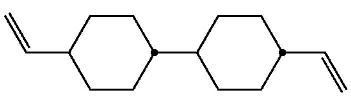

IV-4-2

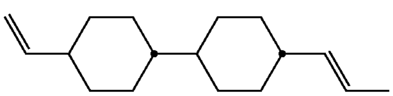

IV3a

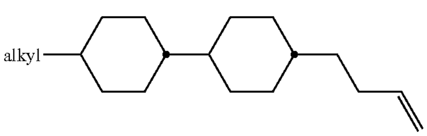

IV-3b

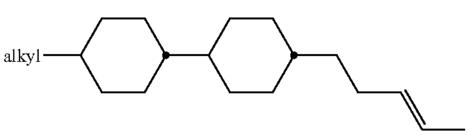

in which alkyl denotes an alkyl radical having 1 to 6 C atoms and alkenyl denotes an alkenyl radical having 2 to 6 C atoms.

The compounds of the formulae V-6a, V-6b, V-7a, V-7b, IV-4-1, IV-4-2, IV-3a and IV-3b are preferably present in the LC media according to the invention in amounts of 1 to 40% by weight, preferably 5 to 35% by weight and very particularly preferably 10 to 30% by weight.

In a preferred embodiment of the present invention the LC medium additionally comprises one or more compounds selected from the group consisting of formulae VI-1 to VI-9

VI - 1

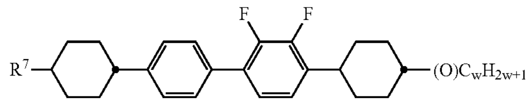

VI - 2

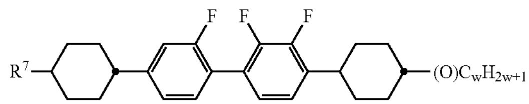

VI - 3

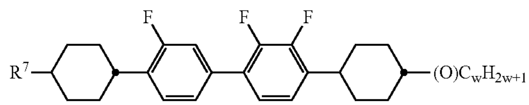

VI - 4

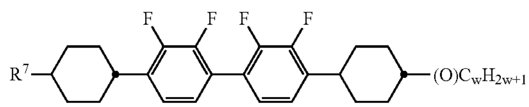

VI - 5

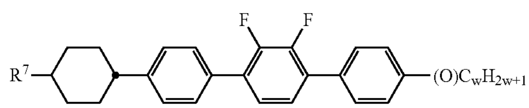

VI - 6

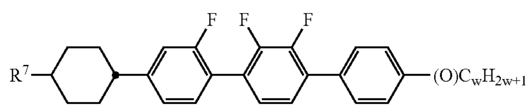

VI - 7

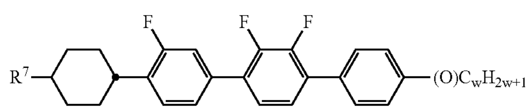

VI - 8

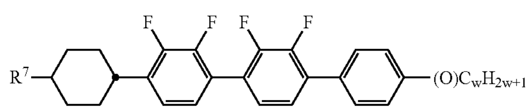

VI - 9

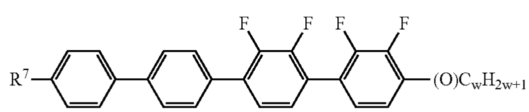

in which $R^7$ each, independently of one another, have one of the meanings indicated for $R^{2A}$ in formula IIA, and w and x each, independently of one another, denote 1 to 6.

Particular preference is given to LC media comprising at least one compound of the formula V-9.
In a preferred embodiment of the present invention the LC medium additionally comprises one or more compounds selected from the group consisting of the formulae VII-1 to VII-25,
VII-1
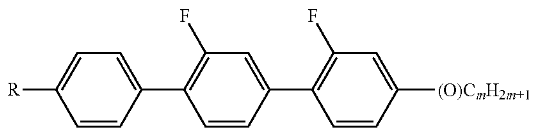
VII-2
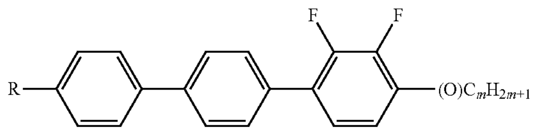
VII-3
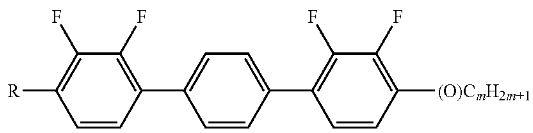
VII-4
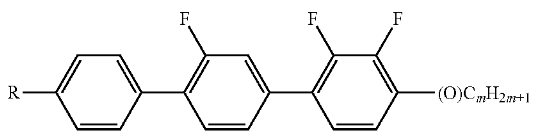
VII-5
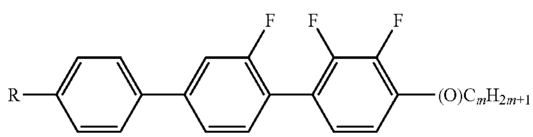
VII-6
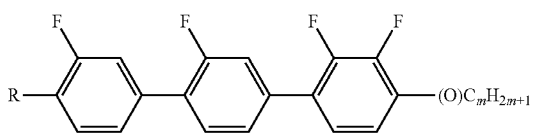
VII-7
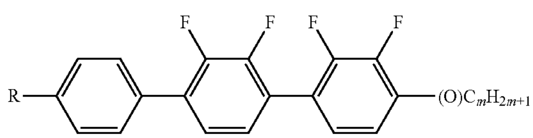
VII-8
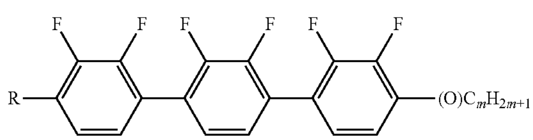
VII-9
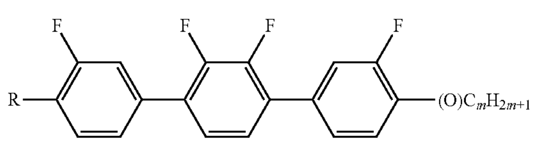
-continued
VII-10
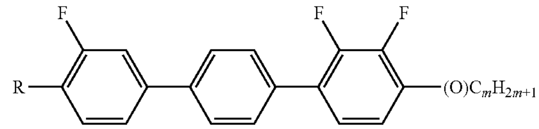
VII-11
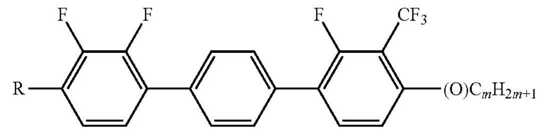
VII-12
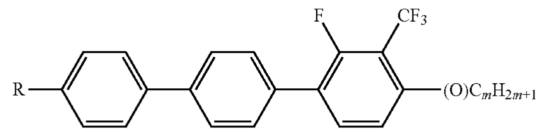
VII-13
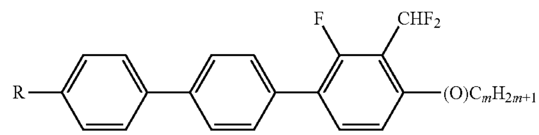
VII-14
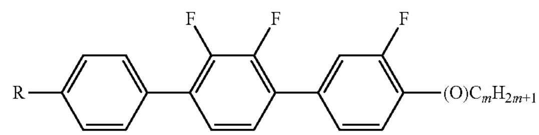
VII-15
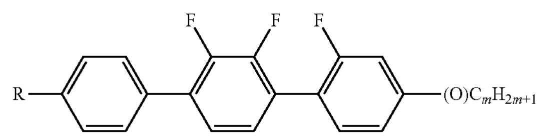
VII-16
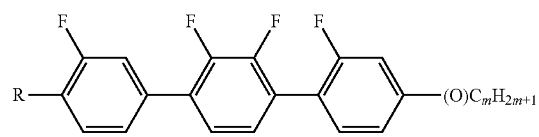
VII-17
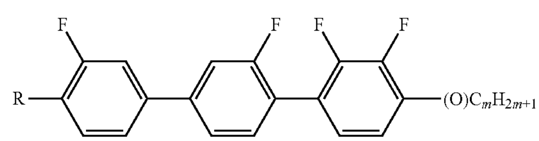
VII-18
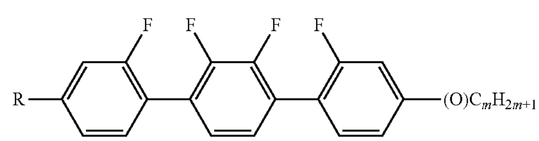
VII-19
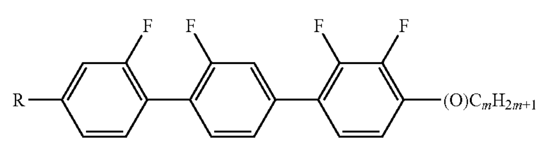

-continued

VII-20

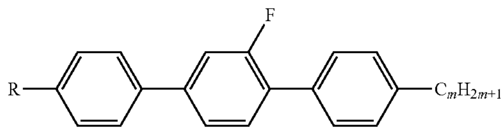

VII-21

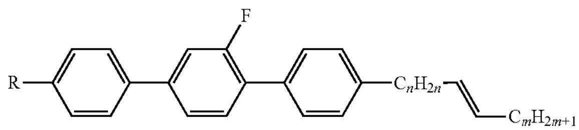

VII-22

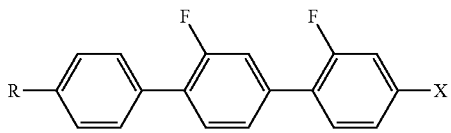

VII-23

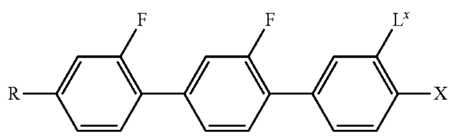

VII-24

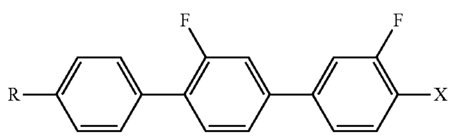

VII-25

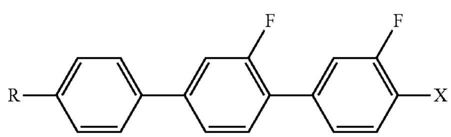

in which

R denotes a straight-chain alkyl or alkoxy radical having 1 to 6 C atoms, (O) denotes —O— or a single bond, X denotes F, Cl, $OCF_3$ or $OCHF_2$, $L^x$ denotes H or F, m is 0, 1, 2, 3, 4, 5 or 6 and n is 0, 1, 2, 3 or 4.

R preferably denotes methyl, ethyl, propyl, butyl, pentyl, hexyl, methoxy, ethoxy, propoxy, butoxy, pentoxy.

X preferably denotes F or $OCH_3$, very preferably F.

The LC medium according to the invention preferably comprises the terphenyls of the formulae VII-1 to VII-25 in amounts of 2 to 30% by weight, in particular 5 to 20% by weight.

Particular preference is given to compounds of the formulae VII-1, VII-2, VII-4, VII-20, VII-21, and VII-22 wherein X denotes F. In these compounds, R preferably denotes alkyl, furthermore alkoxy, each having 1 to 5 C atoms. In the compounds of the formula VII-20, R preferably denotes alkyl or alkenyl, in particular alkyl. In the compounds of the formula VII-21, R preferably denotes alkyl. In the compounds of the formulae VII-22 to VII-25, X preferably denotes F.

The terphenyls of formula VII-1 to VII-25 are preferably employed in the LC media according to the invention if the Δn value of the mixture is to be ≥0.1. Preferred LC media comprise 2 to 20% by weight of one or more terphenyl compounds selected from the group of the compounds of formulae VII-1 to VII-25.

Further preferred embodiments are listed below:

a) LC medium comprising at least one compound selected from the group consisting of formulae Z-1 to Z-14,

Z-1

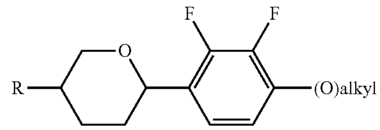

Z-2

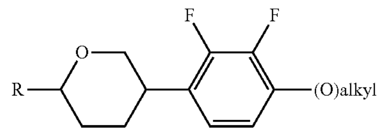

Z-3

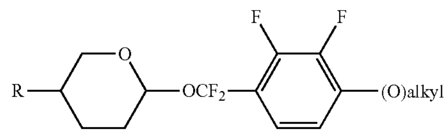

Z-4

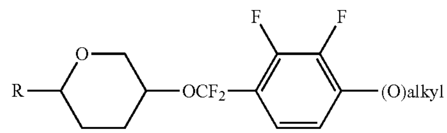

Z-5

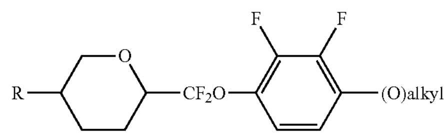

Z-6

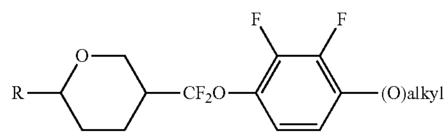

Z-7

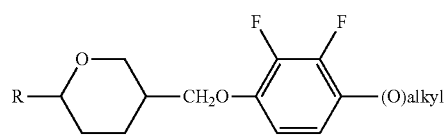

Z-8

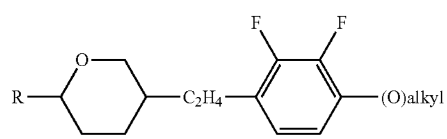

Z-9

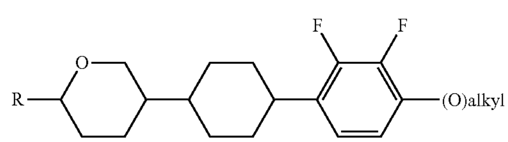

Z-10

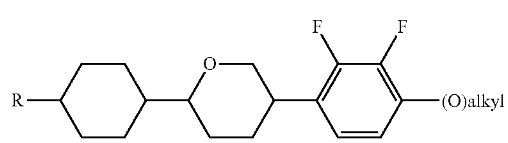

Z-11

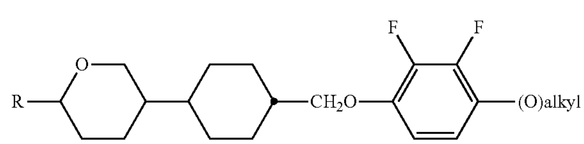

-continued

Z-12

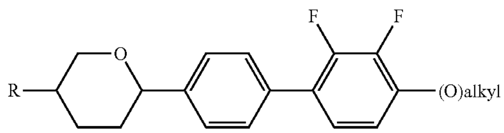

Z-13

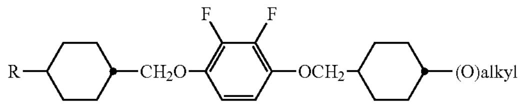

Z-14

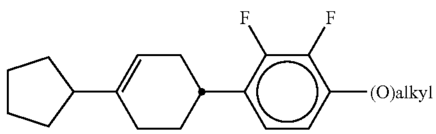

in which R, (O) and "alkyl" have the meanings indicated above for formula III.

b) Preferred LC media according to the invention comprise one or more substances which contain a tetrahydronaphthyl or naphthyl unit, such as, for example, the compounds of the formulae N-1 to N-5,

N-1

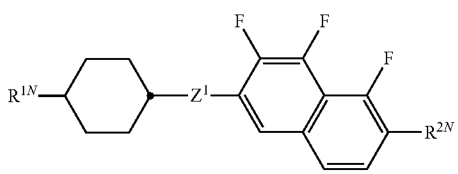

N-2

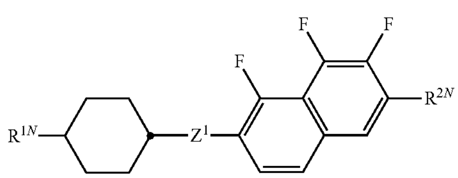

N-3

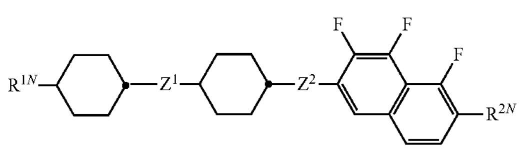

N-4

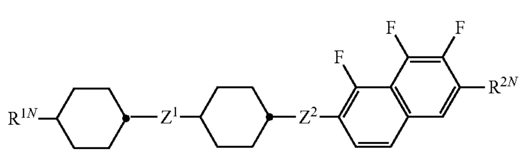

N-5

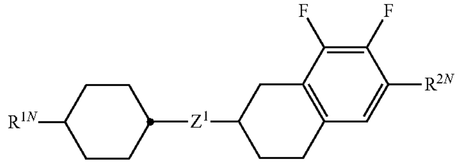

in which $R^{1N}$ and $R^{2N}$ each, independently of one another, have the meanings indicated for $R^{2A}$, preferably denote straight-chain alkyl, straight-chain alkoxy or straight-chain alkenyl, and $Z^1$ and $Z^2$ each, independently of one another, denote —$C_2H_4$—, —CH═CH—, —$(CH_2)_4$—, —$(CH_2)_3O$—, —$O(CH_2)_3$—, —CH═CHCH$_2$CH$_2$—, —CH$_2$CH$_2$CH═CH—, —CH$_2$O—, —OCH$_2$—, —COO—, —OCO—, —$C_2F_4$—, —CF═CF—, —CF═CH—, —CH═CF—, —CF$_2$O—, —OCF$_2$—, —CH$_2$— or a single bond.

c) Preferred LC media comprise one or more compounds selected from the group of the difluorodibenzochroman compounds of the formula BC, chromans of the formula CR, and fluorinated phenanthrenes of the formulae PH-1 and PH-2,

BC

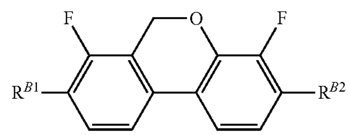

CR

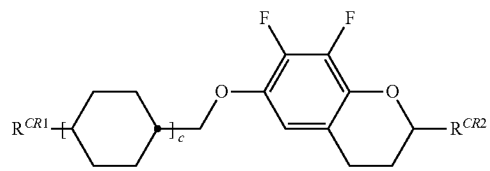

PH-1

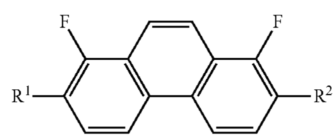

PH-2

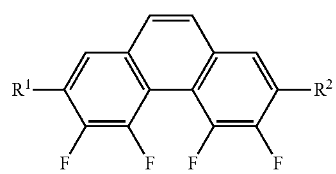

in which $R^{B1}$, $R^{B2}$, $R^{CR1}$, $R^{CR2}$, $R^1$, $R^2$ each, independently of one another, have the meaning of $R^{2A}$. c is 0, 1 or 2. $R^1$ and $R^2$ preferably, independently of one another, denote alkyl or alkoxy having 1 to 6 C atoms.

The LC media according to the invention preferably comprise the compounds of the formulae BC, CR, PH-1, PH-2 in amounts of 3 to 20% by weight, in particular in amounts of 3 to 15% by weight.

Particularly preferred compounds of the formulae BC and CR are the compounds BC-1 to BC-7 and CR-1 to CR-5,

BC-1

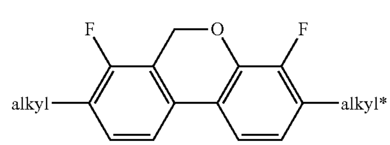

BC-2

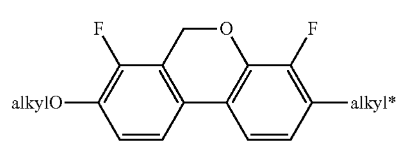

-continued

BC-3

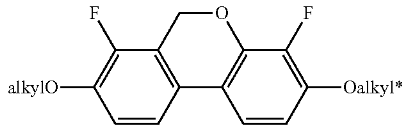

BC-4

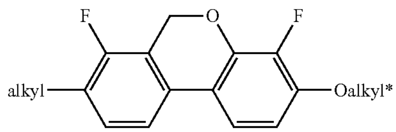

BC-5

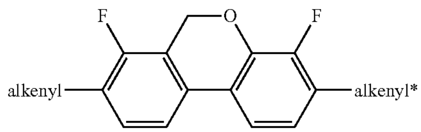

BC-6

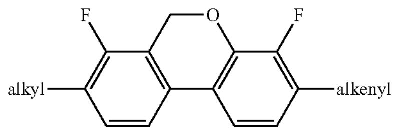

BC-7

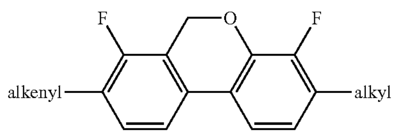

CR-1

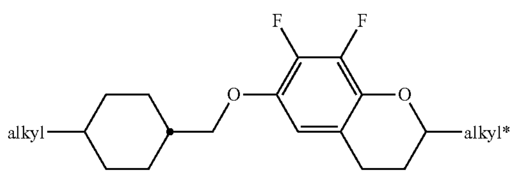

CR-2

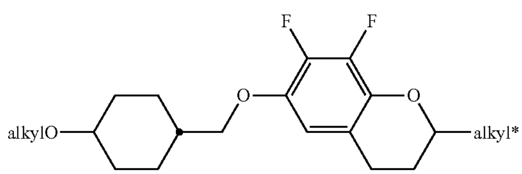

CR-3

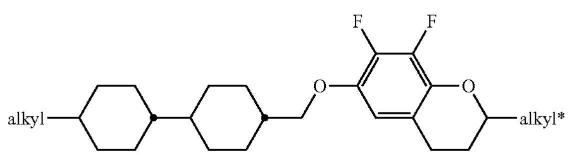

CR-4

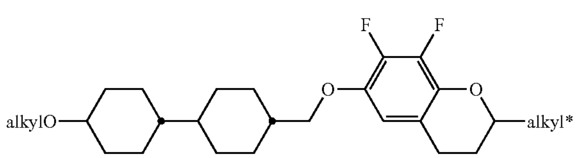

CR-5

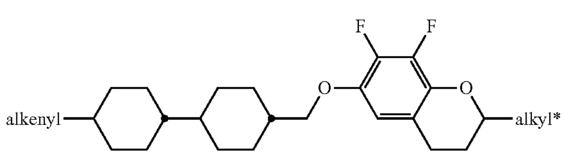

in which

"alkyl" and "alkyl*" each, independently of one another, denote a straight-chain alkyl radical having 1 to 6 C atoms, and "alkenyl" and "alkenyl*" each, independently of one another, denote a straight-chain alkenyl radical having 2 to 6 C atoms.

Very particular preference is given to LC media comprising one, two or three compounds of the formula BC-2, BF-1 and/or BF-2.

d) Preferred LC media comprise one or more indane compounds of the formula In,

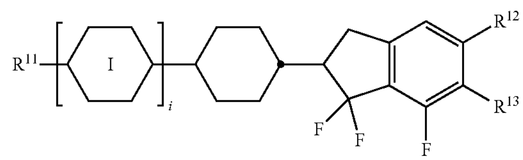

In in which $R^{11}$, $R^{12}$, $R^{13}$ each, independently of one another, denote a straight-chain alkyl, alkoxy, alkoxyalkyl or alkenyl radical having 1 to 6 C atoms, $R^{12}$ and $R^{13}$ additionally denote halogen, preferably F,

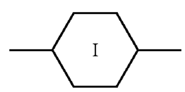

denotes

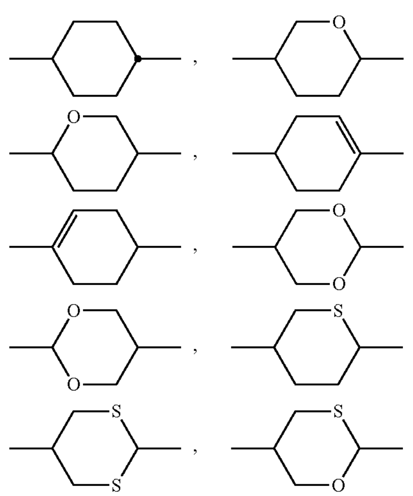

i denotes 0, 1 or 2.

Preferred compounds of the formula In are the compounds of the formulae In-1 to In-16 indicated below:

In-1

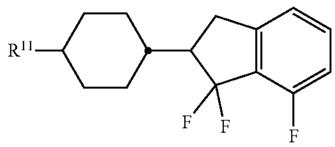

In-2

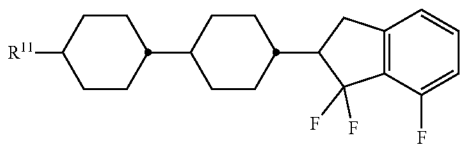

In-3

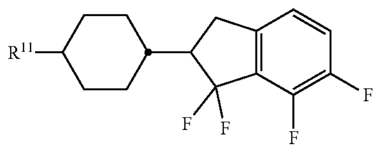

In-4

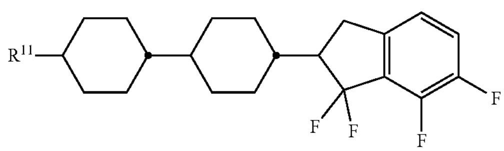

In-5

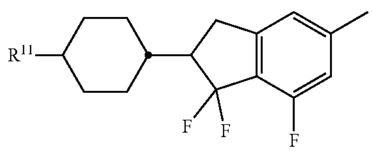

In-6

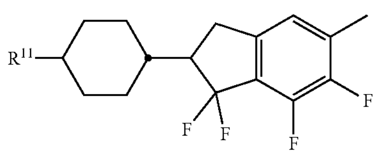

In-7

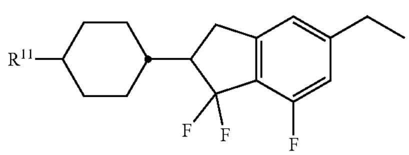

In-8

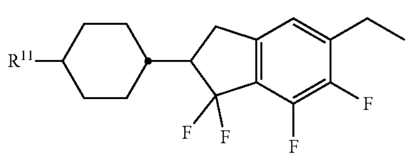

In-9

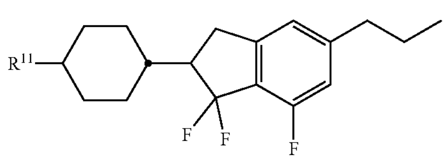

In-10

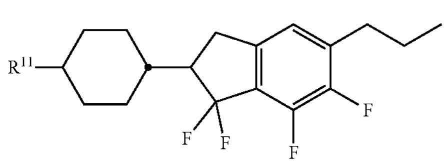

-continued

In-11

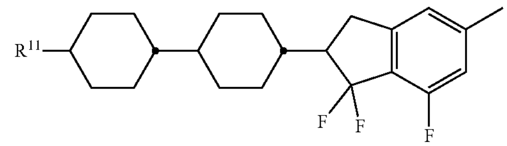

In-12

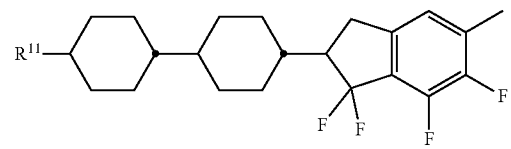

In-13

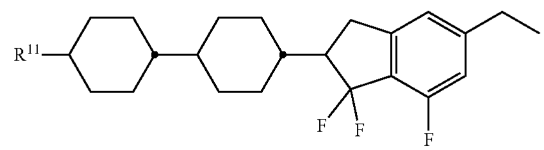

In-14

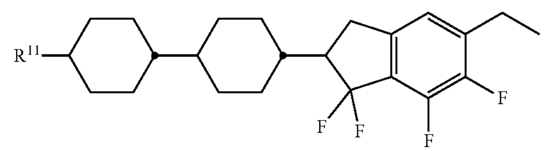

In-15

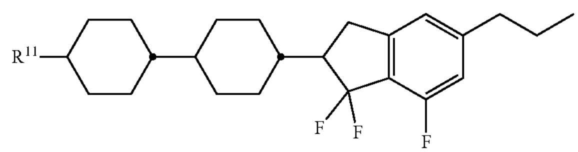

In-16

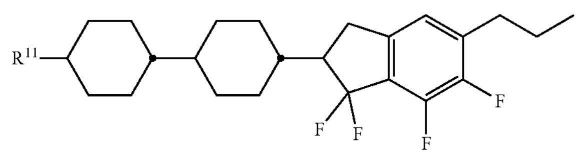

Particular preference is given to the compounds of the formulae In-1, In-2, In-3 and In-4.

The compounds of the formula In and the sub-formulae In-1 to In-16 are preferably employed in the LC media according to the invention in concentrations ≥5% by weight, in particular 5 to 30% by weight and very particularly preferably 5 to 25% by weight.

e) Preferred LC media additionally comprise one or more compounds of the formulae L-1 to L-5,

L-1

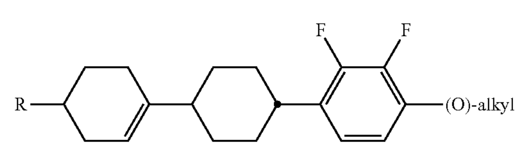

-continued

L-2

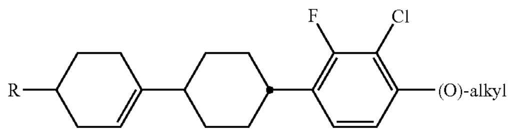

L-3

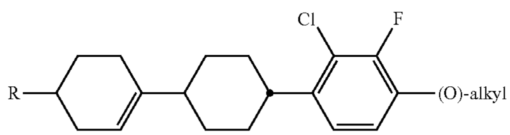

L-4

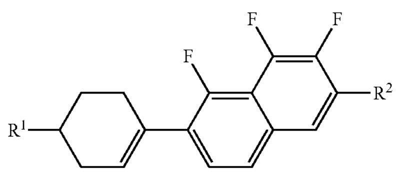

L-5

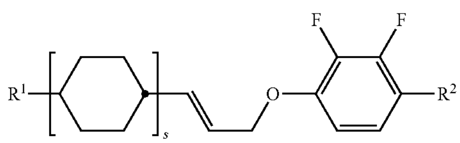

in which

R and $R^1$ each, independently of one another, have the meanings indicated for $R^{2A}$ in formula IIA above, and alkyl denotes an alkyl radical having 1 to 6 C atoms. The parameter s denotes 1 or 2.

The compounds of the formulae L-1 to L-5 are preferably employed in concentrations of 5 to 50% by weight, in particular 5 to 40% by weight and very particularly preferably 10 to 40% by weight.

f) Preferred LC media additionally comprise one or more compounds of formula IIA-Y

IIA - Y

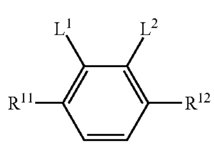

in which $R^{11}$ and $R^{12}$ have one of the meanings given for $R^{2A}$ in formula IIA above, and $L^1$ and $L^2$, identically or differently, denote F or Cl.

Preferred compounds of the formula IIA-Y are selected from the group consisting of the following subformulae

IIA-Y1

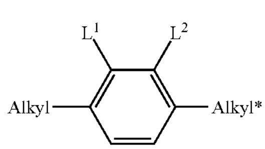

-continued

IIA-Y2

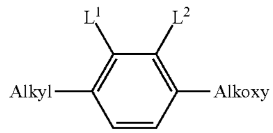

IIA-Y3

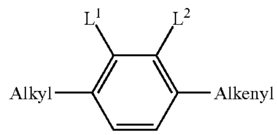

IIA-Y4

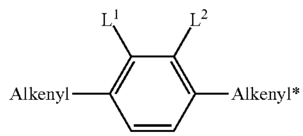

IIA-Y5

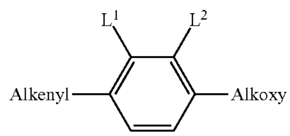

IIA-Y6

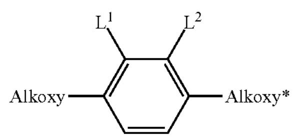

IIA-Y7

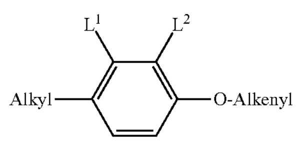

IIA-Y8

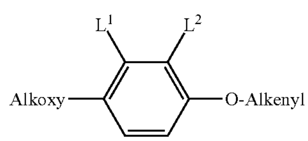

IIA-Y9

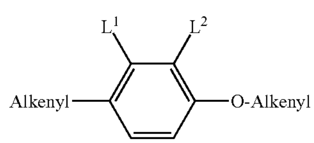

IIA-Y10

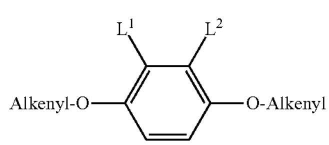

in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

Particularly preferred compounds of the formula IIA-Y are selected from the group consisting of following subformulae:

IIA - Y6a

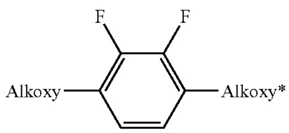

IIA - Y6b

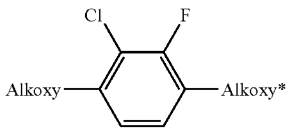

in which Alkoxy and Alkoxy* have the meanings defined above and preferably denote methoxy, ethoxy, n-propyloxy, n-butyloxy or n-pentyloxy.

g) LC medium which additionally comprises one or more quaterphenyl compounds selected from the following formula:

Q

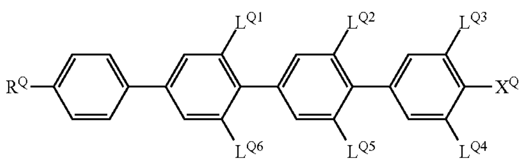

wherein $R^Q$ is alkyl, alkoxy, oxaalkyl or alkoxyalkyl having 1 to 9 C atoms or alkenyl or alkenyloxy having 2 to 9 C atoms, all of which are optionally fluorinated, $X^Q$ is F, Cl, halogenated alkyl or alkoxy having 1 to 6 C atoms or halogenated alkenyl or alkenyloxy having 2 to 6 C atoms, $L^{Q1}$ to $L^{Q6}$ independently of each other are H or F, with at least one of $L^{Q1}$ to $L^{Q6}$ being F.

Preferred compounds of formula Q are those wherein $R^Q$ denotes straight-chain alkyl with 2 to 6 C-atoms, very preferably ethyl, n-propyl or n-butyl.

Preferred compounds of formula Q are those wherein $L^{Q3}$ and $L^{Q4}$ are F. Further preferred compounds of formula Q are those wherein $L^{Q3}$, $L^{Q4}$ and one or two of $L^{Q1}$ and $L^{Q2}$ are F.

Preferred compounds of formula Q are those wherein $X^Q$ denotes F or $OCF_3$, very preferably F.

The compounds of formula Q are preferably selected from the following subformulae

Q1

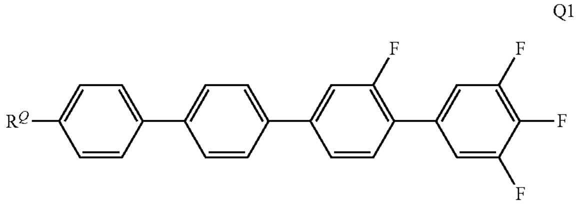

-continued

Q2

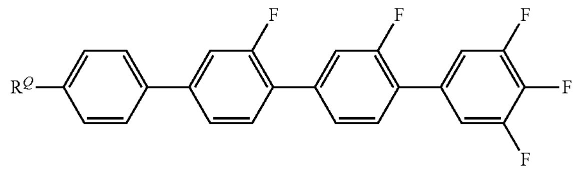

wherein $R^Q$ has one of the meanings of formula Q or one of its preferred meanings given above and below, and is preferably ethyl, n-propyl or n-butyl.

Especially preferred are compounds of formula Q1, in particular those wherein $R^Q$ is n-propyl.

Preferably the proportion of compounds of formula Q in the LC host mixture is from >0 to ≤5% by weight, very preferably from 0.05 to 2% by weight, more preferably from 0.1 to 1% by weight, most preferably from 0.1 to 0.8% by weight.

Preferably the LC medium contains 1 to 5, preferably 1 or 2 compounds of formula Q.

The addition of quaterphenyl compounds of formula Q to the LC host mixture enables to reduce ODF mura, whilst maintaining high UV absorption, enabling quick and complete polymerization, enabling strong and quick tilt angle generation, and increasing the UV stability of the LC medium.

Besides, the addition of compounds of formula Q, which have positive dielectric anisotropy, to the LC medium with negative dielectric anisotropy allows a better control of the values of the dielectric constants $\varepsilon_{\parallel}$ and $\varepsilon_{\perp}$, and in particular enables to achieve a high value of the dielectric constant $\varepsilon_{\parallel}$ while keeping the dielectric anisotropy $\Delta\varepsilon$ constant, thereby reducing the kick-back voltage and reducing image sticking.

The LC media according to the invention preferably comprise one or more polymerizable compounds of formula I or its subformulae, preferably in a total concentration in the range of from 0.01% to 2.0%, more preferably from 0.05% to 1.0%, most preferably from 0.2% to 0.8%, and/or one or more compounds of formula IIA, preferably in a total concentration in the range of from 5% to 30%, more preferably from 7% to 25%, particularly preferably from 10% to 20%;

and/or one or more compounds of formulae IIA and IIB, preferably in a total concentration in the range of from 30% to 45%;

and/or one or more compounds of formula IV, preferably in a total concentration in the range of from 35% to 70%, more preferably from 40% to 65%, particularly preferably from 45% to 60%;

and/or one or more compounds of formula IV-3, preferably in a total concentration in the range of from 35% to 60%, more preferably from 40% to 55%, particularly preferably from 45% to 50%;

and/or one or more compounds of formula III-2, preferably of formula III-2-6, preferably in a total concentration in the range of from 2% to 25%, more preferably from 5% to 15%, particularly preferably from 5 to 12%.

In particular, the medium comprises one or more compounds CY-n-Om, in particular CY-3-O4, CY-5-O4 and/or CY-3-O2, preferably in a total concentration in the range of from 5% to 30%, preferably 10% to 20%;

and/or one or more compounds PY-n-Om, in particular PY-3-O2 and/or PY-1-O2, preferably in a total concentration in the range of from 5% to 30%, preferably 5% to 20%;

and/or

CPY-n-Om, in particular CPY-2-O2, CPY-3-O2 and/or CPY-5-O2, preferably in concentrations >5%, in particular 7% to 20%, based on the mixture as a whole, and/or one or more compounds CCY-n-Om, preferably CCY-4-O2, CCY-3-O2, CCY-3-O3, CCY-3-O1 and/or CCY-5-O2, preferably in concentrations >3%, in particular 5 to 15%, based on the mixture as a whole;

and/or one or more compounds CPY-n-Om, preferably CPY-2-O2 and/or CPY-3-O2, preferably in concentrations >3%, in particular 5 to 15%, based on the mixture as a whole;

and/or

CLY-n-Om, preferably CLY-2-O4, CLY-3-O2 and/or CLY-3-O3, preferably in concentrations >5%, in particular 10 to 30%, very preferably 15 to 20%, based on the mixture as a whole;

and/or

CPY-n-Om and CY-n-Om, preferably in concentrations of 10 to 80%, based on the mixture as a whole, and/or CPY-n-Om and PY-n-Om, preferably CPY-2-O2 and/or CPY-3-O2 and PY-3-O2 or PY-1-O2, preferably in concentrations of 5 to 20%, more preferably 10 to 15% to based on the mixture as a whole, and/or CC-3-V, preferably in concentrations of 5 to 50%, based on the mixture as a whole.

and/or

CC-3-V1, preferably in a total concentration in the range of from 5 to 40%, more preferably from 15% to 35%, particularly preferably from 20% to 30%, and/or one or more compounds of formula B-nO—Om and/or B(S)-nO—Om, in particular the compound B(S)-2O—O4 and/or B(S)-2O—O5, preferably in a concentration in the range of from 2 to 12%.

and/or 0.1% to 3% of the compound PPGU-3-F, and/or the compound B(S)-(c5)$_1$O—O2:

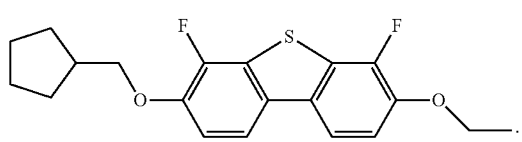 [SMILES: CCOc1ccc2c(sc3c(F)c(OCC4CCCC4)ccc32)c1F]

The LC medium according to the present invention has negative dielectric anisotropy.

More preferably the LC medium according to the present invention does not contain a compound having positive dielectric anisotropy, except for the the compounds of formula Q as described below. Most preferably the LC medium does not contain a compound having positive dielectric anisotropy.

In another preferred embodiment the LC medium according to the present invention does not contain a compound of formula G

G

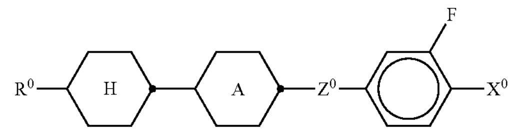

in which the individual radicals, on each occurrence identically or differently, and each, independently of one another, have the following meaning:

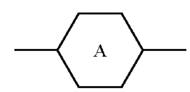

denotes

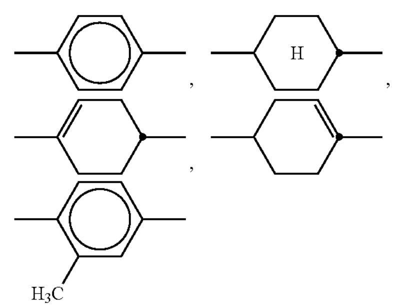

$R^0$ denotes a straight chain or branched alkyl or alkoxy radical having 1 to 15 C atoms, where one or more $CH_2$ groups in these radicals may each be replaced, independently of one another, by

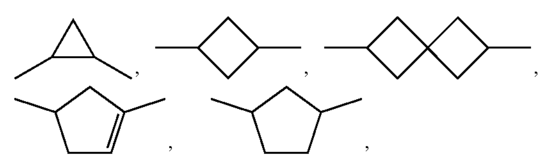

—C≡C—, —$CF_2$O—, —O$CF_2$—, —CH═CH—, —O—, —CO—O— or —O—CO— in such a way that O atoms are not linked directly to one another, and in which, in addition, one or more H atoms may be replaced by halogen, preferably by F, $X^0$ denotes F, Cl, CN, $SF_5$, SCN, NCS, a halogenated alkyl radical, a halogenated alkenyl radical, a halogenated alkoxy radical or a halogenated alkenyloxy radical having up to 6 C atoms, $Z^0$ denotes —$C_2H_4$—, —$CH_2$O—, $CF_2$O, —CH═CH— or a single bond.

The invention furthermore relates to an electro-optical display having active-matrix addressing, characterised in that it contains, as dielectric, an LC medium according to the present invention, and wherein the display is a VA, SA-VA, IPS, U-IPS, FFS, UB-FFS, SA-FFS, PS-VA, PS-OCB, PS- IPS, PS-FFS, PS-UB-FFS, PS-posi-VA, PS-TN, polymer stabilised SA-VA or polymer stabilised SA-FFS display.

It is advantageous for the liquid-crystalline medium according to the invention to preferably have a nematic phase from ≤−20° C. to ≥70° C., particularly preferably from ≤−30° C. to ≥80° C., very particularly preferably from ≤−40° C. to ≥90° C.

The medium according to the invention preferably has a clearing temperature of 70° C. or more, very preferably of 74° C. or more.

The LC medium has preferably a nematic LC phase.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The LC medium preferably has a nematic phase range of at least 60 K and a flow viscosity $\nu_{20}$ of at most 30 $mm^2 \cdot s^{-1}$ at 20° C.

The LC medium is preferably nematic at a temperature of −20° C. or less, preferably at −30° C. or less, very preferably at −40° C. or less.

The values of the birefringence Δn of the LC medium according to the present invention are generally between 0.07 and 0.16, preferably between 0.08 and 0.15, very preferably between 0.09 and 0.14.

In a preferred embodiment, the LC medium according to the present invention has a birefringence in the range of from 0.090 to 0.110, preferably from 0.095 to 0.105, in particular from 0.100 to 0.105.

In another preferred embodiment, the LC medium according to the present invention has a birefringence of 0.120 or more, preferably in the range of from 0.125 to 0.145, more preferably from 0.130 to 0.140.

The LC medium according to the present invention preferably has a dielectric anisotropy Δε of −1.5 to −8.0, preferably of −2.0 to −4.0, in particular −2.5 to −3.5, The LC medium according to the present invention preferably has a rotational viscosity $\gamma_1$ at ≤20° C. of 120 mPa·s, in particular ≤100 mPa·s.

In a preferred embodiment, the rotational viscosity $\gamma_1$ at 20° C. is ≤100 mPa·s, in particular ≤95 mPa·s.

The LC medium according to the present invention preferably has relatively low values for the threshold voltage ($V_0$). They are preferably in the range from 1.7 V to 3.0 V, particularly preferably ≤2.7 V and very particularly preferably ≤2.5 V.

For the present invention, the term "threshold voltage" relates to the capacitive threshold ($V_0$), also called the Freedericks threshold, unless explicitly indicated otherwise.

The LC medium according to the present invention preferably has high values for the voltage holding ratio in liquid-crystal cells.

In general, LC media having a low addressing voltage or threshold voltage exhibit a lower voltage holding ratio than those having a higher addressing voltage or threshold voltage and vice versa.

For the present invention, the term "dielectrically positive compounds" denotes compounds having a Δε>1.5, the term "dielectrically neutral compounds" denotes those having −1.5≤Δε≤1.5 and the term "dielectrically negative compounds" denotes those having Δε<−1.5. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The LC media according to the invention are suitable for all VA-TFT (vertical alignment-thin film transistor) applications, such as, for example, VAN (vertically aligned nematic), MVA (multidomain VA), (S)-PVA (super patterned VA), ASV (advanced super view, or axially symmetric VA), PSA (polymer sustained VA) and PS-VA (polymer stabilized VA). They are furthermore suitable for IPS (in-plane switching) and FFS (fringe field switching) applications having negative Δε.

It goes without saying for the person skilled in the art that the VA, IPS or FFS mixture according to the invention may also comprise compounds in which, for example, H, N, O, Cl and F have been replaced by the corresponding isotopes.

The combination of compounds of the preferred embodiments mentioned above with the polymerized compounds described above causes low threshold voltages, low rotational viscosities and very good low-temperature stabilities in the LC media according to the invention at the same time as constantly high clearing points and high HR values, and allows the rapid establishment of a particularly low tilt angle (i.e. a large tilt) in PSA displays. In particular, the LC media exhibit significantly shortened response times, in particular also the grey-shade response times, in PSA displays compared with the LC media from the prior art.

The LC media according to the invention may also comprise further additives which are known to the person skilled in the art and are described in the literature, such as, for example, polymerization initiators, inhibitors, stabilizers, surface-active substances or chiral dopants. These may be polymerizable or non-polymerizable.

The invention furthermore relates to an LC display as described above, wherein the polymerizable compounds of formula I or its subformulae and the other polymerizable compounds contained in the LC medium are present in polymerized form.

The LC display is preferably a PSA or SA display, very preferably a PS-VA, PS-IPS, PS-FFS, PS-UB-FFS or SA-VA display.

For the production of PSA or polymer stabilised SA displays, the polymerizable compounds contained in the LC medium are polymerized by in-situ polymerization in the LC medium between the substrates of the LC display, preferably while a voltage is applied to the electrodes.

The structure of the displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

A preferred LC display of the present invention comprises:

a first substrate including a pixel electrode defining pixel areas, the pixel electrode being connected to a switching element disposed in each pixel area and optionally including a micro-slit pattern, and optionally a first alignment layer disposed on the pixel electrode, a second substrate including a common electrode layer, which may be disposed on the entire portion of the second substrate facing the first substrate, and optionally a second alignment layer, an LC layer disposed between the first and second substrates and including an LC medium as described above and below, wherein the polymerizable compounds may also be present in polymerized form, a quantum dot colour filter (QDCF) containing red, green and blue quantum dots (QDs) provided between the LC layer and the first or second substrate preferably between the LC layer and the substrate facing the viewer, optionally a backlight, preferably a blue backlight.

The first and/or second alignment layer controls the alignment direction of the LC molecules of the LC layer. For example, in PS-VA displays the alignment layer is selected such that it imparts to the LC molecules homeotropic (or vertical) alignment (i.e. perpendicular to the surface) or tilted alignment. Such an alignment layer may for example comprise a polyimide, which may also be rubbed, or may be prepared by a photoalignment method.

The LC layer with the LC medium can be deposited between the substrates of the display by methods that are conventionally used by display manufacturers, for example the so-called one-drop-filling (ODF) method. The polymerizable component of the LC medium is then polymerized for example by UV photopolymerization. The polymerization can be carried out in one step or in two or more steps.

The LC display further contains a colour filter, a quantum dot colour filter (QDCF) containing red, green and blue QDs. The QDCF is preferably located between the LC layer and the substrate facing the viewer of the display. The QDs preferably contain a semiconducting material which is excited by blue light emitted from the backlight and converts this to light of the desired colour.

The LC display may comprise further elements, like a black matrix, a passivation layer, optical retardation layers, transistor elements for addressing the individual pixels, etc., all of which are well known to the person skilled in the art and can be employed without inventive skill.

The electrode structure can be designed by the skilled person depending on the individual display type. For example for PS-VA displays a multi-domain orientation of the LC molecules can be induced by providing electrodes having slits and/or bumps or protrusions in order to create two, four or more different tilt alignment directions.

Upon polymerization the polymerizable compounds form a copolymer, which causes a certain tilt angle of the LC molecules in the LC medium. Without wishing to be bound to a specific theory, it is believed that at least a part of the crosslinked polymer, which is formed by the polymerizable compounds, will phase-separate or precipitate from the LC medium and form a polymer layer on the substrates or electrodes, or the alignment layer provided thereon. Microscopic measurement data (like SEM and AFM) have confirmed that at least a part of the formed polymer accumulates at the LC/substrate interface.

The polymerization can be carried out in one step. It is also possible firstly to carry out the polymerization, optionally while applying a voltage, in a first step in order to pro-duce a tilt angle, and subsequently, in a second polymerization step without an applied voltage, to polymerize or crosslink the compounds which have not reacted in the first step ("end curing").

Suitable and preferred polymerization methods are, for example, thermal or photopolymerization, preferably photopolymerization, in particular UV induced photopolymerization, which can be achieved by exposure of the polymerizable compounds to UV radiation.

Optionally one or more polymerization initiators are added to the LC medium. Suitable conditions for the polymerization and suitable types and amounts of initiators are known to the person skilled in the art and are described in the literature. Suitable for free-radical polymerization are, for example, the commercially available photoinitiators Irgacure651®, Irgacure184®, Irgacure907®, Irgacure369® or Darocure1173® (Ciba AG). If a polymerization initiator is employed, its proportion is preferably 0.001 to 5% by weight, particularly preferably 0.001 to 1% by weight.

The polymerizable compounds according to the invention are also suitable for polymerization without an initiator, which is accompanied by considerable advantages, such, for example, lower material costs and in particular less contamination of the LC medium by possible residual amounts of the initiator or degradation products thereof. The polymerization can thus also be carried out without the addition of an initiator. In a preferred embodiment, the LC medium thus does not contain a polymerization initiator.

The the LC medium may also comprise one or more stabilizers in order to prevent undesired spontaneous polymerization of the RMs, for example during storage or transport. Suitable types and amounts of stabilizers are known to the person skilled in the art and are described in the literature. Particularly suitable are, for example, the commercially available stabilizers from the Irganox® series (Ciba AG), such as, for example, Irganox® 1076. If stabilizers are employed, their proportion, based on the total amount of polymerizable compounds, is preferably 10-50,000 ppm, particularly preferably 50-5,000 ppm.

In a preferred embodiment the LC media contain one or more chiral dopants, preferably in a concentration from 0.01 to 1% by weight, very preferably from 0.05 to 1.0% by weight. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

In another preferred embodiment of the present invention the LC media contain one or more further stabilizers, preferably selected from the the group consisting of the following formulae

S1

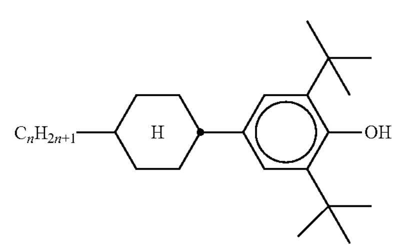

-continued

S2

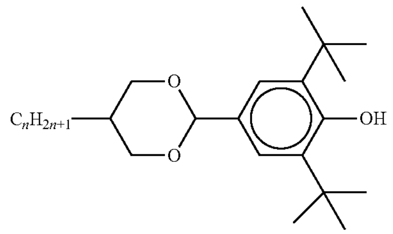

S3

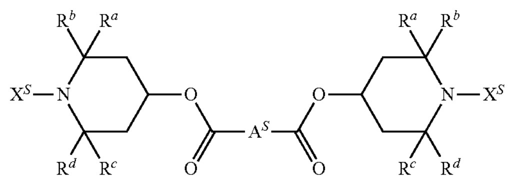

wherein the individual radicals, independently of each other and on each occurrence identically or differently, have the following meanings $R^{a-d}$ straight-chain or branched alkyl with 1 to 10, preferably 1 to 6, very preferably 1 to 4 C atoms, most preferably methyl, $X^S$ H, $CH_3$, OH or $O^{\bullet}$, $A^S$ straight-chain, branched or cyclic alkylene with 1 to 20 C atoms which is optionally substituted, n an integer from 1 to 6, preferably 3.

Preferred stabilizers of formula S3 are selected from formula S3A

S3A

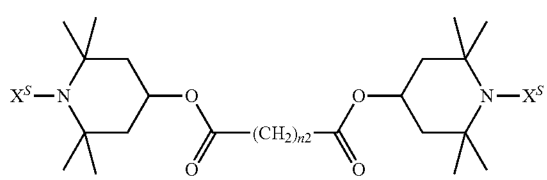

wherein n2 is an integer from 1 to 12, and wherein one or more H atoms in the group $(CH_2)_{n2}$ are optionally replaced by methyl, ethyl, propyl, butyl, pentyl or hexyl.

Very preferred stabilizers are selected from the group consisting of the following formulae

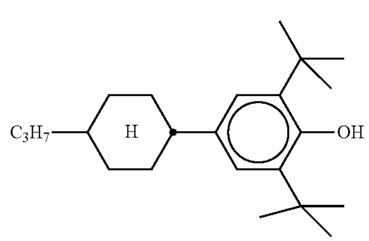

-continued

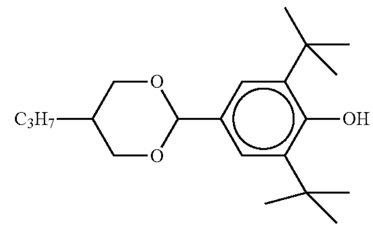

S3-1

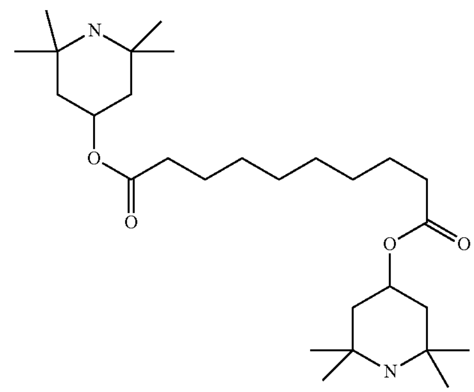

S3-2

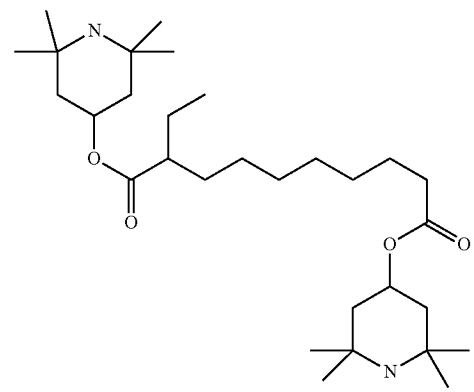

S3-3

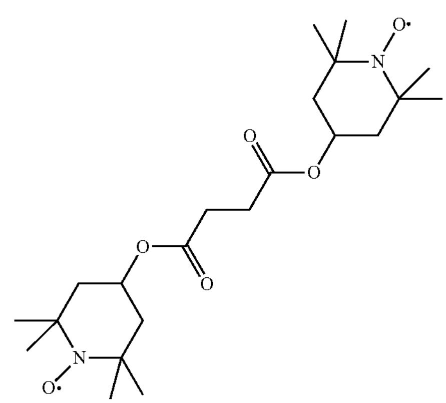

-continued

S3-4

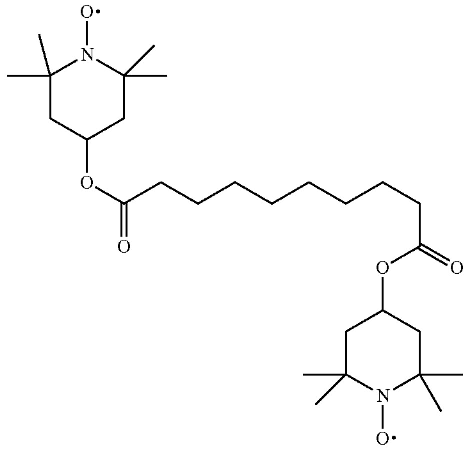

S3-5

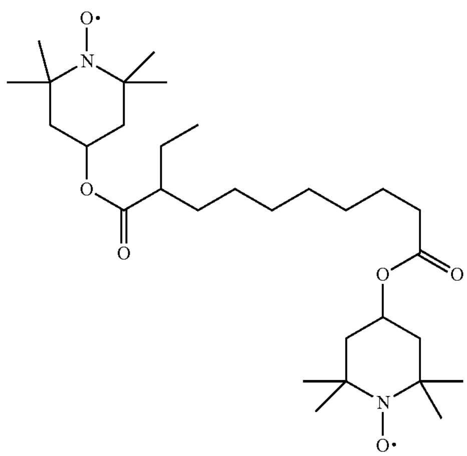

S3-6

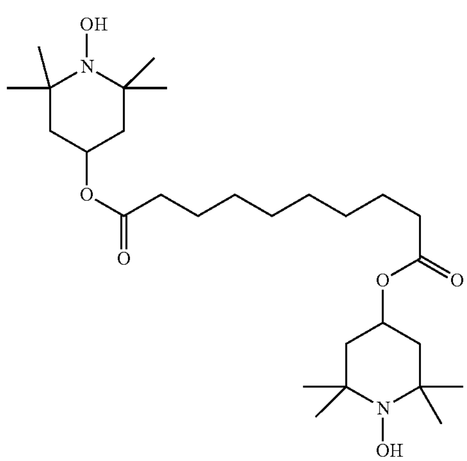

-continued

S3-7

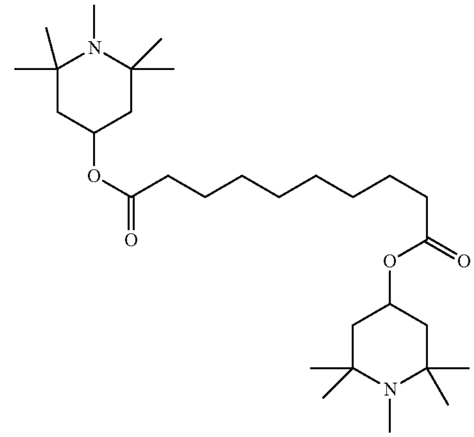

In a preferred embodiment the liquid-crystalline medium comprises one or more stabilizers selected from the group consisting of formulae S1-1, S2-1, S3-1, S3-1 and S3-3.

In a preferred embodiment the liquid-crystalline medium comprises one or more stabilizers selected from Table C below.

Preferably the proportion of stabilizers, like those of formula S1 to S3 and their subformulae, in the liquid-crystalline medium is from 10 to 500 ppm, very preferably from 20 to 100 ppm.

In another preferred embodiment the LC medium according to the present invention contains a self alignment (SA) additive, preferably in a concentration of 0.1 to 2.5%.

In another preferred embodiment the LC medium according to the present invention contains a self alignment (SA) additive, preferably in a concentration of 0.1 to 2.5%.

In a preferred embodiment the SA-VA display according to the present invention does not contain a polyimide alignment layer. In another preferred embodiment the SA-VA display according to preferred embodiment contains a polyimide alignment layer.

Preferred SA additives for use in this preferred embodiment are selected from compounds comprising a mesogenic group and a straight-chain or branched alkyl side chain that is terminated with one or more polar anchor groups selected from hydroxy, carboxy, amino or thiol groups.

Further preferred SA additives contain one or more polymerizable groups which are attached, optionally via spacer groups, to the mesogenic group. These polymerizable SA additives can be polymerized in the LC medium under similar conditions as applied for the RMs in the PSA process.

Suitable SA additives to induce homeotropic alignment, especially for use in SA-VA mode displays, are disclosed for example in US 2013/0182202 A1, US 2014/0838581 A1, US 2015/0166890 A1 and US 2015/0252265 A1.

In another preferred embodiment an LC medium or a polymer stabilised SA-VA display according to the present invention contains one or more self alignment additives selected from Table E below.

In another preferred embodiment the LC medium according to the present invention contains one or more SA additives, preferably selected from Table E, in a concentration from 0.1 to 5%, very preferably from 0.2 to 3%, most preferably from 0.2 to 1.5%.

The polymerizable compounds of formula I and its subformulae do in particular show good UV absorption in, and are therefore especially suitable for, a process of preparing a PSA display including one or more of the following features:

- the polymerizable medium is exposed to UV light in the display in a 2-step process, including a first UV exposure step ("UV1 step"), with application of a voltage, to generate the tilt angle, and a second UV exposure step ("UV2 step"), without application of a voltage, to complete polymerization,
- the polymerizable medium is exposed to UV light in the display generated by an UV-LED lamp, preferably at least in the UV2 step, more preferably both in the UV1 and UV2 step.
- the polymerizable medium is exposed to UV light in the display generated by a UV lamp with a radiation spectrum that is shifted to longer wavelengths, preferably ≥340 nm, more preferably from 350 to <370 nm, very preferably from 355 to 368 nm, to avoid short UV light exposure in the PS-VA process.

Both using lower intensity and a UV shift to longer wavelengths protect the organic layer against damage that may be caused by the UV light.

A preferred embodiment of the present invention relates to a process for preparing a PSA display as described above and below, comprising one or more of the following features:

- the polymerizable LC medium is irradiated by UV light in a 2-step process, including a first UV exposure step ("UV1 step"), with application of a voltage, to generate the tilt angle, and a second UV exposure step ("UV2 step"), without application of a voltage, to complete polymerization,
- the polymerizable LC medium is irradiated by UV light generated by a UV lamp having an intensity of from 0.5 $mW/cm^2$ to 10 $mW/cm^2$ in the wavelength range from 300-380 nm, preferably in the UV2 step, and optionally also in the UV1 step,
- the polymerizable LC medium is irradiated by UV light having a wavelength of ≥340 nm, and preferably ≤420 nm, very preferably in the range from 340 to 380 nm, more preferably in the range from 350 to <370 nm, most preferably in the range from 355 to 368 nm,
- the polymerizable LC medium is irradiated by UV light while a voltage is applied to the electrodes of the display,
- irradiation by UV light is carried out using a UV-LED lamp.

This preferred process can be carried out for example by using the desired UV lamps or by using a band pass filter and/or a cut-off filter, which are substantially transmissive for UV light with the respective desired wavelength(s) and are substantially blocking light with the respective undesired wavelengths. For example, when irradiation with UV light of wavelengths λ of 300-400 nm is desired, UV exposure can be carried out using a wide band pass filter being substantially transmissive for wavelengths 300 nm<λ<400 nm. When irradiation with UV light of wavelength X of more than 340 nm is desired, UV irradiation can be carried out using a cut-off filter being substantially transmissive for wavelengths λ>340 nm.

Preferably UV irradiation is carried out using a UV-LED lamp.

The use of UV-LED lamps, which have with only one narrow emission peak, in the PSA process provides several advantages, like for example a more effective optical energy transfer to the polymerizable compounds in the LC medium, depending on the choice of the suitable polymerizable compounds that shows absorption at the emission wavelength of the LED lamp. This allows to reduce the UV intensity and/or the UV irradiation time, thus enabling a reduced tact time and savings in energy and production costs. Another advantage is that the narrow emission spectrum of the lamp allows an easier selection of the appropriate wavelength for photopolymerization.

Very preferably the UV light source is an UV-LED lamp emitting a wavelength in the range from 340 to 400 nm, more preferably in the range from 340 to 380 nm, more preferably in the range from 350 to <370 nm, most preferably in the range from 355 to 368 nm. UV-LED lamps emitting UV light with a wavelength of 365 nm are especially preferred.

Preferably the UV-LED lamp emits light having an emission peak with a full width half maximum (FWHM) of 30 nm or less.

UV-LED lamps are commercially available, for example from Dr. Hoenle AG, Germany or Primelite GmbH, Germany, or IST Metz GmbH, Germany, with emission wavelengths e.g. of 365, 385, 395 and 405 nm.

This preferred process enables the manufacture of displays by using longer UV wavelengths, thereby reducing or even avoiding the hazardous and damaging effects of short UV light components.

UV radiation energy is in general from 6 to 100 J, depending on the production process conditions.

The LC medium according to the present invention may additionally comprise one or more further components or additives, preferably selected from the list including but not limited to co-monomers, chiral dopants, polymerization initiators, inhibitors, stabilizers, surfactants, wetting agents, lubricating agents, dispersing agents, hydrophobing agents, adhesive agents, flow improvers, defoaming agents, deaerators, diluents, reactive diluents, auxiliaries, colourants, dyes, pigments and nanoparticles.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the above-listed preferred embodiments of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerizable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

Preferred mixture components are shown in Table A below.

TABLE A

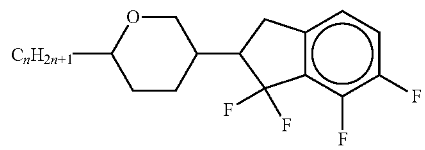

AIK-n-F

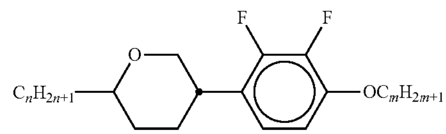

AIY-n-Om

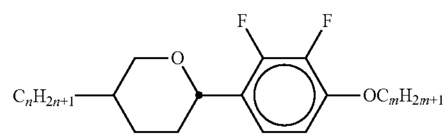

AY-n-Om

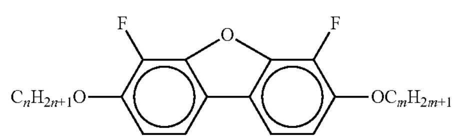

B-nO-Om

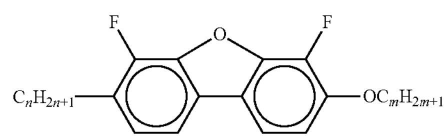

B-n-Om

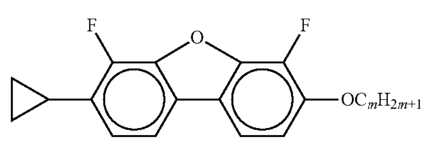

B-(c3)-Om

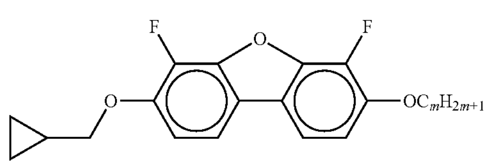

B-(3c)1O-Om

TABLE A-continued
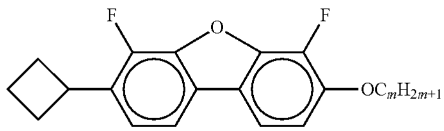
B-(c4)-Om
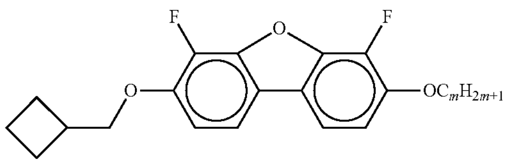
B-(c4)1O-Om
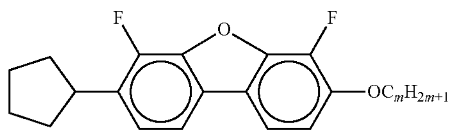
B-(c5)-Om
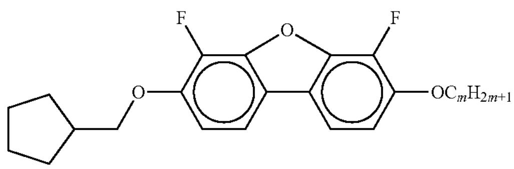
B-(c5)1O-Om
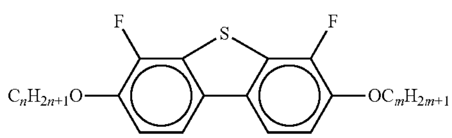
B(S)-nO-Om
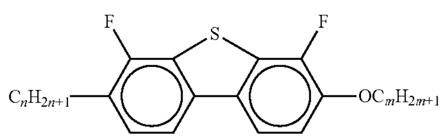
B(S)-n-Om
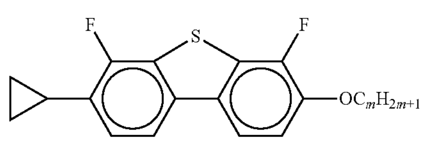
B(S)-(c3)-Om
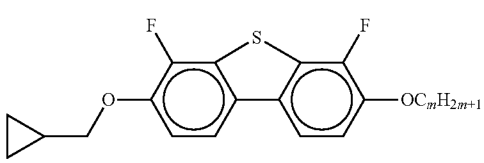
B(S)-(c3)1O-Om TABLE A-continued
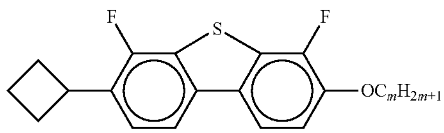
B(S)-(c4)-Om
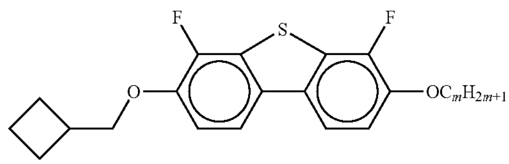
B(S)-(C4)1O-Om
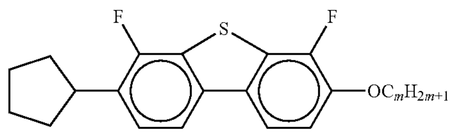
B(S)-(c5)-Om
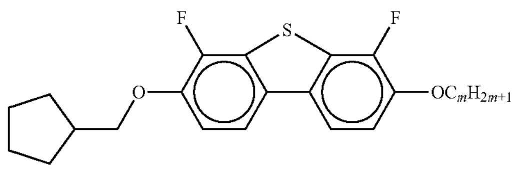
B(S)-(c5)1O-Om
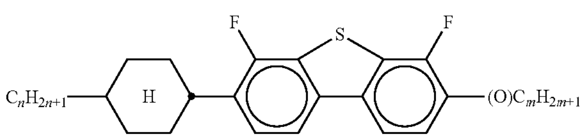
CB(S)-n-(O)m
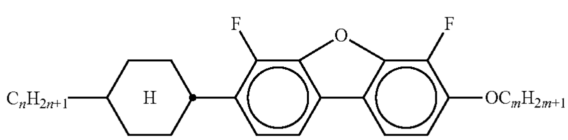
CB-n-m
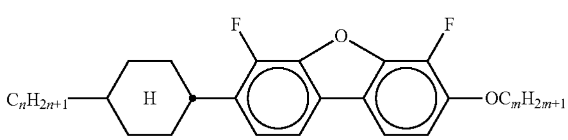
CB-n-Om
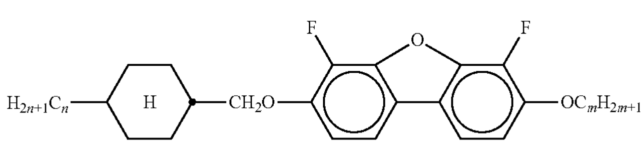
COB-n-Om TABLE A-continued
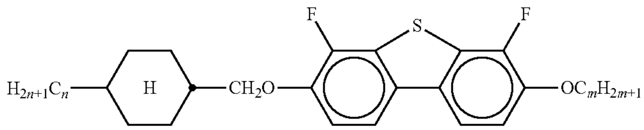
COB(S)-n-Om
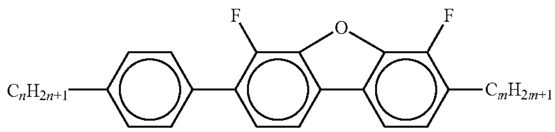
PB-n-m
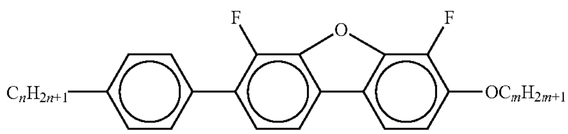
PB-n-Om
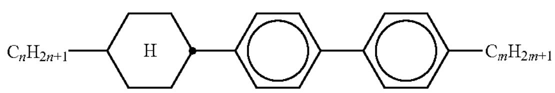
BCH-nm
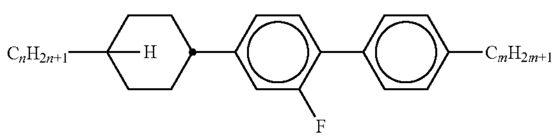
BCH-nmF
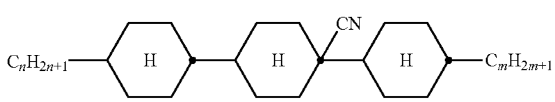
BCN-nm
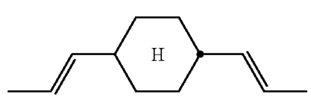
C-1V-V1
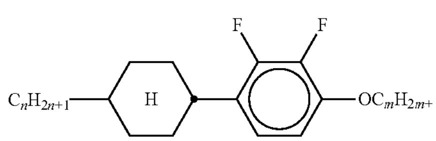
CY-n-Om
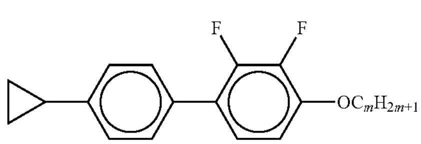
CY-(c3)-Om TABLE A-continued
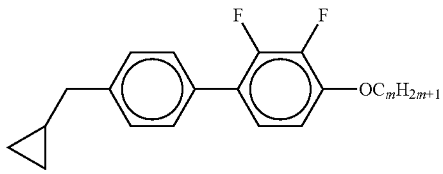
CY-(c3)1-Om
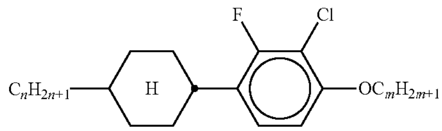
CY(F,Cl)-n-Om
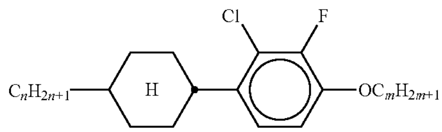
CY(Cl,F)-n-Om
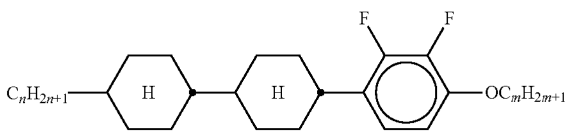
CCY-n-Om
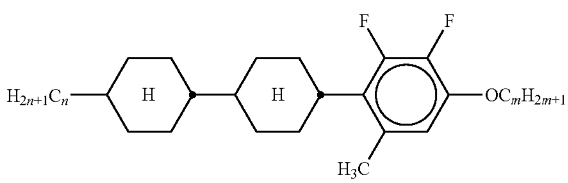
CC1Y-n-Om
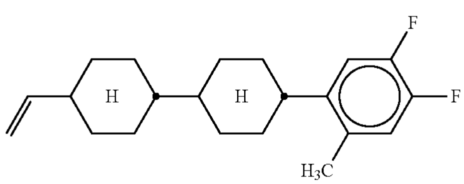
CC1G-V-F
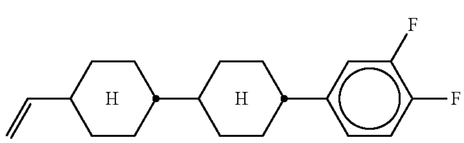
CCG-V-F
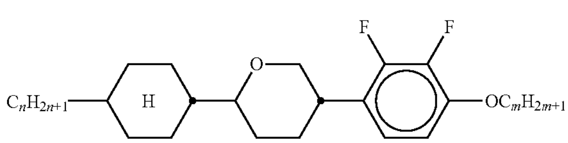
CAIY-n-Om TABLE A-continued
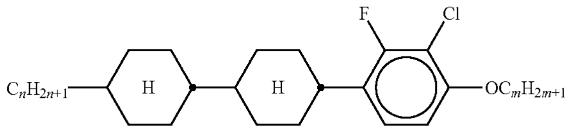
CCY(F,Cl)-n-Om
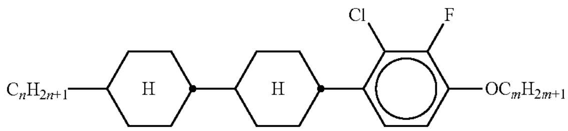
CCY(Cl,F)-n-Om
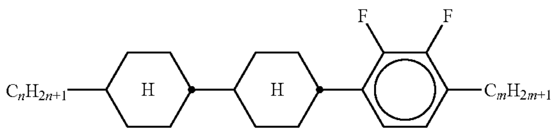
CCY-n-m
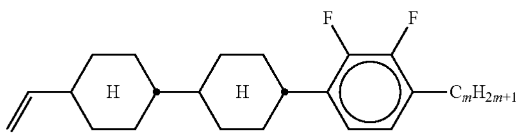
CCY-V-m
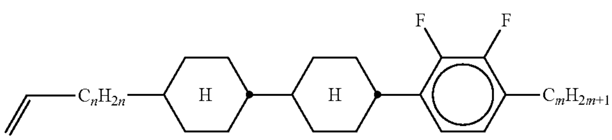
CCY-Vn-m
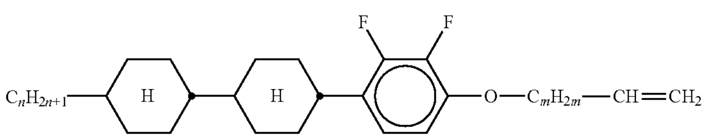
CCY-n-OmV
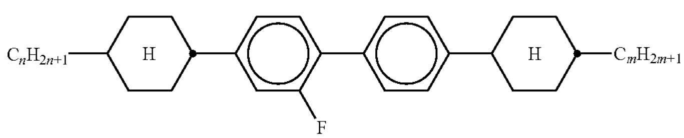
CBC-nmF
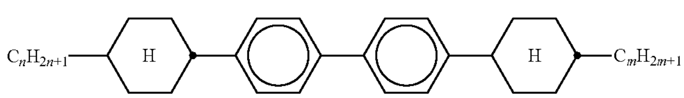
CBC-nm
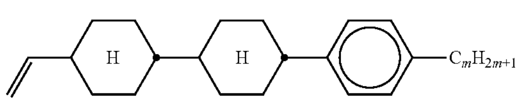
CCP-V-m TABLE A-continued
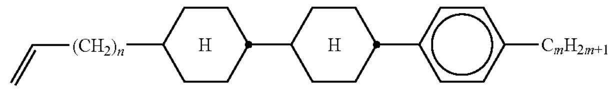
CCP-Vn-m
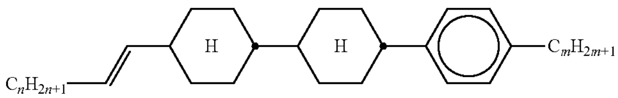
CCP-nV-m
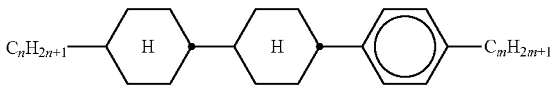
CCP-n-m
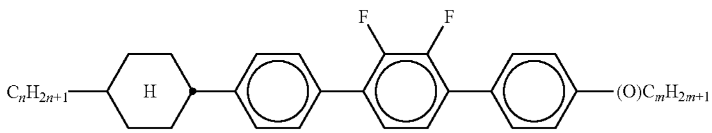
CPYP-n-(O)m
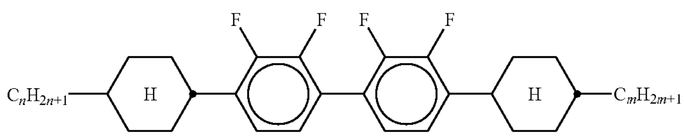
CYYC-n-m
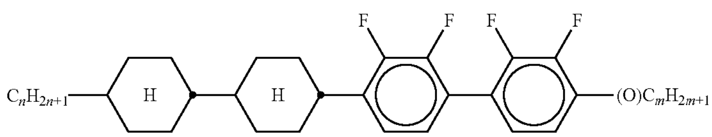
CCYY-n-(O)m
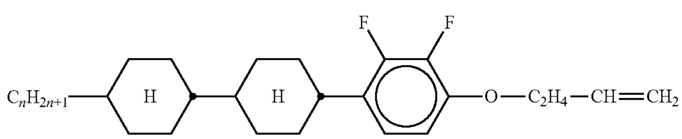
CCY-n-O2V
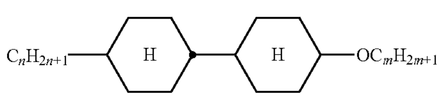
CCH-nOm, CC-n-Om
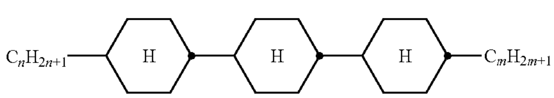
CCC-n-m
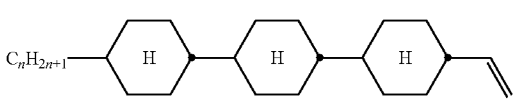
CCC-n-V TABLE A-continued
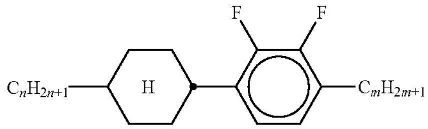
CY-n-m
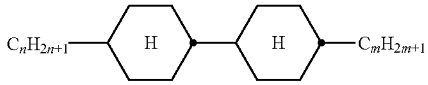
CCH-nm, CC-n-m
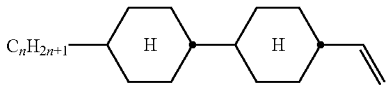
CC-n-V
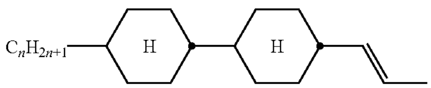
CC-n-V1
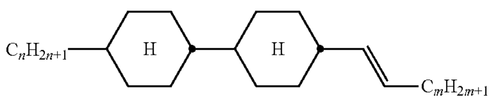
CC-n-Vm
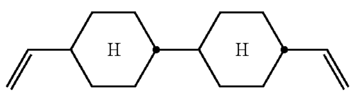
CC-V-V
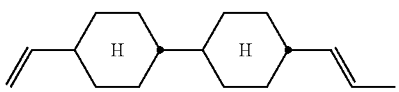
CC-V-V1
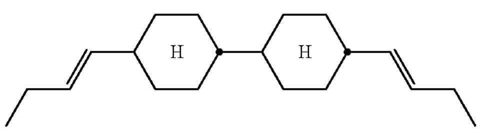
CC-2V-V2
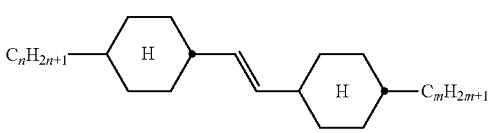
CVC-n-m
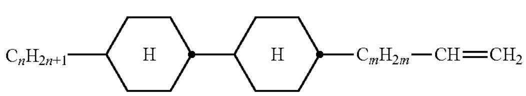
CC-n-mV
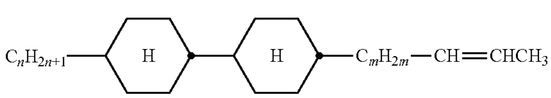
CC-n-mV1

TABLE A-continued
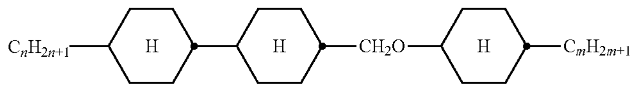
CCOC-n-m
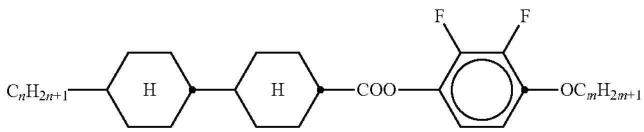
CP-nOmFF
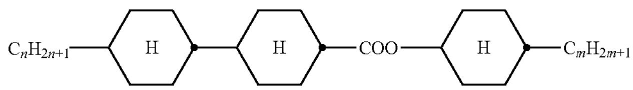
CH-nm
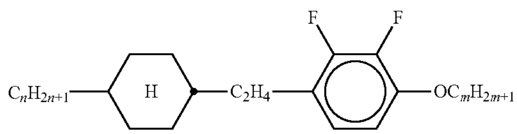
CEY-n-Om
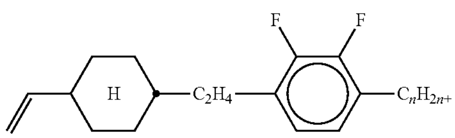
CEY-V-n
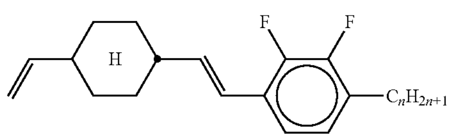
CVY-V-n
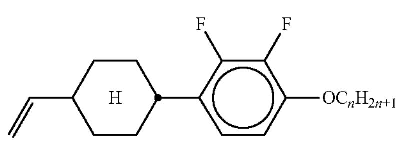
CY-V-On
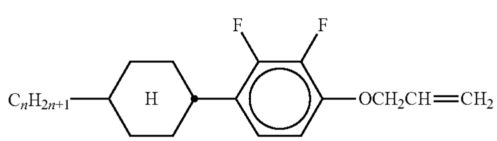
CY-n-O1V
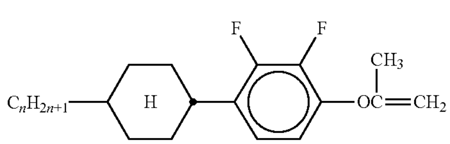
CY-n-OC($CH_3$)$=$$CH_2$ TABLE A-continued
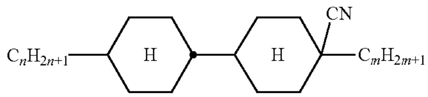
CCN-nm
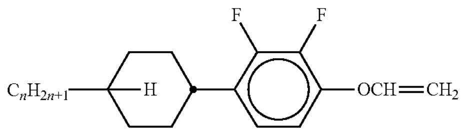
CY-n-OV
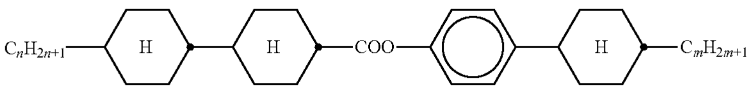
CCPC-nm
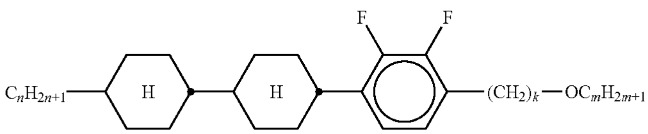
CCY-n-kOm
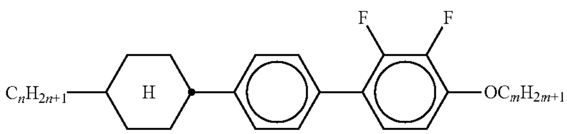
CPY-n-Om
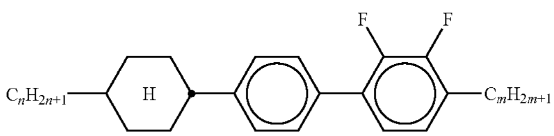
CPY-n-m
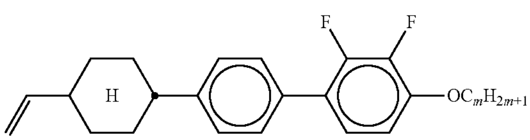
CPY-V-Om
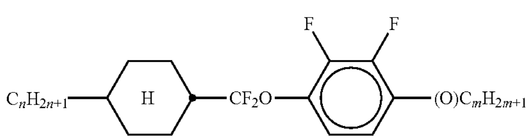
CQY-n-(O)m
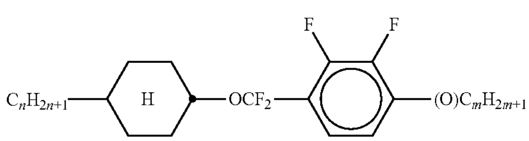
CQIY-n-(O)m TABLE A-continued
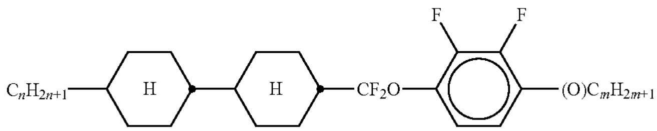
CCQY-n-(O)m
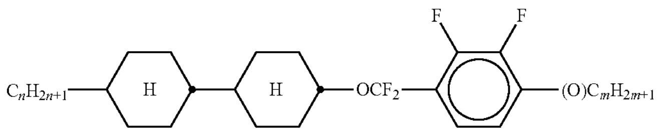
CCQIY-n-(O)m
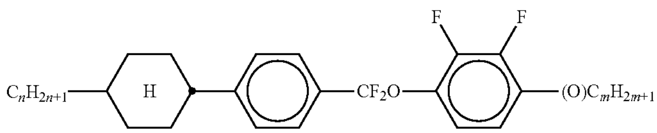
CPQY-n-(O)m
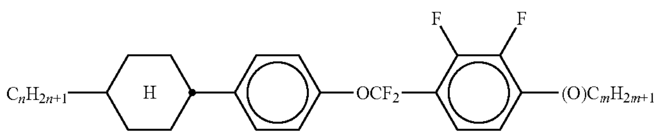
CPQIY-n-(O)m
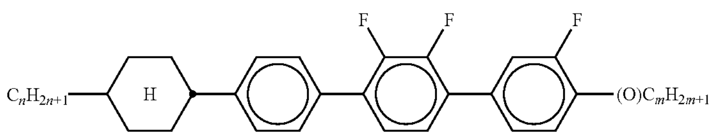
CPYG-n-(O)m
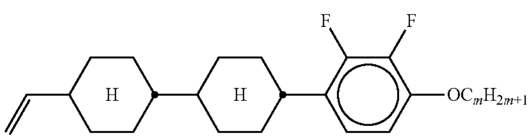
CCY-V-Om
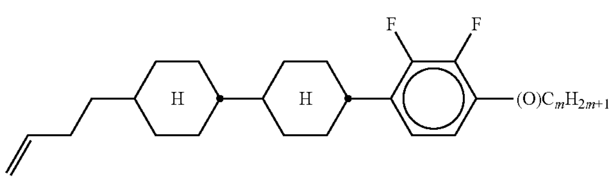
CCY-V2-(O)m
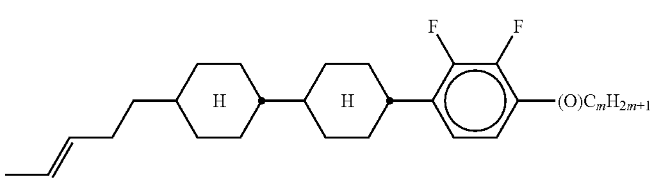
CCY-1V2-(O)m TABLE A-continued
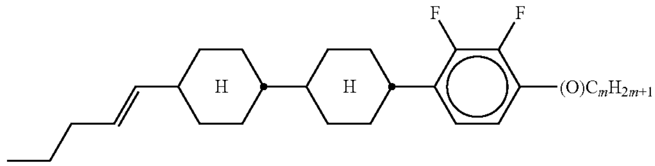
CCY-3V-(O)m
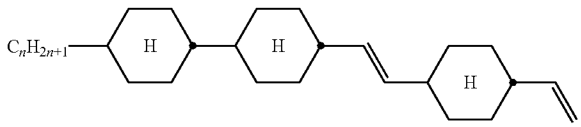
CCVC-n-V
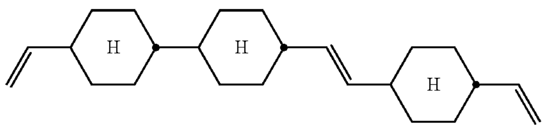
CCVC-V-V
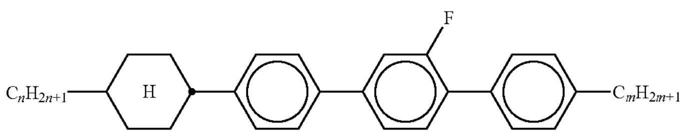
CPGP-n-m
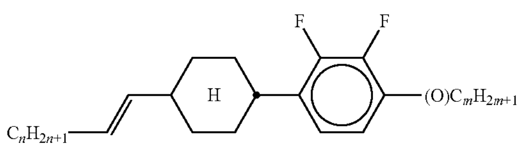
CY-nV-(O)m
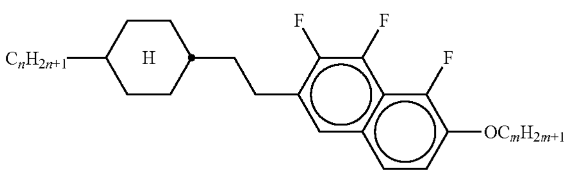
CENaph-n-Om
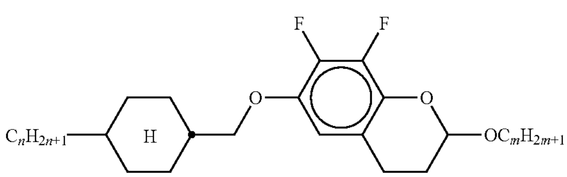
COChrom-n-Om
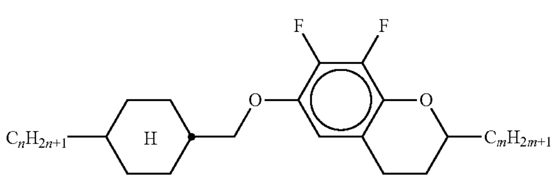
COChrom-n-m TABLE A-continued
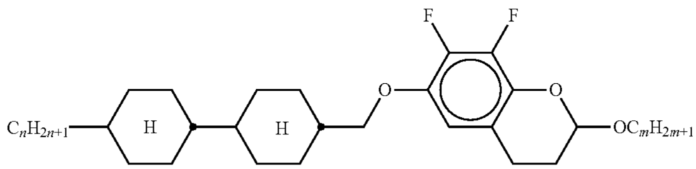
CCOChrom-n-Om
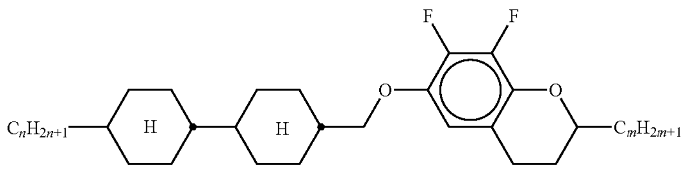
CCOChrom-n-m
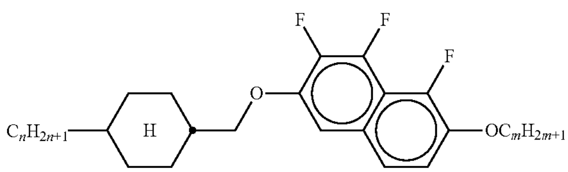
CONaph-n-Om
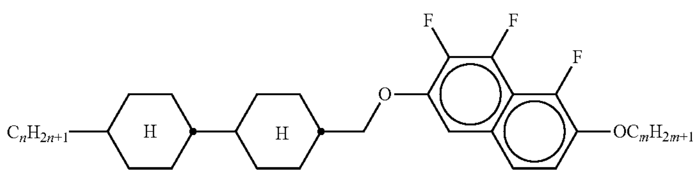
CCONaph-n-Om
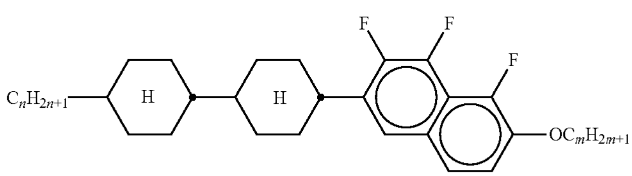
CCNaph-n-Om
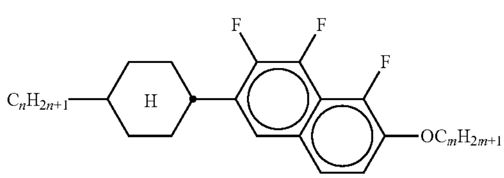
CCONaph-n-Om
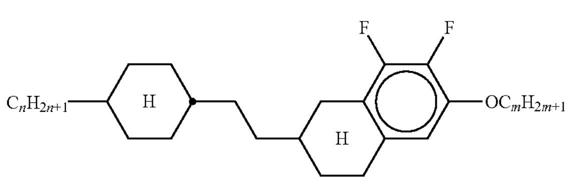
CETNaph-n-Om TABLE A-continued
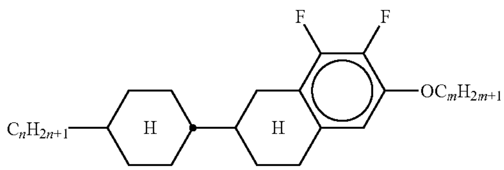
CTNaph-n-Om
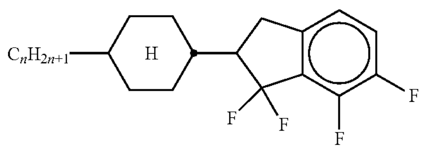
CK-n-F
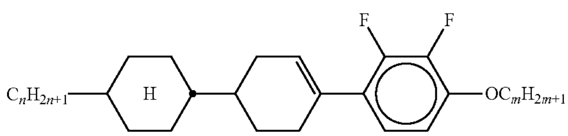
CLY-n-Om
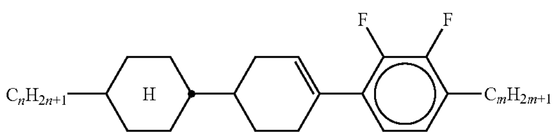
CLY-n-m
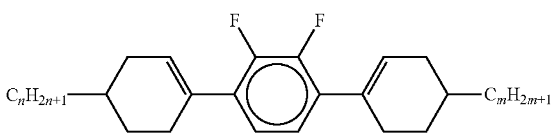
LYLI-n-m
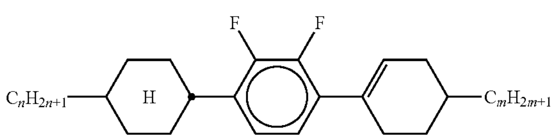
CYLI-n-m
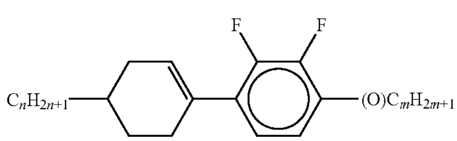
LY-n-(O)m
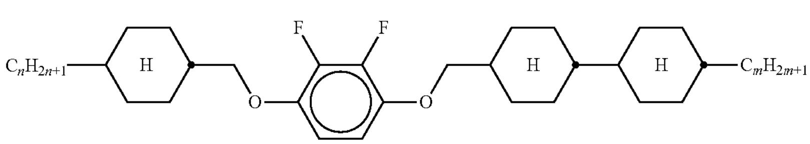
COYOICC-n-m TABLE A-continued
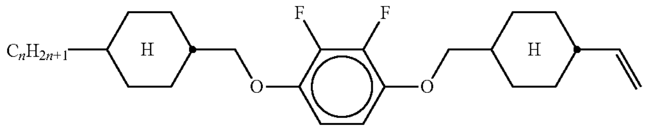
COYOICC-n-V
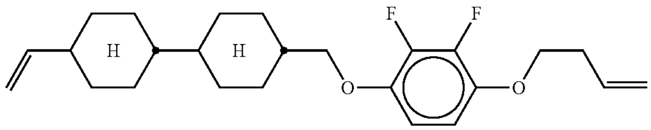
CCOY-V-O2V
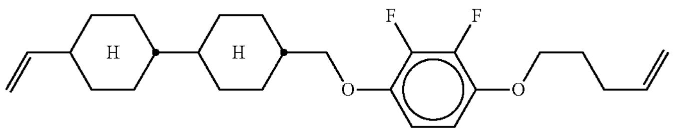
CCOY-V-O3V
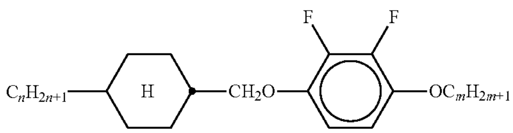
COY-n-Om
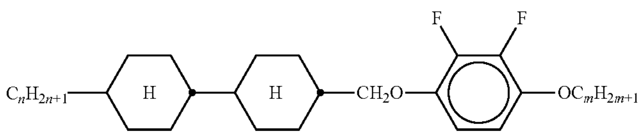
CCOY-n-Om
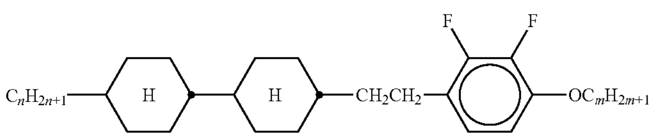
CCEY-n-Om
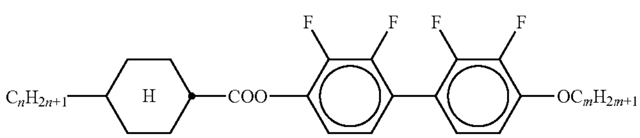
CZYY-n-Om
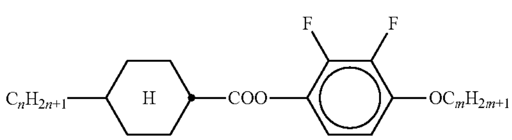
D-nOmFF
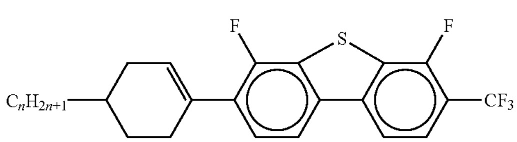
LB(S)-n-T TABLE A-continued
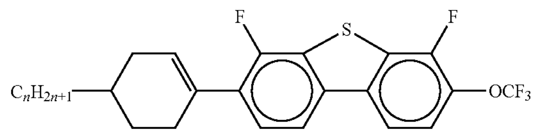
LB(S)-n-OT
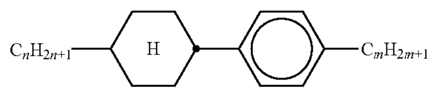
PCH-nm, CP-n-m
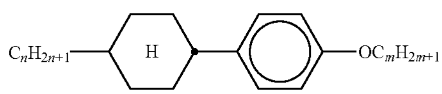
PCH-nOm, CP-n-Om
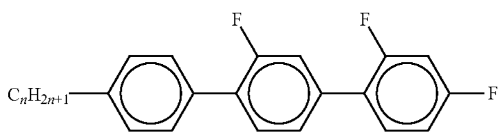
PGIGI-n-F
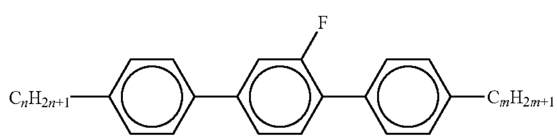
PGP-n-m
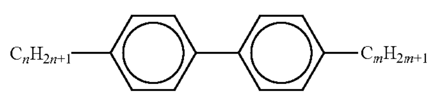
PP-n-m
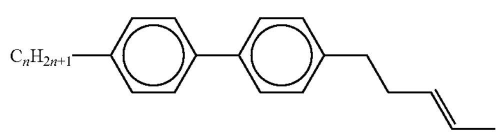
PP-n-2V1
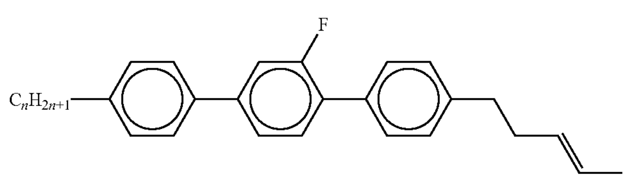
PGP-n-2V1
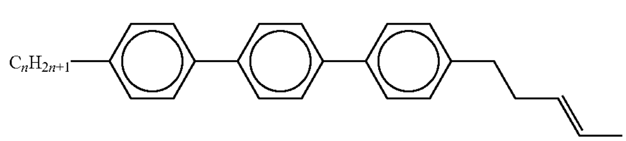
PPP-n-2V1

TABLE A-continued
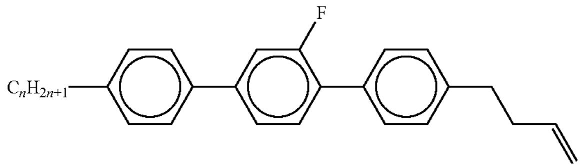
PGP-n-2V
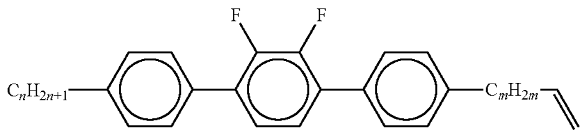
PYP-n-mV
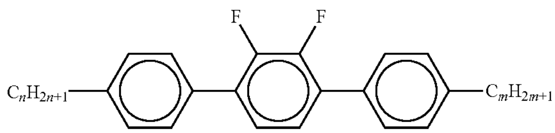
PYP-n-m
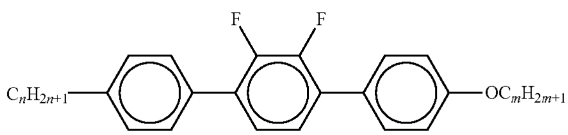
PYP-n-Om
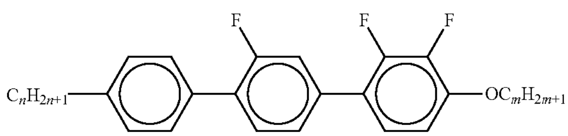
PGIY-n-Om
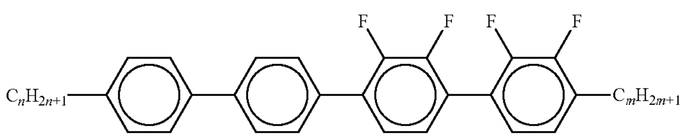
PPYY-n-m
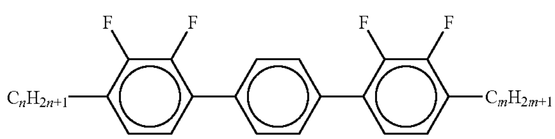
YPY-n-m
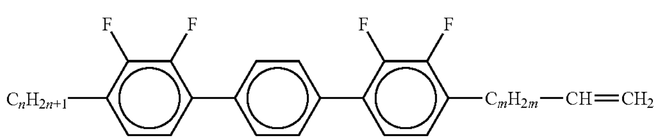
YPY-n-mV
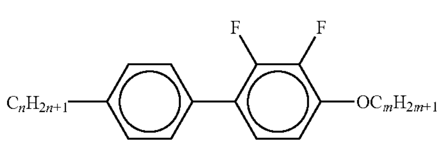
PY-n-Om TABLE A-continued
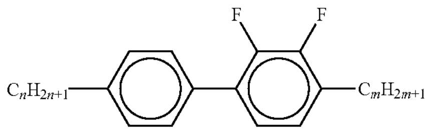
PY-n-m
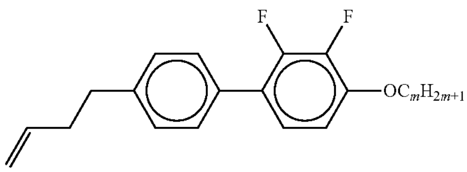
PY-V2-Om
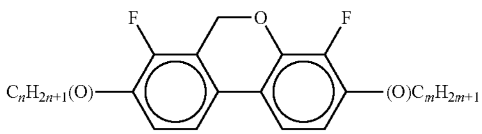
DFDBC-n(O)-(O)m
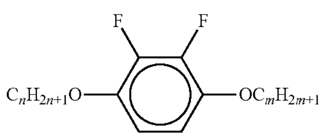
Y-nO-Om
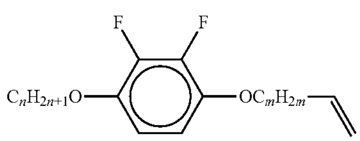
Y-nO-Om
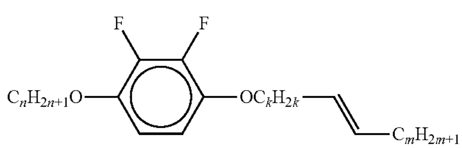
Y-nO-OkVm
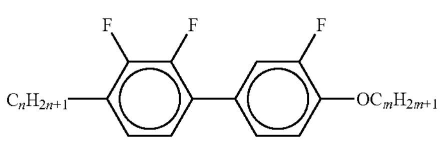
YG-n-Om
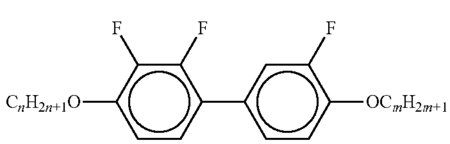
YG-nO-Om TABLE A-continued

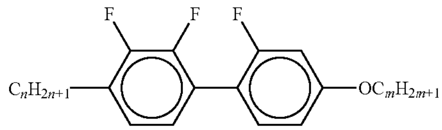
YGI-n-Om

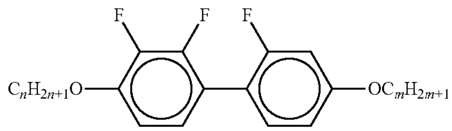
YGI-nO-Om

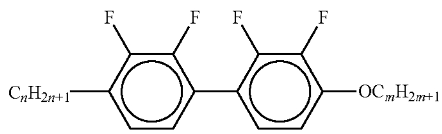
YY-n-Om

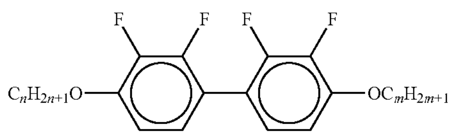
YY-nO-Om

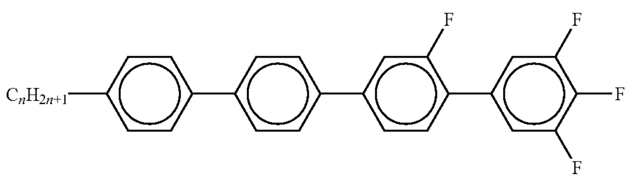
PPGU-n-F

In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.

In a preferred embodiment of the present invention, the LC media according to the invention comprise one or more compounds selected from the group consisting of compounds from Table A.

TABLE B

C 15

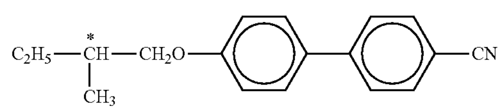

CB 15

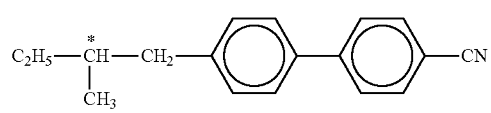

CM 21

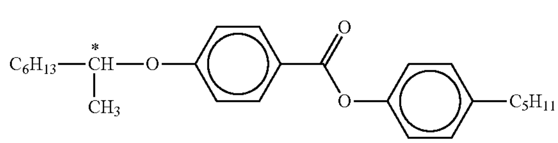

TABLE B-continued
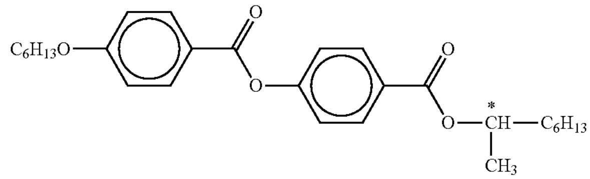
R/S-811
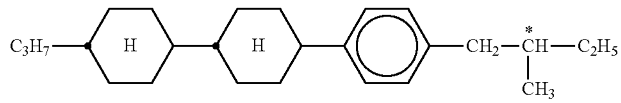
CM 44
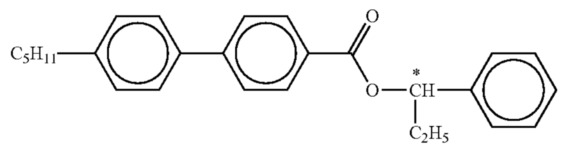
CM 45
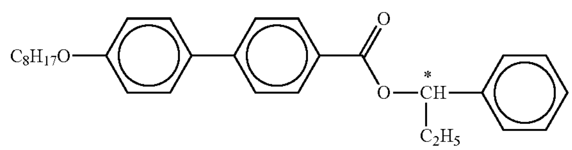
CM 47
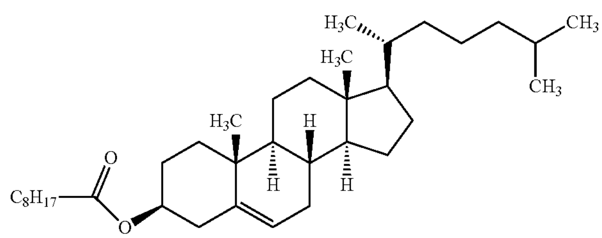
CN
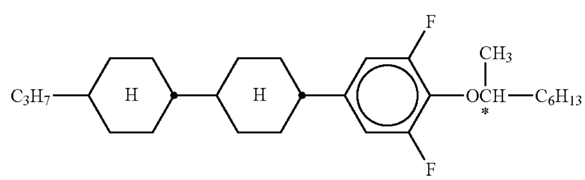
R/S-2011
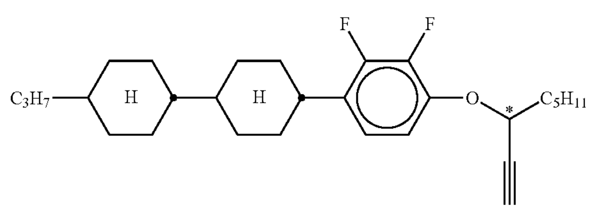
R/S-3011
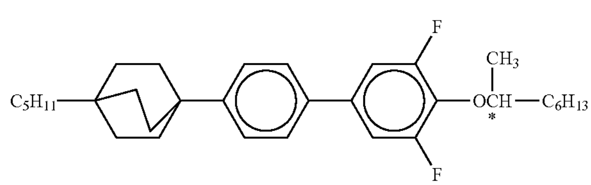
R/S-4011
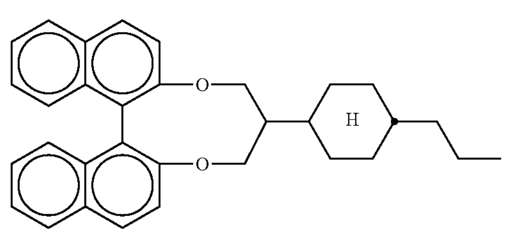
R/S-5011

TABLE B-continued

R/S-1011

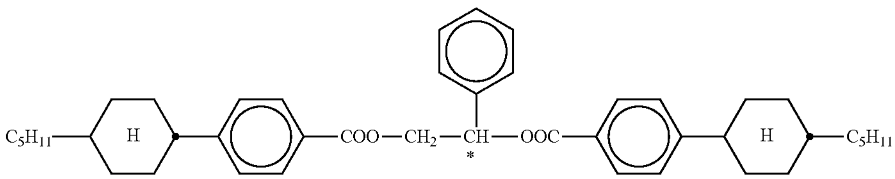

Table B shows possible chiral dopants which can be added to the LC media according to the invention.

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C

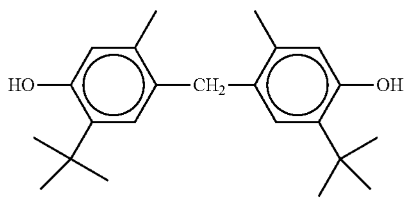

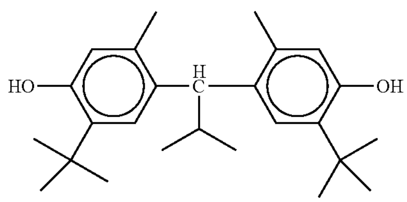

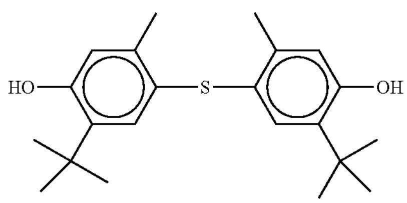

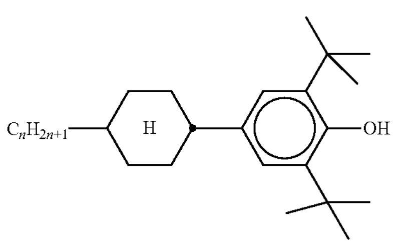

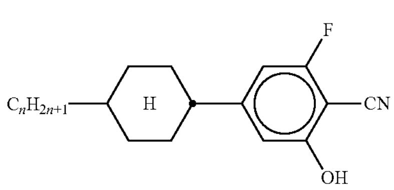

TABLE C-continued
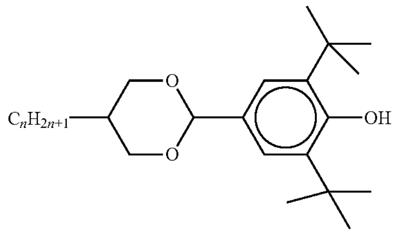
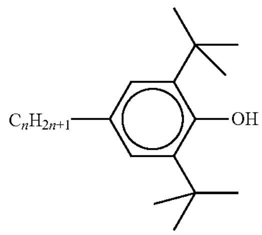
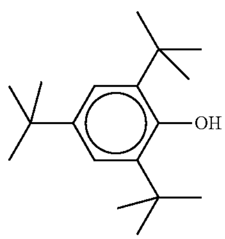
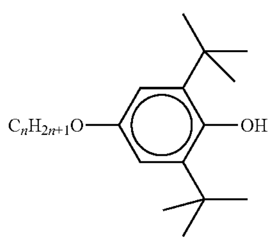
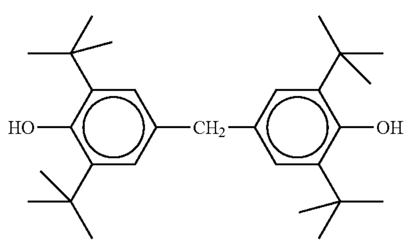
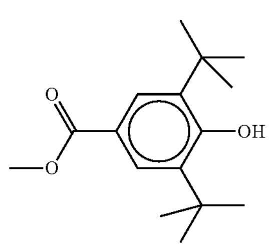

TABLE C-continued
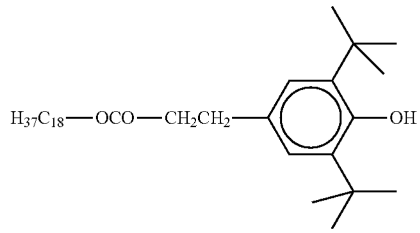
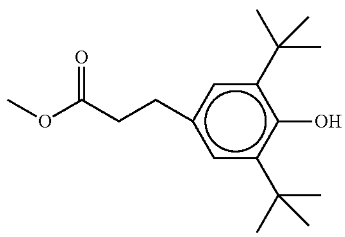
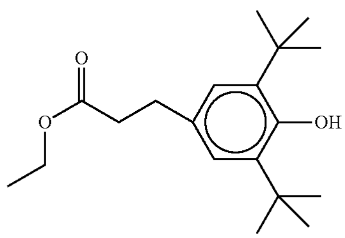
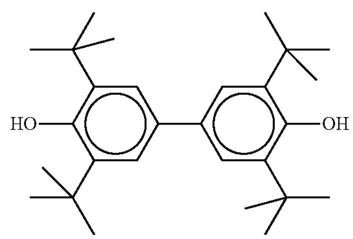
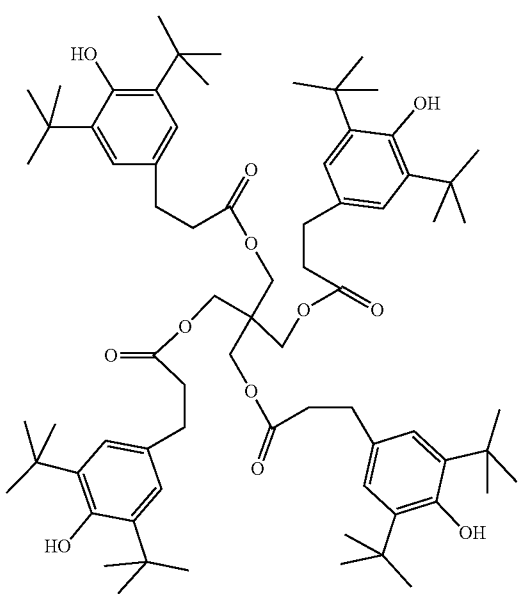 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE C-continued
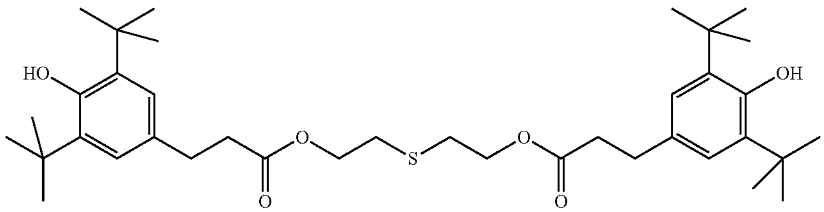 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
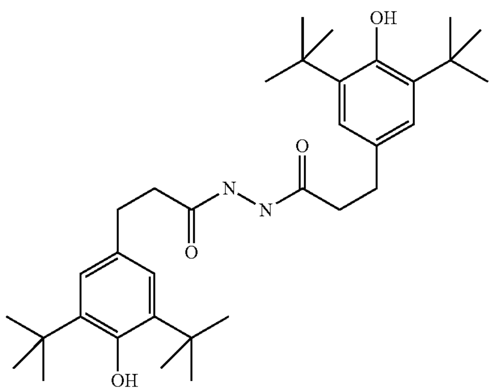 [SMILES: CC(C)(C)c1cc(CCC(=O)NNC(=O)CCc2cc(C(C)(C)C)c(O)c(C(C)(C)C)c2)cc(C(C)(C)C)c1O]
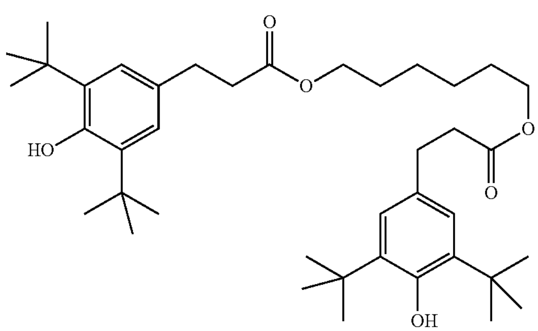 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
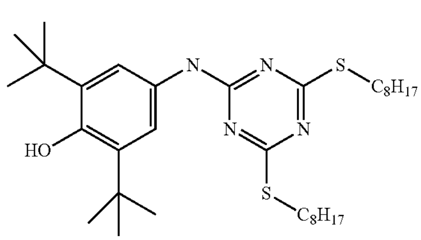

TABLE C-continued
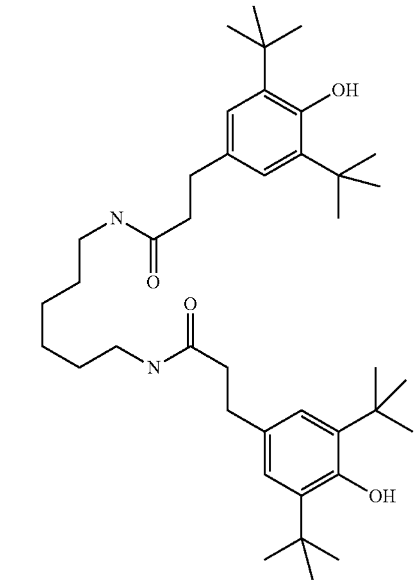 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
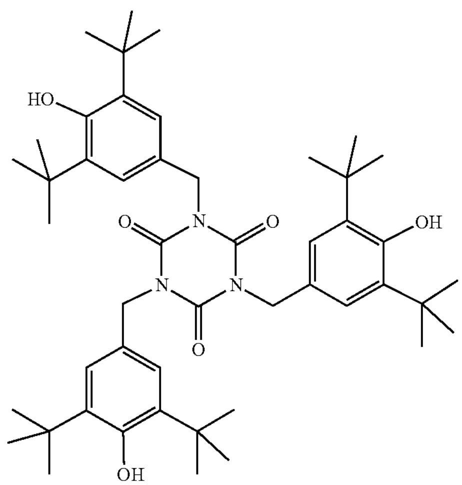 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
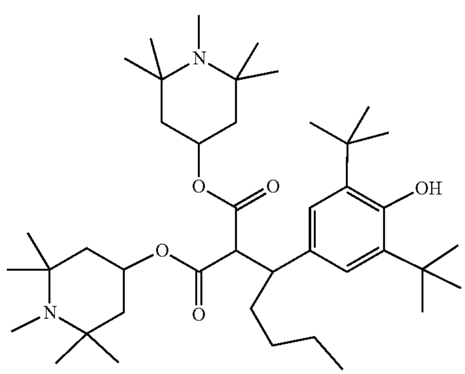 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
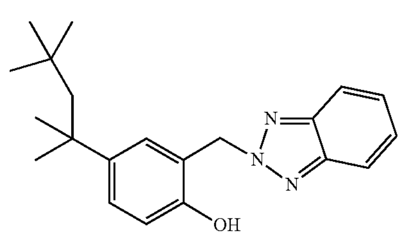 [SMILES: CC(C)(C)CC(C)(C)c1ccc(O)c(Cn2nc3ccccc3n2)c1]

TABLE C-continued
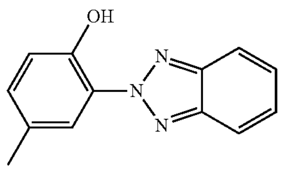 [SMILES: Cc1ccc(O)c(-n2nc3ccccc3n2)c1]
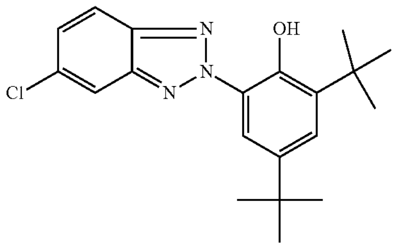 [SMILES: CC(C)(C)c1cc(-n2nc3ccc(Cl)cc3n2)c(O)c(C(C)(C)C)c1]
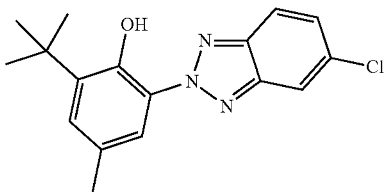 [SMILES: Cc1cc(-n2nc3ccc(Cl)cc3n2)c(O)c(C(C)(C)C)c1]
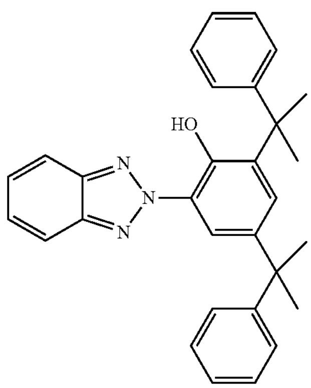 [SMILES: CC(C)(c1ccccc1)c1cc(-n2nc3ccccc3n2)c(O)c(C(C)(C)c2ccccc2)c1]
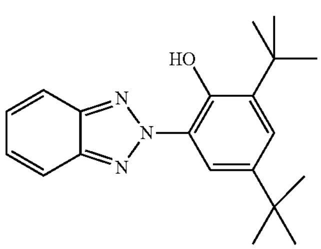 [SMILES: CC(C)(C)c1cc(-n2nc3ccccc3n2)c(O)c(C(C)(C)C)c1]
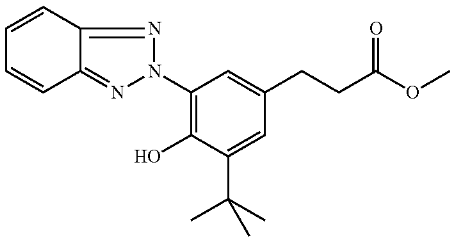 [SMILES: COC(=O)CCc1cc(-n2nc3ccccc3n2)c(O)c(C(C)(C)C)c1]

TABLE C-continued
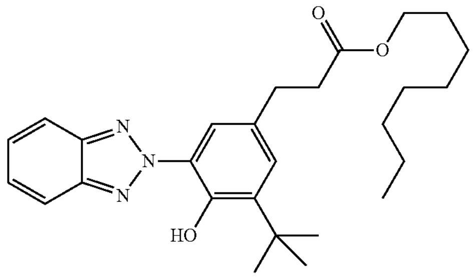 [SMILES: CCCCCCCCOC(=O)CCc1cc(-n2nc3ccccc3n2)c(O)c(C(C)(C)C)c1]
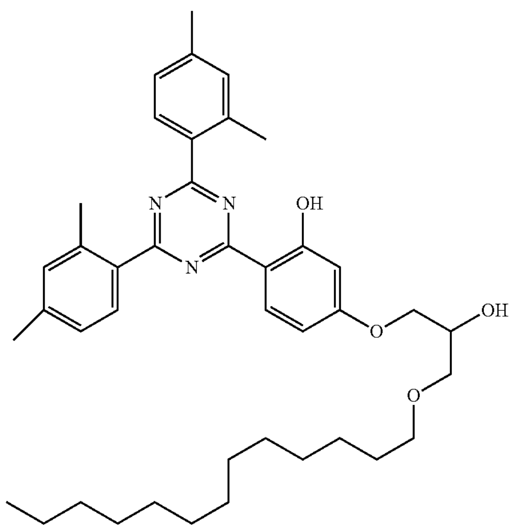 [SMILES: CCCCCCCCCCCCCOCC(O)COc1ccc(-c2nc(-c3ccc(C)cc3C)nc(-c3ccc(C)cc3C)n2)c(O)c1]
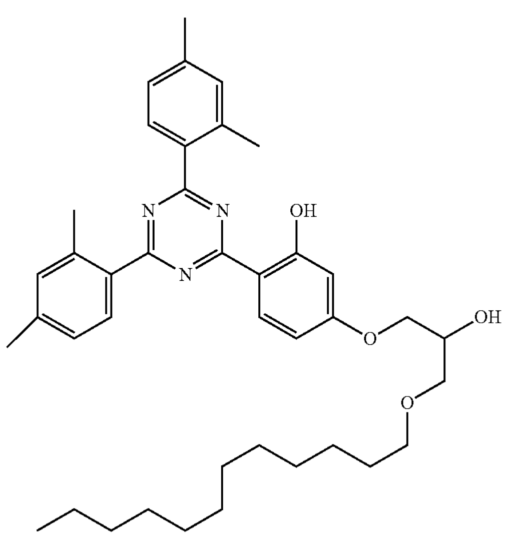 [SMILES: CCCCCCCCCCCCOCC(O)COc1ccc(-c2nc(-c3ccc(C)cc3C)nc(-c3ccc(C)cc3C)n2)c(O)c1]

TABLE C-continued
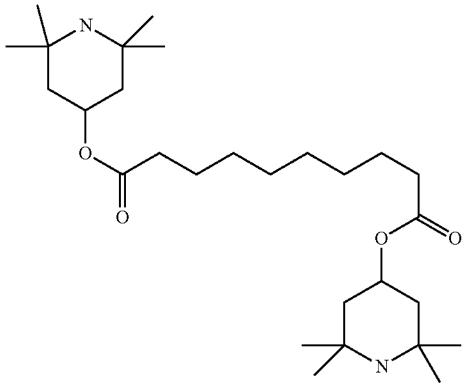
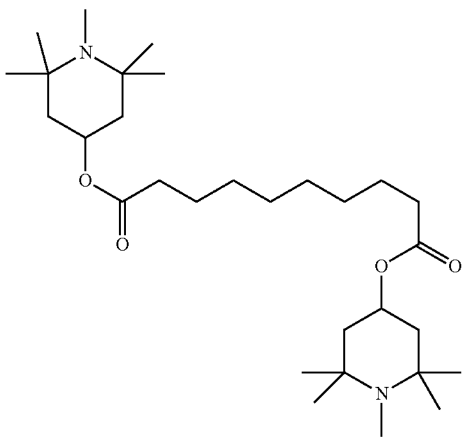
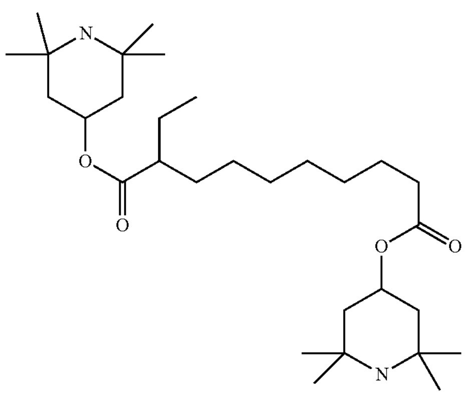
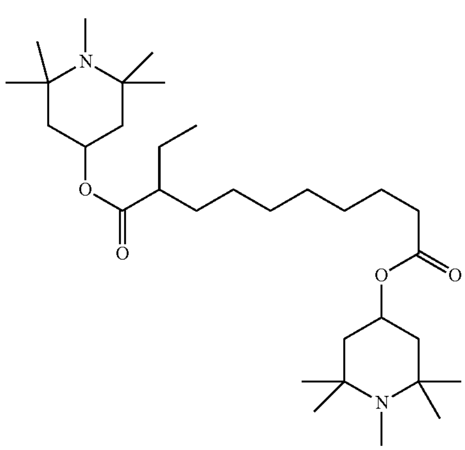

TABLE C-continued
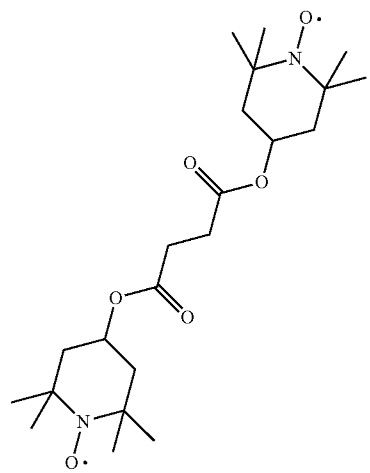
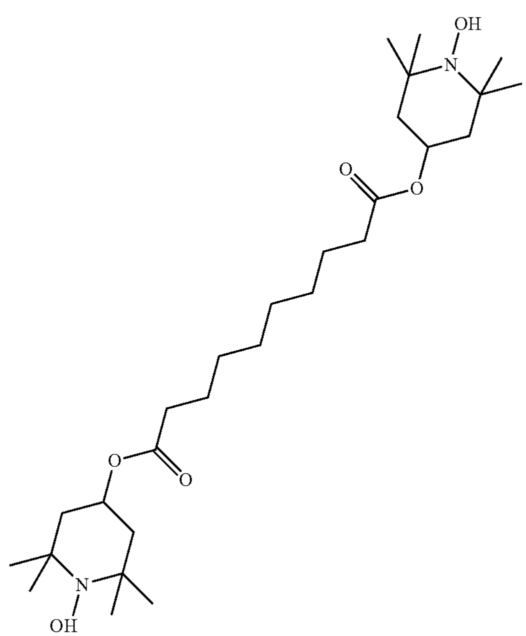
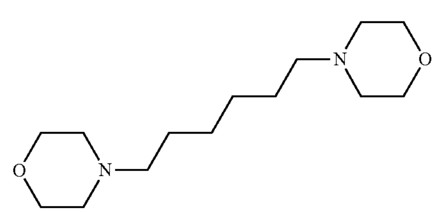 [SMILES: C(CCCN1CCOCC1)CCN1CCOCC1]

TABLE C-continued
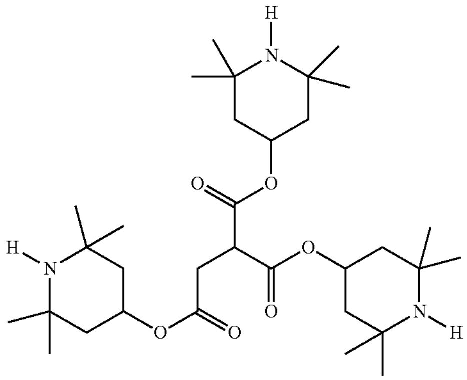
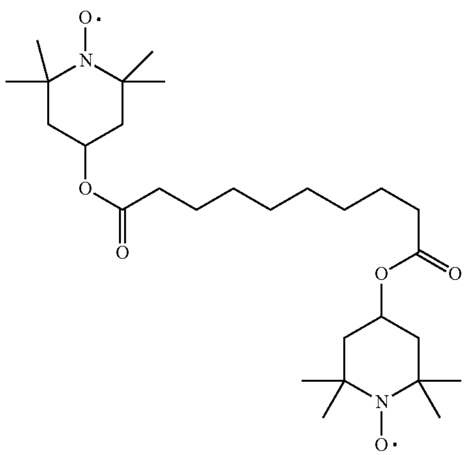
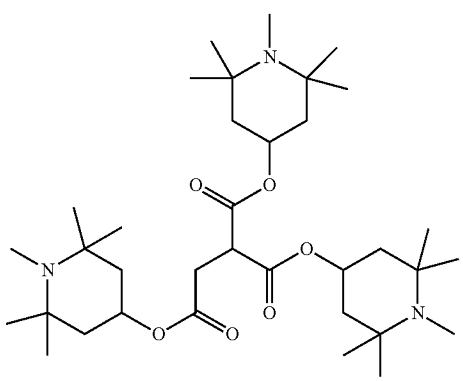
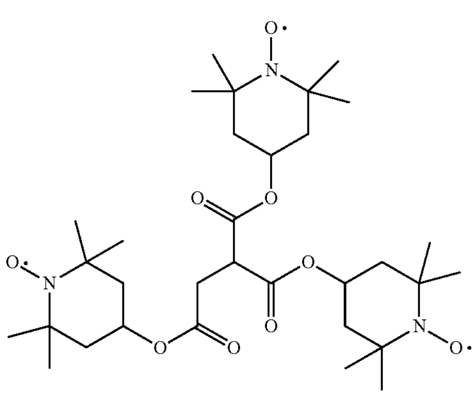

TABLE C-continued
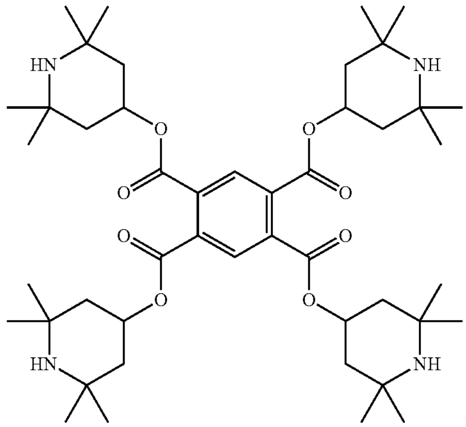
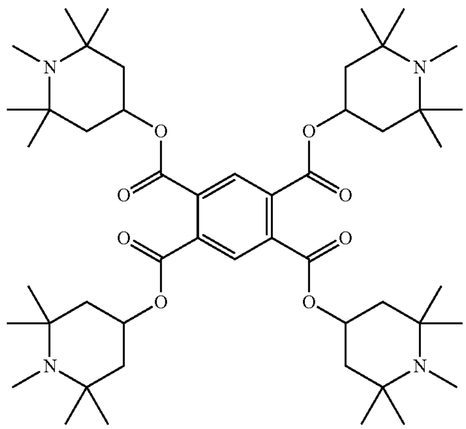
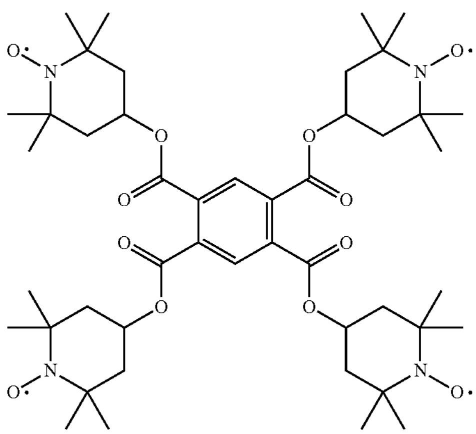
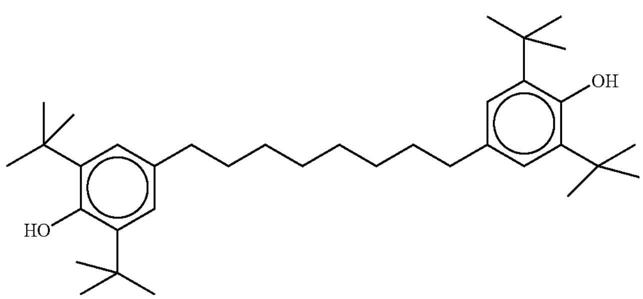

Table C shows possible stabilizers which can be added to the LC media according to the invention. Therein n denotes an integer from 1 to 12, preferably 1, 2, 3, 4, 5, 6, 7 or 8, and terminal methyl groups are not shown.

The LC media preferably comprise 0 to 10% by weight, in particular 1 ppm to 5% by weight, particularly preferably 1 ppm to 1% by weight, of stabilizers. The LC media preferably comprise one or more stabilizers selected from the group consisting of compounds from Table C.

TABLE D

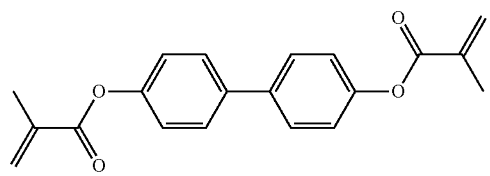

RM-1

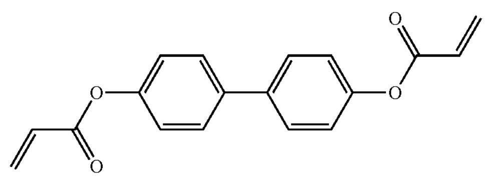 [SMILES: C=CC(=O)Oc1ccc(-c2ccc(OC(=O)C=C)cc2)cc1]

RM-2

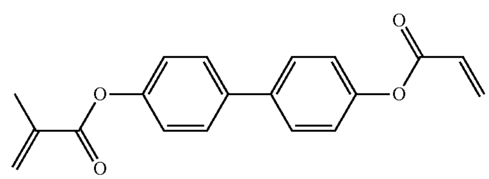 [SMILES: C=CC(=O)Oc1ccc(-c2ccc(OC(=O)C(=C)C)cc2)cc1]

RM-3

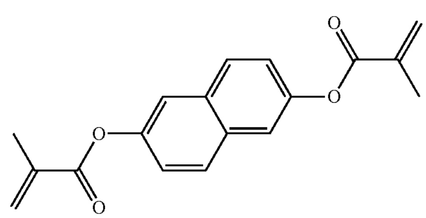 [SMILES: C=C(C)C(=O)Oc1ccc2cc(OC(=O)C(=C)C)ccc2c1]

RM-4

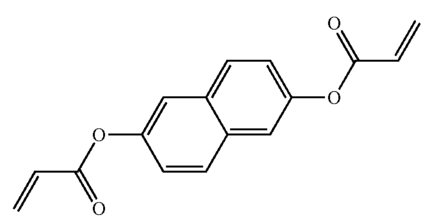 [SMILES: C=CC(=O)Oc1ccc2cc(OC(=O)C=C)ccc2c1]

RM-5

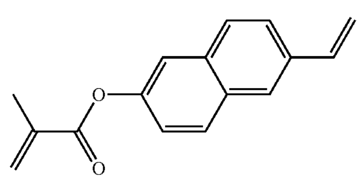 [SMILES: C=Cc1ccc2cc(OC(=O)C(=C)C)ccc2c1]

RM-6

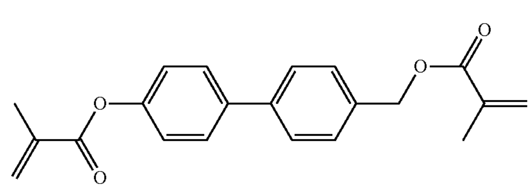 [SMILES: C=C(C)C(=O)OCc1ccc(-c2ccc(OC(=O)C(=C)C)cc2)cc1]

RM-7

TABLE D-continued
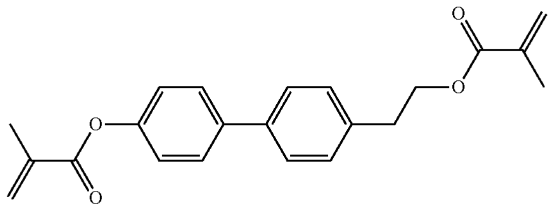 [SMILES: C=C(C)C(=O)OCCc1ccc(-c2ccc(OC(=O)C(=C)C)cc2)cc1]
RM-8
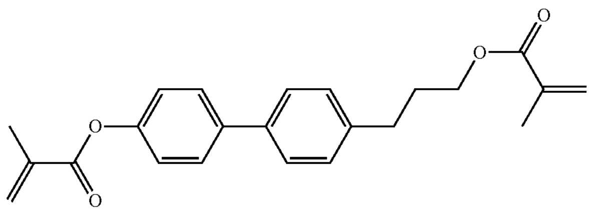 [SMILES: C=C(C)C(=O)OCCCc1ccc(-c2ccc(OC(=O)C(=C)C)cc2)cc1]
RM-9
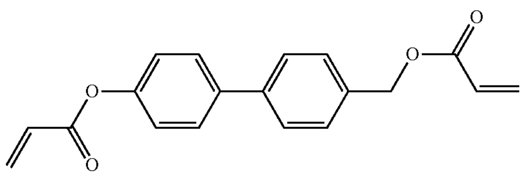 [SMILES: C=CC(=O)OCc1ccc(-c2ccc(OC(=O)C=C)cc2)cc1]
RM-10
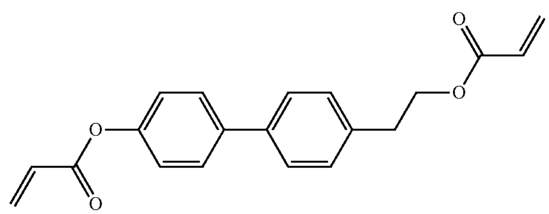 [SMILES: C=CC(=O)OCCc1ccc(-c2ccc(OC(=O)C=C)cc2)cc1]
RM-11
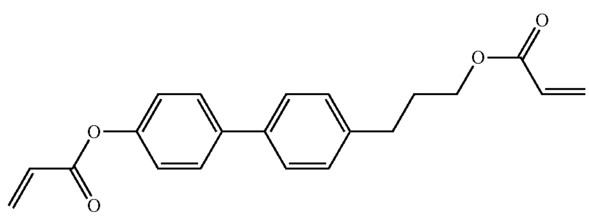 [SMILES: C=CC(=O)OCCCc1ccc(-c2ccc(OC(=O)C=C)cc2)cc1]
RM-12
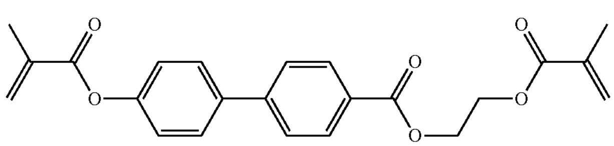
RM-13
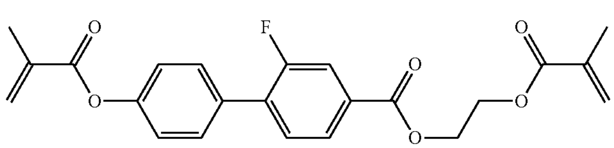 [SMILES: C=C(C)C(=O)OCCOC(=O)c1ccc(-c2ccc(OC(=O)C(=C)C)cc2)c(F)c1]
RM-14
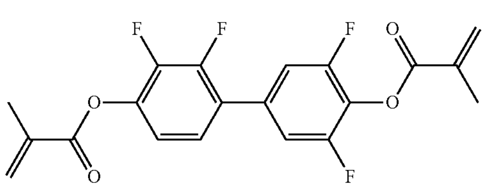 [SMILES: C=C(C)C(=O)Oc1ccc(-c2cc(F)c(OC(=O)C(=C)C)c(F)c2)c(F)c1F]
RM-15

TABLE D-continued
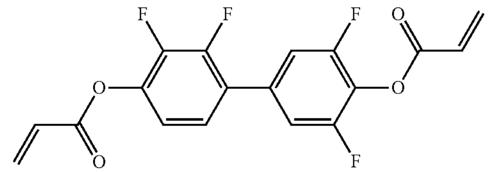 [SMILES: C=CC(=O)Oc1ccc(-c2cc(F)c(OC(=O)C=C)c(F)c2)c(F)c1F]
RM-16
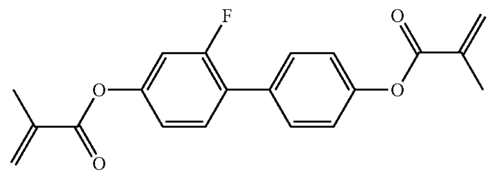 [SMILES: C=C(C)C(=O)Oc1ccc(-c2ccc(OC(=O)C(=C)C)cc2F)cc1]
RM-17
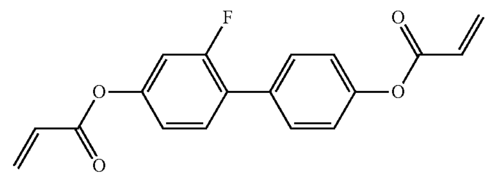 [SMILES: C=CC(=O)Oc1ccc(-c2ccc(OC(=O)C=C)cc2F)cc1]
RM-18
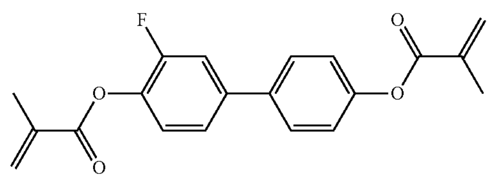 [SMILES: C=C(C)C(=O)Oc1ccc(-c2ccc(OC(=O)C(=C)C)c(F)c2)cc1]
RM-19
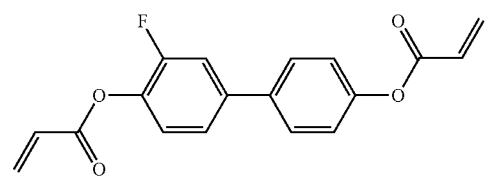 [SMILES: C=CC(=O)Oc1ccc(-c2ccc(OC(=O)C=C)c(F)c2)cc1]
RM-20
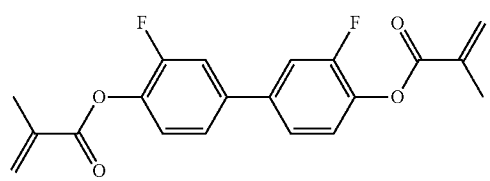 [SMILES: C=C(C)C(=O)Oc1ccc(-c2ccc(OC(=O)C(=C)C)c(F)c2)cc1F]
RM-21
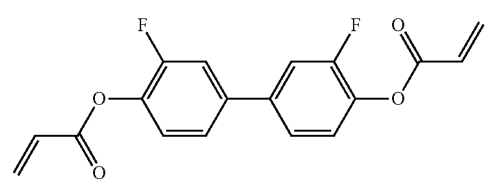 [SMILES: C=CC(=O)Oc1ccc(-c2ccc(OC(=O)C=C)c(F)c2)cc1F]
RM-22
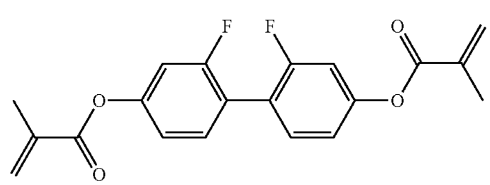 [SMILES: C=C(C)C(=O)Oc1ccc(-c2ccc(OC(=O)C(=C)C)cc2F)c(F)c1]
RM-23
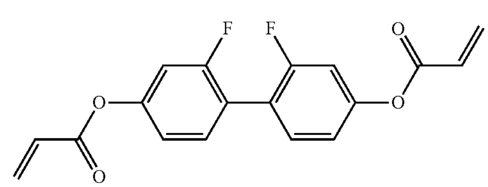 [SMILES: C=CC(=O)Oc1ccc(-c2ccc(OC(=O)C=C)cc2F)c(F)c1]
RM-24

TABLE D-continued
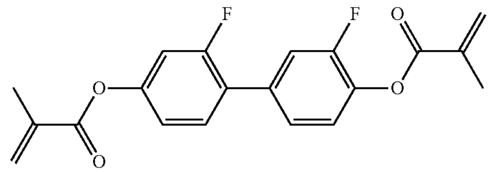 [SMILES: C=C(C)C(=O)Oc1ccc(-c2ccc(OC(=O)C(=C)C)c(F)c2)c(F)c1]
RM-25
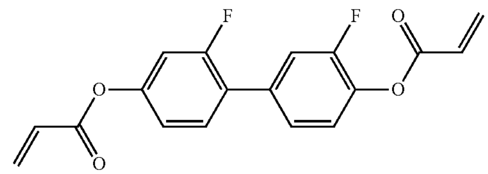 [SMILES: C=CC(=O)Oc1ccc(-c2ccc(OC(=O)C=C)c(F)c2)c(F)c1]
RM-26
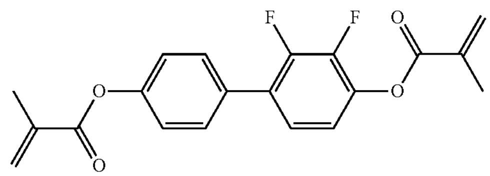 [SMILES: C=C(C)C(=O)Oc1ccc(-c2ccc(OC(=O)C(=C)C)c(F)c2F)cc1]
RM-27
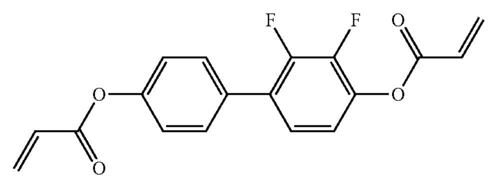 [SMILES: C=CC(=O)Oc1ccc(-c2ccc(OC(=O)C=C)c(F)c2F)cc1]
RM-28
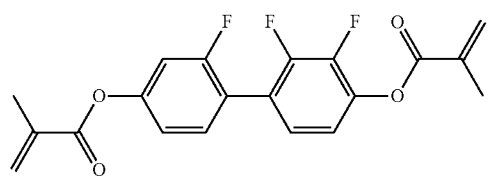 [SMILES: C=C(C)C(=O)Oc1ccc(-c2ccc(OC(=O)C(=C)C)c(F)c2F)c(F)c1]
RM-29
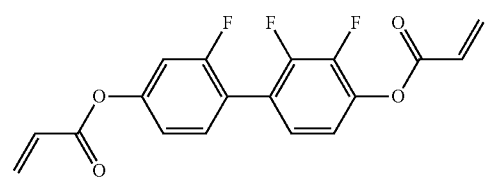 [SMILES: C=CC(=O)Oc1ccc(-c2ccc(OC(=O)C=C)c(F)c2F)c(F)c1]
RM-30
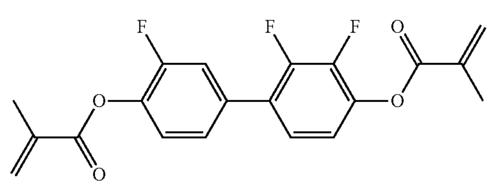 [SMILES: C=C(C)C(=O)Oc1ccc(-c2ccc(OC(=O)C(=C)C)c(F)c2F)cc1F]
RM-31
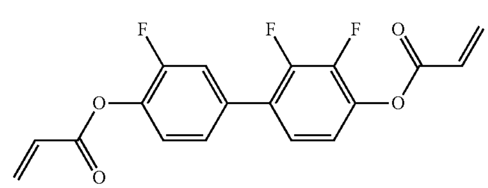 [SMILES: C=CC(=O)Oc1ccc(-c2ccc(OC(=O)C=C)c(F)c2F)cc1F]
RM-32

TABLE D-continued
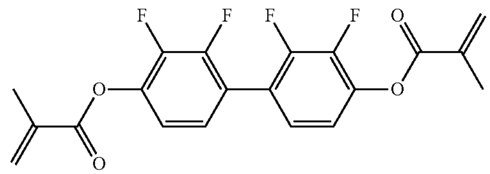 [SMILES: C=C(C)C(=O)Oc1ccc(-c2ccc(OC(=O)C(=C)C)c(F)c2F)c(F)c1F]
RM-33
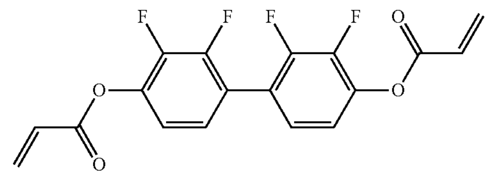 [SMILES: C=CC(=O)Oc1ccc(-c2ccc(OC(=O)C=C)c(F)c2F)c(F)c1F]
RM-34
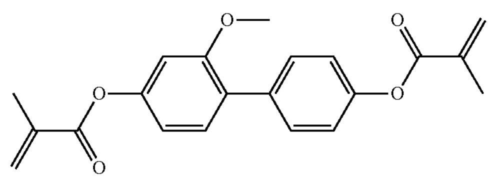
RM-35
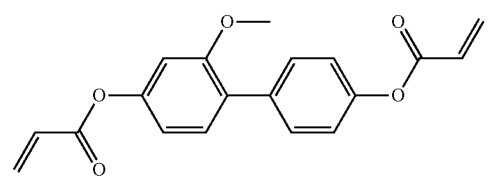
RM-36
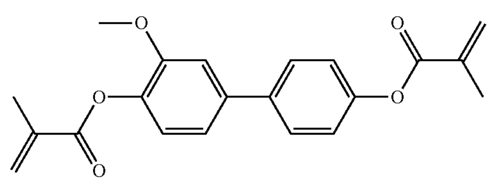
RM-37
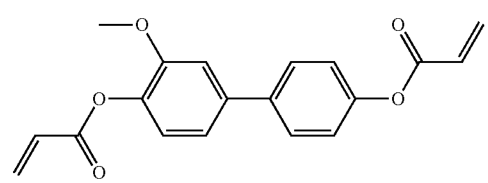
RM-38
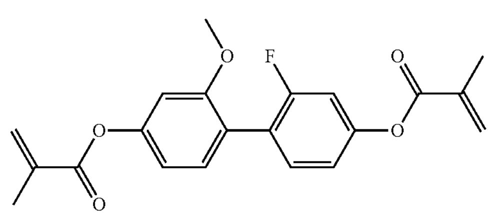 [SMILES: C=C(C)C(=O)Oc1ccc(-c2ccc(OC(=O)C(=C)C)cc2OC)c(F)c1]
RM-39
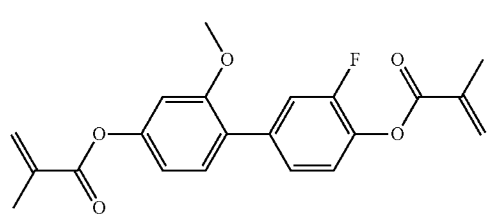 [SMILES: C=C(C)C(=O)Oc1ccc(-c2ccc(OC(=O)C(=C)C)c(F)c2)c(OC)c1]
RM-40

TABLE D-continued
RM-41
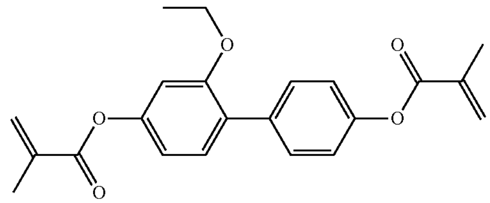 [SMILES: C=C(C)C(=O)Oc1ccc(-c2ccc(OC(=O)C(=C)C)cc2OCC)cc1]
RM-42
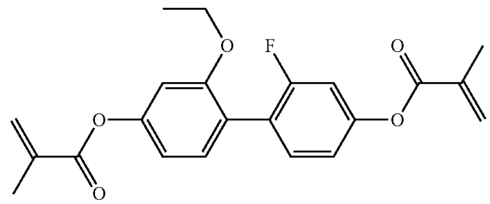 [SMILES: C=C(C)C(=O)Oc1ccc(-c2ccc(OC(=O)C(=C)C)cc2OCC)c(F)c1]
RM-43
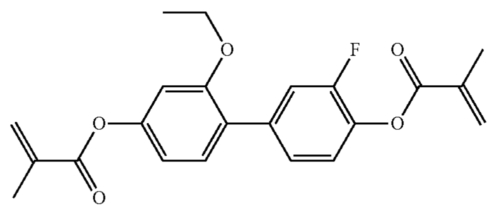 [SMILES: C=C(C)C(=O)Oc1ccc(-c2ccc(OC(=O)C(=C)C)c(F)c2)c(OCC)c1]
RM-44
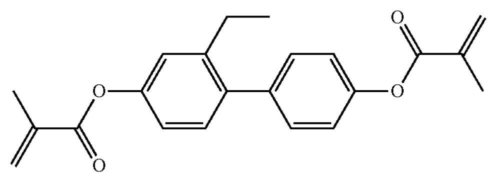
RM-45
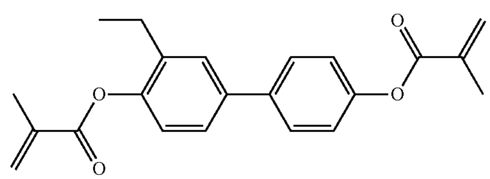
RM-46
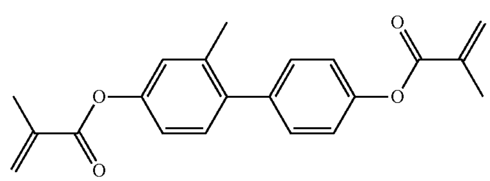
RM-47
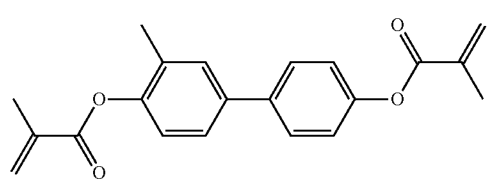
RM-48
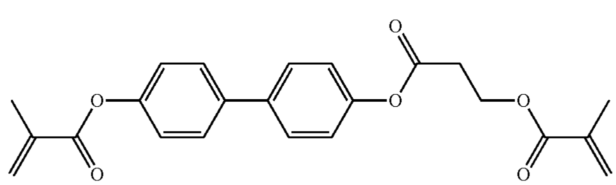

TABLE D-continued
RM-49
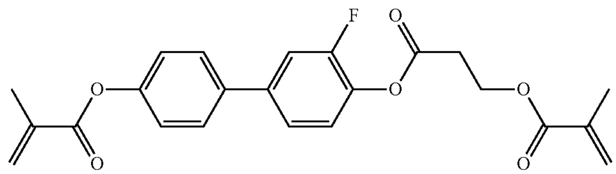 [SMILES: C=C(C)C(=O)OCCC(=O)Oc1ccc(-c2ccc(OC(=O)C(=C)C)cc2)cc1F]
RM-50
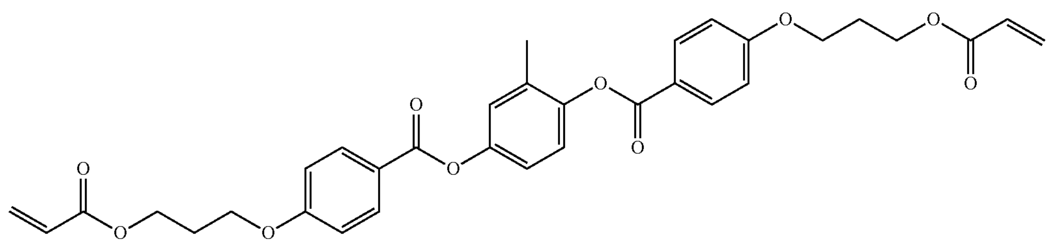 [SMILES: C=CC(=O)OCCCOc1ccc(C(=O)Oc2ccc(OC(=O)c3ccc(OCCCOC(=O)C=C)cc3)c(C)c2)cc1]
RM-51
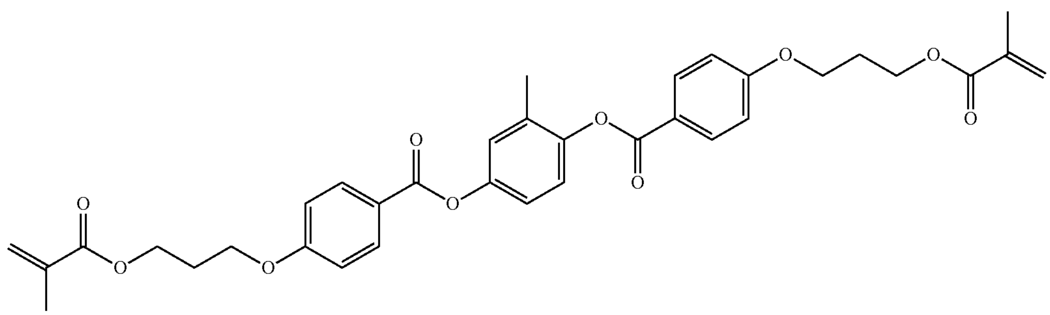 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-52
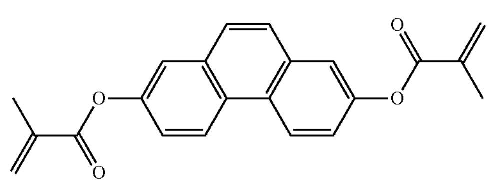 [SMILES: C=C(C)C(=O)Oc1ccc2c(ccc3cc(OC(=O)C(=C)C)ccc32)c1]
RM-53
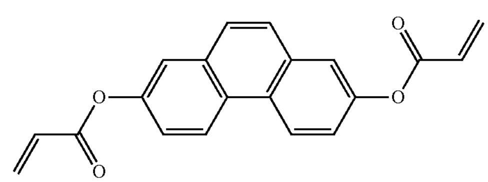 [SMILES: C=CC(=O)Oc1ccc2c(ccc3cc(OC(=O)C=C)ccc32)c1]
RM-54
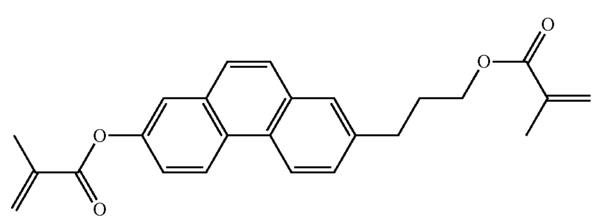 [SMILES: C=C(C)C(=O)OCCCc1ccc2c(ccc3cc(OC(=O)C(=C)C)ccc32)c1]
RM-55
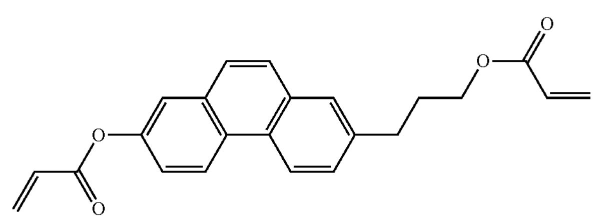 [SMILES: C=CC(=O)OCCCc1ccc2c(ccc3cc(OC(=O)C=C)ccc32)c1]

TABLE D-continued
RM-56
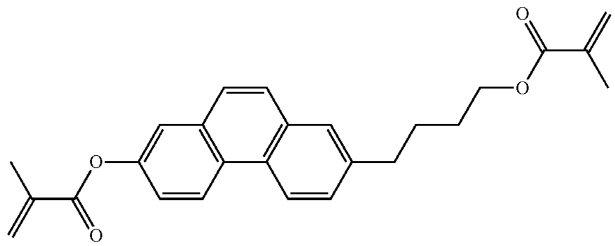 [SMILES: C=C(C)C(=O)OCCCCc1ccc2c(ccc3cc(OC(=O)C(=C)C)ccc32)c1]
RM-57
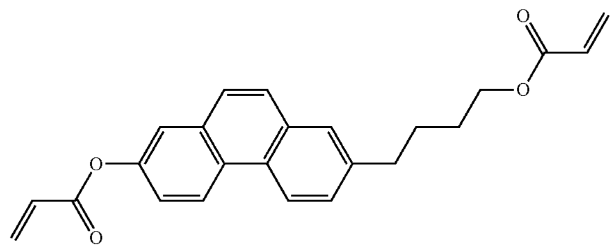 [SMILES: C=CC(=O)OCCCCc1ccc2c(ccc3cc(OC(=O)C=C)ccc32)c1]
RM-58
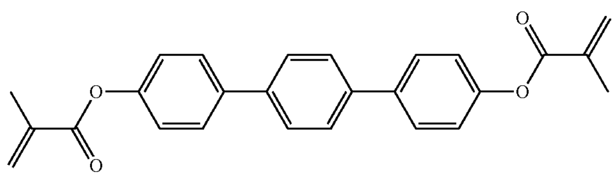 [SMILES: C=C(C)C(=O)Oc1ccc(-c2ccc(-c3ccc(OC(=O)C(=C)C)cc3)cc2)cc1]
RM-59
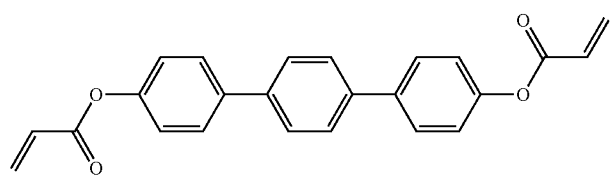 [SMILES: C=CC(=O)Oc1ccc(-c2ccc(-c3ccc(OC(=O)C=C)cc3)cc2)cc1]
RM-60
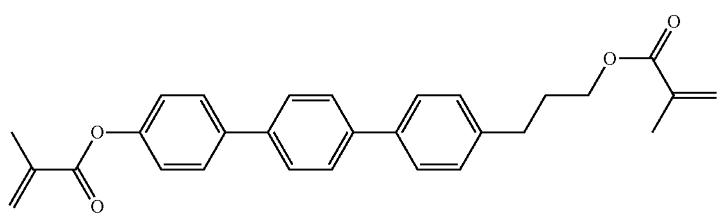 [SMILES: C=C(C)C(=O)OCCCc1ccc(-c2ccc(-c3ccc(OC(=O)C(=C)C)cc3)cc2)cc1]
RM-61
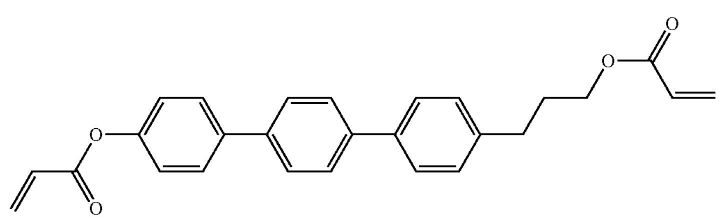 [SMILES: C=CC(=O)OCCCc1ccc(-c2ccc(-c3ccc(OC(=O)C=C)cc3)cc2)cc1]
RM-62
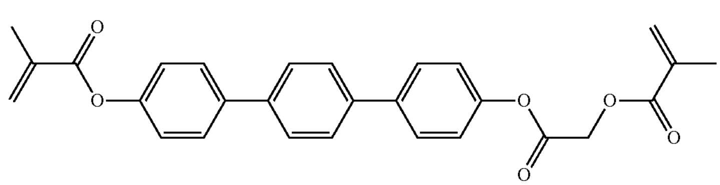 [SMILES: C=C(C)C(=O)OCC(=O)Oc1ccc(-c2ccc(-c3ccc(OC(=O)C(=C)C)cc3)cc2)cc1]

TABLE D-continued
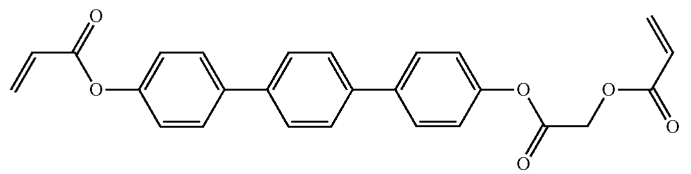 [SMILES: C=CC(=O)OCC(=O)Oc1ccc(-c2ccc(-c3ccc(OC(=O)C=C)cc3)cc2)cc1]
RM-63
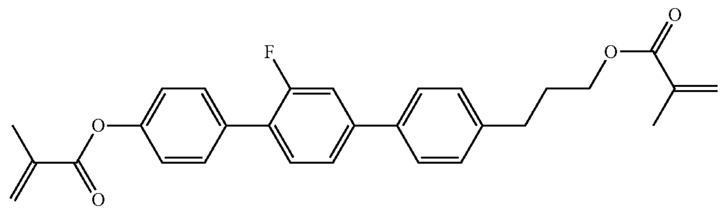
RM-64
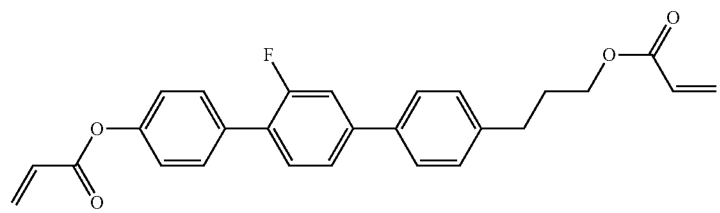
RM-65
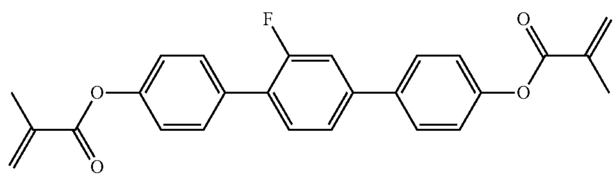
RM-66
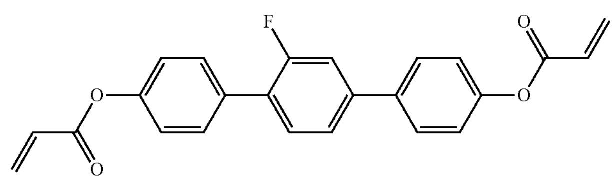 [SMILES: C=CC(=O)Oc1ccc(-c2ccc(-c3ccc(OC(=O)C=C)cc3)c(F)c2)cc1]
RM-67
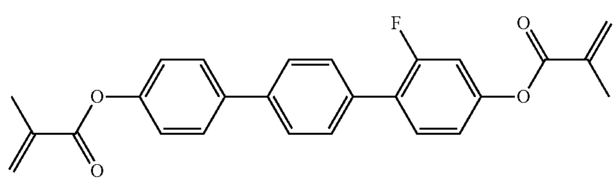
RM-68
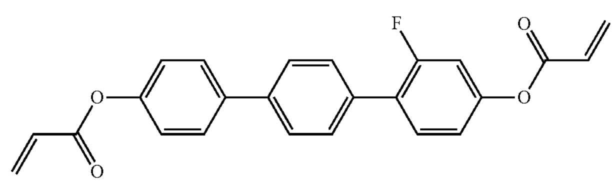 [SMILES: C=CC(=O)Oc1ccc(-c2ccc(-c3ccc(OC(=O)C=C)cc3F)cc2)cc1]
RM-69
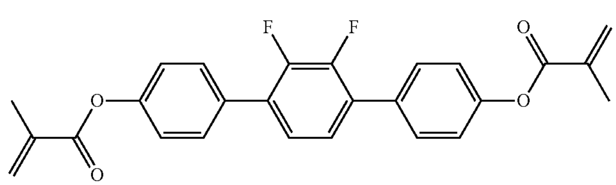
RM-70

TABLE D-continued
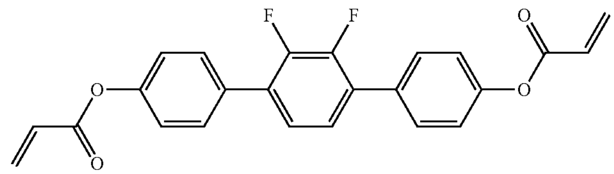 [SMILES: C=CC(=O)Oc1ccc(-c2ccc(-c3ccc(OC(=O)C=C)cc3)c(F)c2F)cc1]
RM-71
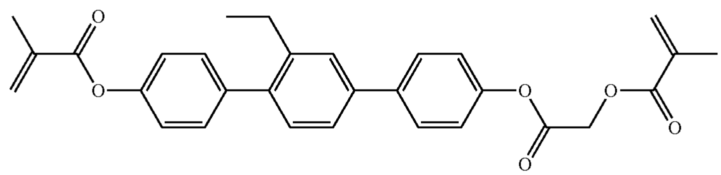 [SMILES: C=C(C)C(=O)OCC(=O)Oc1ccc(-c2ccc(-c3ccc(OC(=O)C(=C)C)cc3)c(CC)c2)cc1]
RM-72
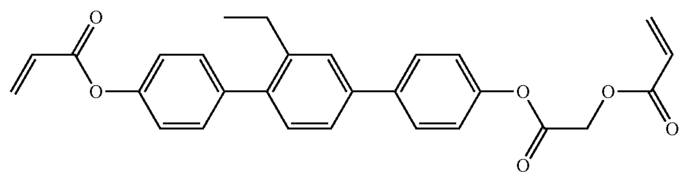 [SMILES: C=CC(=O)OCC(=O)Oc1ccc(-c2ccc(-c3ccc(OC(=O)C=C)cc3)c(CC)c2)cc1]
RM-73
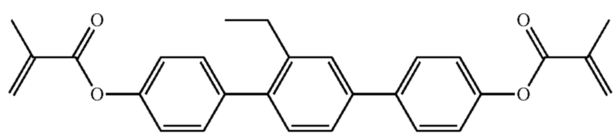 [SMILES: C=C(C)C(=O)Oc1ccc(-c2ccc(-c3ccc(OC(=O)C(=C)C)cc3)c(CC)c2)cc1]
RM-74
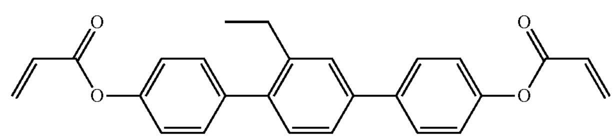 [SMILES: C=CC(=O)Oc1ccc(-c2ccc(-c3ccc(OC(=O)C=C)cc3)c(CC)c2)cc1]
RM-75
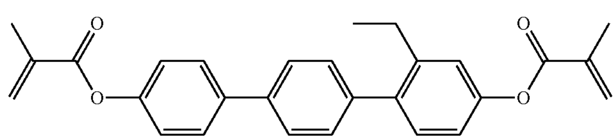 [SMILES: C=C(C)C(=O)Oc1ccc(-c2ccc(-c3ccc(OC(=O)C(=C)C)cc3CC)cc2)cc1]
RM-76
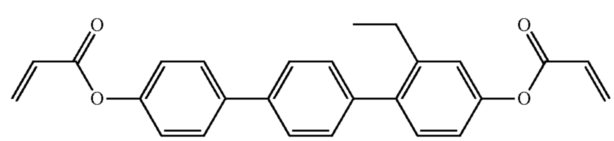 [SMILES: C=CC(=O)Oc1ccc(-c2ccc(-c3ccc(OC(=O)C=C)cc3CC)cc2)cc1]
RM-77
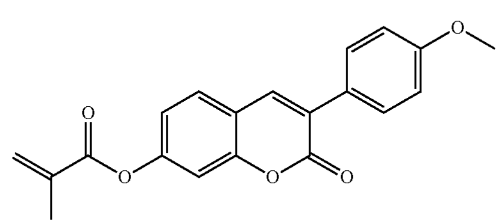 [SMILES: C=C(C)C(=O)Oc1ccc2cc(-c3ccc(OC)cc3)c(=O)oc2c1]
RM-78
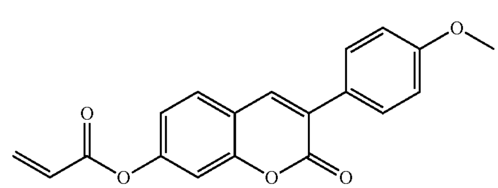 [SMILES: C=CC(=O)Oc1ccc2cc(-c3ccc(OC)cc3)c(=O)oc2c1]
RM-79

TABLE D-continued
RM-80
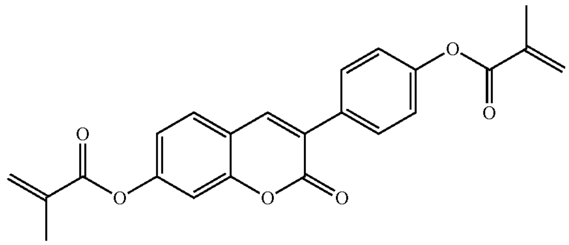 [SMILES: C=C(C)C(=O)Oc1ccc(-c2cc3ccc(OC(=O)C(=C)C)cc3oc2=O)cc1]
RM-81
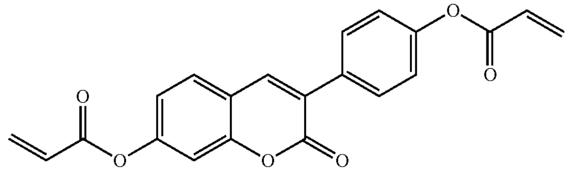 [SMILES: C=CC(=O)Oc1ccc(-c2cc3ccc(OC(=O)C=C)cc3oc2=O)cc1]
RM-82
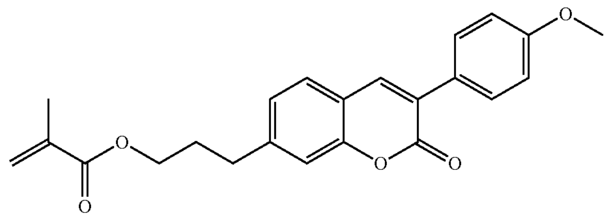 [SMILES: C=C(C)C(=O)OCCCc1ccc2cc(-c3ccc(OC)cc3)c(=O)oc2c1]
RM-83
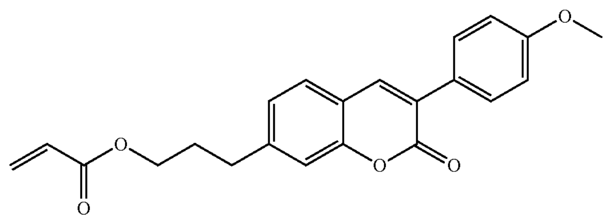 [SMILES: C=CC(=O)OCCCc1ccc2cc(-c3ccc(OC)cc3)c(=O)oc2c1]
RM-84
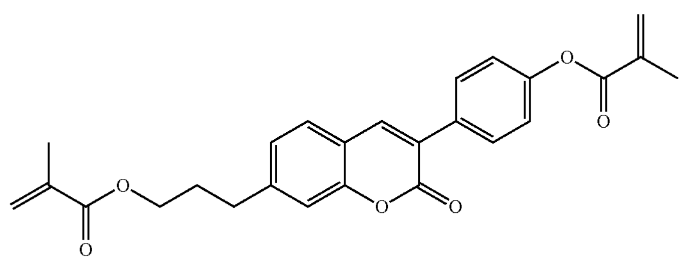 [SMILES: C=C(C)C(=O)OCCCc1ccc2cc(-c3ccc(OC(=O)C(=C)C)cc3)c(=O)oc2c1]
RM-85
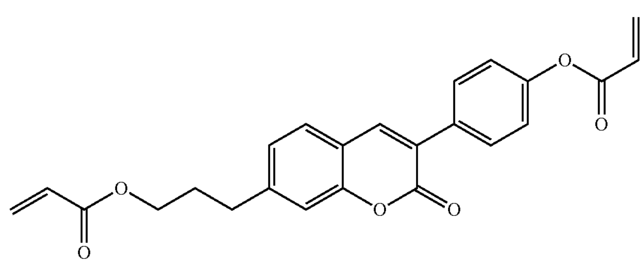 [SMILES: C=CC(=O)OCCCc1ccc2cc(-c3ccc(OC(=O)C=C)cc3)c(=O)oc2c1]
RM-86
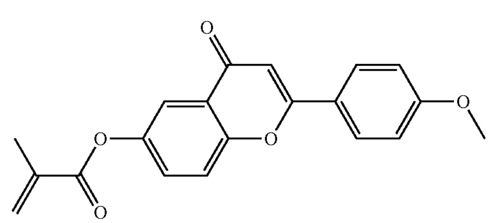 [SMILES: C=C(C)C(=O)Oc1ccc2oc(-c3ccc(OC)cc3)cc(=O)c2c1]

TABLE D-continued
RM-87
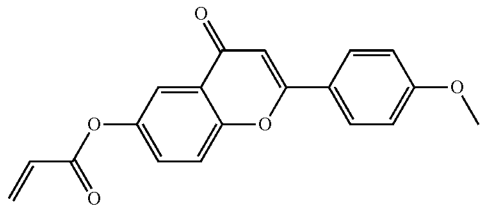 [SMILES: C=CC(=O)Oc1ccc2oc(-c3ccc(OC)cc3)cc(=O)c2c1]
RM-88
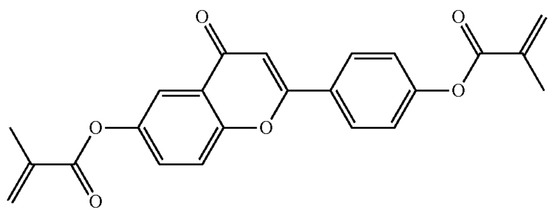 [SMILES: C=C(C)C(=O)Oc1ccc(-c2cc(=O)c3cc(OC(=O)C(=C)C)ccc3o2)cc1]
RM-89
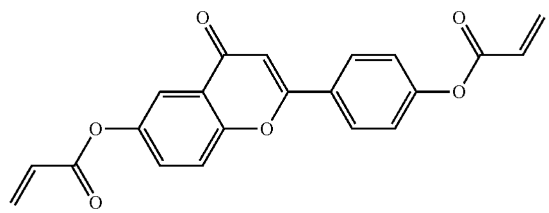 [SMILES: C=CC(=O)Oc1ccc(-c2cc(=O)c3cc(OC(=O)C=C)ccc3o2)cc1]
RM-90
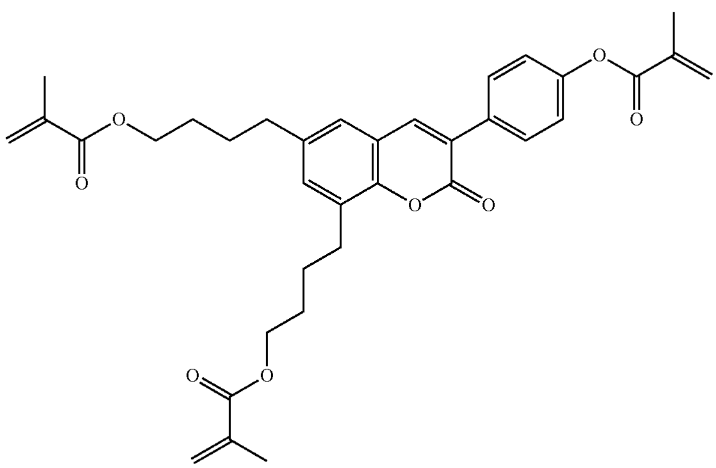 [SMILES: C=C(C)C(=O)OCCCCc1cc(CCCCOC(=O)C(=C)C)c2oc(=O)c(-c3ccc(OC(=O)C(=C)C)cc3)cc2c1]
RM-91
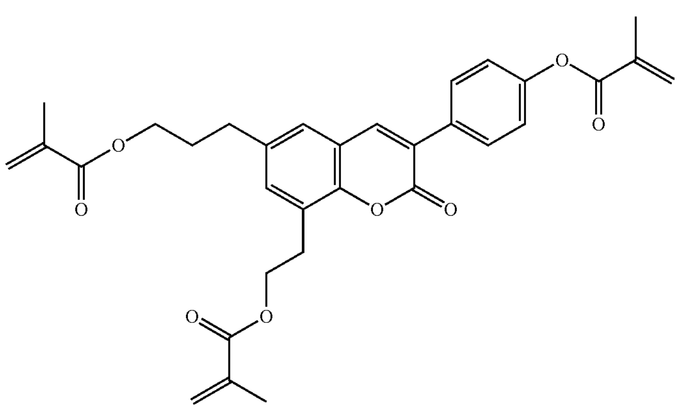 [SMILES: C=C(C)C(=O)OCCCc1cc(CCOC(=O)C(=C)C)c2oc(=O)c(-c3ccc(OC(=O)C(=C)C)cc3)cc2c1]

TABLE D-continued
RM-92
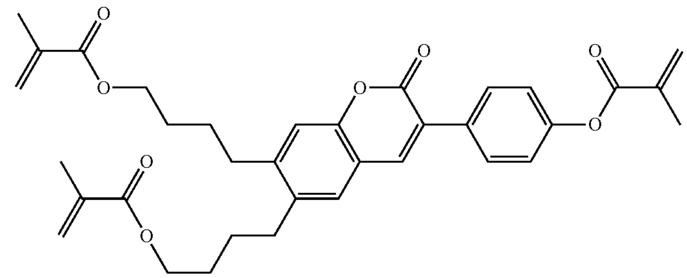 [SMILES: C=C(C)C(=O)OCCCCc1cc2cc(-c3ccc(OC(=O)C(=C)C)cc3)c(=O)oc2cc1CCCCOC(=O)C(=C)C]
RM-93
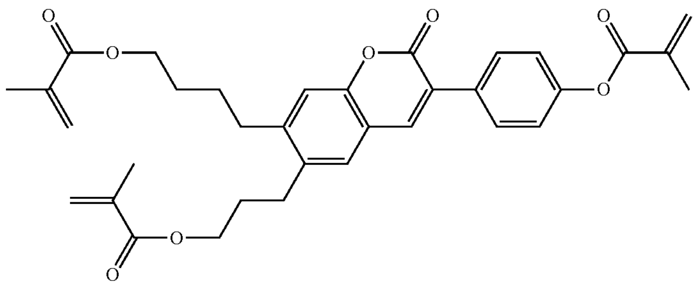 [SMILES: C=C(C)C(=O)OCCCCc1cc2oc(=O)c(-c3ccc(OC(=O)C(=C)C)cc3)cc2cc1CCCOC(=O)C(=C)C]
RM-94
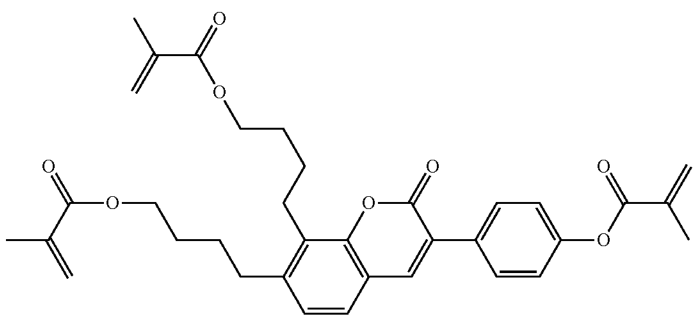 [SMILES: C=C(C)C(=O)OCCCCc1ccc2cc(-c3ccc(OC(=O)C(=C)C)cc3)c(=O)oc2c1CCCCOC(=O)C(=C)C]
RM-95
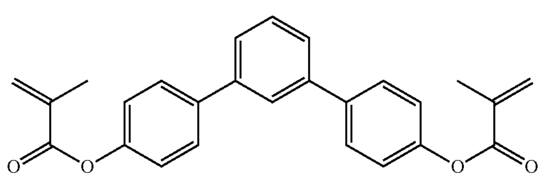 [SMILES: C=C(C)C(=O)Oc1ccc(-c2cccc(-c3ccc(OC(=O)C(=C)C)cc3)c2)cc1]
RM-96
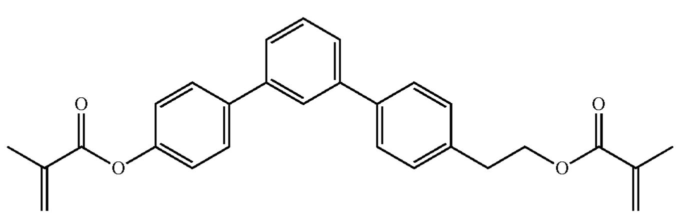 [SMILES: C=C(C)C(=O)OCCc1ccc(-c2cccc(-c3ccc(OC(=O)C(=C)C)cc3)c2)cc1]
RM-97
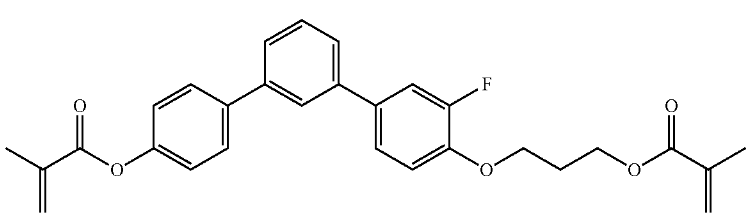 [SMILES: C=C(C)C(=O)OCCCOc1ccc(-c2cccc(-c3ccc(OC(=O)C(=C)C)cc3)c2)cc1F]

TABLE D-continued
RM-98
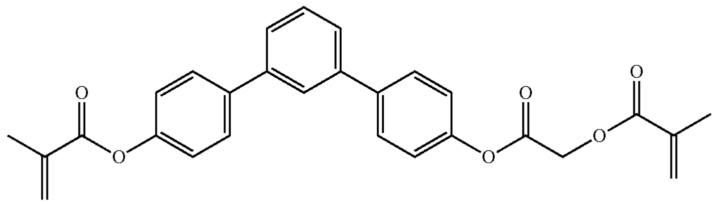 [SMILES: C=C(C)C(=O)OCC(=O)Oc1ccc(-c2cccc(-c3ccc(OC(=O)C(=C)C)cc3)c2)cc1]
RM-99
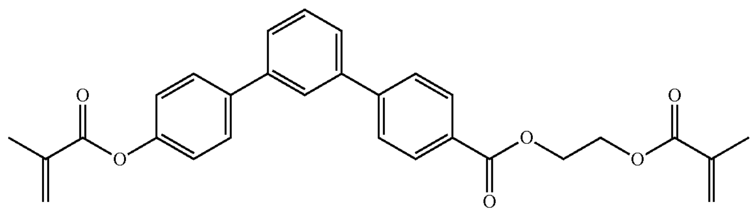 [SMILES: C=C(C)C(=O)OCCOC(=O)c1ccc(-c2cccc(-c3ccc(OC(=O)C(=C)C)cc3)c2)cc1]
RM-100
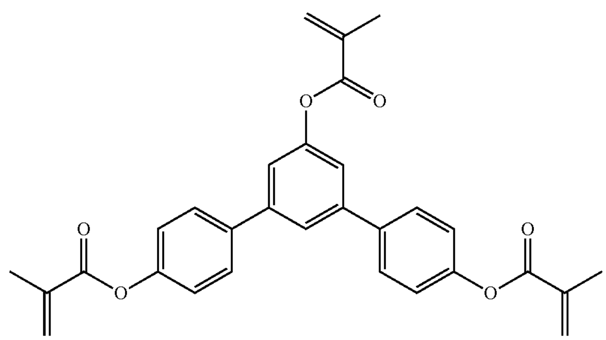 [SMILES: C=C(C)C(=O)Oc1ccc(-c2cc(OC(=O)C(=C)C)cc(-c3ccc(OC(=O)C(=C)C)cc3)c2)cc1]
RM-101
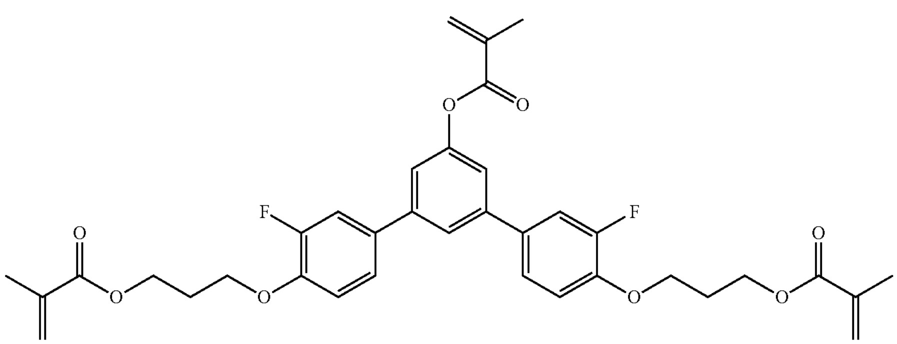 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-102
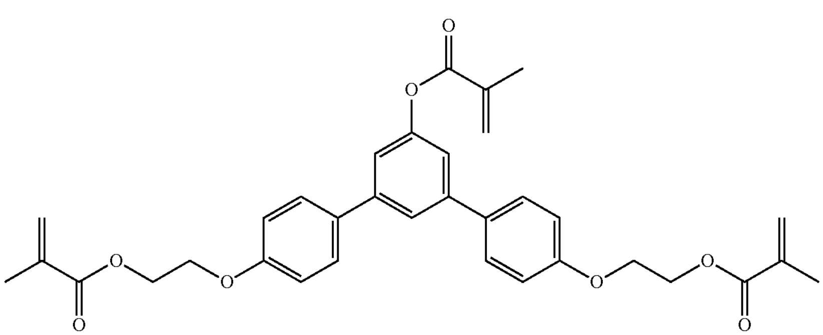 [SMILES: C=C(C)C(=O)OCCOc1ccc(-c2cc(OC(=O)C(=C)C)cc(-c3ccc(OCCOC(=O)C(=C)C)cc3)c2)cc1]

TABLE D-continued
RM-103
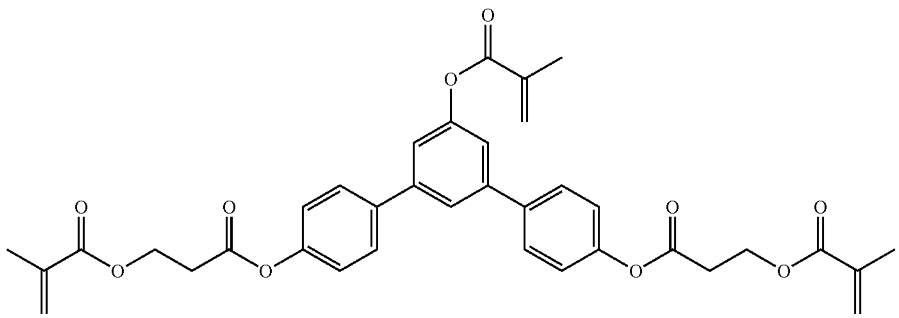 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-104
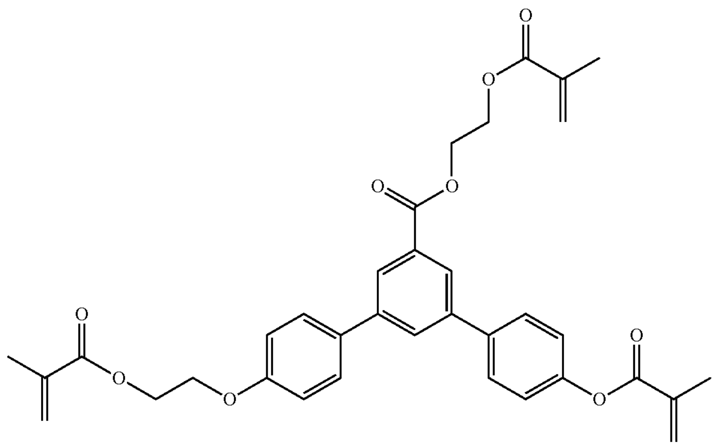 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-105
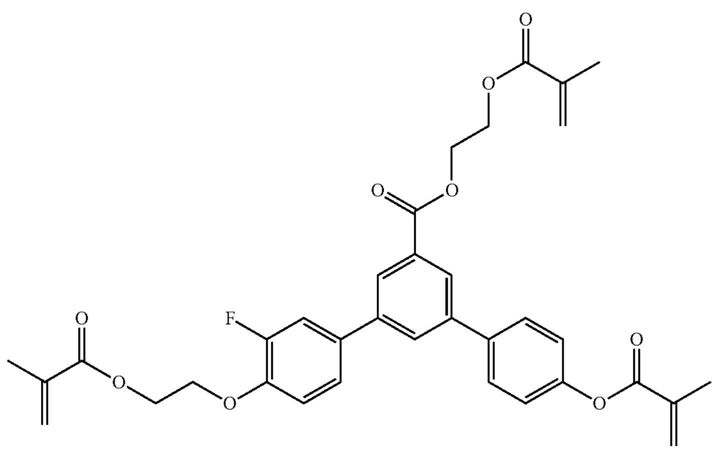 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-106
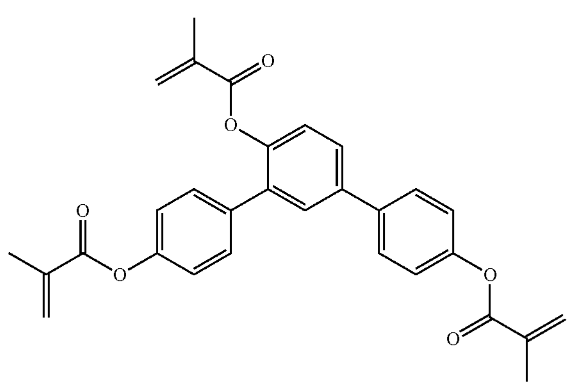 [SMILES: C=C(C)C(=O)Oc1ccc(-c2ccc(OC(=O)C(=C)C)c(-c3ccc(OC(=O)C(=C)C)cc3)c2)cc1]

TABLE D-continued
RM-107
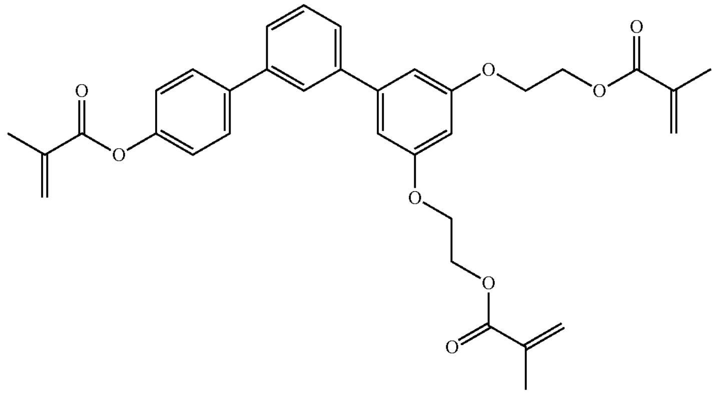 [SMILES: C=C(C)C(=O)OCCOc1cc(OCCOC(=O)C(=C)C)cc(-c2cccc(-c3ccc(OC(=O)C(=C)C)cc3)c2)c1]
RM-108
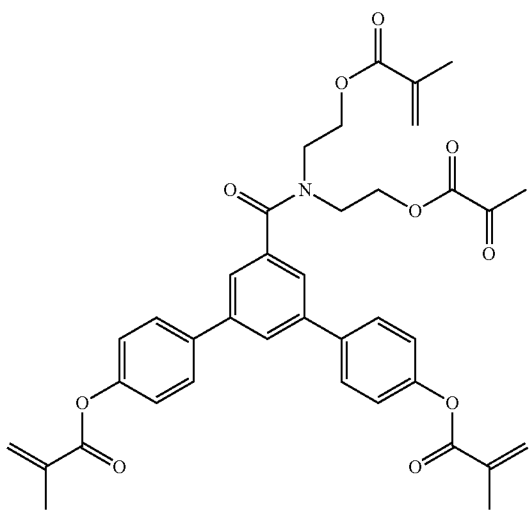 [SMILES: C=C(C)C(=O)OCCN(CCOC(=O)C(C)=O)C(=O)c1cc(-c2ccc(OC(=O)C(=C)C)cc2)cc(-c2ccc(OC(=O)C(=C)C)cc2)c1]
RM-109
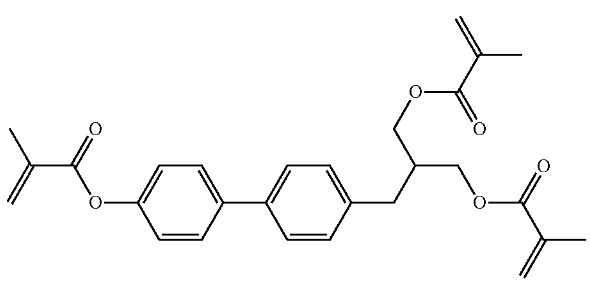 [SMILES: C=C(C)C(=O)OCC(COC(=O)C(=C)C)Cc1ccc(-c2ccc(OC(=O)C(=C)C)cc2)cc1]
RM-110
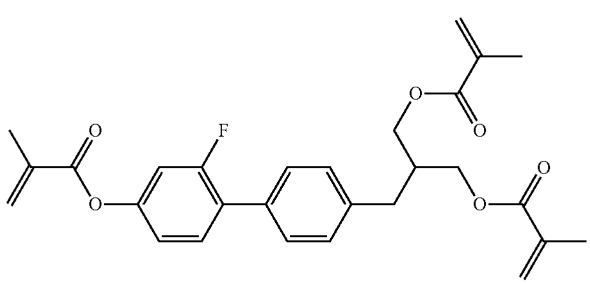 [SMILES: C=C(C)C(=O)OCC(COC(=O)C(=C)C)Cc1ccc(-c2ccc(OC(=O)C(=C)C)cc2F)cc1]

TABLE D-continued
RM-111
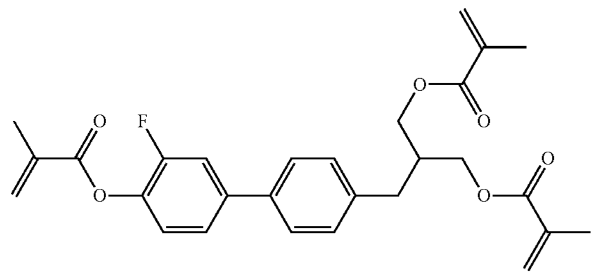 [SMILES: C=C(C)C(=O)OCC(COC(=O)C(=C)C)Cc1ccc(-c2ccc(OC(=O)C(=C)C)c(F)c2)cc1]
RM-112
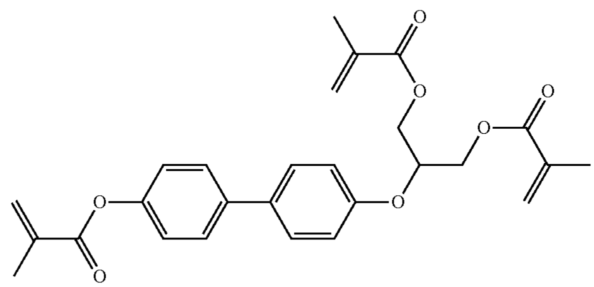 [SMILES: C=C(C)C(=O)OCC(COC(=O)C(=C)C)Oc1ccc(-c2ccc(OC(=O)C(=C)C)cc2)cc1]
RM-113
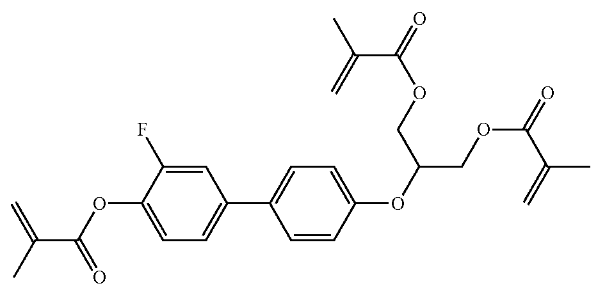 [SMILES: C=C(C)C(=O)OCC(COC(=O)C(=C)C)Oc1ccc(-c2ccc(OC(=O)C(=C)C)c(F)c2)cc1]
RM-114
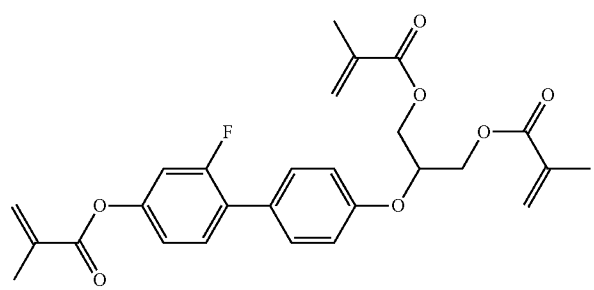 [SMILES: C=C(C)C(=O)OCC(COC(=O)C(=C)C)Oc1ccc(-c2ccc(OC(=O)C(=C)C)cc2F)cc1]
RM-115
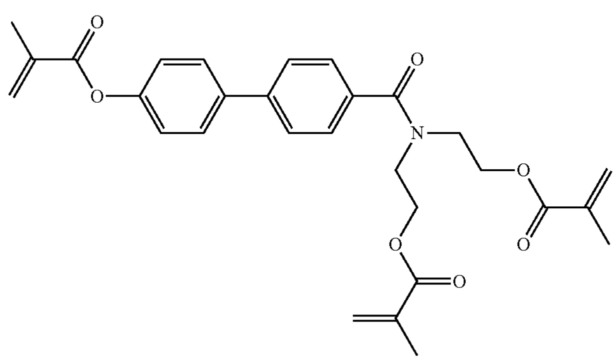 [SMILES: C=C(C)C(=O)OCCN(CCOC(=O)C(=C)C)C(=O)c1ccc(-c2ccc(OC(=O)C(=C)C)cc2)cc1]

TABLE D-continued
RM-116
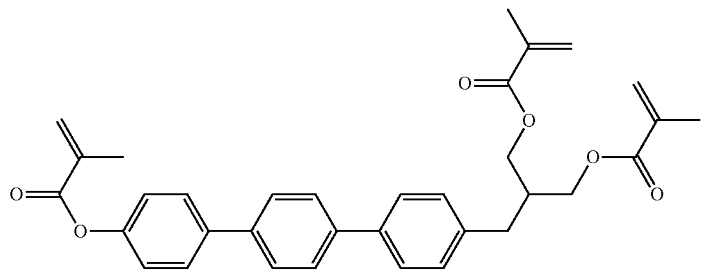 [SMILES: C=C(C)C(=O)OCC(COC(=O)C(=C)C)Cc1ccc(-c2ccc(-c3ccc(OC(=O)C(=C)C)cc3)cc2)cc1]
RM-117
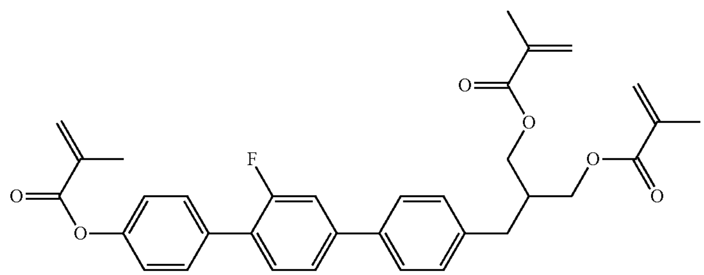 [SMILES: C=C(C)C(=O)OCC(COC(=O)C(=C)C)Cc1ccc(-c2ccc(-c3ccc(OC(=O)C(=C)C)cc3)c(F)c2)cc1]
RM-118
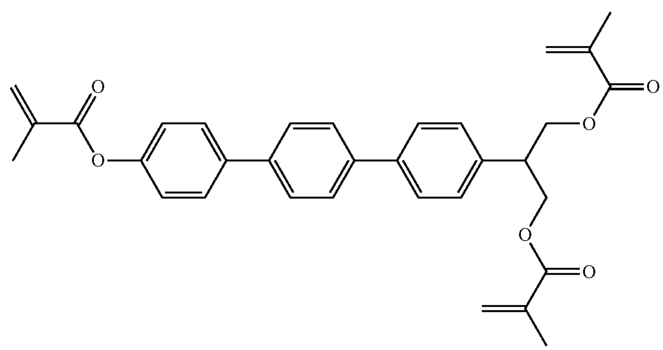 [SMILES: C=C(C)C(=O)OCC(COC(=O)C(=C)C)c1ccc(-c2ccc(-c3ccc(OC(=O)C(=C)C)cc3)cc2)cc1]
RM-119
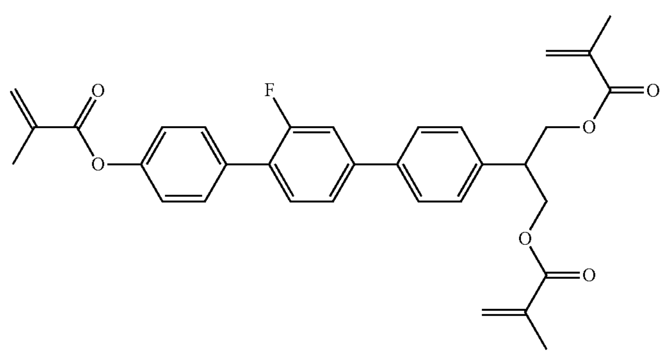 [SMILES: C=C(C)C(=O)OCC(COC(=O)C(=C)C)c1ccc(-c2ccc(-c3ccc(OC(=O)C(=C)C)cc3)c(F)c2)cc1]
RM-120
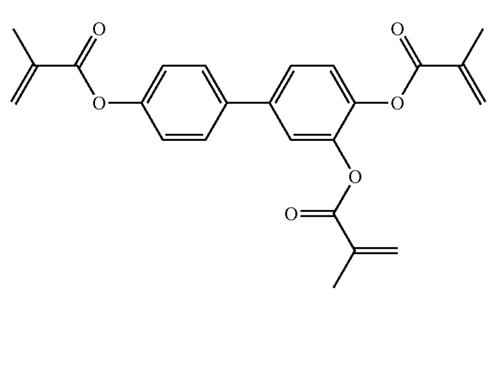 [SMILES: C=C(C)C(=O)Oc1ccc(-c2ccc(OC(=O)C(=C)C)c(OC(=O)C(=C)C)c2)cc1]

TABLE D-continued
RM-121
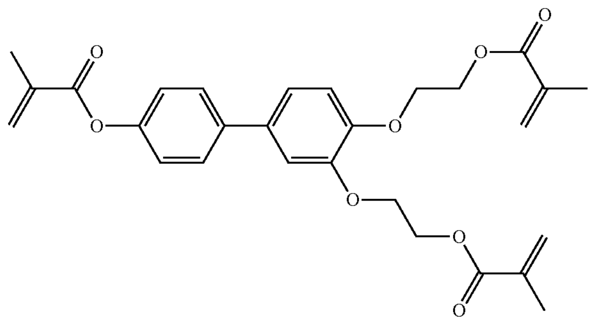 [SMILES: C=C(C)C(=O)OCCOc1ccc(-c2ccc(OC(=O)C(=C)C)cc2)cc1OCCOC(=O)C(=C)C]
RM-122
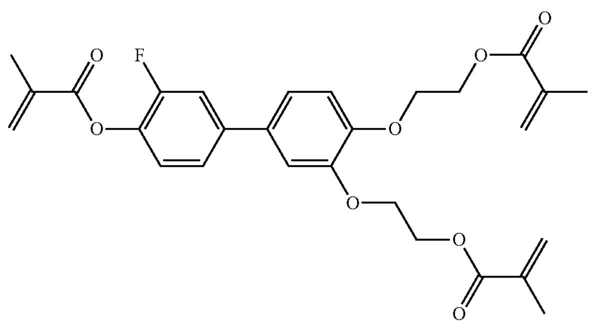 [SMILES: C=C(C)C(=O)OCCOc1ccc(-c2ccc(OC(=O)C(=C)C)c(F)c2)cc1OCCOC(=O)C(=C)C]
RM-123
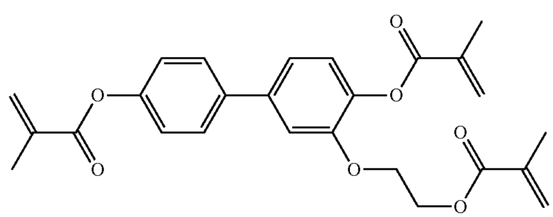 [SMILES: C=C(C)C(=O)OCCOc1cc(-c2ccc(OC(=O)C(=C)C)cc2)ccc1OC(=O)C(=C)C]
RM-124
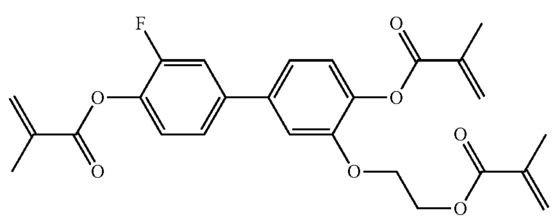 [SMILES: C=C(C)C(=O)OCCOc1cc(-c2ccc(OC(=O)C(=C)C)c(F)c2)ccc1OC(=O)C(=C)C]
RM-125
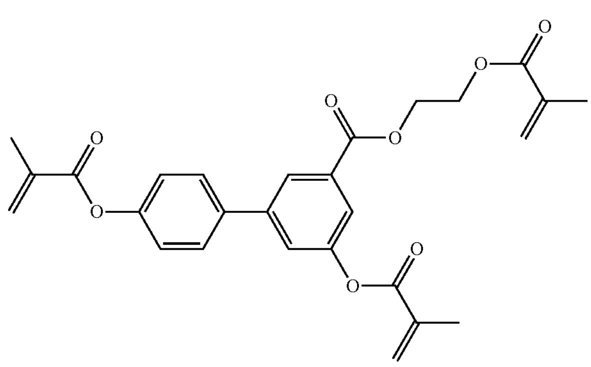 [SMILES: C=C(C)C(=O)OCCOC(=O)c1cc(OC(=O)C(=C)C)cc(-c2ccc(OC(=O)C(=C)C)cc2)c1]

TABLE D-continued
RM-126
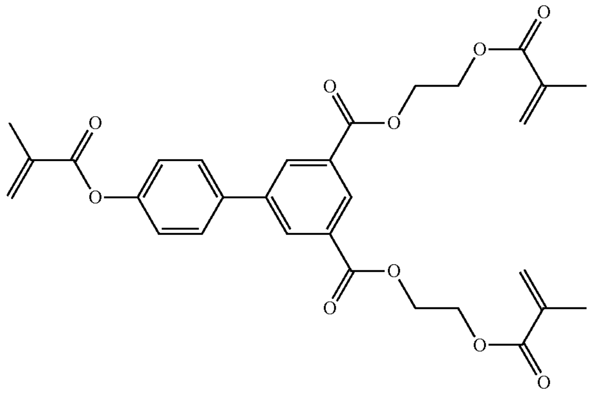 [SMILES: C=C(C)C(=O)OCCOC(=O)c1cc(C(=O)OCCOC(=O)C(=C)C)cc(-c2ccc(OC(=O)C(=C)C)cc2)c1]
RM-127
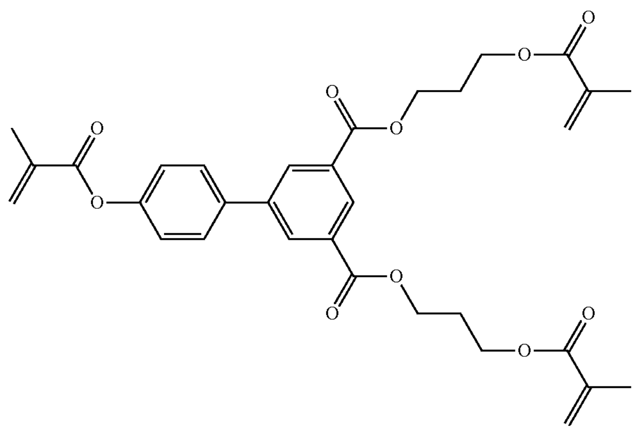 [SMILES: C=C(C)C(=O)OCCCOC(=O)c1cc(C(=O)OCCCOC(=O)C(=C)C)cc(-c2ccc(OC(=O)C(=C)C)cc2)c1]
RM-128
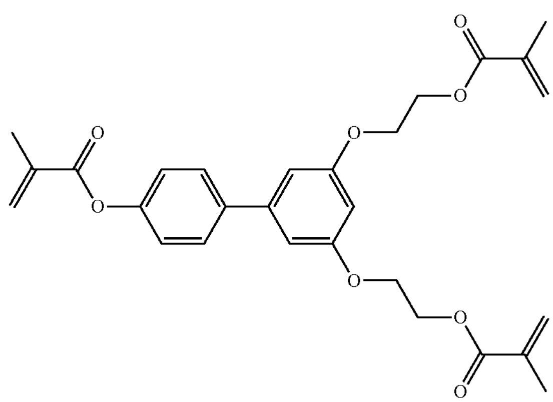 [SMILES: C=C(C)C(=O)OCCOc1cc(OCCOC(=O)C(=C)C)cc(-c2ccc(OC(=O)C(=C)C)cc2)c1]
RM-129
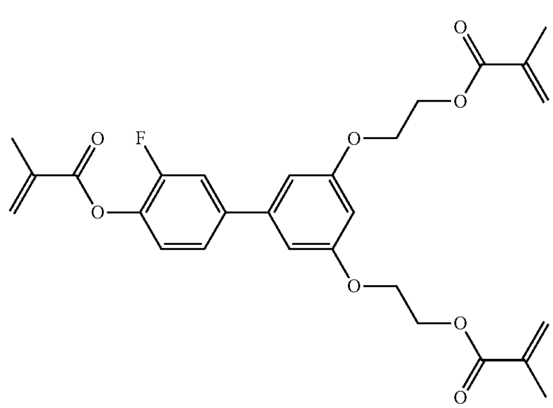 [SMILES: C=C(C)C(=O)OCCOc1cc(OCCOC(=O)C(=C)C)cc(-c2ccc(OC(=O)C(=C)C)c(F)c2)c1]

TABLE D-continued
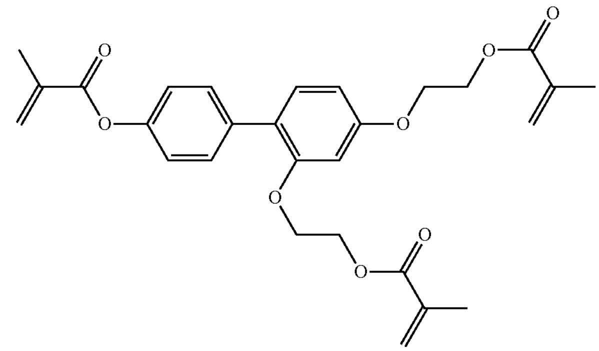 [SMILES: C=C(C)C(=O)OCCOc1ccc(-c2ccc(OC(=O)C(=C)C)cc2)c(OCCOC(=O)C(=C)C)c1]
RM-130
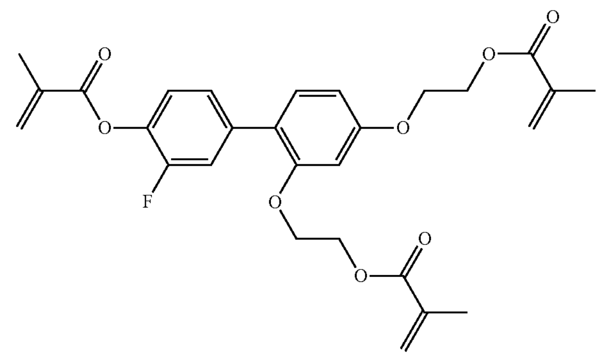 [SMILES: C=C(C)C(=O)OCCOc1ccc(-c2ccc(OC(=O)C(=C)C)c(F)c2)c(OCCOC(=O)C(=C)C)c1]
RM-131
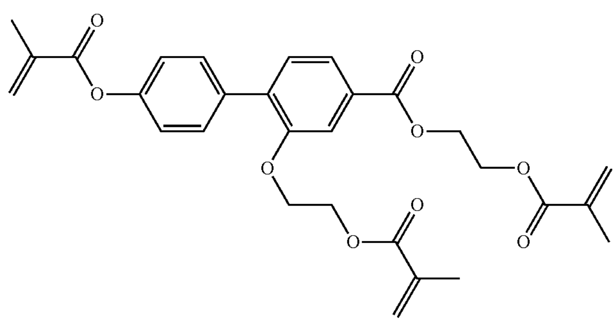 [SMILES: C=C(C)C(=O)OCCOC(=O)c1ccc(-c2ccc(OC(=O)C(=C)C)cc2)c(OCCOC(=O)C(=C)C)c1]
RM-132
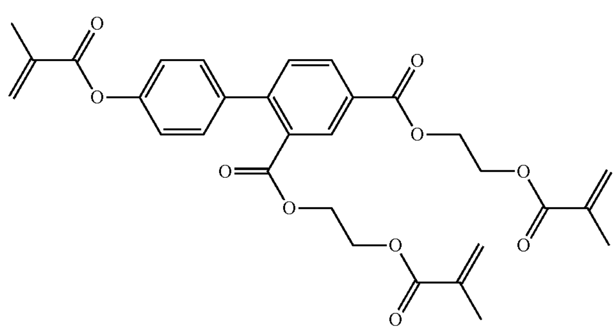 [SMILES: C=C(C)C(=O)OCCOC(=O)c1ccc(-c2ccc(OC(=O)C(=C)C)cc2)c(C(=O)OCCOC(=O)C(=C)C)c1]
RM-133
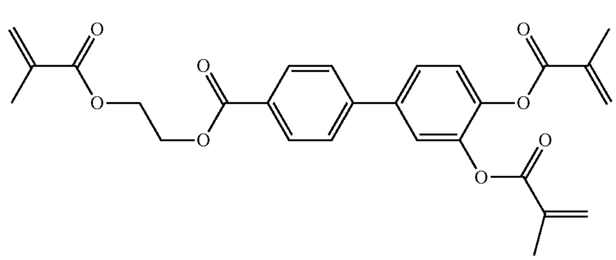 [SMILES: C=C(C)C(=O)OCCOC(=O)c1ccc(-c2ccc(OC(=O)C(=C)C)c(OC(=O)C(=C)C)c2)cc1]
RM-134

TABLE D-continued
RM-135
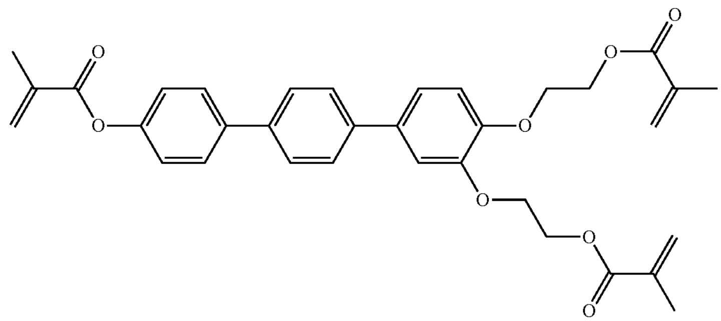 [SMILES: C=C(C)C(=O)OCCOc1ccc(-c2ccc(-c3ccc(OC(=O)C(=C)C)cc3)cc2)cc1OCCOC(=O)C(=C)C]
RM-136
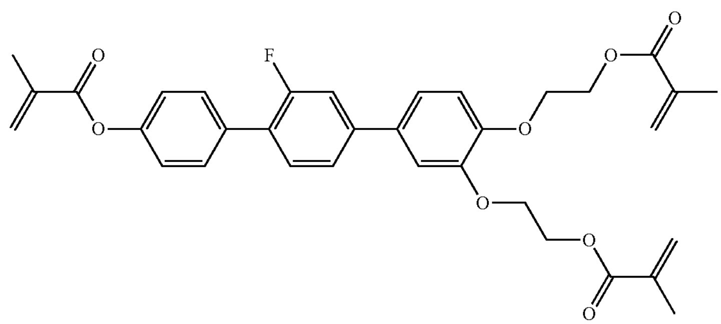 [SMILES: C=C(C)C(=O)OCCOc1ccc(-c2ccc(-c3ccc(OC(=O)C(=C)C)cc3)c(F)c2)cc1OCCOC(=O)C(=C)C]
RM-137
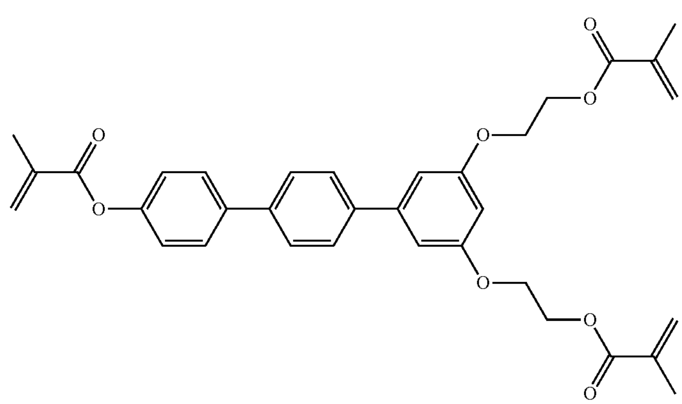 [SMILES: C=C(C)C(=O)OCCOc1cc(OCCOC(=O)C(=C)C)cc(-c2ccc(-c3ccc(OC(=O)C(=C)C)cc3)cc2)c1]
RM-138
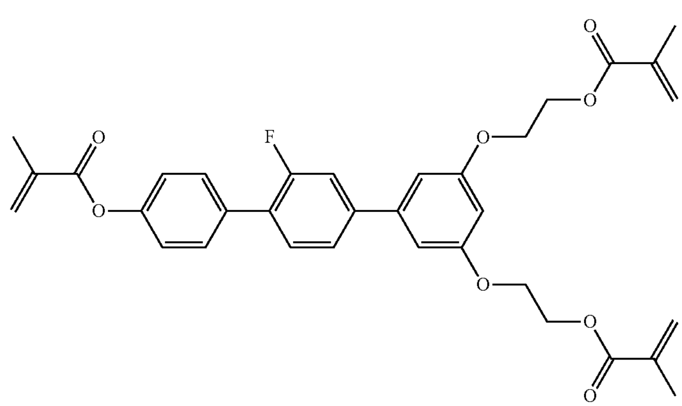 [SMILES: C=C(C)C(=O)OCCOc1cc(OCCOC(=O)C(=C)C)cc(-c2ccc(-c3ccc(OC(=O)C(=C)C)cc3)c(F)c2)c1]

TABLE D-continued
RM-139
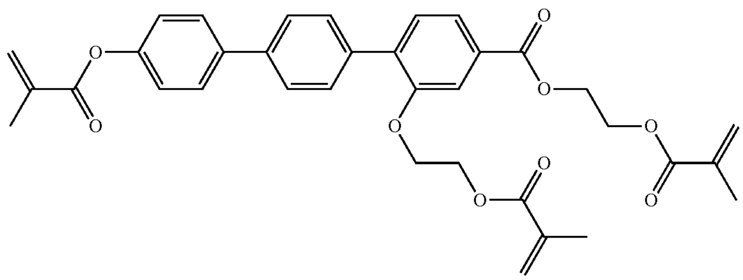 [SMILES: C=C(C)C(=O)OCCOC(=O)c1ccc(-c2ccc(-c3ccc(OC(=O)C(=C)C)cc3)cc2)c(OCCOC(=O)C(=C)C)c1]
RM-140
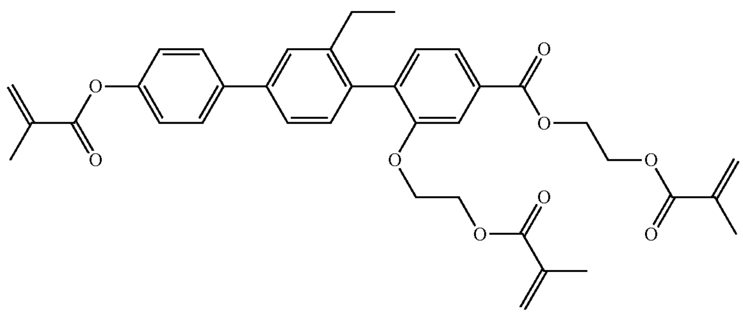 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-141
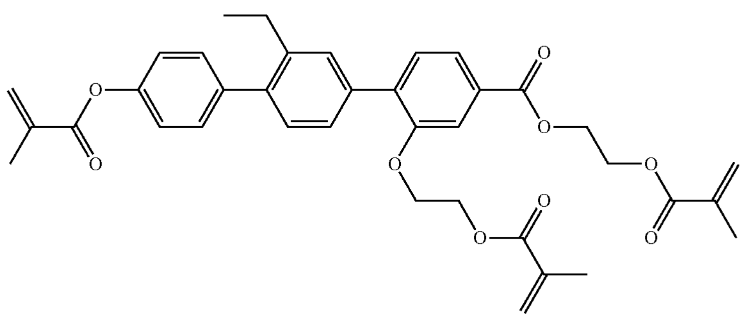 [SMILES: C=C(C)C(=O)OCCOC(=O)c1ccc(-c2ccc(-c3ccc(OC(=O)C(=C)C)cc3)c(CC)c2)c(OCCOC(=O)C(=C)C)c1]
RM-142
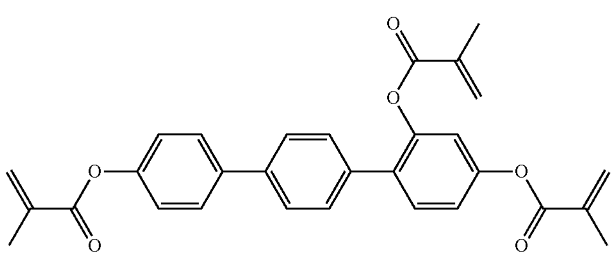 [SMILES: C=C(C)C(=O)Oc1ccc(-c2ccc(-c3ccc(OC(=O)C(=C)C)cc3OC(=O)C(=C)C)cc2)cc1]
RM-143
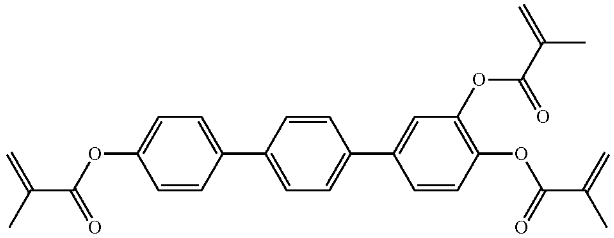 [SMILES: C=C(C)C(=O)Oc1ccc(-c2ccc(-c3ccc(OC(=O)C(=C)C)c(OC(=O)C(=C)C)c3)cc2)cc1]

TABLE D-continued
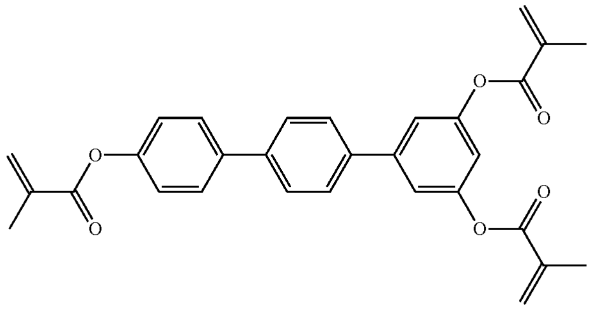 [SMILES: C=C(C)C(=O)Oc1ccc(-c2ccc(-c3cc(OC(=O)C(=C)C)cc(OC(=O)C(=C)C)c3)cc2)cc1]
RM-144
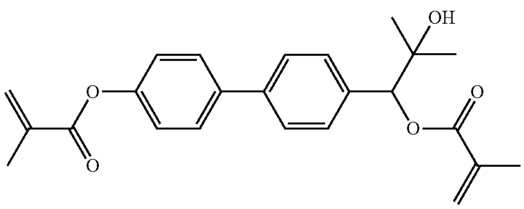 [SMILES: C=C(C)C(=O)Oc1ccc(-c2ccc(C(OC(=O)C(=C)C)C(C)(C)O)cc2)cc1]
RM-145
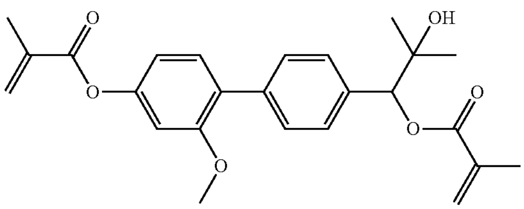 [SMILES: C=C(C)C(=O)Oc1ccc(-c2ccc(C(OC(=O)C(=C)C)C(C)(C)O)cc2)c(OC)c1]
RM-146
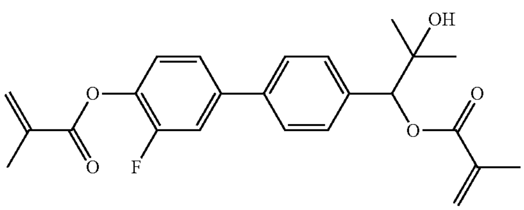 [SMILES: C=C(C)C(=O)Oc1ccc(-c2ccc(C(OC(=O)C(=C)C)C(C)(C)O)cc2)cc1F]
RM-147
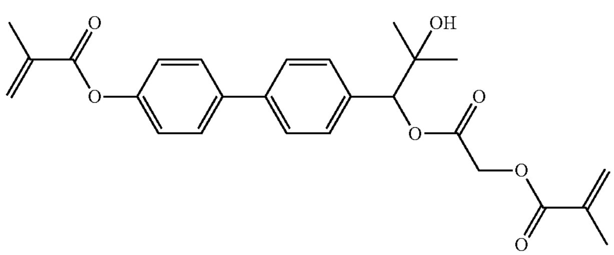 [SMILES: C=C(C)C(=O)OCC(=O)OC(c1ccc(-c2ccc(OC(=O)C(=C)C)cc2)cc1)C(C)(C)O]
RM-148
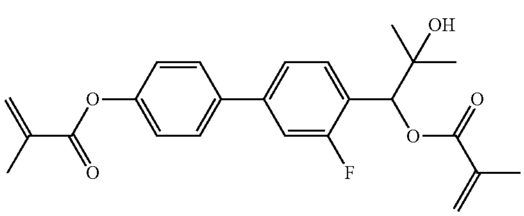 [SMILES: C=C(C)C(=O)Oc1ccc(-c2ccc(C(OC(=O)C(=C)C)C(C)(C)O)c(F)c2)cc1]
RM-149
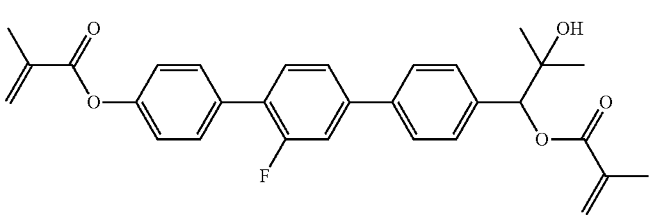 [SMILES: C=C(C)C(=O)Oc1ccc(-c2ccc(-c3ccc(C(OC(=O)C(=C)C)C(C)(C)O)cc3)cc2F)cc1]
RM-150

TABLE D-continued
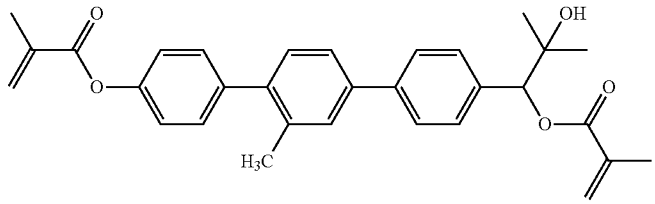 [SMILES: C=C(C)C(=O)Oc1ccc(-c2ccc(-c3ccc(C(OC(=O)C(=C)C)C(C)(C)O)cc3)cc2C)cc1]
RM-151
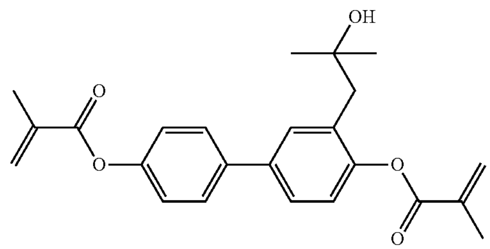 [SMILES: C=C(C)C(=O)Oc1ccc(-c2ccc(OC(=O)C(=C)C)c(CC(C)(C)O)c2)cc1]
RM-152
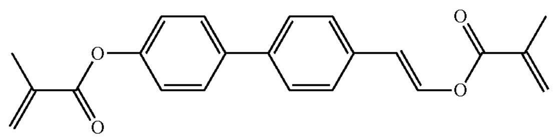 [SMILES: C=C(C)C(=O)O/C=C/c1ccc(-c2ccc(OC(=O)C(=C)C)cc2)cc1]
RM-153
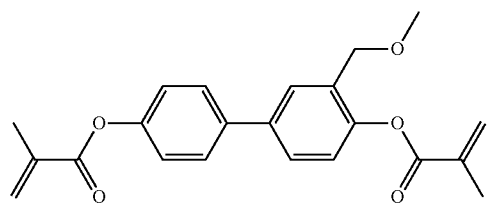 [SMILES: C=C(C)C(=O)Oc1ccc(-c2ccc(OC(=O)C(=C)C)c(COC)c2)cc1]
RM-154
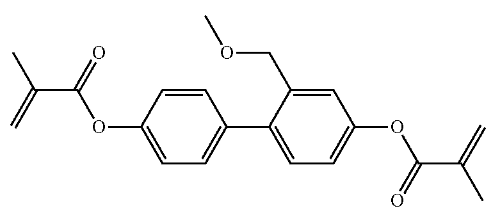 [SMILES: C=C(C)C(=O)Oc1ccc(-c2ccc(OC(=O)C(=C)C)cc2COC)cc1]
RM-155
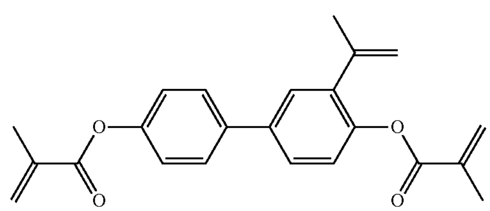 [SMILES: C=C(C)C(=O)Oc1ccc(-c2ccc(OC(=O)C(=C)C)c(C(=C)C)c2)cc1]
RM-156
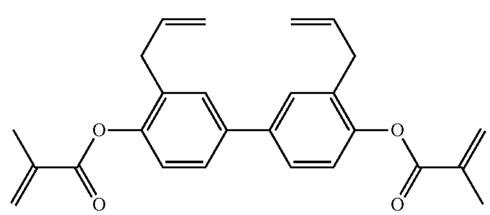 [SMILES: C=CCc1cc(-c2ccc(OC(=O)C(=C)C)c(CC=C)c2)ccc1OC(=O)C(=C)C]
RM-157
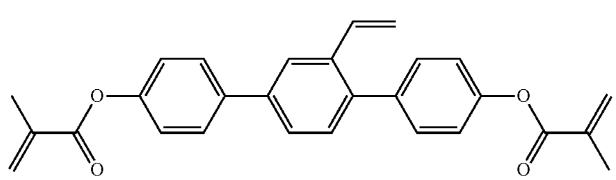 [SMILES: C=Cc1cc(-c2ccc(OC(=O)C(=C)C)cc2)ccc1-c1ccc(OC(=O)C(=C)C)cc1]
RM-158

TABLE D-continued
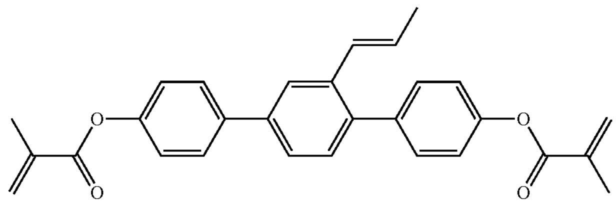 [SMILES: C=C(C)C(=O)Oc1ccc(-c2ccc(-c3ccc(OC(=O)C(=C)C)cc3)c(/C=C/C)c2)cc1]
RM-159
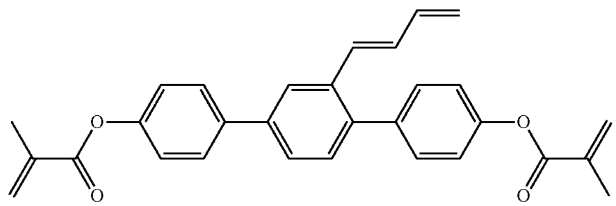 [SMILES: C=C/C=C/c1cc(-c2ccc(OC(=O)C(=C)C)cc2)ccc1-c1ccc(OC(=O)C(=C)C)cc1]
RM-160
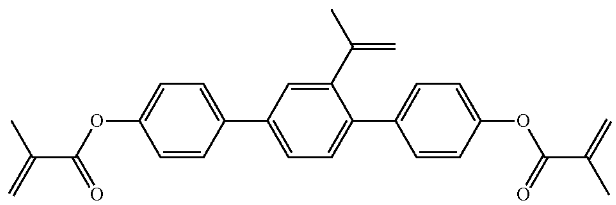 [SMILES: C=C(C)C(=O)Oc1ccc(-c2ccc(-c3ccc(OC(=O)C(=C)C)cc3)c(C(=C)C)c2)cc1]
RM-161
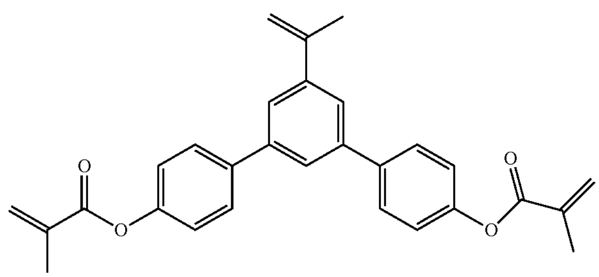 [SMILES: C=C(C)C(=O)Oc1ccc(-c2cc(C(=C)C)cc(-c3ccc(OC(=O)C(=C)C)cc3)c2)cc1]
RM-162
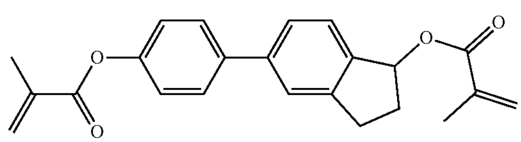 [SMILES: C=C(C)C(=O)Oc1ccc(-c2ccc3c(c2)CCC3OC(=O)C(=C)C)cc1]
RM-163
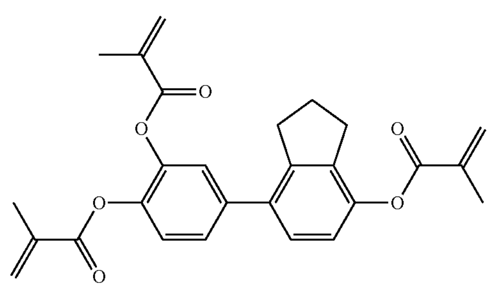 [SMILES: C=C(C)C(=O)Oc1ccc(-c2ccc(OC(=O)C(=C)C)c3c2CCC3)cc1OC(=O)C(=C)C]
RM-164
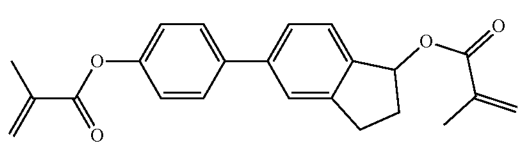 [SMILES: C=C(C)C(=O)Oc1ccc(-c2ccc3c(c2)CCC3OC(=O)C(=C)C)cc1]
RM-165

TABLE D-continued
RM-166
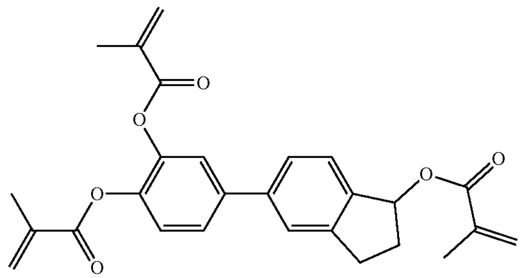 [SMILES: C=C(C)C(=O)Oc1ccc(-c2ccc3c(c2)CCC3OC(=O)C(=C)C)cc1OC(=O)C(=C)C]
RM-167
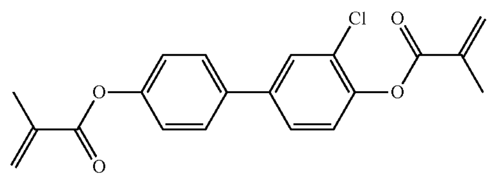
RM-168
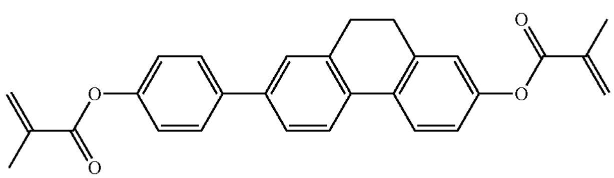 [SMILES: C=C(C)C(=O)Oc1ccc(-c2ccc3c(c2)CCc2cc(OC(=O)C(=C)C)ccc2-3)cc1]
RM-169
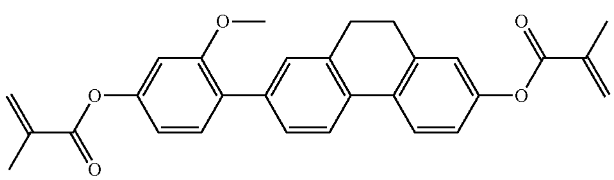 [SMILES: C=C(C)C(=O)Oc1ccc2c(c1)CCc1cc(-c3ccc(OC(=O)C(=C)C)cc3OC)ccc1-2]
RM-170
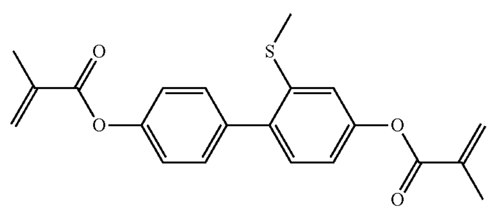 [SMILES: C=C(C)C(=O)Oc1ccc(-c2ccc(OC(=O)C(=C)C)cc2SC)cc1]
RM-171
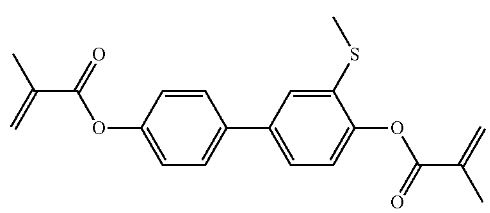 [SMILES: C=C(C)C(=O)Oc1ccc(-c2ccc(OC(=O)C(=C)C)c(SC)c2)cc1]
RM-172
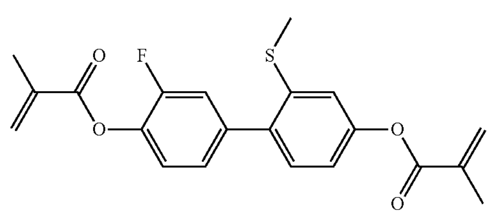 [SMILES: C=C(C)C(=O)Oc1ccc(-c2ccc(OC(=O)C(=C)C)c(F)c2)c(SC)c1]

TABLE D-continued
RM-173
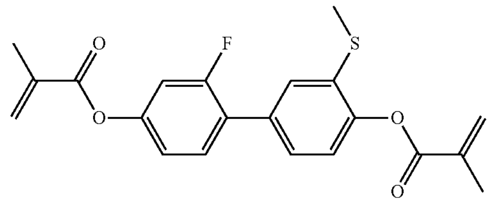 [SMILES: C=C(C)C(=O)Oc1ccc(-c2ccc(OC(=O)C(=C)C)c(SC)c2)c(F)c1]
RM-174
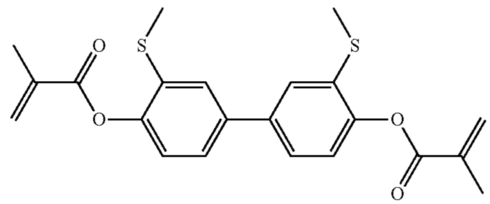 [SMILES: C=C(C)C(=O)Oc1ccc(-c2ccc(OC(=O)C(=C)C)c(SC)c2)cc1SC]
RM-175
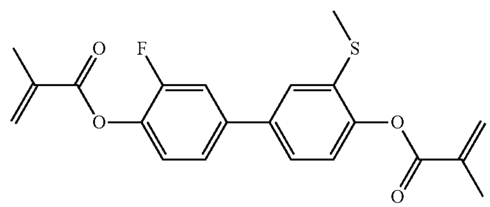 [SMILES: C=C(C)C(=O)Oc1ccc(-c2ccc(OC(=O)C(=C)C)c(SC)c2)cc1F]
RM-176
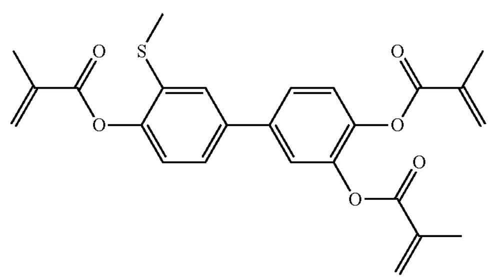 [SMILES: C=C(C)C(=O)Oc1ccc(-c2ccc(OC(=O)C(=C)C)c(SC)c2)cc1OC(=O)C(=C)C]
RM-177
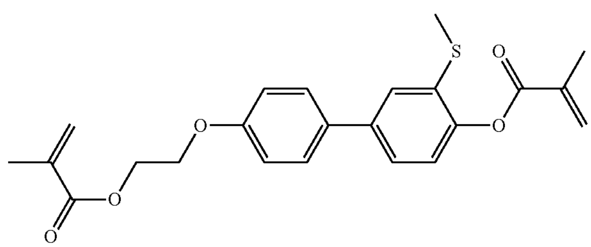 [SMILES: C=C(C)C(=O)OCCOc1ccc(-c2ccc(OC(=O)C(=C)C)c(SC)c2)cc1]
RM-178
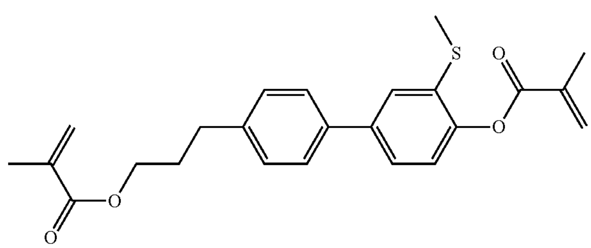 [SMILES: C=C(C)C(=O)OCCCc1ccc(-c2ccc(OC(=O)C(=C)C)c(SC)c2)cc1]
RM-179
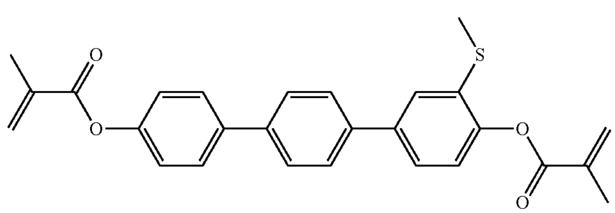 [SMILES: C=C(C)C(=O)Oc1ccc(-c2ccc(-c3ccc(OC(=O)C(=C)C)c(SC)c3)cc2)cc1]

TABLE D-continued

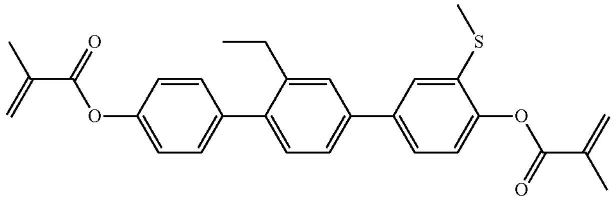 [SMILES: C=C(C)C(=O)Oc1ccc(-c2ccc(-c3ccc(OC(=O)C(=C)C)c(SC)c3)cc2CC)cc1]
RM-180

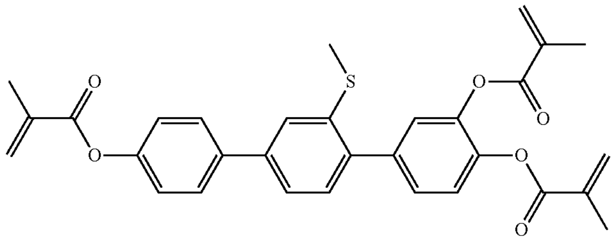 [SMILES: C=C(C)C(=O)Oc1ccc(-c2ccc(-c3ccc(OC(=O)C(=C)C)c(OC(=O)C(=C)C)c3)c(SC)c2)cc1]
RM-181

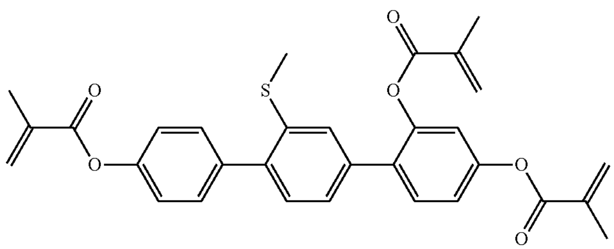 [SMILES: C=C(C)C(=O)Oc1ccc(-c2ccc(-c3ccc(OC(=O)C(=C)C)cc3OC(=O)C(=C)C)cc2SC)cc1]
RM-182

Table D shows illustrative reactive mesogenic compounds which can be used in the LC media in accordance with the present invention.

In a preferred embodiment, the mixtures according to the invention comprise one or more polymerizable compounds, preferably selected from the polymerizable compounds of the formulae RM-1 to RM-182. Of these, compounds RM-1, RM-4, RM-8, RM-17, RM-19, RM-35, RM-37, RM-39, RM-40, RM-41, RM-48, RM-52, RM-54, RM-57, RM-58, RM-64, RM-74, RM-76, RM-88, RM-91, RM-102, RM-103, RM-109, RM-116, RM-117, RM-120, RM-121, RM-122, RM-139, RM-140, RM-142, RM-143, RM-145, RM-146, RM-147, RM-149, RM-156 to RM-162, RM-168, RM-169 and RM-170 to RM-182 are particularly preferred.

TABLE E

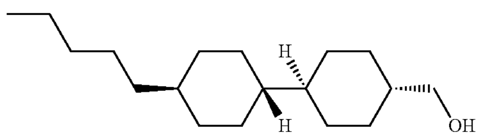 [SMILES: CCCCC[C@H]1CC[C@H]([C@H]2CC[C@H](CO)CC2)CC1]
SA-1

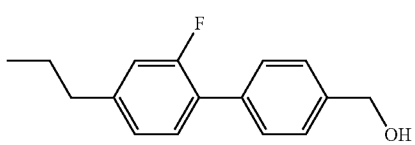 [SMILES: CCCc1ccc(-c2ccc(CO)cc2)c(F)c1]
SA-2

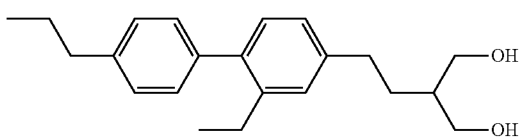 [SMILES: CCCc1ccc(-c2ccc(CCC(CO)CO)cc2CC)cc1]
SA-3

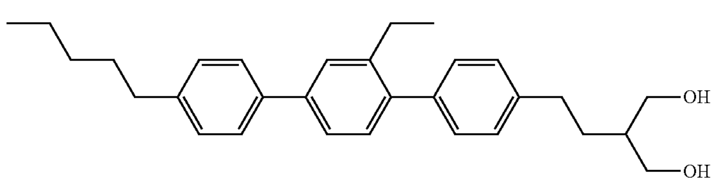 [SMILES: CCCCCc1ccc(-c2ccc(-c3ccc(CCC(CO)CO)cc3)c(CC)c2)cc1]
SA-4

TABLE E-continued
SA-5
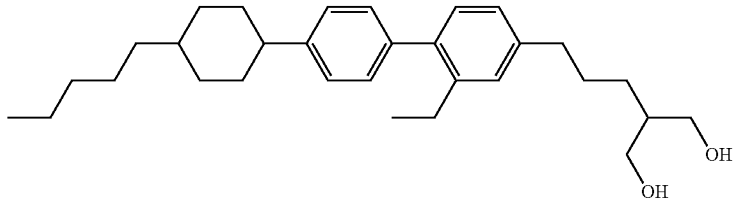 [SMILES: CCCCCC1CCC(c2ccc(-c3ccc(CCCC(CO)CO)cc3CC)cc2)CC1]
SA-6
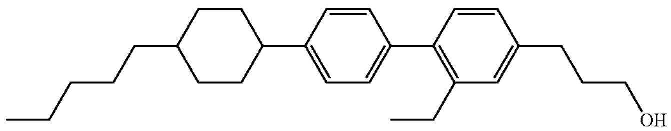 [SMILES: CCCCCC1CCC(c2ccc(-c3ccc(CCCO)cc3CC)cc2)CC1]
SA-7
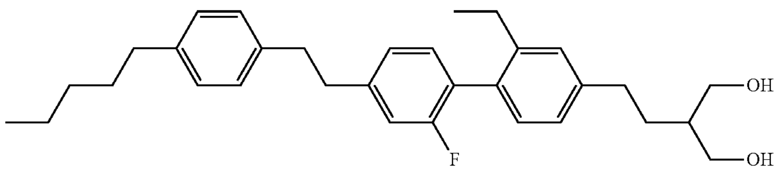 [SMILES: CCCCCc1ccc(CCc2ccc(-c3ccc(CCC(CO)CO)cc3CC)c(F)c2)cc1]
SA-8
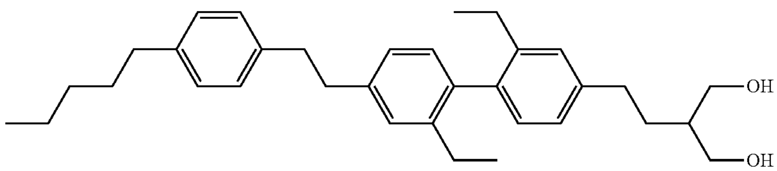 [SMILES: CCCCCc1ccc(CCc2ccc(-c3ccc(CCC(CO)CO)cc3CC)c(CC)c2)cc1]
SA-9
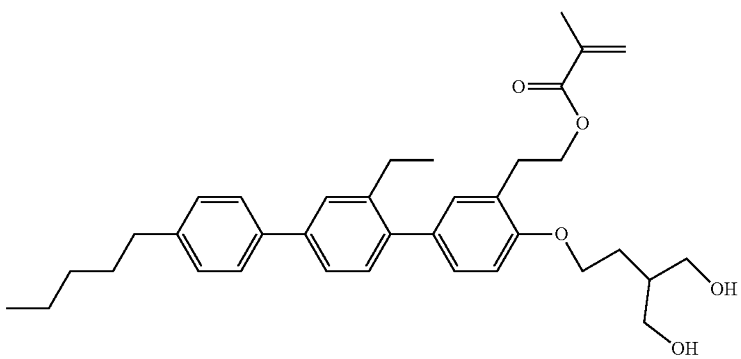 [SMILES: C=C(C)C(=O)OCCc1cc(-c2ccc(-c3ccc(CCCCC)cc3)cc2CC)ccc1OCCC(CO)CO]
SA-10
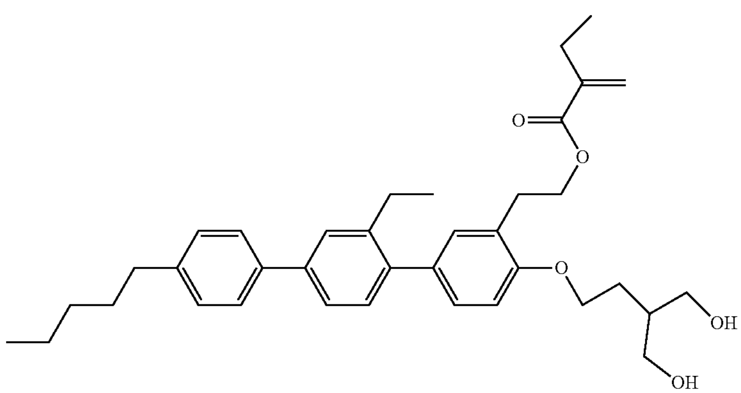 [SMILES: C=C(CC)C(=O)OCCc1cc(-c2ccc(-c3ccc(CCCCC)cc3)cc2CC)ccc1OCCC(CO)CO]
SA-11
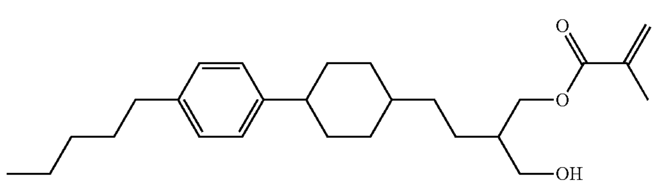 [SMILES: C=C(C)C(=O)OCC(CO)CCC1CCC(c2ccc(CCCCC)cc2)CC1]

TABLE E-continued
SA-12
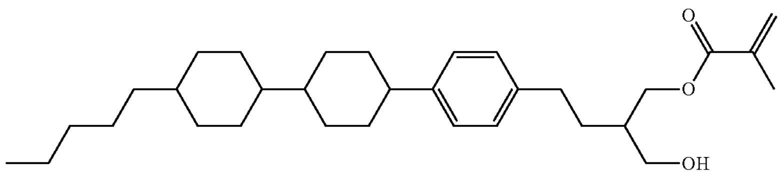 [SMILES: C=C(C)C(=O)OCC(CO)CCc1ccc(C2CCC(C3CCC(CCCCC)CC3)CC2)cc1]
SA-13
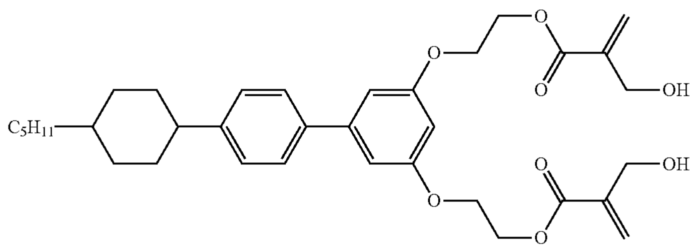
SA-14
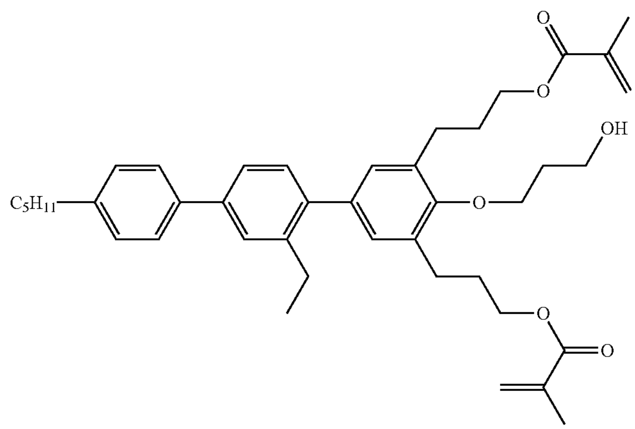
SA-15
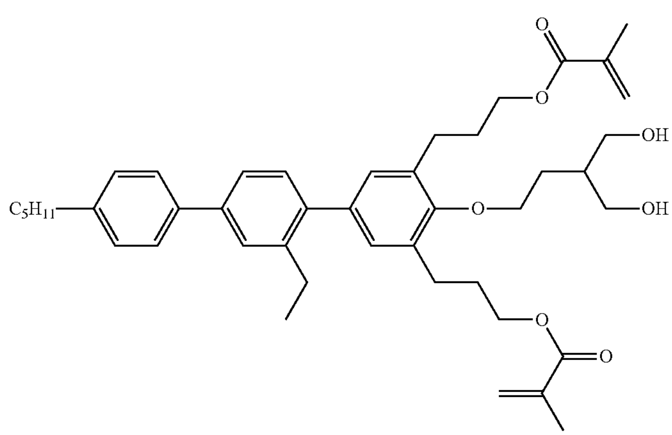

TABLE E-continued
SA-16
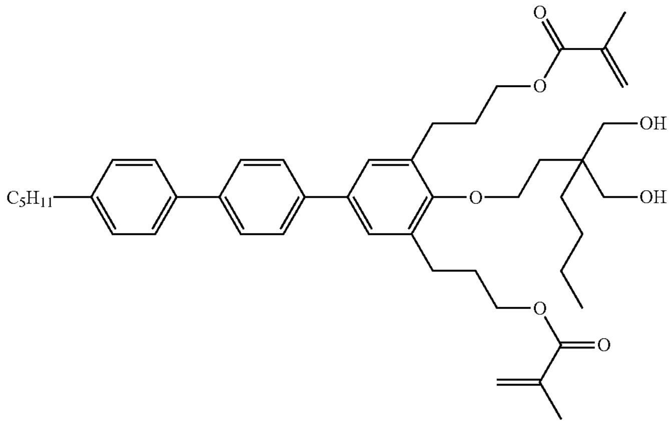
SA-17
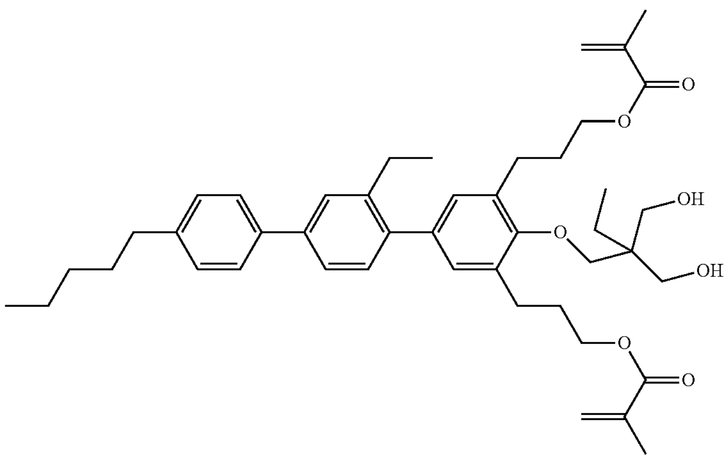 [SMILES: C=C(C)C(=O)OCCCc1cc(-c2ccc(-c3ccc(CCCCC)cc3)cc2CC)cc(CCCOC(=O)C(=C)C)c1OCC(CC)(CO)CO]
SA-18
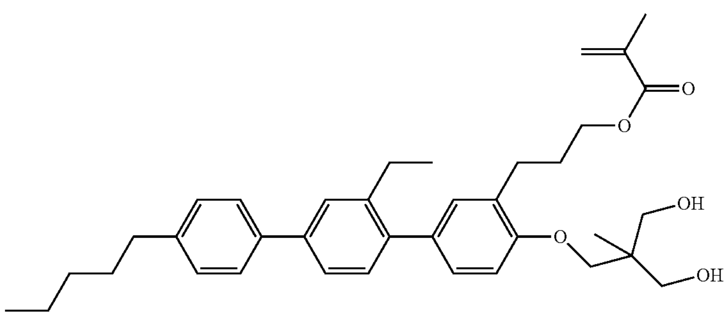 [SMILES: C=C(C)C(=O)OCCCc1cc(-c2ccc(-c3ccc(CCCCC)cc3)cc2CC)ccc1OCC(C)(CO)CO]
SA-19
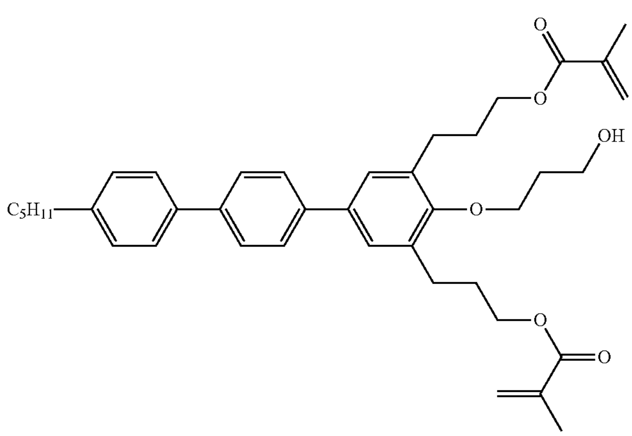

TABLE E-continued
SA-20
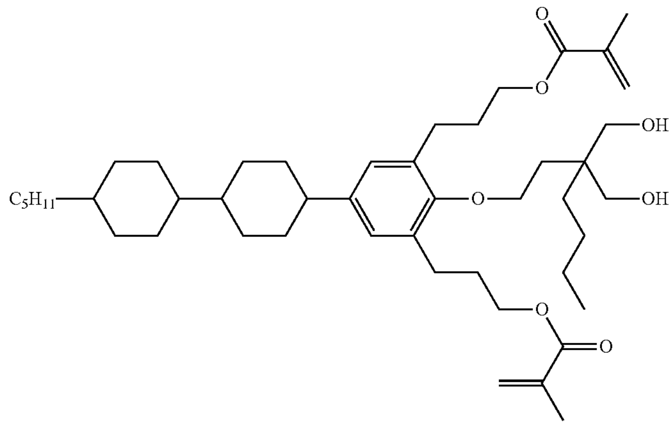
SA-21
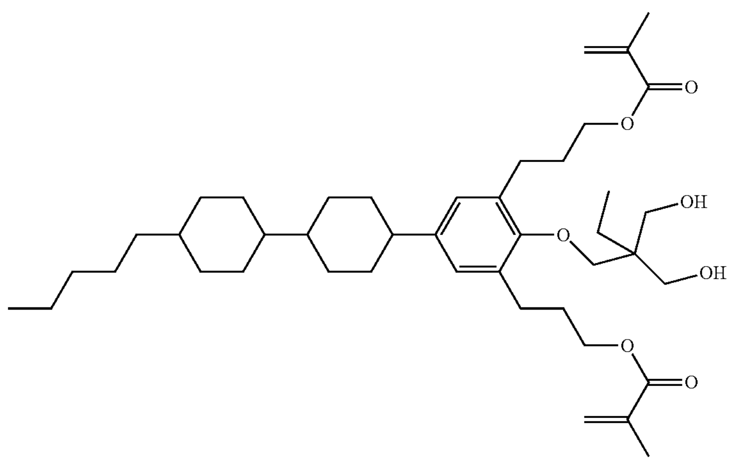 [SMILES: C=C(C)C(=O)OCCCc1cc(C2CCC(C3CCC(CCCCC)CC3)CC2)cc(CCCOC(=O)C(=C)C)c1OCC(CC)(CO)CO]
SA-22
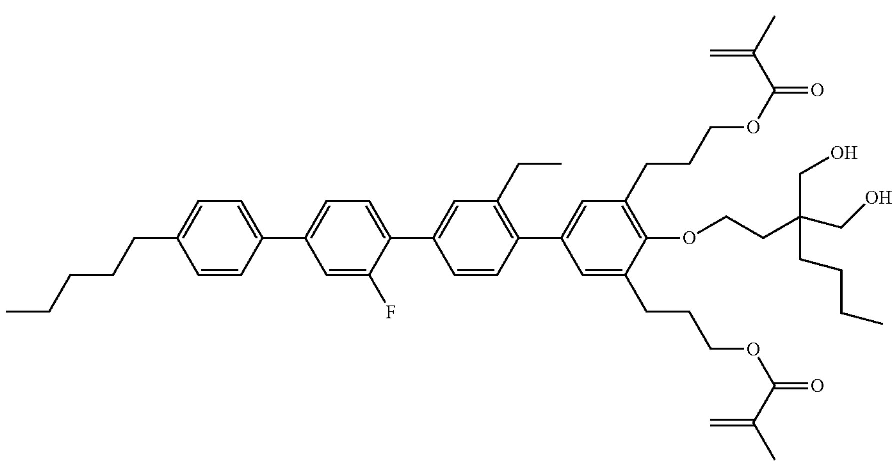 [SMILES: C=C(C)C(=O)OCCCc1cc(-c2ccc(-c3ccc(-c4ccc(CCCCC)cc4)cc3F)cc2CC)cc(CCCOC(=O)C(=C)C)c1OCCC(CO)(CO)CCCC]

TABLE E-continued
SA-23
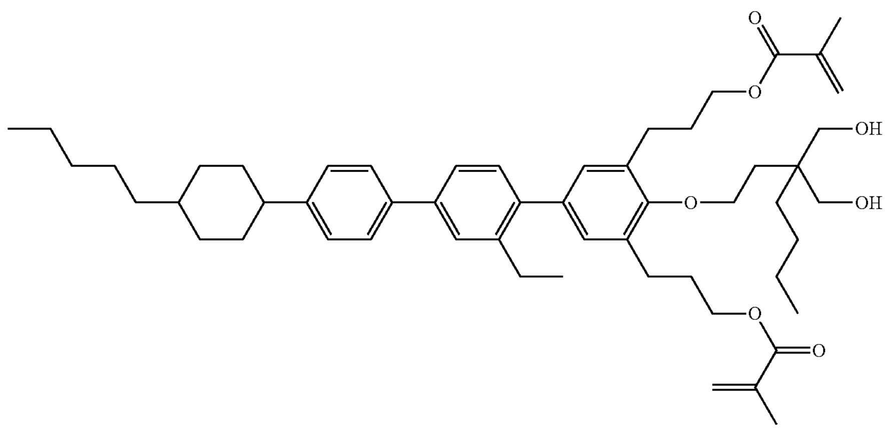 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCC]
SA-24
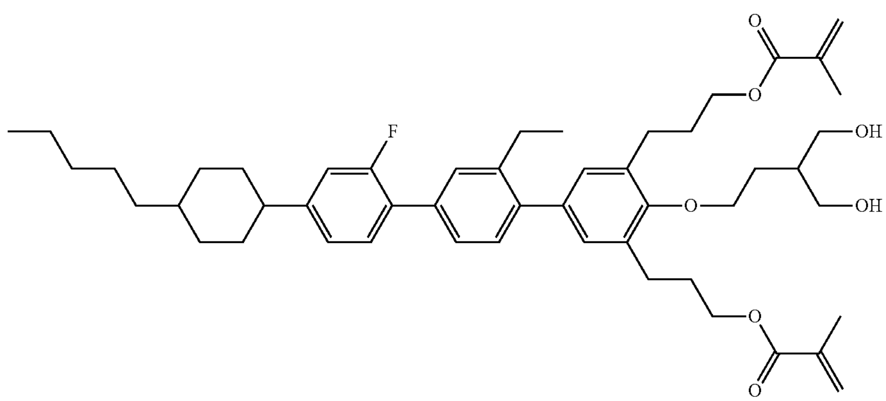 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)CO]
SA-25
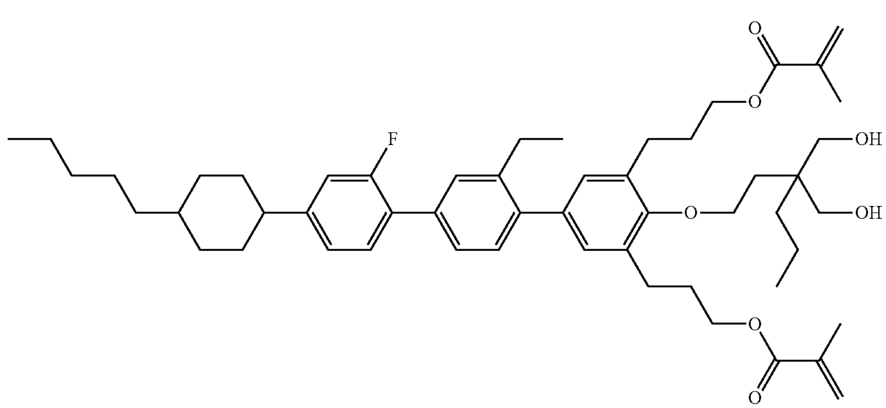 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCC]

TABLE E-continued
SA-26
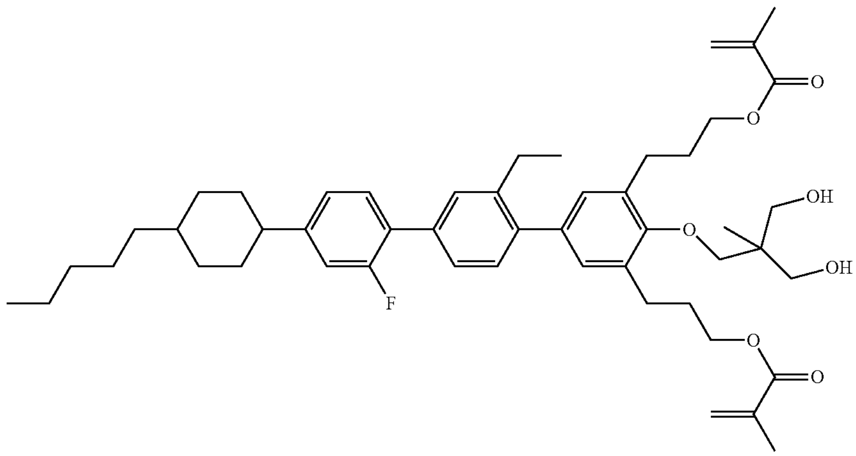 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(C)(CO)CO]
SA-27
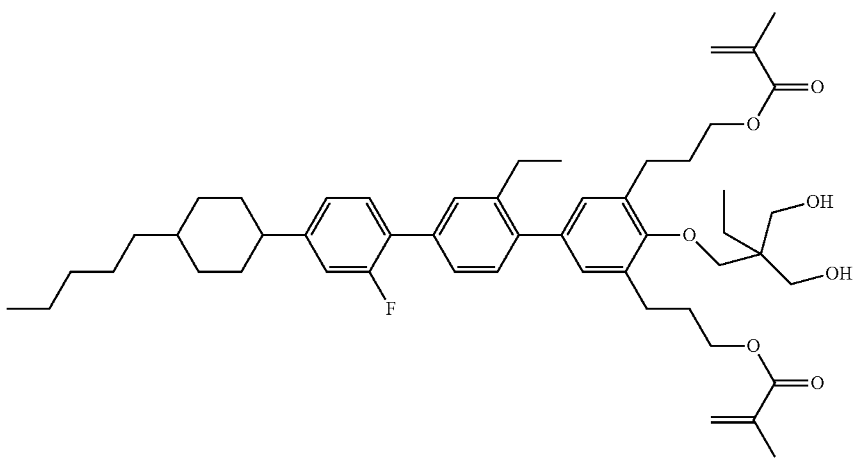 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(CC)(CO)CO]
SA-28
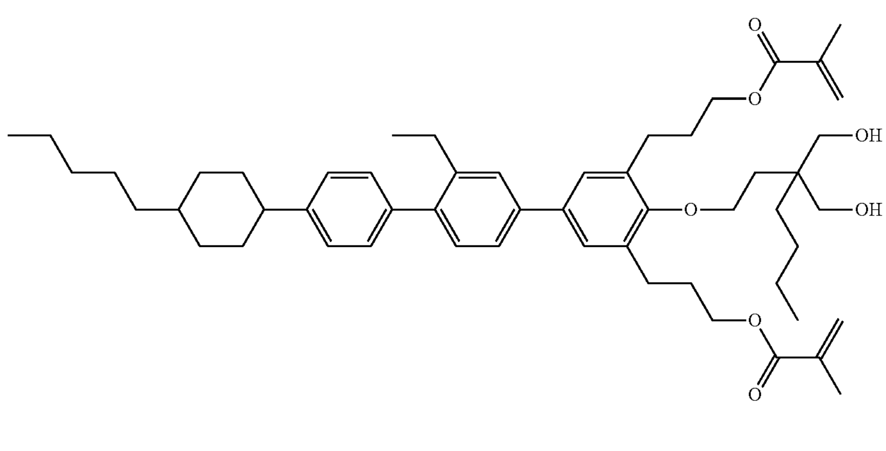 [SMILES: C=C(C)C(=O)OCCCc1cc(-c2ccc(-c3ccc(C4CCC(CCCCC)CC4)cc3)c(CC)c2)cc(CCCOC(=O)C(=C)C)c1OCCC(CO)(CO)CCCC]

TABLE E-continued
SA-29
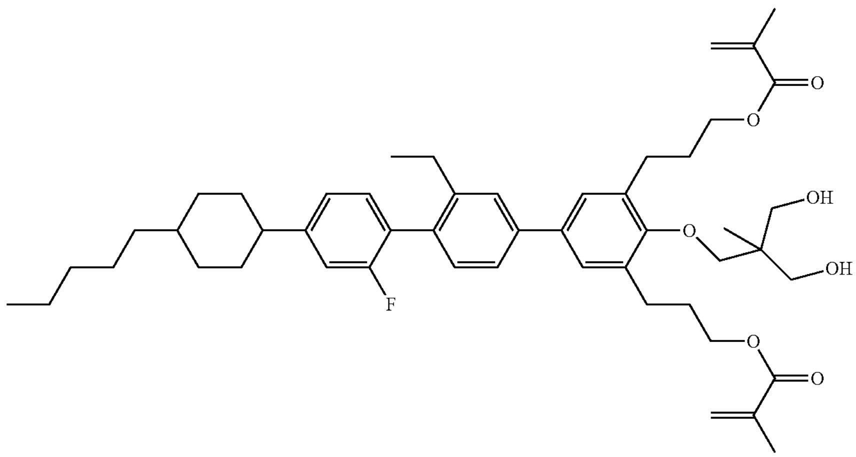 [SMILES: C=C(C)C(=O)OCCCc1cc(-c2ccc(-c3ccc(C4CCC(CCCCC)CC4)cc3F)c(CC)c2)cc(CCCOC(=O)C(=C)C)c1OCC(C)(CO)CO]
SA-30
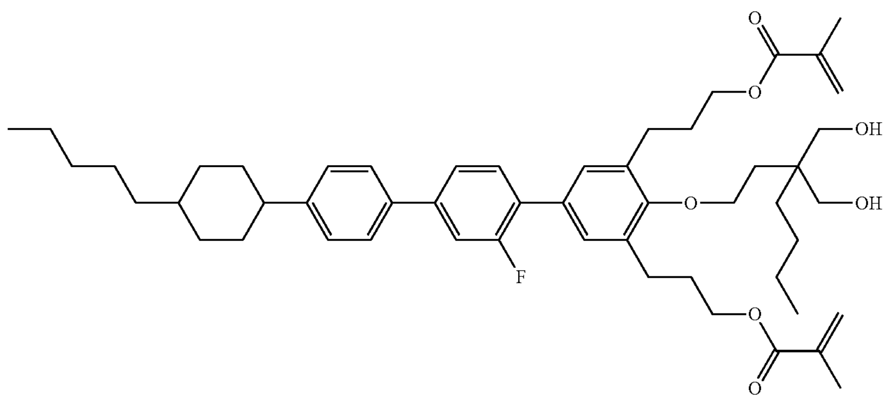 [SMILES: C=C(C)C(=O)OCCCc1cc(-c2ccc(-c3ccc(C4CCC(CCCCC)CC4)cc3)cc2F)cc(CCCOC(=O)C(=C)C)c1OCCC(CO)(CO)CCCC]
SA-31
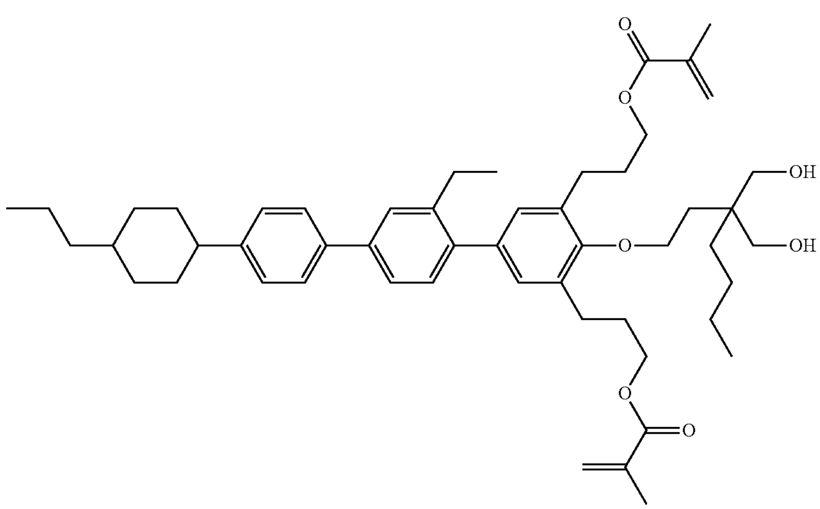 [SMILES: C=C(C)C(=O)OCCCc1cc(-c2ccc(-c3ccc(C4CCC(CCC)CC4)cc3)cc2CC)cc(CCCOC(=O)C(=C)C)c1OCCC(CO)(CO)CCCC]

TABLE E-continued
SA-32
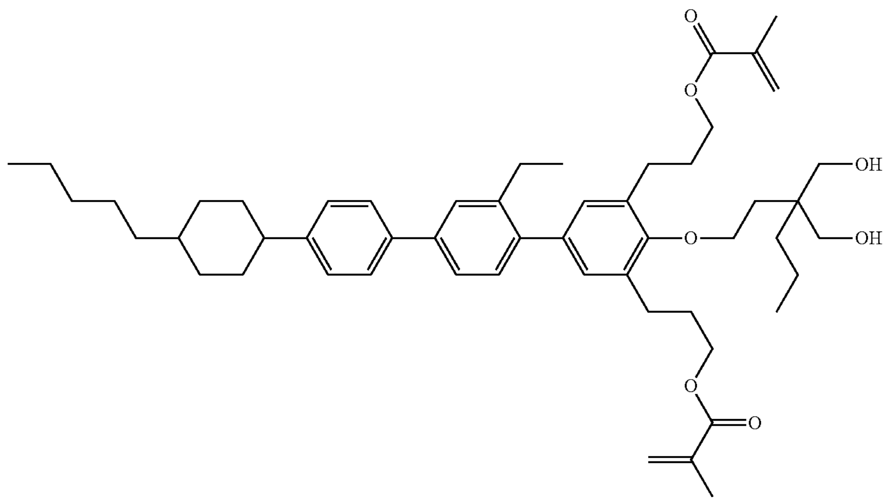 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCC]
SA-33
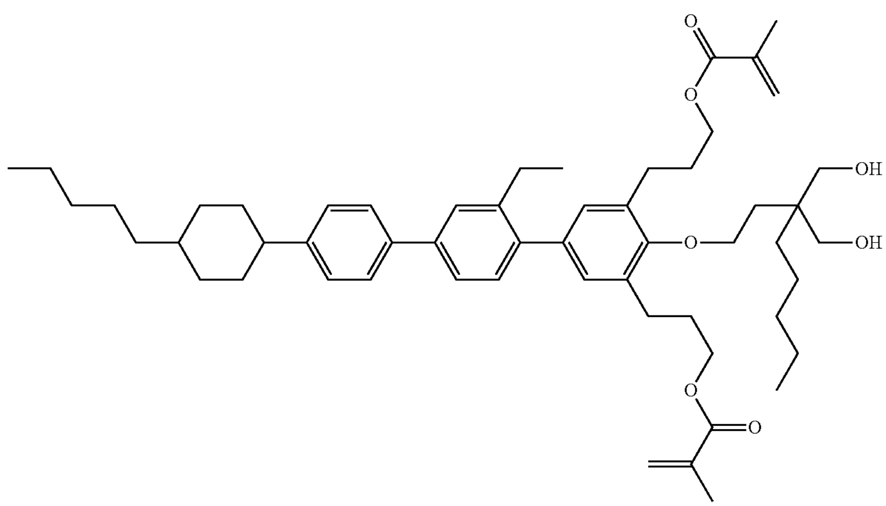 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCCC]
SA-34
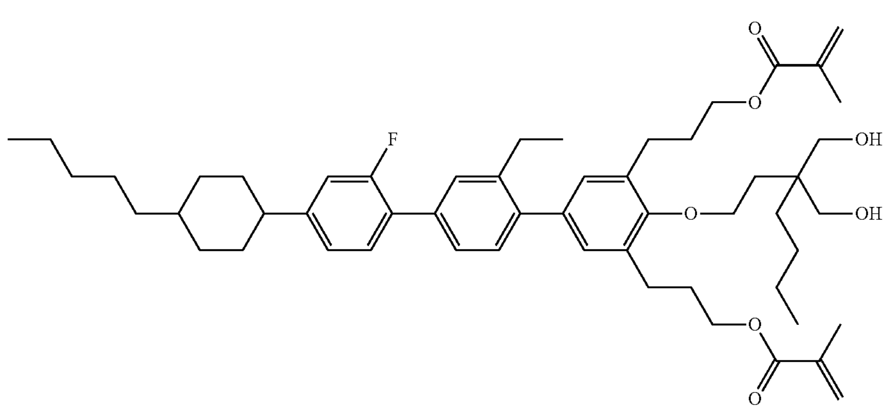 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCCC]

TABLE E-continued
SA-35
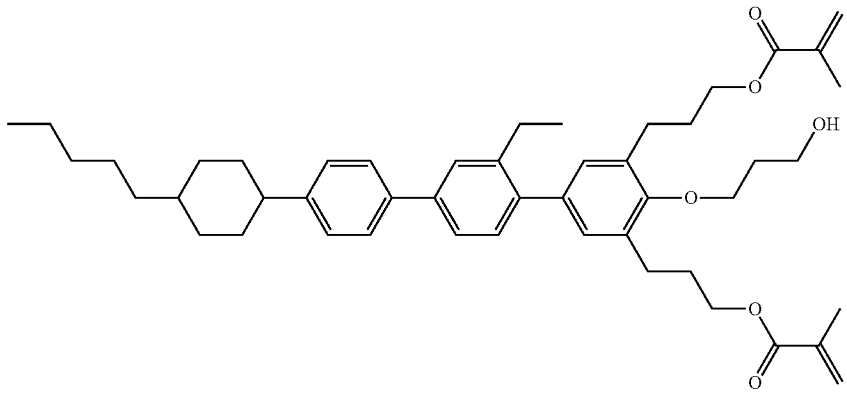 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCCO]
SA-36
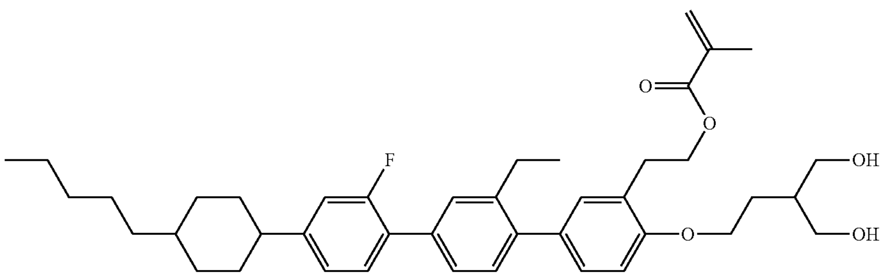 [SMILES: C=C(C)C(=O)OCCc1cc(-c2ccc(-c3ccc(C4CCC(CCCCC)CC4)cc3F)cc2CC)ccc1OCCC(CO)CO]
SA-37
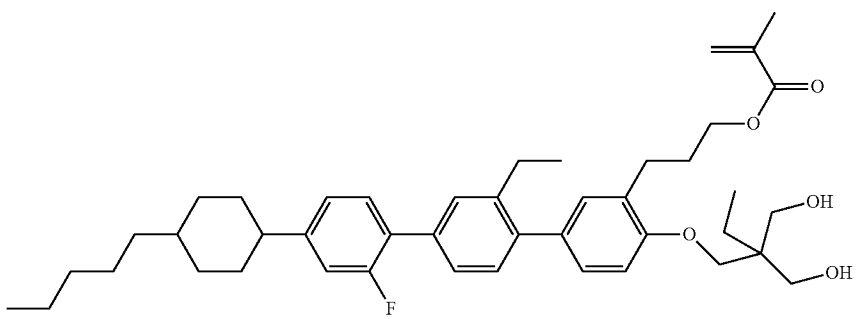 [SMILES: C=C(C)C(=O)OCCCc1cc(-c2ccc(-c3ccc(C4CCC(CCCCC)CC4)cc3F)cc2CC)ccc1OCC(CC)(CO)CO]
SA-38
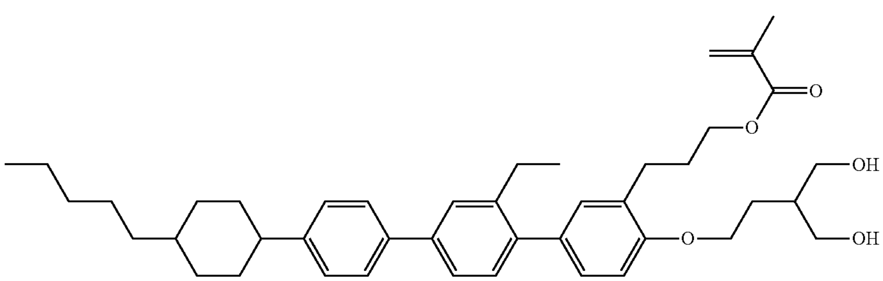 [SMILES: C=C(C)C(=O)OCCCc1cc(-c2ccc(-c3ccc(C4CCC(CCCCC)CC4)cc3)cc2CC)ccc1OCCC(CO)CO]
SA-39
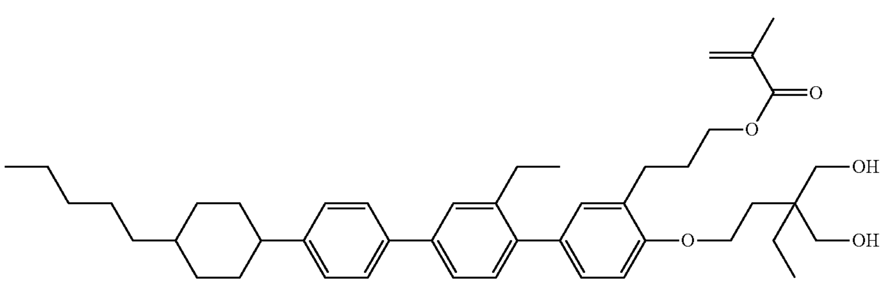 [SMILES: C=C(C)C(=O)OCCCc1cc(-c2ccc(-c3ccc(C4CCC(CCCCC)CC4)cc3)cc2CC)ccc1OCCC(CC)(CO)CO]

TABLE E-continued
SA-40
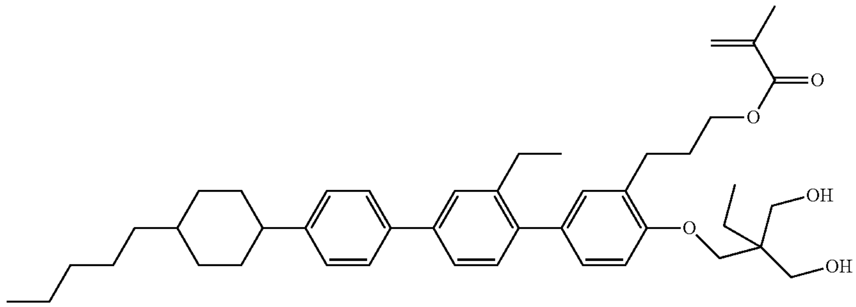 [SMILES: C=C(C)C(=O)OCCCc1cc(-c2ccc(-c3ccc(C4CCC(CCCCC)CC4)cc3)cc2CC)ccc1OCC(CC)(CO)CO]
SA-41
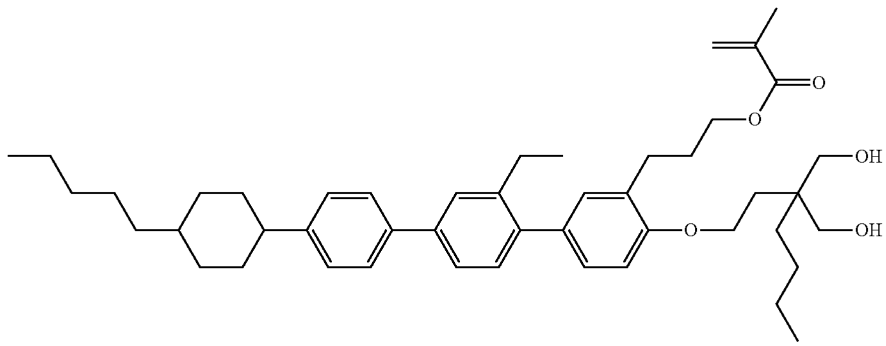 [SMILES: C=C(C)C(=O)OCCCc1cc(-c2ccc(-c3ccc(C4CCC(CCCCC)CC4)cc3)cc2CC)ccc1OCCC(CO)(CO)CCCC]
SA-42
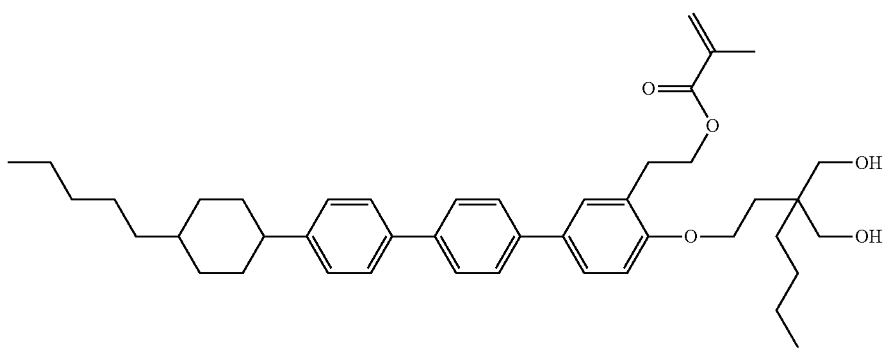 [SMILES: C=C(C)C(=O)OCCc1cc(-c2ccc(-c3ccc(C4CCC(CCCCC)CC4)cc3)cc2)ccc1OCCC(CO)(CO)CCCC]
SA-43
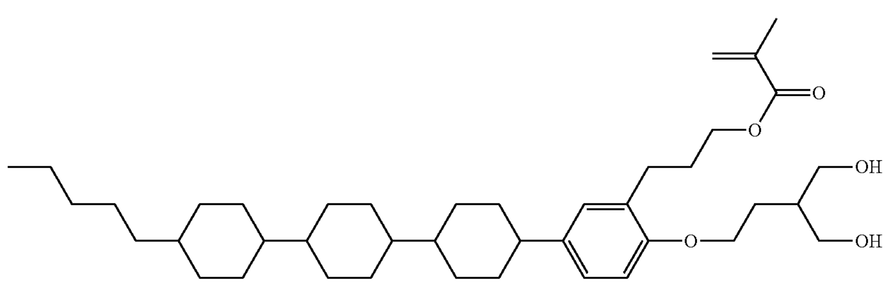 [SMILES: C=C(C)C(=O)OCCCc1cc(C2CCC(C3CCC(C4CCC(CCCCC)CC4)CC3)CC2)ccc1OCCC(CO)CO]

TABLE E-continued
SA-44
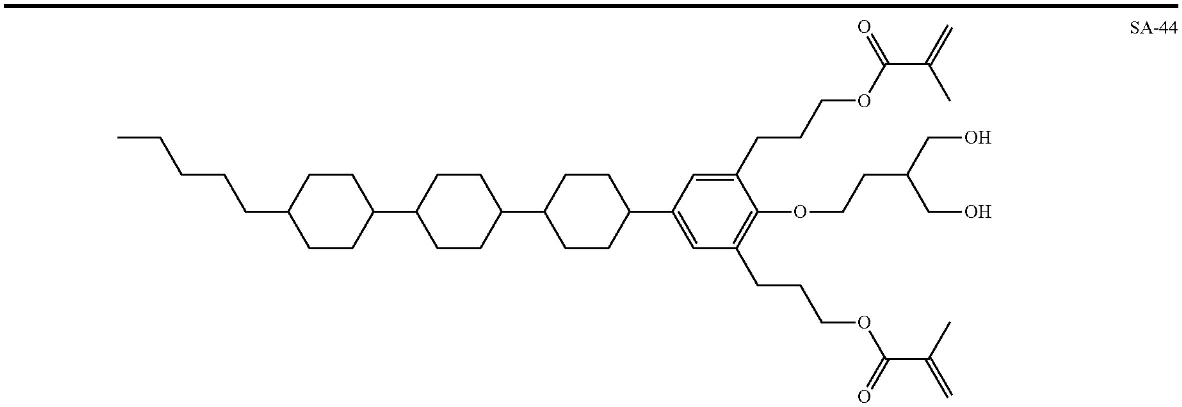
SA-45
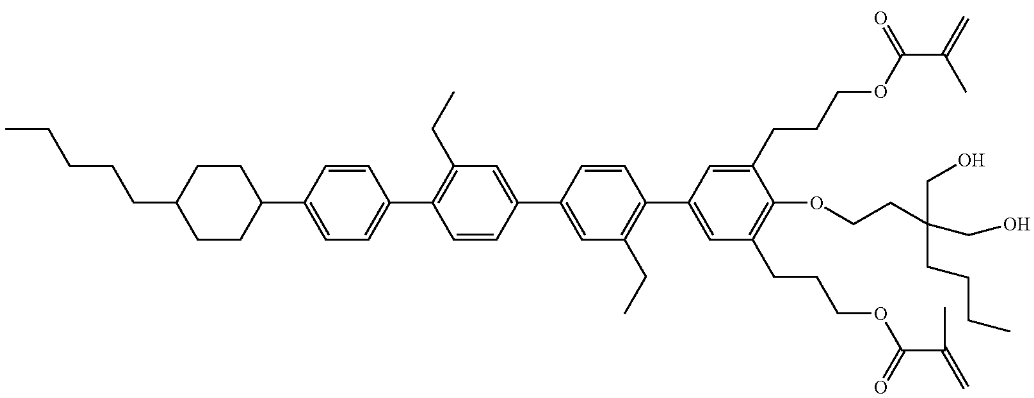 [SMILES: C=C(C)C(=O)OCCCc1cc(-c2ccc(-c3ccc(-c4ccc(C5CCC(CCCCC)CC5)cc4)c(CC)c3)cc2CC)cc(CCCOC(=O)C(=C)C)c1OCCC(CO)(CO)CCCC]
SA-46
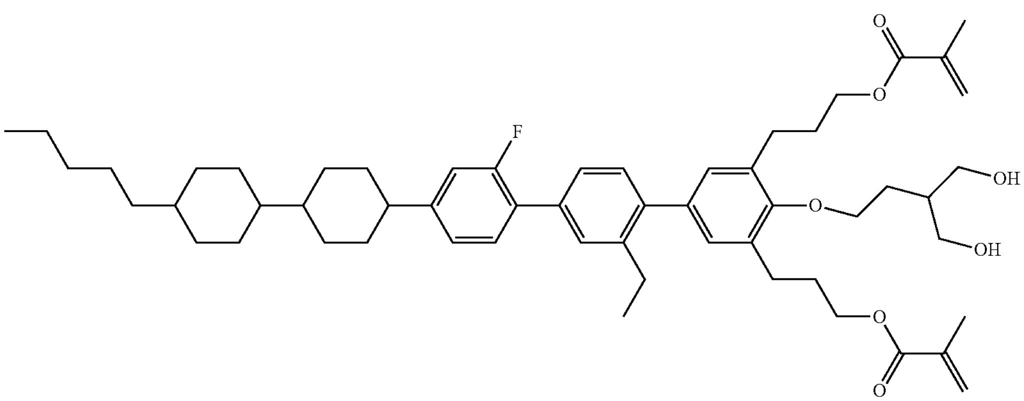 [SMILES: C=C(C)C(=O)OCCCc1cc(-c2ccc(-c3ccc(C4CCC(C5CCC(CCCCC)CC5)CC4)cc3F)cc2CC)cc(CCCOC(=O)C(=C)C)c1OCCC(CO)CO]
SA-47
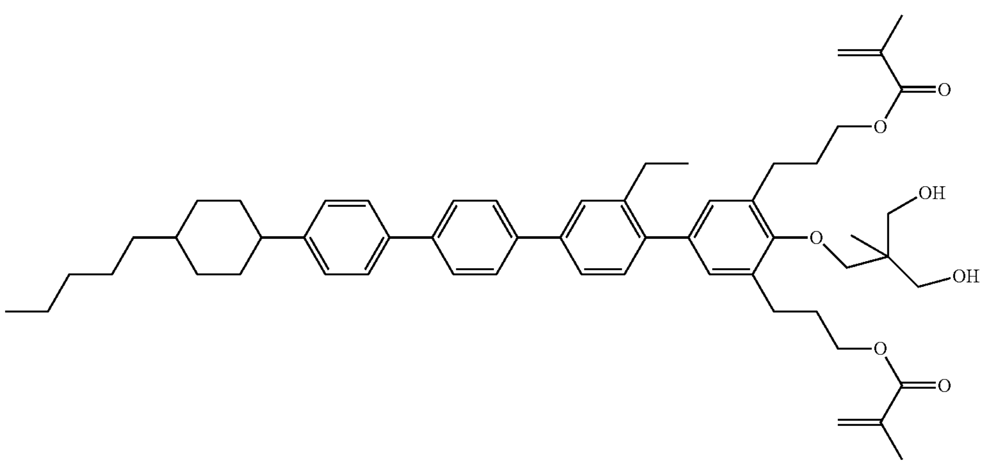 [SMILES: C=C(C)C(=O)OCCCc1cc(-c2ccc(-c3ccc(-c4ccc(C5CCC(CCCCC)CC5)cc4)cc3)cc2CC)cc(CCCOC(=O)C(=C)C)c1OCC(C)(CO)CO]

TABLE E-continued

SA-48

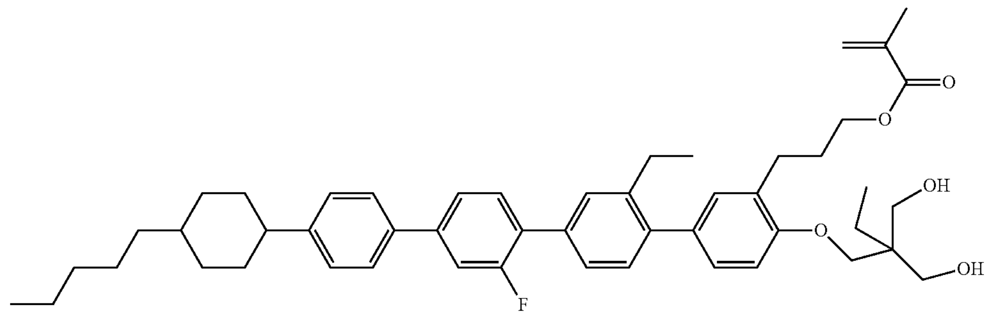 [SMILES: C=C(C)C(=O)OCCCc1cc(-c2ccc(-c3ccc(-c4ccc(C5CCC(CCCCC)CC5)cc4)cc3F)cc2CC)ccc1OCC(CC)(CO)CO]

Table E shows self-alignment additives for vertical alignment which can be used in LC media for SA-VA and SA-FFS displays according to the present invention together with the polymerizable compounds of formula I:

In a preferred embodiment, the LC media, SA-VA and SA-FFS displays according to the present invention comprise one or more SA additives selected from formulae SA-1 to SA-48, preferably from formulae SA-14 to SA-48, very preferably from formulae SA-20 to SA-34 and SA-44, in combination with one or more RMs of formula I.

EXAMPLES

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

In addition, the following abbreviations and symbols are used:

$V_0$ threshold voltage, capacitive [V] at 20° C.,
$n_e$ extraordinary refractive index at 20° C. and 589 nm,
$n_0$ ordinary refractive index at 20° C. and 589 nm,
Δn optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
Δε dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δε at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, the process of polymerizing the polymerizable compounds in the PSA displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

The display used for measurement of the capacitive threshold voltage consists of two plane-parallel glass outer plates at a separation of 25 μm, each of which has on the inside an electrode layer and an unrubbed polyimide alignment layer on top, which effect a homeotropic edge alignment of the liquid-crystal molecules.

The PSVA display or PSVA test cell used for measurement of the tilt angles consists of two plane-parallel glass outer plates at a separation of ca. 3.3 μm unless stated otherwise, each of which has on the inside an electrode layer and a polyimide alignment layer on top, where the two polyimide layers are rubbed antiparallel to one another and effect a homeotropic edge alignment of the liquid-crystal molecules. The SAVA display or test cell have one or no polyimide orientation layer and a patterned electrode structure resulting in two or more domains of LC orientation direction. For tilt measurements, the light of a single domain is transmitted by the use of light blocking layers or shields.

The polymerizable compounds are polymerized in the display or test cell by irradiation with UV light of defined intensity for a prespecified time, with a voltage simultaneously being applied to the display (usually 10 V to 30 V alternating current, 1 kHz). In the examples, unless indicated otherwise, a metal halide lamp and an intensity of 100 mW/cm$^2$ is used for polymerization. The intensity is measured using a standard meter (Hoenle UV-meter high end with UV sensor).

The tilt angle is determined using the Mueller Matrix Polarimeter "AxoScan" from Axometrics. A low value (i.e. a large deviation from the 90° angle) corresponds to a large tilt here.

The tilt angle can be also determined by the polarimeter RETS from Otsuka Electronics Co., Ltd. For VA mode case, for small retardation values the tilt-angle is small, which means the LC director is close to the vertical (homeotropic) alignment.

Unless stated otherwise, the term "tilt angle" means the angle between the LC director and the substrate, and "LC director" means in a layer of LC molecules with uniform orientation the preferred orientation direction of the optical main axis of the LC molecules, which corresponds, in case of calamitic, uniaxially positive birefringent LC molecules, to their molecular long axis.

Example 1

The nematic LC host mixture N1 is formulated as follows

| | | | |
|---|---|---|---|
| B-2O-O5 | 4.00% | cl.p. | 74.2° C. |
| BCH-32 | 8.00% | Δn | 0.1091 |
| CC-3-V1 | 9.00% | $n_e$ | 1.5953 |
| CCH-301 | 2.00% | $n_o$ | 1.4862 |
| CCH-34 | 8.00% | Δε | −3.1 |
| CCH-35 | 7.00% | ε‖ | 3.6 |
| CCP-3-1 | 8.00% | $\varepsilon_\perp$ | 6.7 |
| CCP-V2-1 | 5.00% | $\gamma_1$ | 108 mPa · s |
| CCY-3-O2 | 10.50% | $K_1$ | 14.8 |
| CLY-3-O2 | 1.00% | $K_3$ | 16.5 |
| CPY-3-O2 | 2.50% | $K_3/K_1$ | 1.14 |
| CY-3-O2 | 11.50% | $V_0$ | 2.41 V |
| PCH-301 | 5.50% | | |
| PY-3-O2 | 18.00% | | |

Polymerizable mixture P1 is prepared by mixing 0.35% of the polymerizable compound RM-1 with 99.65% of the mixture N1.

RM-1

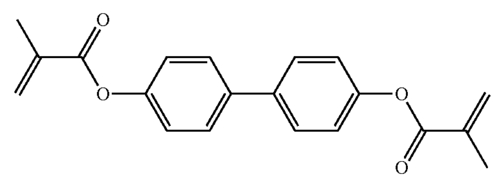

The dyed polymerizable mixture P1R is prepared by adding 0.2% of the red dye F-355 of formula I*1a1 to the polymerizable mixture P1.

I*1a1

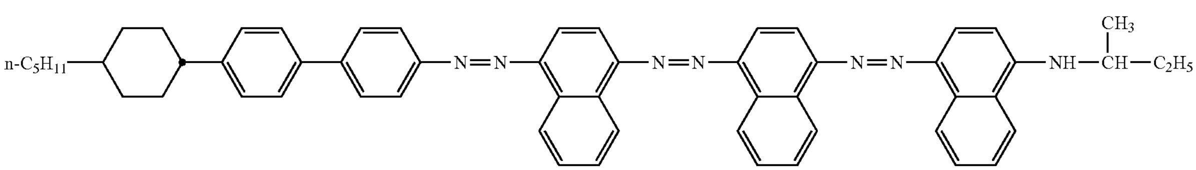

The UV-vis spectrum of dyed polymerizable mixture P1R shows an absorption peak at ca. 550 nm. The dyed polymerizable mixture P1R is thus suitable to absorb undesired green light emitted by the QDCF into the LC layer.

The dyed polymerizable mixture P1B is prepared by adding 0.2% of the blue dye F-593 of formula I*4a1 to the polymerizable mixture P1.

I*4a1

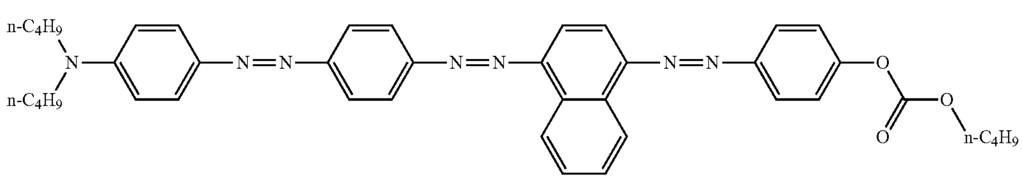

The UV-vis spectrum of dyed polymerizable mixture P1B shows an absorption peak at ca. 630 nm. The dyed polymerizable mixture P1B is thus suitable to absorb undesired red light emitted by the QDCF into the LC layer.

Example 2

The nematic LC host mixture N2 is formulated as follows

| | | | |
|---|---|---|---|
| B-(c5)1O-O2 | 4.00% | cl.p. | 74.1° C. |
| BCH-32 | 8.00% | | |
| CC-3-V1 | 9.00% | | |
| CCH-301 | 2.00% | | |
| CCH-34 | 8.00% | | |
| CCH-35 | 7.00% | | |
| CCP-3-1 | 8.00% | | |
| CCP-V2-1 | 5.00% | | |
| CCY-3-O2 | 10.50% | | |
| CLY-3-O2 | 1.00% | | |
| CPY-3-O2 | 2.50% | | |
| CY-3-O2 | 11.50% | | |
| PCH-301 | 5.50% | | |
| PY-3-O2 | 18.00% | | |

Polymerizable mixture P2 is prepared by mixing 0.3% of the polymerizable compound RM-1 with 99.7% of the mixture N2.

Dyed polymerizable mixture P2R is prepared by adding 0.2% of the red dye F-355 of formula I*1a1 to the polymerizable mixture P2.

Dyed polymerizable mixture P2B is prepared by adding 0.2% of the blue dye F-593 of formula I*4a1 to the polymerizable mixture P2.

Example 3

The nematic LC host mixture N3 is formulated as follows

| | | | |
|---|---|---|---|
| B-(c3)1O-O2 | 2.00% | cl.p. | 74.1° C. |
| B-2O-O5 | 2.00% | | |
| BCH-32 | 8.00% | | |
| CC-3-V1 | 9.00% | | |
| CCH-301 | 2.00% | | |
| CCH-34 | 8.00% | | |
| CCH-35 | 7.00% | | |
| CCP-3-1 | 8.00% | | |
| CCP-V2-1 | 5.00% | | |
| CCY-3-O2 | 10.50% | | |
| CLY-3-O2 | 1.00% | | |
| CPY-3-O2 | 2.50% | | |
| CY-3-O2 | 11.50% | | |
| PCH-301 | 5.50% | | |
| PY-3-O2 | 18.00% | | |

Polymerizable mixture P3 is prepared by mixing 0.3% of the polymerizable compound RM-35 with 99.7% of the mixture N3.

RM-35

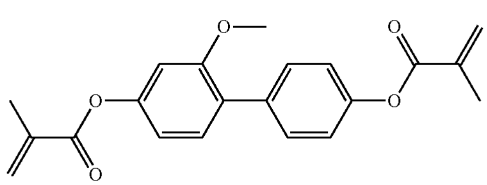

Dyed polymerizable mixture P3R is prepared by adding 0.2% of the red dye F-355 of formula I*1a1 to the polymerizable mixture P3.

Dyed polymerizable mixture P3B is prepared by adding 0.2% of the blue dye F-593 of formula I*4a1 to the polymerizable mixture P3.

Example 4

The nematic LC host mixture N4 is formulated as follows

| | | | |
|---|---|---|---|
| B(S)-(c3)1O-O2 | 2.00% | cl.p. | 74.1° C. |
| B(S)-2O-O5 | 2.00% | | |
| BCH-32 | 8.00% | | |
| CC-3-V1 | 9.00% | | |
| CCH-301 | 2.00% | | |
| CCH-34 | 8.00% | | |
| CCH-35 | 7.00% | | |
| CCP-3-1 | 8.00% | | |
| CCP-V2-1 | 5.00% | | |
| CCY-3-O2 | 10.50% | | |
| CLY-3-O2 | 1.00% | | |
| CPY-3-O2 | 2.50% | | |
| CY-3-O2 | 11.50% | | |
| PCH-301 | 5.50% | | |
| PY-3-O2 | 18.00% | | |

Polymerizable mixture P4 is prepared by mixing 0.3% of the polymerizable compound RM-170 with 99.7% of the mixture N4.

RM-170

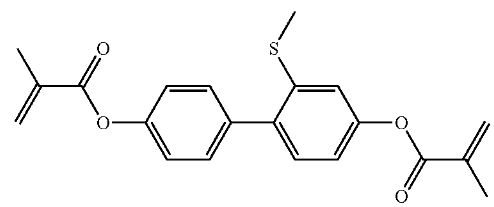

Dyed polymerizable mixture P4R is prepared by adding 0.2% of the red dye F-355 of formula I*1a1 to the polymerizable mixture P4.

Dyed polymerizable mixture P4B is prepared by adding 0.2% of the blue dye F-593 of formula I*4a1 to the polymerizable mixture P4.

Example 5

The nematic LC host mixture N5 is formulated as follows

| | | | |
|---|---|---|---|
| B(S)-2O-O5 | 4.00% | cl.p. | 74.3° C. |
| BCH-32 | 8.00% | | |
| CC-3-V1 | 9.00% | | |
| CCH-301 | 2.00% | | |
| CCH-34 | 8.00% | | |
| CCH-35 | 7.00% | | |
| CCP-3-1 | 8.00% | | |
| CCP-V2-1 | 5.00% | | |
| CCY-3-O2 | 10.50% | | |
| CLY-3-O2 | 1.00% | | |
| CPY-3-O2 | 2.50% | | |
| CY-3-O2 | 11.50% | | |
| PCH-301 | 5.50% | | |
| PY-3-O2 | 18.00% | | |

Polymerizable mixture P5 is prepared by mixing 0.3% of the polymerizable compound RM-145 with 99.7% of the mixture N5.

RM-145

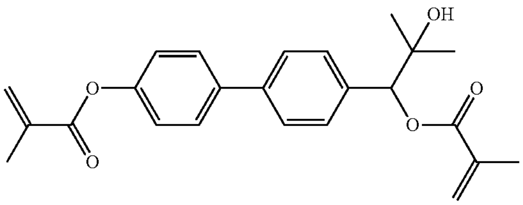

Dyed polymerizable mixture P5R is prepared by adding 0.2% of the red dye F-355 of formula I*1a1 to the polymerizable mixture P5.

Dyed polymerizable mixture P5B is prepared by adding 0.2% of the blue dye F-593 of formula I*4a1 to the polymerizable mixture P5.

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. From the description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding EP application No. 21171926.5, filed May 4, 2021, are incorporated by reference herein.

The invention claimed is:

1. An LC medium, comprising 0.01 to 3.0% by weight of one or more polymerizable compounds of formula I $P\text{-}Sp\text{-}A^a\text{-}(Z^a\text{-}A^b)_z\text{-}R^b$ wherein each of the individual radicals, independently of each other and on each occurrence identically or differently, have the following meanings $R^b$ is P-Sp- or R, R is F, Cl, —CN or a straight chain alkyl having 1 to 25 C atoms or branched or cyclic alkyl having 3 to 25 C atoms, wherein one or more non-adjacent $CH_2$-groups are optionally replaced by —O—, —S—, —CO—, —CO—O—, —O—CO—, —O—CO—O—, $CR^0$═$CR^{00}$—, —C≡C—

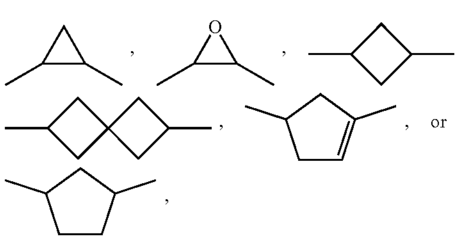

in such a manner that O- and/or S-atoms are not directly connected with each other, and wherein one or more H atoms are each optionally replaced by F or Cl or P-Sp-, P is a polymerizable group, Sp is a spacer group which is optionally substituted by P, or is a single bond, $A^a$, $A^b$ is an alicyclic, heterocyclic, aromatic or heteroaromatic group with 4 to 20 ring atoms, which is monocyclic or polycyclic and which is optionally substituted by one or more groups L or P-Sp-, $Z^a$ is —O—, —S—, —CO—, —CO—O—, —O—CO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH═CH—, —CF═CF—, —CH═CF—, —CF═CH—, —C≡C—, —CH═CH—CO—O—, —O—CO—CH═CH—, —$CH_2$—$CH_2$—CO—O—, —O—CO—$CH_2$—$CH_2$—, —$CR^0R^{00}$—, or a single bond, $R^0$, $R^{00}$ is H or alkyl having 1 to 12 C atoms, L is F, Cl, —CN, P-Sp- or a straight chain alkyl having 1 to 25 C atoms or branched or cyclic alkyl having 3 to 25 C atoms, wherein one or more non-adjacent $CH_2$-groups are optionally replaced by —O—, —S—, —CO—, —CO—O—, —O—CO—, —O—CO—O—, $CR^0$═$CR^{00}$—, —C≡C—

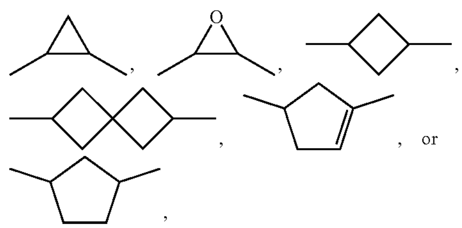

in such a manner that O- and/or S-atoms are not directly connected with each other, and wherein one or more H atoms are each optionally replaced by P-Sp-, F or Cl, z is 0, 1, 2, 3 or 4, n1 is 1, 2, 3 or 4, and further comprising one or more compounds of formula II

II

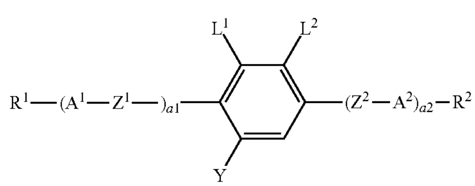

wherein each of the individual radicals, independently of each other and on each occurrence identically or differently, have the following meanings $R^1$, $R^2$ is H or a straight chain alkyl having 1 to 25 C atoms or branched or cyclic alkyl having 3 to 25 C atoms, wherein one or more non-adjacent $CH_2$-groups are optionally replaced by —O—, —S—, —CO—, —CO—O—, —O—CO—, —O—CO—O—, $CR^0$═$CR^{00}$—, —C≡C—,

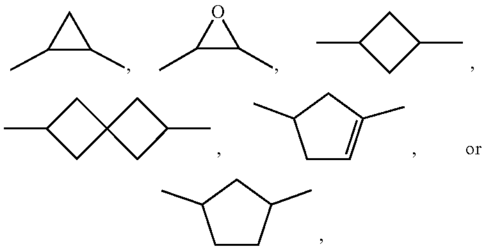

in such a manner that O- and/or S-atoms are not directly connected with each other, and wherein one or more H atoms are each optionally replaced by CN, $CF_3$, F or Cl, $A^1$, $A^2$ is selected from the following formulae

A1

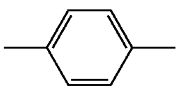

A2

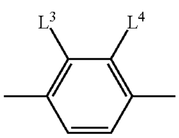

A3

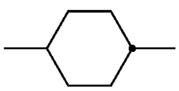

A4

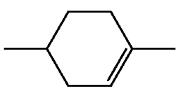

A5

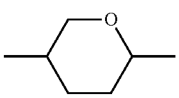

A6

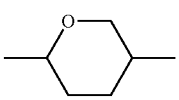

A7

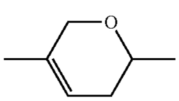

A8

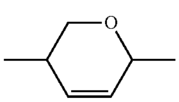

A9

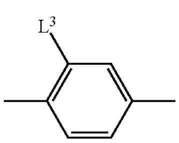

A10

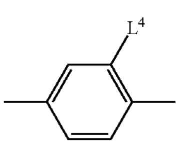

-continued

A11

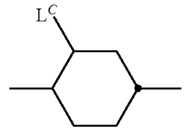

A12

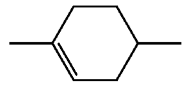

A13

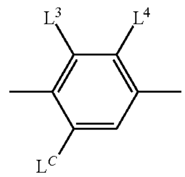

A14

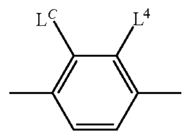

A15

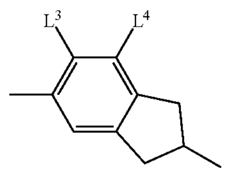

A16

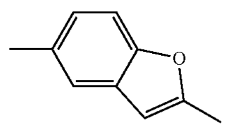

$Z^1$, $Z^2$ is —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, $L^1$, $L^2$, $L^3$, $L^4$ is F, Cl, $OCF_3$, $CF_3$, $CH_3$, $CH_2F$ or $CHF_2$, Y H, F, Cl, $CF_3$, $CHF_2$ or $CH_3$, $L^C$ $CH_3$ or $OCH_3$, a1 0, 1 or 2, and a2 0 or 1, and further comprising at least one dichroic dye absorbing green light and/or at least one dichroic dye absorbing red light, wherein the LC comprises one or more dichroic dyes of formulae I*

I*

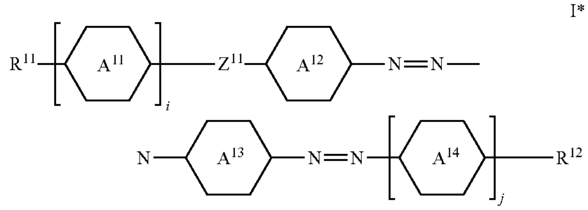

wherein each of the individual radicals, independently of each other and on each occurrence identically or differently, have the following meanings

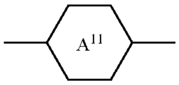
to
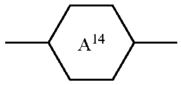

are independently of each other

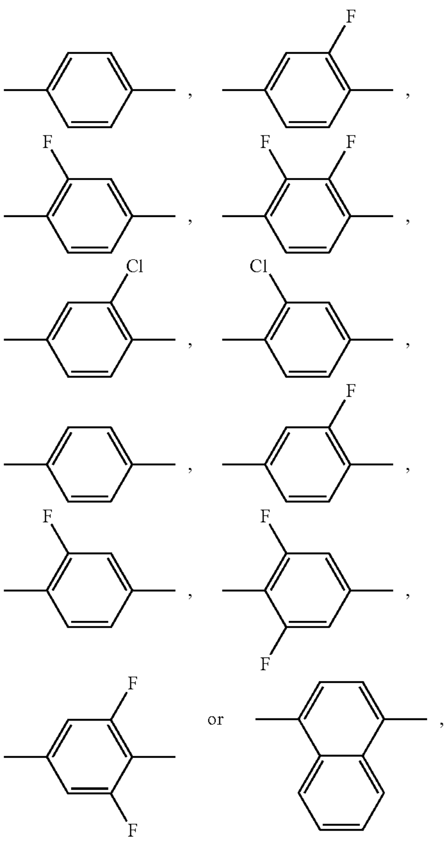

and, in case i is 2 or more, the terminal

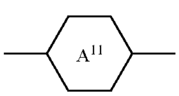

may also be

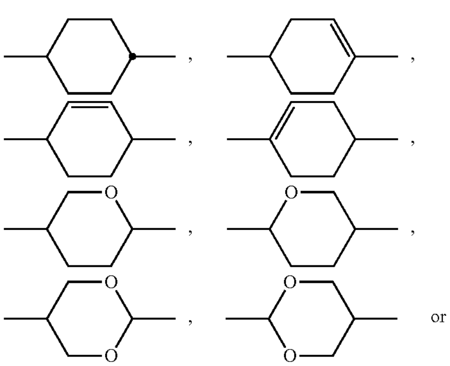

-continued

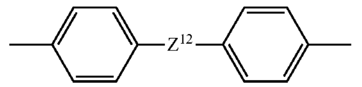

and, in case j is 2 or more, the terminal

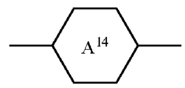

may also be

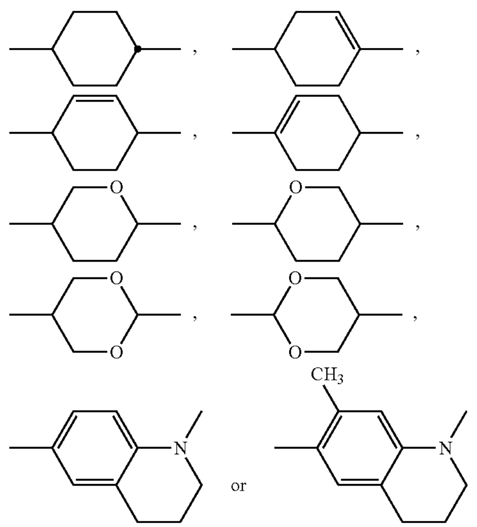

$Z^{11}$ and $Z^{12}$ denote a single bond, —N═N—, —OCO— or —COO—, $R^{11}$ and $R^{12}$ denote alkyl, alkoxy, fluorinated alkyl or fluorinated alkoxy with 1 to 20 C-atoms, alkenyl, alkenyloxy, alkoxyalkyl or fluorinated alkenyl with 2 to 20 C-atoms, or alkylaminyl, dialkylaminyl, alkylcarbonyl, alkyloxycarbonyl, alkylcarbonyloxy or alkyloxycarbonyloxy with 3 to 20 C-atoms, or alkylcyclohexylalkyl with 8 to 25 C-atoms, i and j are independently of each other 1, 2, 3 or 4.

2. The LC medium according to claim 1, comprising one or more polymerizable compounds of formula I selected from the following formulae:

M1

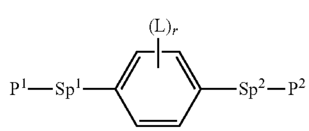

M2

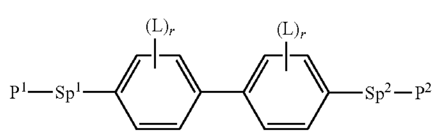

-continued
M3
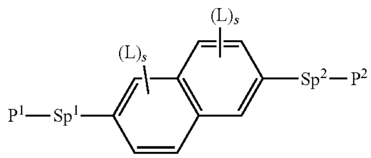
M4
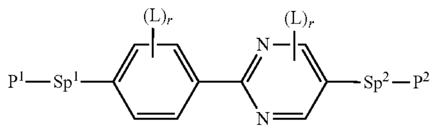
M5
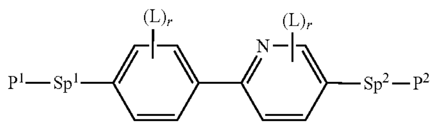
M6
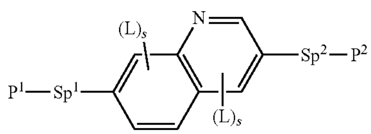
M7
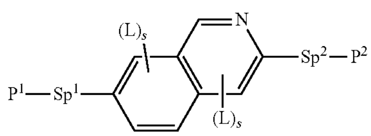
M8
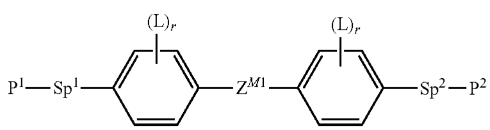
M9
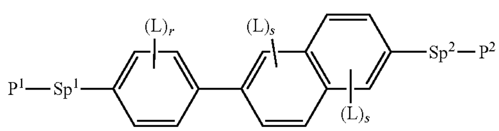
M10
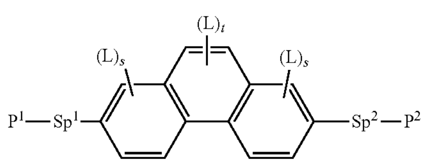
M11
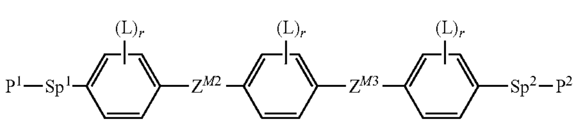
M12
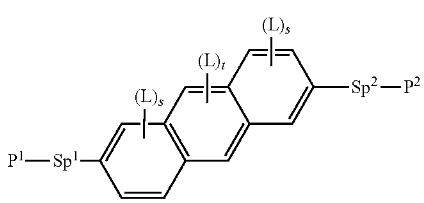
-continued
M13
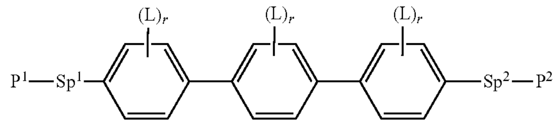
M14
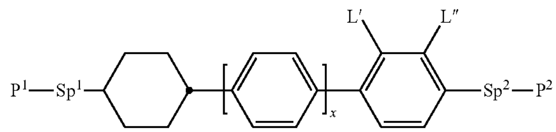
M15
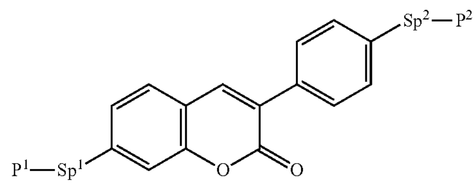
M16
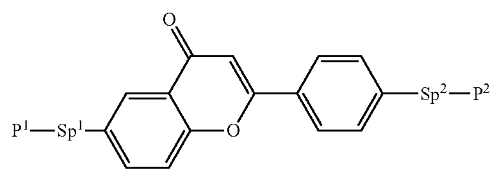
M17
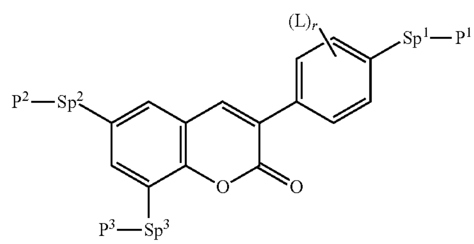
M18
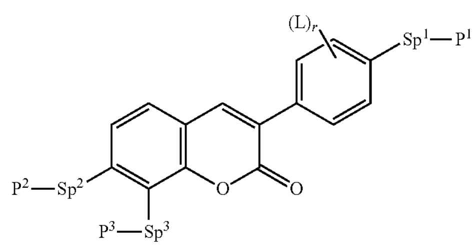
M19
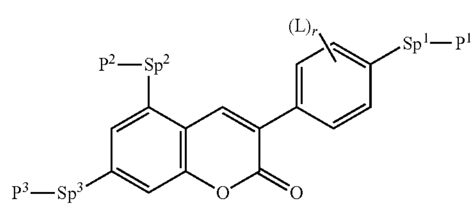
M20
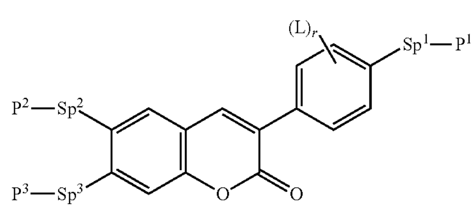

-continued

M21

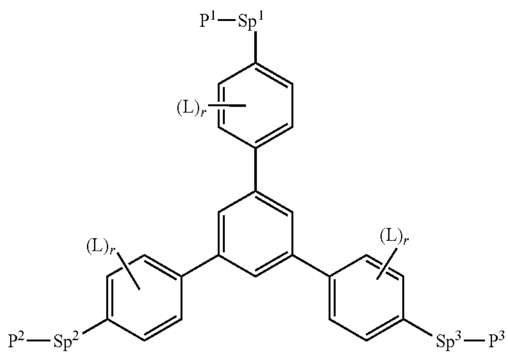

M22

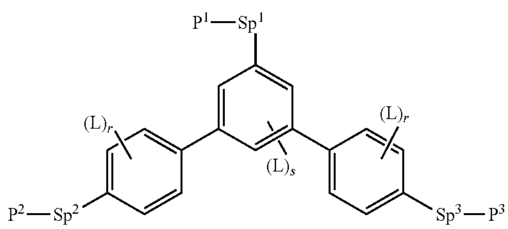

M23

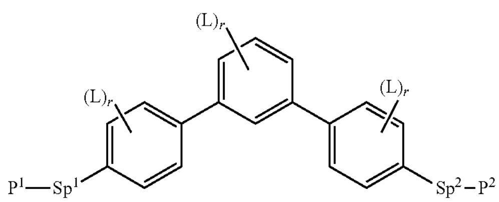

M24

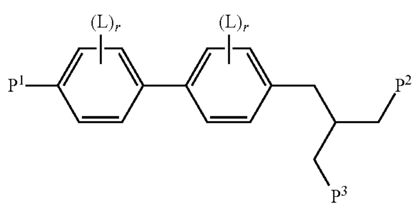

M25

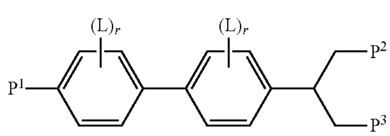

M26

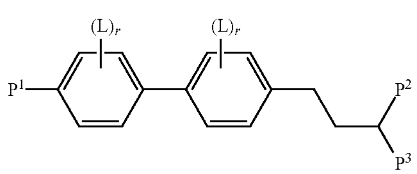

M27

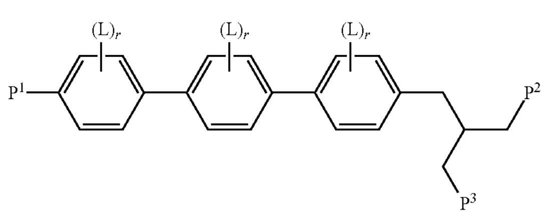

-continued

M28

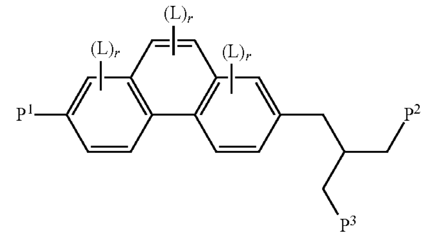

M29

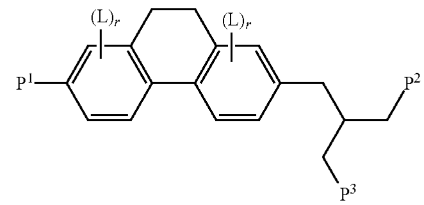

M30

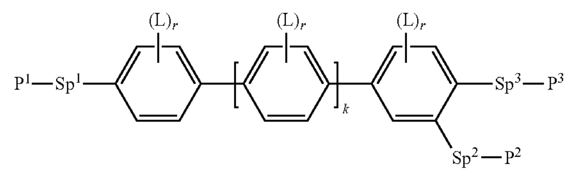

M31

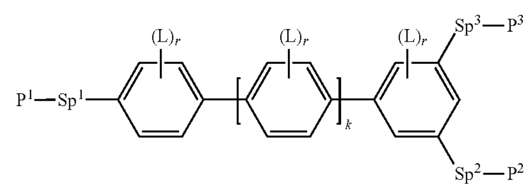

M32

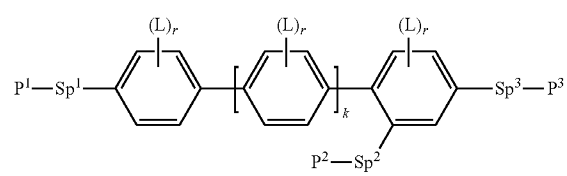

in which each of the individual radicals, on each occurrence identically or differently, and each, independently of one another, have the following meaning:

$P^1$, $P^2$, $P^3$ is a polymerizable group, $Sp^1$, $Sp^2$, $Sp^3$ is a single bond or a spacer group, where one or more of the radicals $P^1$-$Sp^1$-, $P^2$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$-present is different from $R^{aa}$, $R^{aa}$ is H, F, Cl, CN or straight-chain alkyl having 1 to 25 C atoms or branched alkyl having 3 to 25 C atoms, in which one or more non-adjacent $CH_2$ groups may each be replaced, independently of one another, by —C($R^0$)═C($R^{00}$)—, —C≡C—, —N($R^0$)—, —O—, —S—, —CO—, —CO—O—, —O—CO—, or —O—CO—O— in such a way that 0 and/or S atoms are not linked directly to one another, and in which one or more H atoms may be replaced by F, Cl, CN or $P^1$-$Sp^1$-, and wherein $R^{aa}$ does not denote or contain a group $P^1$, $P^2$ or $P^3$, $R^0$, $R^{00}$ is H or alkyl having 1 to 12 C atoms, $R^y$, $R^z$ is H, F, $CH_3$ or $CF_3$, $Z^{M1}$ is —O—, —CO—, —C($R^yR^z$)— or —$CF_2CF_2$—, $Z^{M2}$, $Z^{M3}$ is —CO—O—, —O—CO—, —$CH_2O$—, —$OCH_2$—, —$CF_2O$—, —$OCF_2$— or —$(CH_2)_n$—, where n is 2, 3 or 4, L is F, Cl, CN or a straight-chain or branched, optionally mono- or polyfluorinated alkyl, alkoxy, alkylcarbonyl, alkoxycarbonyl, alkylcarbonyloxy or alkoxycarbonyloxy having 1 to 12 C atoms, or a straight-chain, optionally mono- or polyfluorinated alkenyl or alkynyl having 2 to 12 C atoms, or a branched, optionally mono- or polyfluorinated alkyl, alkoxy, alkenyl, alkynyl, alkylcarbonyl, alkoxycarbonyl, alkylcarbonyloxy or alkoxycarbonyloxy having 3 to 12 C atoms, L', L" is H, F or Cl, k is 0 or 1, r is 0, 1, 2, 3 or 4, s is 0, 1, 2 or 3, t is 0, 1 or 2, and x is 0 or 1.

3. The LC medium according to claim 1, comprising one or more dichroic dyes of the following formulae:

I*1

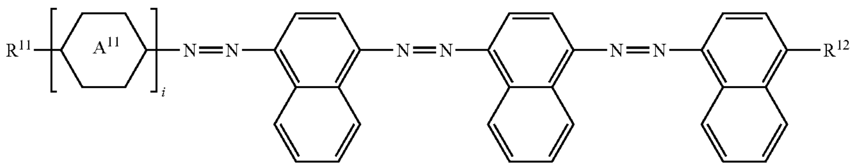

I*2

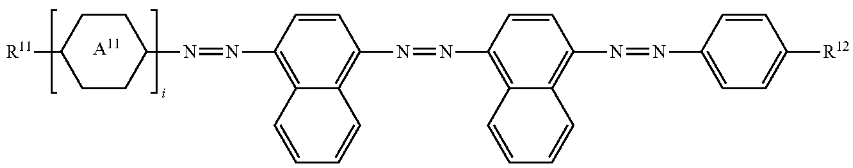

I*3

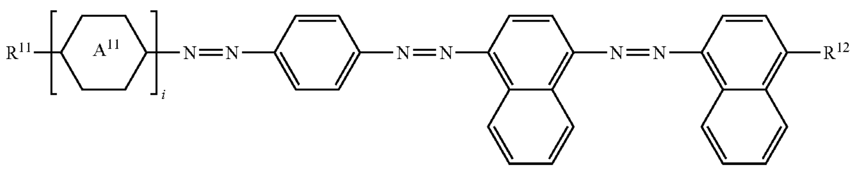

I*4

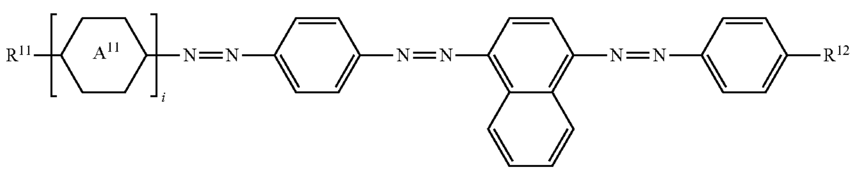

I*5

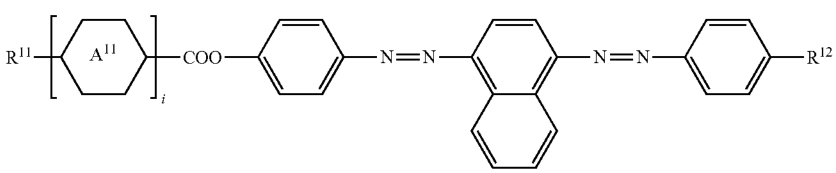

I*6

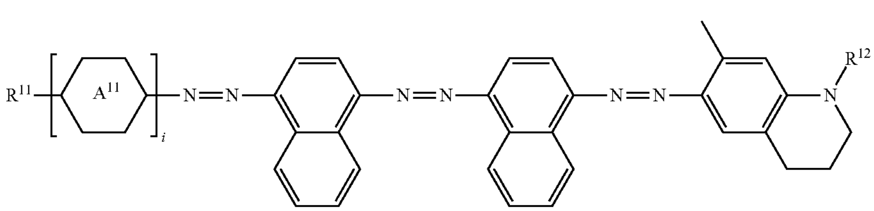

I*7

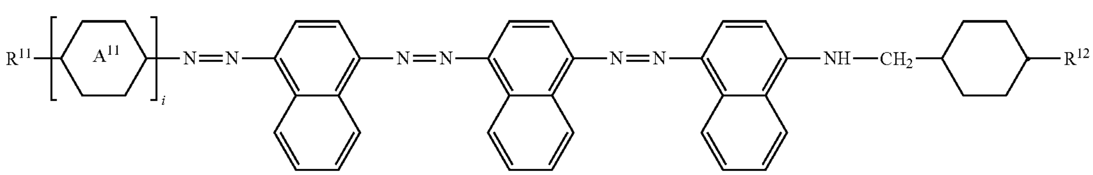

wherein $R^{11}$, $R^{12}$, $A^{11}$ and i have the meanings given for formula I*.
4. The LC medium according to claim 1, comprising one or more dichroic dyes of the following formulae:
I*1a
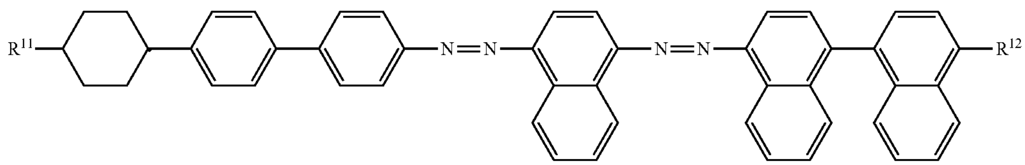
I*2a
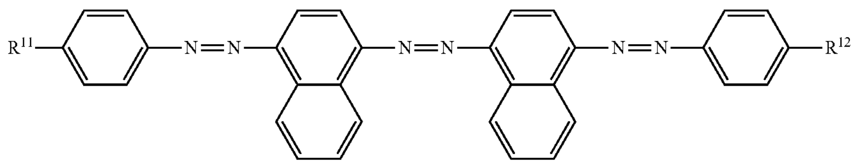
I*3a
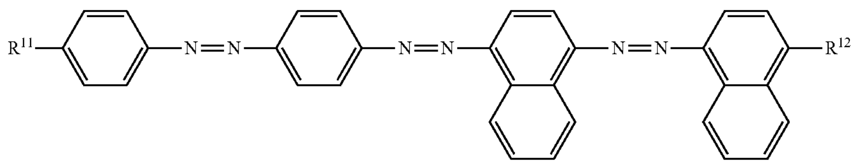
I*4a
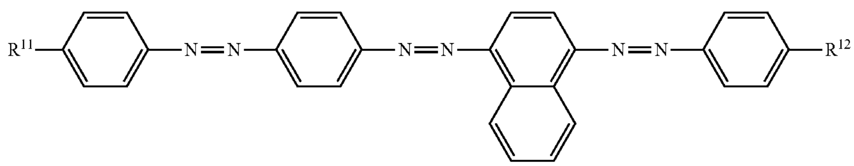
I*5a
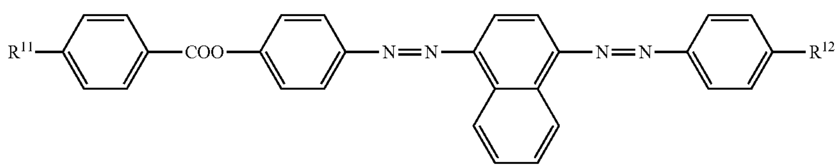
I*6a
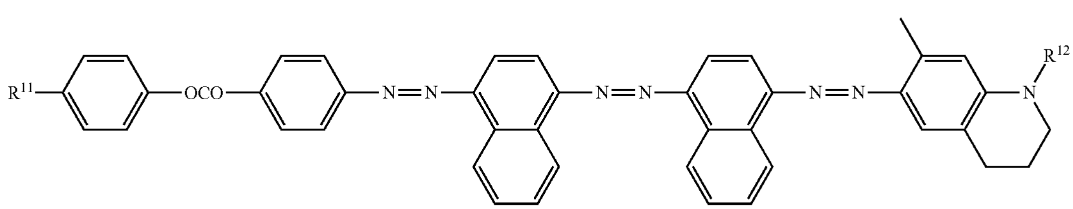
I*7a
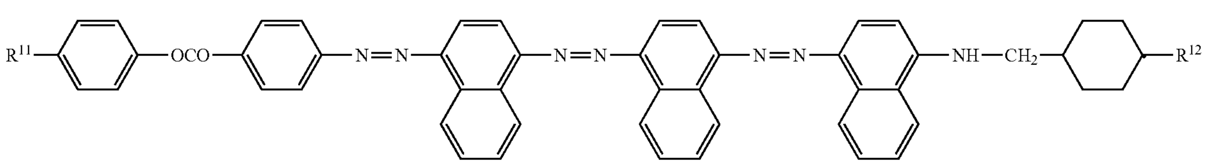

wherein $R^{11}$ and $R^{12}$ have the meanings given for formula I*.

5. The LC medium according to claim 1, comprising one or more compounds of formula II selected from the group consisting of compounds of formulae IIA, IIB, IIC and IID

IIA

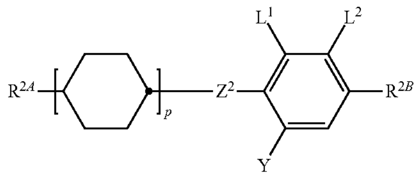

IIB

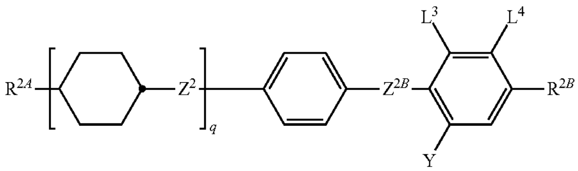

IIC

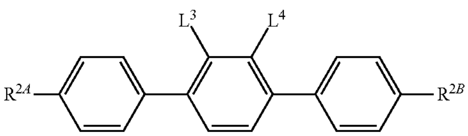

IID

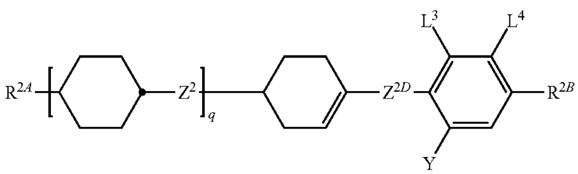

in which $R^{2A}$ and $R^{2B}$ each, independently of one another, denote H, an alkyl or alkenyl radical having up to 15 C atoms which is unsubstituted, monosubstituted by CN, $CF_3$, F or Cl, or at least monosubstituted by halogen, in which one or more $CH_2$ groups may be replaced by —O—, —S—,

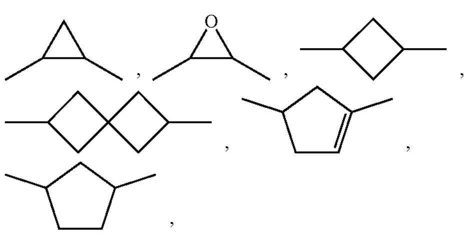

—C≡C—, —$CF_2$O—, —O$CF_2$—, —OC—O— or —O—CO— in such a way that O atoms are not linked directly to one another, $L^1$ to $L^4$ each, independently of one another, denote F, Cl, $CF_3$ or $CHF_2$, Y denotes H, F, Cl, $CF_3$, $CHF_2$ or $CH_3$, $Z^2$, $Z^{2B}$ and $Z^{2D}$ each, independently of one another, denote a single bond, —$CH_2CH_2$—, —CH═CH—, —$CF_2$O—, —O$CF_2$—, —$CH_2$O—, —O$CH_2$—, —COO—, —OCO—, —$C_2F_4$—, —CF═CF—, or —CH═CHC$H_2$O—, p denotes 0, 1 or 2, and q on each occurrence, identically or differently, denotes 0 or 1.

6. An LC medium, comprising 0.01 to 3.0% by weight of one or more polymerizable compounds of formula I $$\text{P-Sp-A}^a\text{-(Z}^a\text{-A}^b)_z\text{-R}^b \quad \text{I}$$

wherein each of the individual radicals, independently of each other and on each occurrence identically or differently, have the following meanings $R^b$ is P-Sp- or R, R is F, Cl, —CN or a straight chain alkyl having 1 to 25 C atoms or branched or cyclic alkyl having 3 to 25 C atoms, wherein one or more non-adjacent $CH_2$-groups are optionally replaced by —O—, —S—, —CO—, —CO—O—, —O—CO—, —O—CO—O—, $CR^0$═$CR^{00}$—, —C≡C—,

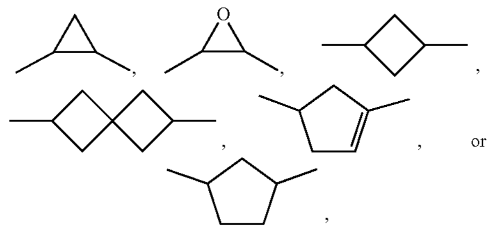

in such a manner that O- and/or S-atoms are not directly connected with each other, and wherein one or more H atoms are each optionally replaced by F or Cl or P-Sp-, P is a polymerizable group, Sp is a spacer group which is optionally substituted by P, or is a single bond, $A^a$, $A^b$ is an alicyclic, heterocyclic, aromatic or heteroaromatic group with 4 to 20 ring atoms, which is monocyclic or polycyclic and which is optionally substituted by one or more groups L or P-Sp-, $Z^a$ is —O—, —S—, —CO—, —CO—O—, —O—CO—, —O—CO—O—, —O$CH_2$—, —$CH_2$O—, —S$CH_2$—, —$CH_2$S—, —$CF_2$O—, —O$CF_2$—, —$CF_2$S—, —S$CF_2$—, —$(CH_2)_{n1}$—, —$CF_2CH_2$—, —$CH_2CF_2$—, —$(CF_2)_{n1}$—, —CH═CH—, —CF═CF—, —CH═CF—, —CF═CH—, —C≡C—, —CH═CH—CO—O—, —O—CO—CH═CH—, —$CH_2$—$CH_2$—CO—O—, —O—CO—$CH_2$—$CH_2$—, —$CR^0R^{00}$—, or a single bond, $R^0$, $R^{00}$ is H or alkyl having 1 to 12 C atoms, L is F, Cl, —CN, P-Sp- or a straight chain alkyl having 1 to 25 C atoms or branched or cyclic alkyl having 3 to 25 C atoms, wherein one or more non-adjacent $CH_2$-groups are optionally replaced by —O—, —S—, —CO—, —CO—O—, —O—CO—, —O—CO—O—, $CR^0$═$CR^{00}$—, —C≡C—,

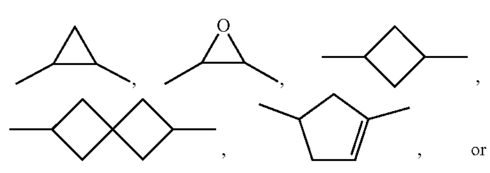

-continued

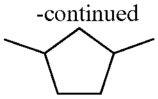

in such a manner that O- and/or S-atoms are not directly connected with each other, and wherein one or more H atoms are each optionally replaced by P-Sp-, F or Cl, z is 0, 1, 2, 3 or 4, n1 is 1, 2, 3 or 4, and further comprising one or more compounds of formula II

II

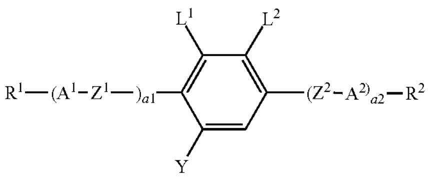

wherein each of the individual radicals, independently of each other and on each occurrence identically or differently, have the following meanings $R^1$, $R^2$ is H or a straight chain alkyl having 1 to 25 C atoms or branched or cyclic alkyl having 3 to 25 C atoms, wherein one or more non-adjacent $CH_2$-groups are optionally replaced by —O—, —S—, —CO—, —CO—O—, —O—CO—, —O—CO—O—, $CR^0$═$CR^{00}$—, —C≡C—,

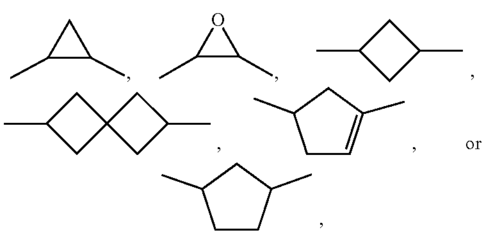

in such a manner that O- and/or S-atoms are not directly connected with each other, and wherein one or more H atoms are each optionally replaced by CN, $CF_3$, F or Cl, $A^1$, $A^2$ is selected from the following formulae

A1

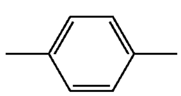

A2

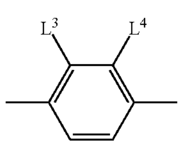

A3

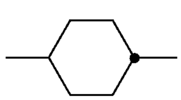

-continued

A4

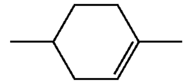

A5

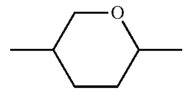

A6

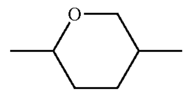

A7

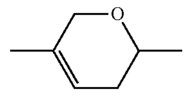

A8

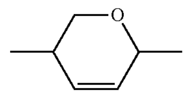

A9

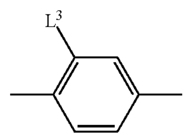

A10

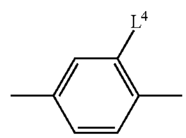

A11

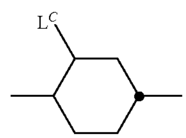

A12

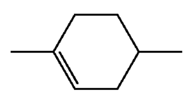

A13

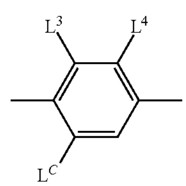

A14

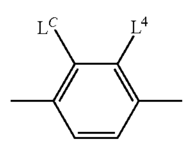

A15

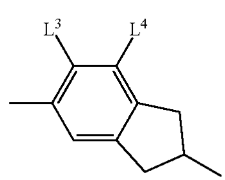

-continued

A16

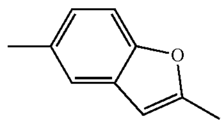

$Z^1$, $Z^2$ is —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, $L^1$, $L^2$, $L^3$, $L^4$ is F, Cl, $OCF_3$, $CF_3$, $CH_3$, $CH_2F$ or $CHF_2$, Y H, F, Cl, $CF_3$, $CHF_2$ or $CH_3$, $L^C$ $CH_3$ or $OCH_3$, a1 0, 1 or 2, and a2 0 or 1, and further comprising at least one dichroic dye absorbing green light and/or at least one dichroic dye absorbing red light, and one or more compounds of formula III

III

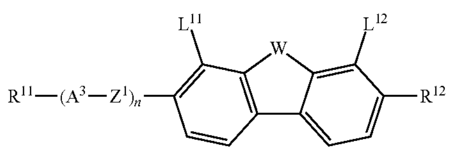

in which $R^{11}$ and $R^{12}$ each, independently of one another, denote H, an alkyl or alkoxy radical having 1 to 15 C atoms, in which one or more $CH_2$ groups may each be replaced, independently of one another, by

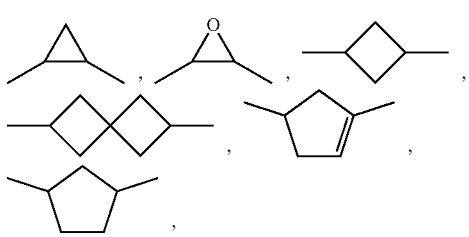

—O—, —S—, —C≡C—, —$CF_2O$—, —$OCF_2$—, —CH═CH—, —OC—O— or —O—CO— in such a way that O atoms are not linked directly to one another, and in which one or more H atoms may be replaced by halogen, $A^3$ on each occurrence, independently of one another, denotes a) 1,4-cyclohexenylene or 1,4-cyclohexylene radical, in which one or two non-adjacent $CH_2$ groups may be replaced by —O— or —S—, b) a 1,4-phenylene radical, in which one or two CH groups may be replaced by N, or c) a radical selected from the group consisting of spiro[3.3]heptane-2,6-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, wherein the radicals a), b) and c) may be mono- or polysubstituted by halogen atoms, n denotes 0, 1 or 2, $Z^1$ on each occurrence independently of one another denotes —CO—O—, —O—CO—, —$CF_2O$—, —$OCF_2$—, —$CH_2O$—, —$OCH_2$—, —$CH_2$—, —$CH_2CH_2$—, —$(CH_2)_4$—, —CH═CH—$CH_2O$—, —$C_2F_4$—, —$CH_2CF_2$—, —$CF_2CH_2$—, —CF═CF—, —CH═CF—, —CF═CH—, —CH═CH—, —C≡C— or a single bond, $L^{11}$ and $L^{12}$ each, independently of one another, denote F, Cl, $CF_3$ or $CHF_2$, and W denotes O or S.

7. The LC medium according to claim 1, additionally comprising one or more compounds of formula IV

IV

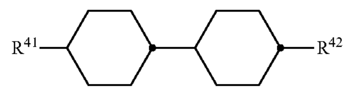

in which $R^{41}$ denotes an unsubstituted alkyl radical having 1 to 7 C atoms or an unsubstituted alkenyl radical having 2 to 7 C atoms, and $R^{42}$ denotes an unsubstituted alkyl radical having 1 to 7 C atoms or an unsubstituted alkoxy radical having 1 to 6 C atoms, or an unsubstituted a alkenyl radical having 2 to 7 C atoms.

8. The LC medium according to claim 1, additionally comprising one or more compounds of formula V

V

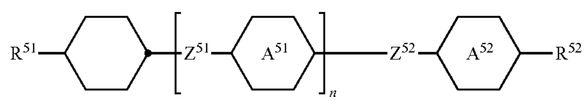

in which $R^{51}$ and $R^{52}$ independently of one another, each denotes an unsubstituted alkyl radical having 1 to 7 C atoms or an unsubstituted alkoxy radical having 1 to 6 C atoms, or an unsubstituted alkenyl radical having 2 to 7 C atoms, alkoxy having 1 to 6 C atoms, or denotes alkoxyalkyl, alkenyl or alkenyloxy having 2 to 7 C atoms,

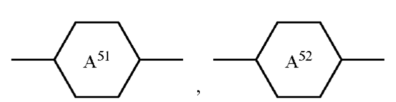

identically or differently, denote

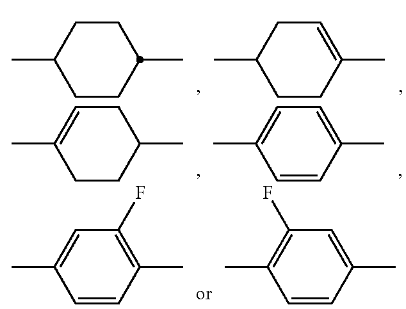

$Z^{51}$, $Z^{52}$ each, independently of one another, denote —$CH_2$—$CH_2$—, —$CH_2$—O—, —CH═CH—, —C≡C—, —COO— or a single bond, and n is 1 or 2.

9. An LC display comprising an LC medium according to claim 1.

10. The LC display according to claim 9, which is a PS-VA, PS-IPS, PS-FFS, PS-UB-FFS or SA-VA display.

11. An LC display comprising a quantum dot colour filter and an LC medium wherein the LC medium comprises 0.01 to 3.0% by weight of one or more polymerizable compounds of formula I $$P\text{-}Sp\text{-}A^a\text{-}(Z^a\text{-}A^b)_z\text{-}R^b \qquad I$$

wherein each of the individual radicals, independently of each other and on each occurrence identically or differently, have the following meanings $R^b$ is P-Sp- or R, R is F, Cl, —CN or a straight chain alkyl having 1 to 25 C atoms or branched or cyclic alkyl having 3 to 25 C atoms, wherein one or more non-adjacent $CH_2$-groups are optionally replaced by —O—, —S—, —CO—, —CO—O—, —O—CO—, —O—CO—O—, $CR^0$═$CR^{00}$—, —C≡C—,

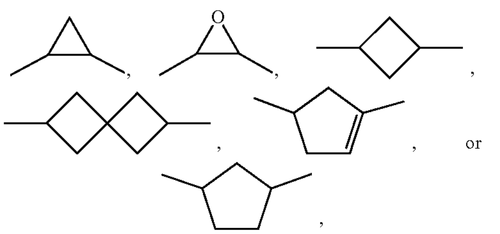

in such a manner that O- and/or S-atoms are not directly connected with each other, and wherein one or more H atoms are each optionally replaced by F or Cl or P-Sp-, P is a polymerizable group, Sp is a spacer group which is optionally substituted by P, or is a single bond, $A^a$, $A^b$ is an alicyclic, heterocyclic, aromatic or heteroaromatic group with 4 to 20 ring atoms, which is monocyclic or polycyclic and which is optionally substituted by one or more groups L or P-Sp-, $Z^a$ is —O—, —S—, —CO—, —CO—O—, —O—CO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH═CH—, —CF═CF—, —CH═CF—, —CF═CH—, —C≡C—, —CH═CH—CO—O—, —O—CO—CH═CH—, —$CH_2$—$CH_2$—CO—O—, —O—CO—$CH_2$—$CH_2$—, —$CR^0R^{00}$—, or a single bond, $R^0$, $R^{00}$ is H or alkyl having 1 to 12 C atoms, L is F, Cl, —CN, P-Sp- or a straight chain alkyl having 1 to 25 C atoms or branched or cyclic alkyl having 3 to 25 C atoms, wherein one or more non-adjacent $CH_2$-groups are optionally replaced by —O—, —S—, —CO—, —CO—O—, —O—CO—, —O—CO—O—, $CR^0$═$CR^{00}$—, —C≡C—

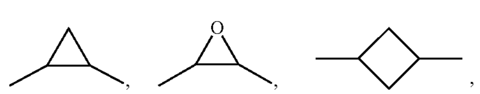

-continued

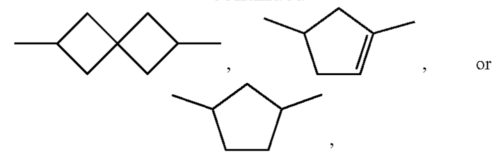

in such a manner that O- and/or S-atoms are not directly connected with each other, and wherein one or more H atoms are each optionally replaced by P-Sp-, F or Cl, z is 0, 1, 2, 3 or 4, n1 is 1, 2, 3 or 4, and further comprising one or more compounds of formula II

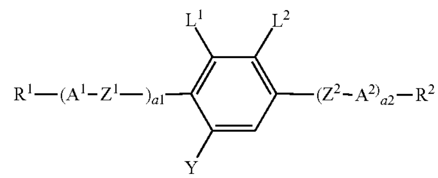

II wherein each of the individual radicals, independently of each other and on each occurrence identically or differently, have the following meanings $R^1$, $R^2$ is H or a straight chain alkyl having 1 to 25 C atoms or branched or cyclic alkyl having 3 to 25 C atoms, wherein one or more non-adjacent $CH_2$-groups are optionally replaced by —O—, —S—, —CO—, —CO—O—, —O—CO—, —O—CO—O—, $CR^0$═$CR^{00}$—, —C≡C—,

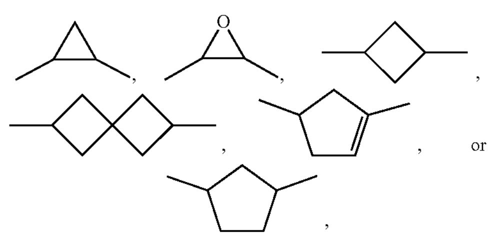

in such a manner that O- and/or S-atoms are not directly connected with each other, and wherein one or more H atoms are each optionally replaced by CN, $CF_3$, F or Cl, $A^1$, $A^2$ is selected from the following formulae

A1

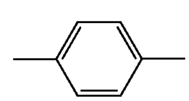

A2

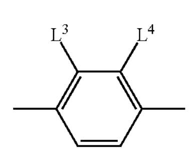

-continued

A3

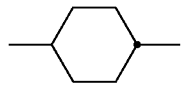

A4

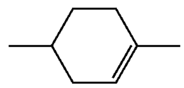

A5

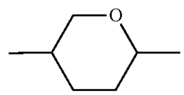

A6

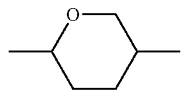

A7

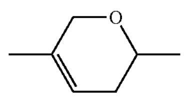

A8

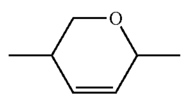

A9

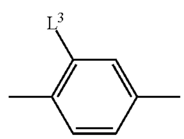

A10

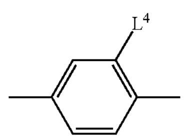

A11

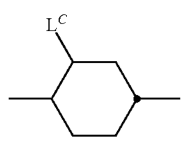

A12

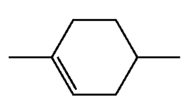

A13

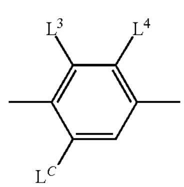

A14

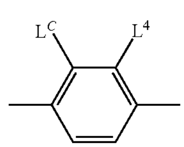

-continued

A15

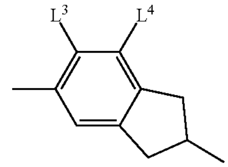

A16

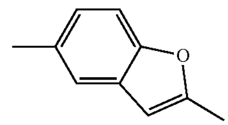

$Z^1$, $Z^2$ is —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, $L^1$, $L^2$, $L^3$, $L^4$ is F, Cl, $OCF_3$, $CF_3$, $CH_3$, $CH_2F$ or $CHF_2$, Y H, F, Cl, $CF_3$, $CHF_2$ or $CH_3$, $L^C$ $CH_3$ or $OCH_3$, a1 0, 1 or 2, and a2 0 or 1, and further comprising at least one dichroic dye absorbing green light and/or at least one dichroic dye absorbing red light.

12. An LC display, comprising:

a first substrate including a pixel electrode defining pixel areas, the pixel electrode being connected to a switching element disposed in each pixel area and optionally including a micro-slit pattern, and optionally a first alignment layer disposed on the pixel electrode, a second substrate including a common electrode layer, which may be disposed on the entire portion of the second substrate facing the first substrate, and optionally a second alignment layer, an LC layer disposed between the first and second substrates and including an LC medium according to claim 1, wherein the one or more polymerizable compounds of formula I are optionally present in polymerized form, a quantum dot colour filter containing red, green and blue quantum dots provided between the LC layer and the first or second substrate, and optionally a backlight.

13. The LC display according to claim 9, wherein the one or more polymerizable compounds of formula I are present in polymerized form.

14. A process for the production of an LC display comprising:

a first substrate including a pixel electrode defining pixel areas, the pixel electrode being connected to a switching element disposed in each pixel area and optionally including a micro-slit pattern, and optionally a first alignment layer disposed on the pixel electrode, a second substrate including a common electrode layer, which may be disposed on the entire portion of the second substrate facing the first substrate, and optionally a second alignment layer, an LC layer disposed between the first and second substrates and including an LC medium according to claim 1, wherein the one or more polymerizable compounds of formula I are optionally present in polymerized form, a quantum dot colour filter containing red, green and blue quantum dots provided between the LC layer and the first or second substrate, and optionally a backlight, said process comprising providing said LC medium between the substrates of the display, and polymerizing the one or more polymerizable compounds of formula I by irradiation with UV light, while a voltage is applied to the electrodes.

15. The LC medium according to claim 1, which contains 0.05 to 1% by weight of the one or more polymerizable compounds of formula I.

16. The LC medium according to claim 1, which contains 0.1 to 0.5% by weight of the one or more polymerizable compounds of formula I.

17. The LC medium according to claim 1, which contains 0.1 to 0.2% by weight of the one or more polymerizable compounds of formula I.

18. The LC medium according to claim 1, wherein $P^1$, $P^2$, $P^3$ is selected from vinyloxy, acrylate, methacrylate, fluoroacrylate, chloroacrylate, oxetane and epoxy, and/or $Sp^1$, $Sp^2$, $Sp^3$ is —$(CH_2)_{p1}$—, —$(CH_2)_{p1}$—O—, —$(CH_2)_{p1}$—CO—O— or —$(CH_2)_{p1}$—O—CO—O—, wherein p1 is an integer from 1 to 12, where one or more of the radicals $P^1$-$Sp^1$-, $P^2$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$-present is different from $R^{aa}$, and/or $R^{aa}$ is a straight-chain optionally mono- or polyfluorinated alkyl, alkoxy, alkylcarbonyl, alkoxycarbonyl, alkylcarbonyloxy or alkoxycarbonyloxy having 1 to 12 C atoms, or a straight-chain optionally mono- or polyfluorinated alkenyl or alkynyl having 2 to 12 C atoms, or a branched optionally mono- or polyfluorinated alkyl, alkoxy, alkenyl, alkynyl, alkylcarbonyl, alkoxycarbonyl, alkylcarbonyloxy or alkoxycarbonyloxy having 3 to 12 C atoms.

19. The LC display according to claim 12, wherein, in the LC medium, the at least one dichroic dye absorbing green light and/or at least one dichroic dye absorbing red light do not substantially absorb light reflected by a blue backlight of the display.

20. The LC medium according to claim 1, wherein the at least one dichroic dye absorbing green light and/or at least one dichroic dye absorbing red light do not substantially absorb light reflected by a blue backlight of a display.

21. The LC display according to claim 9, comprising a quantum dot colour filter.

* * * * *